United States Patent
Konno et al.

(10) Patent No.: US 8,990,299 B2
(45) Date of Patent: Mar. 24, 2015

(54) INFORMATION PROCESSING APPARATUS, METHOD OF CONTROLLING INFORMATION PROCESSING APPARATUS, AND RECORDING MEDIUM STORING CONTROL PROGRAM

(75) Inventors: Hideki Konno, Kyoto (JP); Yoshinobu Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 82 days.

(21) Appl. No.: 13/101,811

(22) Filed: May 5, 2011

(65) Prior Publication Data

US 2011/0307554 A1    Dec. 15, 2011

(30) Foreign Application Priority Data

Jun. 10, 2010    (JP) .................................. 2010-132760

(51) Int. Cl.
| | | |
|---|---|---|
| G06F 15/16 | (2006.01) | |
| H04L 29/08 | (2006.01) | |
| A63F 13/30 | (2014.01) | |
| H04L 29/06 | (2006.01) | |

(52) U.S. Cl.
CPC .............. *H04L 67/327* (2013.01); *A63F 13/12* (2013.01); *H04L 67/38* (2013.01); *A63F 2300/408* (2013.01); *A63F 2300/405* (2013.01)
USPC ............................ 709/204; 709/202; 455/436

(58) Field of Classification Search
USPC ................................... 709/202, 204; 455/436
See application file for complete search history.

(56) References Cited

U.S. PATENT DOCUMENTS

| | | |
|---|---|---|
| 5,396,225 A | 3/1995 | Okada et al. |
| 5,618,045 A | 4/1997 | Kagan et al. |
| 5,666,293 A | 9/1997 | Metz et al. |
| 5,732,275 A | 3/1998 | Kullick et al. |
| 6,018,720 A | 1/2000 | Fujimoto |
| 6,438,573 B1 | 8/2002 | Nilsen |
| 6,733,382 B2 | 5/2004 | Oe et al. |
| 6,736,727 B1 | 5/2004 | Doi et al. |
| 7,054,831 B2 | 5/2006 | Koenig |

(Continued)

FOREIGN PATENT DOCUMENTS

| | | |
|---|---|---|
| EP | 0 710 017 | 5/1996 |
| EP | 1 493 474 | 1/2005 |

(Continued)

OTHER PUBLICATIONS

English-language machine translation of JP 2002-102530.

(Continued)

*Primary Examiner* — Thomas Dailey
(74) *Attorney, Agent, or Firm* — Nixon & Vanderhye, P.C.

(57) ABSTRACT

A CPU checks the number of times of transfer of reception data. Then, the CPU determines whether the number of times of transfer is greater than 0 or not. When it is determined that the number of times of transfer is greater than 0, the number of times of transfer is updated. Then, when it is determined that a transfer condition is satisfied, the CPU allows the reception data of which number of times of transfer has been updated to be copied and stored in a transmission BOX. When reception data satisfying the transfer condition (having a value of the number of times of transfer greater than 0) is received, that reception data will be copied and stored in the transmission BOX. Namely, since the reception data is stored in the transmission BOX, the reception data will be transmitted further to another game device.

17 Claims, 90 Drawing Sheets

(56) References Cited

U.S. PATENT DOCUMENTS

| | | |
|---|---|---|
| 7,114,090 B2 | 9/2006 | Kardach et al. |
| 7,290,072 B2 | 10/2007 | Quraishi et al. |
| 7,346,708 B2 | 3/2008 | Minamisawa |
| 7,457,410 B2 | 11/2008 | Yamauchi et al. |
| 7,493,613 B2 | 2/2009 | D'Souza et al. |
| 7,565,653 B2 | 7/2009 | Inoue et al. |
| 7,620,027 B2 | 11/2009 | Igarashi et al. |
| 7,704,147 B2 | 4/2010 | Quraishi et al. |
| 7,725,078 B2 | 5/2010 | Kuwahara et al. |
| 7,729,661 B2 | 6/2010 | Tanaka et al. |
| 7,794,328 B2 | 9/2010 | Horigome |
| 7,801,818 B2 | 9/2010 | Tsukazaki et al. |
| 7,811,171 B2 | 10/2010 | Mitsuyoshi et al. |
| 7,813,300 B2 | 10/2010 | Takayama et al. |
| 7,819,750 B2 | 10/2010 | Lam et al. |
| 7,854,657 B2 | 12/2010 | Shiraiwa |
| 7,862,433 B2 | 1/2011 | Sato et al. |
| 7,901,293 B2 | 3/2011 | Oe |
| 7,929,911 B2 | 4/2011 | Tanaka et al. |
| 7,934,995 B2 | 5/2011 | Suzuki |
| 8,052,528 B2 | 11/2011 | Shiraiwa et al. |
| 8,075,405 B2 | 12/2011 | Sasaki et al. |
| 8,078,160 B2 | 12/2011 | Quinn |
| 8,185,165 B2 | 5/2012 | Beninghaus et al. |
| 8,229,962 B1 | 7/2012 | Cavalancia, II |
| 8,261,258 B1 | 9/2012 | Jianu et al. |
| 8,433,375 B2 | 4/2013 | Yamazaki et al. |
| 8,505,008 B2 | 8/2013 | Yamazaki et al. |
| 8,700,478 B2 | 4/2014 | Kubo et al. |
| 2001/0003714 A1 | 6/2001 | Takata et al. |
| 2001/0048744 A1 | 12/2001 | Kimura et al. |
| 2002/0016166 A1 | 2/2002 | Uchida et al. |
| 2002/0065137 A1 | 5/2002 | Tonomura |
| 2002/0083160 A1 | 6/2002 | Middleton |
| 2003/0033413 A1 | 2/2003 | Wilson, Jr. et al. |
| 2003/0038731 A1 | 2/2003 | Sako et al. |
| 2003/0126218 A1 | 7/2003 | Sakonsaku |
| 2003/0134623 A1 | 7/2003 | Kanamaru et al. |
| 2003/0207700 A1 | 11/2003 | Yamanaka |
| 2004/0002774 A1 | 1/2004 | Conti et al. |
| 2004/0082383 A1 | 4/2004 | Muncaster et al. |
| 2004/0122931 A1 | 6/2004 | Rowland et al. |
| 2004/0127288 A1 | 7/2004 | Furuhashi et al. |
| 2004/0151126 A1 | 8/2004 | Matsubara |
| 2004/0224769 A1 | 11/2004 | Hansen et al. |
| 2004/0259642 A1 | 12/2004 | Tanaka et al. |
| 2005/0047356 A1 | 3/2005 | Fujii et al. |
| 2005/0068928 A1 | 3/2005 | Smith et al. |
| 2005/0070327 A1 | 3/2005 | Watanabe |
| 2005/0073764 A1 | 4/2005 | Ogawa et al. |
| 2005/0154759 A1 | 7/2005 | Hofmeister et al. |
| 2005/0282639 A1 | 12/2005 | Tanaka et al. |
| 2006/0068702 A1 | 3/2006 | Miwa et al. |
| 2006/0106963 A1 | 5/2006 | Sasaki et al. |
| 2006/0166739 A1 | 7/2006 | Lin |
| 2006/0168574 A1 | 7/2006 | Giannini et al. |
| 2006/0234631 A1 | 10/2006 | Dieguez |
| 2006/0247059 A1 | 11/2006 | Nogami et al. |
| 2006/0282518 A1* | 12/2006 | Karaoguz et al. ............. 709/221 |
| 2006/0282834 A1 | 12/2006 | Cheng et al. |
| 2007/0078004 A1 | 4/2007 | Suzuki et al. |
| 2007/0105623 A1 | 5/2007 | Tanaka et al. |
| 2007/0118587 A1 | 5/2007 | Ishikawa et al. |
| 2007/0121534 A1 | 5/2007 | James et al. |
| 2007/0123168 A1 | 5/2007 | Takehara et al. |
| 2007/0136817 A1 | 6/2007 | Nguyen |
| 2007/0149183 A1 | 6/2007 | Dunko et al. |
| 2007/0174471 A1 | 7/2007 | Van Rossum |
| 2007/0203969 A1 | 8/2007 | Wakasa et al. |
| 2007/0213975 A1 | 9/2007 | Shimoda et al. |
| 2007/0232310 A1* | 10/2007 | Schiff et al. ................... 455/436 |
| 2007/0271234 A1 | 11/2007 | Ravikiran |
| 2008/0119281 A1 | 5/2008 | Hirose et al. |
| 2008/0123582 A1 | 5/2008 | Maekawa |
| 2008/0139310 A1 | 6/2008 | Kando et al. |
| 2008/0148350 A1 | 6/2008 | Hawkins et al. |
| 2008/0209071 A1 | 8/2008 | Kubota |
| 2009/0011709 A1 | 1/2009 | Akasaka et al. |
| 2009/0037526 A1* | 2/2009 | Elliott et al. ................... 709/203 |
| 2009/0058639 A1 | 3/2009 | Tanaka et al. |
| 2009/0061870 A1 | 3/2009 | Finkelstein et al. |
| 2009/0064299 A1 | 3/2009 | Begorre et al. |
| 2009/0093310 A1 | 4/2009 | Tanaka et al. |
| 2009/0124393 A1 | 5/2009 | Tanaka et al. |
| 2009/0137321 A1 | 5/2009 | Katsume et al. |
| 2009/0143114 A1 | 6/2009 | Vargas et al. |
| 2009/0143140 A1 | 6/2009 | Kitahara |
| 2009/0158430 A1 | 6/2009 | Borders |
| 2009/0186603 A1 | 7/2009 | Usami et al. |
| 2009/0193365 A1 | 7/2009 | Sugiura |
| 2009/0217307 A1 | 8/2009 | Ooe |
| 2009/0253518 A1 | 10/2009 | Sasaki et al. |
| 2009/0307105 A1 | 12/2009 | Lemay et al. |
| 2009/0310594 A1 | 12/2009 | Nakata et al. |
| 2010/0083181 A1 | 4/2010 | Matsushima et al. |
| 2010/0111057 A1 | 5/2010 | Nakamura et al. |
| 2010/0130254 A1 | 5/2010 | Kamada et al. |
| 2010/0167697 A1 | 7/2010 | Ishikawa et al. |
| 2010/0312817 A1* | 12/2010 | Steakley ....................... 709/202 |
| 2010/0325235 A1 | 12/2010 | Konno et al. |
| 2011/0045910 A1* | 2/2011 | McKenna et al. ............... 463/42 |
| 2011/0060825 A1 | 3/2011 | Ooe et al. |
| 2011/0070950 A1 | 3/2011 | Tanaka et al. |
| 2011/0143840 A1 | 6/2011 | Sotoike et al. |
| 2011/0176455 A1 | 7/2011 | Matsunada |
| 2011/0205953 A1 | 8/2011 | Kuwahara et al. |
| 2011/0231559 A1 | 9/2011 | Yamaguchi |
| 2011/0292033 A1 | 12/2011 | Umezu et al. |
| 2011/0295709 A1 | 12/2011 | Kubo et al. |
| 2011/0306294 A1 | 12/2011 | Yamazaki et al. |
| 2011/0307554 A1 | 12/2011 | Konno et al. |
| 2011/0307884 A1 | 12/2011 | Wabe |
| 2011/0307892 A1 | 12/2011 | Yamazaki et al. |
| 2012/0010000 A1 | 1/2012 | Masuda et al. |
| 2012/0011256 A1 | 1/2012 | Masuda et al. |
| 2012/0021703 A1 | 1/2012 | Yamazaki et al. |
| 2012/0054297 A1 | 3/2012 | Konno et al. |
| 2012/0071242 A1 | 3/2012 | Fujiwara et al. |

FOREIGN PATENT DOCUMENTS

| | | |
|---|---|---|
| EP | 1 513 066 | 3/2005 |
| EP | 1 810 732 | 7/2007 |
| EP | 1 872 838 | 1/2008 |
| EP | 2 135 650 | 12/2009 |
| JP | 11-53184 | 2/1999 |
| JP | 11-207031 | 8/1999 |
| JP | 2000-167233 | 6/2000 |
| JP | 2000-181822 | 6/2000 |
| JP | 2000-249569 | 9/2000 |
| JP | 2001-231067 | 5/2001 |
| JP | 2001-175556 | 6/2001 |
| JP | 2002-027552 | 1/2002 |
| JP | 2002-102530 | 4/2002 |
| JP | 2002-159739 | 6/2002 |
| JP | 2002-253866 | 9/2002 |
| JP | 2002-297483 | 10/2002 |
| JP | 2003-023661 | 1/2003 |
| JP | 2003-050771 | 2/2003 |
| JP | 2003-196217 | 7/2003 |
| JP | 2003-219465 | 7/2003 |
| JP | 2003-229809 | 8/2003 |
| JP | 2004-057515 | 2/2004 |
| JP | 2004221671 | 8/2004 |
| JP | 2004-329948 | 11/2004 |
| JP | 2004-348203 | 12/2004 |
| JP | 2005018377 | 1/2005 |
| JP | 2005-028103 | 2/2005 |
| JP | 2005-242399 | 9/2005 |
| JP | 2005-242886 | 9/2005 |
| JP | 2005-251167 | 9/2005 |
| JP | 2005-266160 | 9/2005 |
| JP | 2006-005630 | 1/2006 |
| JP | 2006-072685 | 3/2006 |

(56) References Cited

FOREIGN PATENT DOCUMENTS

| | | |
|---|---|---|
| JP | 2006-101474 | 4/2006 |
| JP | 2006-146306 | 6/2006 |
| JP | 2006-228113 | 8/2006 |
| JP | 2007507982 | 3/2007 |
| JP | 2007-088900 | 4/2007 |
| JP | 2007-125185 | 5/2007 |
| JP | 2007-142613 | 6/2007 |
| JP | 2007-164699 | 6/2007 |
| JP | 2007175508 | 7/2007 |
| JP | 2007-330642 | 12/2007 |
| JP | 2008-113259 | 5/2008 |
| JP | 2008-125659 | 6/2008 |
| JP | 2008-136737 | 6/2008 |
| JP | 2008-142181 | 6/2008 |
| JP | 2008-153905 | 7/2008 |
| JP | 2008-160303 | 7/2008 |
| JP | 2008-206800 | 9/2008 |
| JP | 2009015551 | 1/2009 |
| JP | 2009-026178 | 2/2009 |
| JP | 2009-065306 | 3/2009 |
| JP | 2009-512239 | 3/2009 |
| JP | 2009-147828 | 7/2009 |
| JP | 2009-225000 | 10/2009 |
| JP | 2010-022704 | 2/2010 |
| JP | 2010-028171 | 2/2010 |
| JP | 2010028171 | 2/2010 |
| JP | 2010028672 | 2/2010 |
| JP | 2010-079546 | 4/2010 |
| JP | 2010-086327 | 4/2010 |
| JP | 2011-509541 | 3/2011 |
| WO | 2005/111815 | 11/2005 |
| WO | 2009/048473 | 4/2009 |
| WO | 2009/148781 | 12/2009 |
| WO | 2010/010645 | 1/2010 |

OTHER PUBLICATIONS

Dissidia Final Fantasy Ultimania, Japan, Square Enix Co., Ltd., Feb. 19, 2009, First Edition, p. 502-503 and partial English-language translation thereof.
Konno et al., U.S. Appl. No. 12/816,672, filed Jun. 16, 2010.
Ooe et al., U.S. Appl. No. 12/871,243, filed Aug. 30, 2010.
Kubo et al., U.S. Appl. No. 12/940,426, filed Nov. 5, 2010.
Yamazaki et al., U.S. Appl. No. 12/948,050, filed Nov. 17, 2010.
Yamazaki et al., U.S. Appl. No. 12/948,371, filed Nov. 17, 2010.
Fujiwara et al., U.S. Appl. No. 12/969,855, filed Dec. 16, 2010.
Wabe et al., U.S. Appl. No. 13/027,723, filed Feb. 15, 2011.
Fujiwara et al., U.S. Appl. No. 13/111,033, filed May 19, 2011.
Konno et al., U.S. Appl. No. 13/251,204, filed Oct. 1, 2011.
Yamazaki et al., U.S. Appl. No. 13/251,205, filed Oct. 1, 2011.
Miki, "Oideyo Doubutsu No Mori Kanpeki Guidebook", First Edition, Enterbrain, Inc., Hamamura Kouichi, Jan. 9, 2006 (partial English-language translation), 6 pages.
Dragon Quest Monsters Joker 2, Weekly Famitsu, Enterbrain, Inc., Apr. 22, 2010, vol. 25, No. 18, Serial No. 1116, pp. 115-119, with a partial English translation, 8 pages.
Dragon Quest Monsters Joker 2, Nintendo DREAM, Mainichi Communications, Inc., Jul. 1, 2010, vol. 15, No. 7, Serial No. 195, pp. 52-59, with a partial English translation, 12 pages.
Game Broadway STAGE27, Gamaga, SOFTBANK Creative Corp., Jun. 1, 2010, vol. 27, No. 6, Serial No. 475, pp. 36-37, with a partial English translation, 6 pages.
English-language machine translation of JP 11-207031.
English-language machine translation of JP 2006-005630.
English-language machine translation of JP 2006-228113.
English-language machine translation of JP 2007-330642.
English-language machine translation of JP 2008-113259.
English-language machine translation of JP 2008-160303.
English-language machine translation of JP 2009-026178.
Bhupender Virk, "Development of Low Power Consumption Wireless IC for Realization of Sensor Network with Wireless LAN." *Nikkei Electronics*, vol. 997, Feb. 9, 2009, pp. 87-94, published by Nikkei Business Publications, Inc., and partial English-language translation.
English-language machine translation of JP 2000-167233.
English-language machine translation of JP 2010-022704.
English-language machine translation of JP 2007-125185.
English-language machine translation of JP 2006-072685.
English-language machine translation of JP 2007-164699.
English-language machine translation of JP2004-221671.
English-language machine translation of JP2007-175508.
English-language machine translation of JP2010-028171.
English-language machine translation of JP2010-028672.
Kubo et al., U.S. Appl. No. 14/181,692, filed Feb. 16, 2014—awaiting USPTO action.
English-language machine translation of JP-2002-297483.
English-language machine translation of JP-2005-242886.
English-language machine translation of JP-2006-146306.
English-language machine translation of JP-2009-225000.
English-language machine translation of JP-2010-079546.
Konno et al., U.S. Appl. No. 12/816,672, filed Jun. 16, 2010—response to office action filed Mar. 12, 2014.
Ooe et al., U.S. Appl. No. 12/871,243, filed Aug. 30, 2010—RCE filed Nov. 29, 2013.
Kubo et al., U.S. Appl. No. 12/940,426, filed Nov. 5, 201—now USP 8,700,478.
Yamazaki et al., U.S. Appl. No. 12/948,050, filed Nov. 17, 2010—now USP 8,433,375.
Yamazaki et al., U.S. Appl. No. 12/948,371, filed Nov. 17, 2010—now USP 8,505,008.
Fujiwara et al., U.S. Appl. No. 12/969,855, filed Dec. 16, 2010—awaiting USPTO action.
Wabe et al., U.S. Appl. No. 13/027,723, filed Feb. 15, 2011—final office action mailed Apr. 28, 2014.
Fujiwara et al., U.S. Appl. No. 13/111,033, filed May 19, 2011—non-final office action mailed Apr. 25, 2014.
Konno et al., U.S. Appl. No. 13/251,204, filed Oct. 1, 2011—allowed.
Yamazaki et al., U.S. Appl. No. 13/251,205, filed Oct. 1, 2011—RCE filed May 11, 2014.
Kubo et al., U.S. Appl. No. 14/181,690, filed Feb. 16, 2014—awaiting USPTO action.
Saeki, K., "Apparent and Substantial Improvement in Function! Report on Nintendo DSi Giving Impression of Development," Impress Watch Corporation, GAME Watch, uploaded on Nov. 1, 2008 [retrieved Feb. 4, 2014]; http://game.watch.impress.co.jp/docs/20081101/dsil.htm with partial English-language translation thereof.
English-language machine translation of http://game.watch.impress.co.jp/docs/20081101/dsil.htm [retrieved Apr. 15, 2014].

* cited by examiner

FIG.11

| | APPLICATION PROGRAM A | |
|---|---|---|
| | TRANSMISSION BOX | ～SB |
| 01 | DATA X | ～SBU |
| 02 | DATA Y | |
| 03 | EMPTY | |
| ⋮ | EMPTY | |
| | EMPTY | |

X=1 : MULTICAST ADDRESS
X=0 : UNICAST ADDRESS
  Y=0 : GLOBAL ADDRESS
  Y=1 : LOCAL ADDRESS

| OWN DEVICE 1 | | | FLAG OK DETERMINATION |
|---|---|---|---|
| SEND FLAG | RECEIVE FLAG | | |
| 1 | 0 | TRANSMISSION COMMUNICATION ONLY | (0,1),(1,1) |
| 0 | 1 | RECEPTION COMMUNICATION ONLY | (1,0),(1,1) |
| 1 | 1 | COMMUNICATION BEING PERMITTED UNDER ANY CONDITION | (0,0),(0,1),(1,0),(1,1) |
| 0 | 0 | BIDIRECTIONAL COMMUNICATION ONLY | (0,0),(1,1) |

(B)

| | OWN DEVICE 1 | | PORTABLE GAME DEVICE 3 | | |
|---|---|---|---|---|---|
| | SEND FLAG | RECEIVE FLAG | SEND FLAG | RECEIVE FLAG | |
| EXAMPLE1 | 0 | 1 | 1 | 0 | FLAG OK DETERMINATION |
| EXAMPLE2 | 1 | 0 | 0 | 1 | FLAG OK DETERMINATION |
| EXAMPLE3 | 1 | 1 | 1 | 0 | FLAG OK DETERMINATION |
| EXAMPLE4 | 1 | 0 | 1 | 0 | FLAG NG DETERMINATION |
| EXAMPLE5 | 0 | 0 | 1 | 0 | FLAG NG DETERMINATION |

FIG.33

(A) USERS HA & HB

DETERMINATION PROCESSING ON THE SIDE OF USER HA
        PARTNER'S CONDITION DATA & USER'S OWN MASK DATA = 0 & 1 = 0
        USER'S OWN REQUEST DATA & USER'S OWN MASK DATA = 0 & 1 = 0
        USER'S OWN CONDITION DATA & PARTNER'S MASK DATA = 1 & 1 = 1
        PARTNER'S REQUEST DATA & PARTNER'S MASK DATA = 1 & 1 = 1
        → OBTAINING CONDITION IS SATISFIED

DETERMINATION PROCESSING ON THE SIDE OF USER HB
        PARTNER'S CONDITION DATA & USER'S OWN MASK DATA = 1 & 1 = 1
        USER'S OWN REQUEST DATA & USER'S OWN MASK DATA = 1 & 1 = 1
        USER'S OWN CONDITION DATA & PARTNER'S MASK DATA = 0 & 1 = 0
        PARTNER'S REQUEST DATA & PARTNER'S MASK DATA = 0 & 1 = 0
        → OBTAINING CONDITION IS SATISFIED (B) USERS HA & HC

DETERMINATION PROCESSING ON THE SIDE OF USER HA
        PARTNER'S CONDITION DATA & USER'S OWN MASK DATA = 1 & 1 = 1
        USER'S OWN REQUEST DATA & USER'S OWN MASK DATA = 0 & 1 = 0
        USER'S OWN CONDITION DATA & PARTNER'S MASK DATA = 1 & 0 = 0
        PARTNER'S REQUEST DATA & PARTNER'S MASK DATA = 0 & 0 = 0
        → OBTAINING CONDITION IS UNSATISFIED

DETERMINATION PROCESSING ON THE SIDE OF USER HC
        PARTNER'S CONDITION DATA & USER'S OWN MASK DATA = 1 & 0 = 0
        USER'S OWN REQUEST DATA & USER'S OWN MASK DATA = 0 & 0 = 0
        USER'S OWN CONDITION DATA & PARTNER'S MASK DATA = 1 & 1 = 1
        PARTNER'S REQUEST DATA & PARTNER'S MASK DATA = 0 & 1 = 0
        → OBTAINING CONDITION IS UNSATISFIED (C) USERS HA & HD

DETERMINATION PROCESSING ON THE SIDE OF USER HA
        PARTNER'S CONDITION DATA & USER'S OWN MASK DATA = 0 & 1 = 0
        USER'S OWN REQUEST DATA & USER'S OWN MASK DATA = 0 & 1 = 0
        USER'S OWN CONDITION DATA & PARTNER'S MASK DATA = 1 & 0 = 0
        PARTNER'S REQUEST DATA & PARTNER'S MASK DATA = 0 & 0 = 0
        → OBTAINING CONDITION IS SATISFIED

DETERMINATION PROCESSING ON THE SIDE OF USER HD
        PARTNER'S CONDITION DATA & USER'S OWN MASK DATA = 1 & 0 = 0
        USER'S OWN REQUEST DATA & USER'S OWN MASK DATA = 0 & 0 = 0
        USER'S OWN CONDITION DATA & PARTNER'S MASK DATA = 0 & 1 = 0
        PARTNER'S REQUEST DATA & PARTNER'S MASK DATA = 0 & 1 = 0
        → OBTAINING CONDITION IS SATISFIED

FIG.34

(A) USER HE

| MASK | | CONDITION | | REQUEST | |
|---|---|---|---|---|---|
| COURSE P | COURSE Q | COURSE P | COURSE Q | COURSE P | COURSE Q |
| 0 | 1 | 1 | 1 | 0 (DON'T CARE) | 1 |

USER HE HAS DATA OF COURSES P & Q
   MAY OR MAY NOT DESIRE DATA EXCHANGE OF COURSE P
   DESIRES DATA EXCHANGE OF COURSE Q.

(B) USER HF

| MASK | | CONDITION | | REQUEST | |
|---|---|---|---|---|---|
| COURSE P | COURSE Q | COURSE P | COURSE Q | COURSE P | COURSE Q |
| 1 | 1 | 1 | 0 | 0 | 1 |

USER HF HAS DATA OF COURSE P
   DESIRES DATA EXCHANGE OF COURSE P
   WANTS DATA OF COURSE Q.

(C) USER HG

| MASK | | CONDITION | | REQUEST | |
|---|---|---|---|---|---|
| COURSE P | COURSE Q | COURSE P | COURSE Q | COURSE P | COURSE Q |
| 1 | 1 | 0 | 1 | 1 | 1 |

USER HG HAS DATA OF COURSE Q
   WANTS DATA OF COURSE P
   DESIRES DATA EXCHANGE OF COURSE Q.

FIG.35

(A) USERS HE AND HF

DETERMINATION PROCESSING ON THE SIDE OF USER HE

PARTNER'S CONDITION DATA & USER'S OWN MASK DATA = [1 0] & [0 1]
　　　　　　= [0 0]
　　　　USER'S OWN REQUEST DATA & USER'S OWN MASK DATA = [0 1] & [0 1]
　　　　　　= [0 1] → NG
　　　　USER'S OWN CONDITION DATA & PARTNER'S MASK DATA = [1 1] & [1 1]
　　　　　　= [1 1]
　　　　PARTNER'S REQUEST DATA & PARTNER'S MASK DATA = [0 1] & [1 1]
　　　　　　= [0 1] → NG
　　　　→ OBTAINING CONDITION IS UNSATISFIED

DETERMINATION PROCESSING ON THE SIDE OF USER HF

PARTNER'S CONDITION DATA & USER'S OWN MASK DATA = [1 1] & [1 1]
　　　　　　= [1 1]
　　　　USER'S OWN REQUEST DATA & USER'S OWN MASK DATA = [0 1] & [1 1]
　　　　　　= [0 1] → NG
　　　　USER'S OWN CONDITION DATA & PARTNER'S MASK DATA = [1 0] & [0 1]
　　　　　　= [0 0]
　　　　PARTNER'S REQUEST DATA & PARTNER'S MASK DATA = [0 1] & [0 1]
　　　　　　= [0 1] → NG
　　　　→ OBTAINING CONDITION IS UNSATISFIED (B) USERS HE AND HG

DETERMINATION PROCESSING ON THE SIDE OF USER HE

PARTNER'S CONDITION DATA & USER'S OWN MASK DATA = [0 1] & [0 1]
　　　　　　= [0 1]
　　　　USER'S OWN REQUEST DATA & USER'S OWN MASK DATA = [0 1] & [0 1]
　　　　　　= [0 1] → OK
　　　　USER'S OWN CONDITION DATA & PARTNER'S MASK DATA = [1 1] & [1 1]
　　　　　　= [1 1]
　　　　PARTNER'S REQUEST DATA & PARTNER'S MASK DATA = [1 1] & [1 1]
　　　　　　= [1 1] → OK
　　　　→ OBTAINING CONDITION IS SATISFIED

DETERMINATION PROCESSING ON THE SIDE OF USER HG

PARTNER'S CONDITION DATA & USER'S OWN MASK DATA = [1 1] & [1 1]
　　　　　　= [1 1]
　　　　USER'S OWN REQUEST DATA & USER'S OWN MASK DATA = [1 1] & [1 1]
　　　　　　= [1 1] → OK
　　　　USER'S OWN CONDITION DATA & PARTNER'S MASK DATA = [0 1] & [0 1]
　　　　　　= [0 1]
　　　　PARTNER'S REQUEST DATA & PARTNER'S MASK DATA = [0 1] & [0 1]
　　　　　　= [0 1] → OK
　　　　→ OBTAINING CONDITION IS SATISFIED

TRANSMISSION DATA LIST

| APPLICATION ID | SEND FLAG | RECEIVE FLAG | SIZE | FLAG |
|---|---|---|---|---|
| APPLICATION A | 1 | 1 | SZA0 | |
| APPLICATION B | 0 | 0 | SZB0 | |
| APPLICATION C | 1 | 0 | SZC0 | |

(B)

TRANSMISSION DATA LIST

| APPLICATION ID | SEND FLAG | RECEIVE FLAG | SIZE | FLAG |
|---|---|---|---|---|
| APPLICATION A | 1 | 1 | SZA1 | |
| APPLICATION B | 0 | 0 | SZB1 | |
| APPLICATION D | 1 | 0 | SZD1 | |

FIG.78
(A) CASE OF COMMUNICATION PARTNER SEARCH PROCESSING (1)
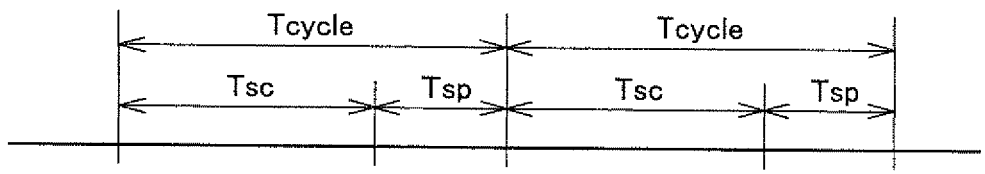
Tcycle: FIXED VALUE, FOR EXAMPLE, 4 SECONDS
Tsc: RANDOM VALUE BETWEEN 0 AND Tcycle
Tsp: Tcycle − Tsc
(B) CASE OF COMMUNICATION PARTNER SEARCH PROCESSING (2)
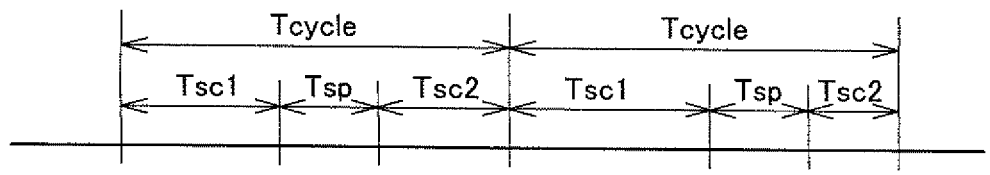
Tcycle: FIXED VALUE, FOR EXAMPLE, 4 SECONDS
Tsp: FIXED VALUE, FOR EXAMPLE, 96 ms.
Tsc1: RANDOM VALUE BETWEEN 0 AND (Tcycle − Tsp)
Tsc2: Tcycle − Tsc1 − Tsp

| MAC ADDRESS LIST SAVING AREA | |
|---|---|
| ADDRESS X | 2010/6/1 |
| ADDRESS Y | 2010/6/2 |
| ADDRESS Z | 2010/6/3 |
| | |
| | |

DELETE ADDRESS STARTING FROM OLDEST ADDRESS

| MAC ADDRESS LIST SAVING AREA | |
|---|---|
| ADDRESS Y | 2010/6/2 |
| ADDRESS Z | 2010/6/3 |
| | |
| | |
| ADDRESS XX | 2010/6/4 |

INFORMATION PROCESSING APPARATUS, METHOD OF CONTROLLING INFORMATION PROCESSING APPARATUS, AND RECORDING MEDIUM STORING CONTROL PROGRAM

This nonprovisional application is based on Japanese Patent Application No. 2010-132760 filed with the Japan Patent Office on Jun. 10, 2010, the entire contents of which are hereby incorporated by reference.

BACKGROUND OF THE INVENTION

1. Field of the Invention

The present invention relates to an information processing system and an information processing apparatus, and particularly relates, for example, to an information processing system including a plurality of portable information processing apparatuses capable of wireless communication with each other, an information processing apparatus, a method of controlling an information processing apparatus, and a recording medium storing a control program for the information processing apparatus.

2. Description of the Background Art

Conventionally, a system has been available that automatically carries out communication when information processing apparatuses come close to each other. For example, Japanese Patent Laying-Open No. 2000-181.822 (Patent Document 1) shows a portable data transmission/reception terminal device automatically carrying out transmission to another portable data transmission/reception terminal device present in a communication range.

In the scheme shown in Patent Document 1, once a user of the portable data transmission/reception terminal device transmits data, the data is endlessly transmitted to another portable data transmission/reception terminal device. Therefore, even when the user or the like desires to transmit data by setting a certain range, the user's intention could not be reflected.

SUMMARY OF THE INVENTION

The present invention was made to solve the above-described problem and its object is to provide an information processing system allowing efficient data communication reflecting intention of a sender who transmits data, an information processing apparatus, a method of controlling an information processing apparatus, and a recording medium storing a control program for the information processing apparatus.

An information processing system according to a first aspect of the present invention is an information processing system including a plurality of information processing apparatuses, each of the information processing apparatuses includes setting means capable of setting transfer information for transferring data in assignment data to be transmitted, transmission means for transmitting to another information processing apparatus, the assignment data for which the transfer information has been set by the setting means, reception means for receiving the assignment data transmitted by the transmission means of another information processing apparatus, for which the transfer information has been set by the setting means, and transfer determination means for determining whether the assignment data is to be transferred or not, based on the transfer information included in the assignment data received by the reception means. The transmission means transmits the assignment data received by the reception means to yet another information processing apparatus when a result of determination made by the transfer determination means indicates positive.

According to the first aspect, the information processing apparatus in the information processing system can transmit the assignment data with transfer information for transferring the data being set therein, and thus the information processing apparatus that received the assignment data determines whether or not to transfer the assignment data based on the transfer information set in the assignment data. Since the assignment data is transferred when the result of determination indicates positive, endless transmission of the assignment data to another information processing apparatus can be suppressed and efficient data communication reflecting a sender's intention can be carried out.

According to a preferred second aspect, the information processing apparatus further includes transfer information update means for updating the transfer information included in the received assignment data when the result of determination made by the transfer determination means indicates positive, and the transmission means transmits the assignment data received by the reception means and including the transfer information updated by the transfer information update means to yet another information processing apparatus when the result of determination made by the transfer determination means indicates positive.

According to the second aspect, since the transfer information included in the assignment data is updated by the transfer information update means, endless transmission of the assignment data to another information processing apparatus can be suppressed and efficient data communication reflecting a sender's intention can be carried out.

According to a preferred third aspect, the assignment data transmitted by the transmission means, received by the reception means, and including the transfer information updated by the transfer information update means is stored in storage means.

According to a preferred fourth aspect, the information processing apparatus further includes access means for reading the transmitted assignment data stored in the storage means and causing display means to display the assignment data.

According to the third and fourth aspects, the assignment data transmitted by the transmission means is stored in the storage means and the stored assignment data is displayed on the display means. Therefore, transmission of the assignment data including the transfer information can be grasped.

According to a preferred fifth aspect, the setting means can set transmission information defining the number of times of transmission of data in the assignment data to be transmitted, the information processing apparatus further includes transmission determination means for determining whether or not to transmit the assignment data based on the transmission information in the assignment data including the transmission information set by the setting means, and the transmission means transmits the assignment data to another information processing apparatus when a result of determination made by the transmission determination means indicates positive.

According to the fifth aspect, the assignment data can be transmitted with transmission information defining the number of times of transmission of data being set therein, and thus the information processing apparatus that received the assignment data determines whether or not to transmit the data based on the transmission information set in the assignment data. Since the assignment data is transmitted when the result of determination indicates positive, data communication in which transfer of the assignment data and transmission thereof are independent of each other can be carried out and hence efficient data communication can be achieved. In addition, since information on transfer and transmission of the assignment data can be set separately, various types of data communication can be carried out.

According to a preferred sixth aspect, the information processing apparatus further includes transmission success determination means for determining whether transmission by the transmission means has been successful or not and transmission information update means for updating the transmission information included in the assignment data when a result of determination made by the transmission success determination means indicates positive, and the transmission determination means determines whether the assignment data is to be transmitted again or not based on the transmission information updated by the transmission information update means.

According to the sixth aspect, when transmission of the assignment data was successful, the transmission information update means updates the transmission information included in the assignment data. Therefore, endless transmission of the assignment data to another information processing apparatus can be suppressed and efficient data communication reflecting a sender's intention can be carried out.

According to a preferred seventh aspect, the transfer information and the transmission information define the number of times of transfer and the number of times of transmission, respectively, and the setting means sets the number of times of transmission to one when the number of times of transfer is set to one or more.

According to the seventh aspect, when the number of times of transfer is set to one or more, the number of times of transmission is set to one. Thus, when the assignment data is to be transferred, a range of transfer of the assignment data can be restricted by restricting the number of times of transmission and hence efficient data communication reflecting intention of a sender who transmits the data can be carried out.

According to a preferred eighth aspect, the information processing apparatus can execute an application program capable of utilizing the assignment data, and the transmission means transmits the assignment data received by the reception means to yet another information processing apparatus when the result of determination made by the transfer determination means indicates positive, regardless of whether the application program is executed or not.

According to the eighth aspect, since it is not necessary to execute an application program in advance for transmitting the assignment data, the assignment data can easily be transmitted to another information processing apparatus.

According to a preferred ninth aspect, the information processing apparatus further includes data storing means for causing the assignment data received by the reception means to be stored in a reception storage area in the storage means for storing received data and causing the assignment data received by the reception means to be replicated and causing the replicated assignment data to be stored in a transmission storage area in the storage means for storing data to be transmitted, when the result of determination made by the transfer determination means indicates positive.

According to a preferred tenth aspect, the information processing apparatus further includes a wireless module for searching for another information processing apparatus among the plurality of information processing apparatuses capable of communication through near field communication, and a main body portion other than the wireless module makes transition to a sleep state after the data storing means caused the assignment data to be stored in the transmission storage area.

According to a preferred eleventh aspect, the wireless module repeatedly searches for another information processing apparatus with which it can communicate through near field communication, and when the wireless module can communicate with another information processing apparatus, the wireless module instructs the transmission means to carry out data communication with another information processing apparatus.

According to the ninth to eleventh aspects, the main body portion makes transition to the sleep state until an information processing apparatus with which communication can be established is searched for, and when communication with another information processing apparatus is allowed, transmission of the assignment data is allowed. Therefore, data communication with reduced power consumption can be carried out.

An information processing apparatus according to a twelfth aspect of the present invention includes setting means capable of setting transfer information for transferring data in assignment data to be transmitted, transmission means for transmitting to another information processing apparatus, the assignment data for which the transfer information has been set by the setting means, reception means for receiving the assignment data transmitted by the transmission means of another information processing apparatus, for which the transfer information has been set by the setting means, and transfer determination means for determining whether the assignment data is to be transferred or not, based on the transfer information included in the assignment data received by the reception means, and the transmission means transmits the assignment data received by the reception means to yet another information processing apparatus when a result of determination made by the transfer determination means indicates positive.

A method of controlling an information processing apparatus according to a thirteenth aspect of the present invention includes the steps of setting transfer information for transferring data in assignment data to be transmitted, transmitting to another information processing apparatus, the assignment data for which the transfer information has been set in the setting step, receiving the assignment data transmitted by another information processing apparatus, for which the transfer information has been set, and determining whether the assignment data is to be transferred or not, based on the transfer information included in the assignment data received in the receiving step. In the transmission step, the assignment data received in the receiving step is transmitted to yet another information processing apparatus when a result of determination made in the determining step indicates positive.

A control program for an information processing apparatus according to a fourteenth aspect of the present invention causes a computer to perform processing in the steps of setting transfer information for transferring data in assignment data to be transmitted, transmitting to another information processing apparatus, the assignment data for which the transfer information has been set in the setting step, receiving the assignment data transmitted by another information processing apparatus, for which the transfer information has been set, and determining whether the assignment data is to be transferred or not, based on the transfer information included in the assignment data received in the receiving step. In the transmission step, processing for transmitting the assignment data received in the receiving step to yet another information processing apparatus is performed when a result of determination made in the determining step indicates positive.

According to the twelfth to fourteenth aspects, the information processing apparatus can transmit the assignment data, with transfer information for transferring the data being set therein. When the assignment data is received, whether or not to transfer the assignment data is determined based on the transfer information set in the assignment data. Since the assignment data is transferred when the result of determination indicates positive, endless transmission of the assignment data to another information processing apparatus can be suppressed and efficient data communication reflecting a sender's intention can be carried out.

According to the present invention, since transfer information is set for data and whether or not to transfer the data is determined based on the transfer information, endless transmission can be avoided and efficient data communication can be carried out.

BRIEF DESCRIPTION OF THE DRAWINGS

FIG. 11 is a diagram illustrating an example in which data is stored in the transmission BOX according to an embodiment of the present invention.

FIG. 30 illustrates comparison of send flag data and receive flag data representing transmission/reception condition data according to an embodiment of the present invention.

FIG. 33 shows specific examples of condition data comparison based on the obtaining condition data illustrated in FIG. 32.

FIG. 34 shows other specific examples of the obtaining condition data according to an embodiment of the present invention.

FIG. 35 shows specific examples of condition data comparison based on the obtaining condition data illustrated in FIG. 34.

FIG. 50 is a diagram illustrating the transmission data list according to an embodiment of the present invention.

FIG. 78 illustrates a period of one cycle of communication partner search processing according to an embodiment of the present invention.

DESCRIPTION OF THE PREFERRED EMBODIMENTS

Figure 1:
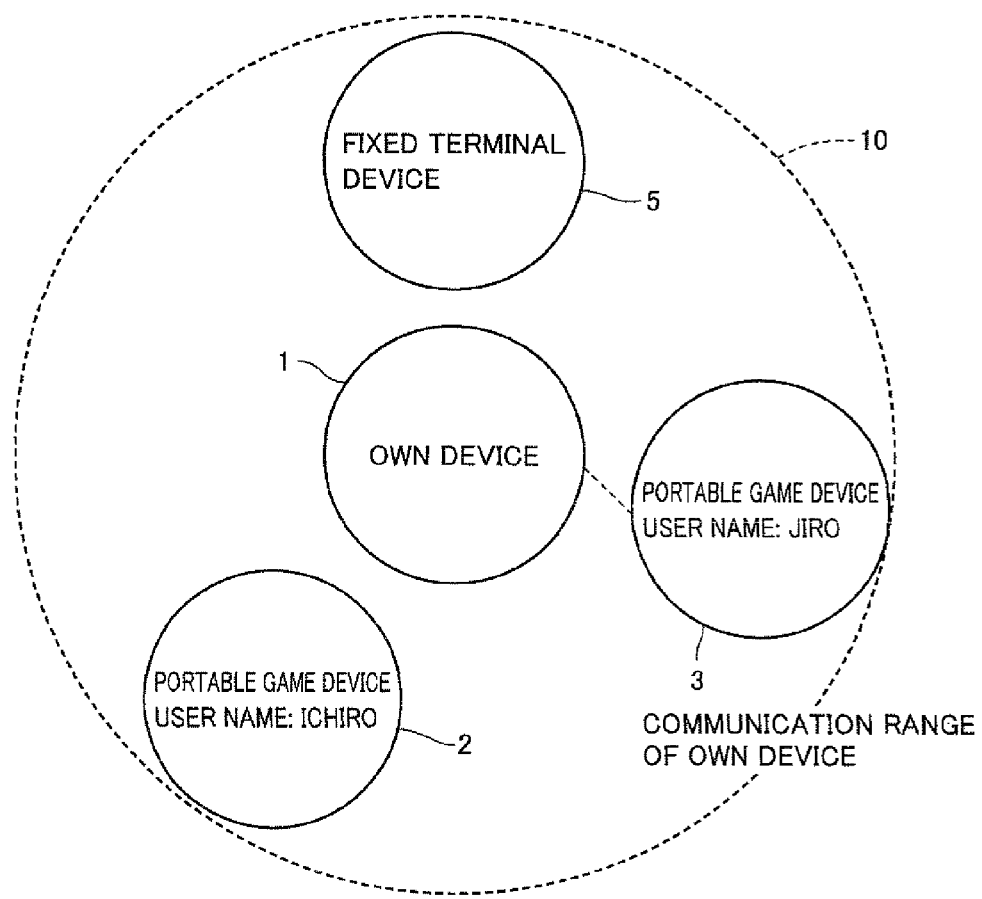
FIG. 1 is an illustration of a typical example of an information processing system according to the present invention.

Embodiments of the present invention will be described in detail with reference to the drawings. It is noted that the same or corresponding portions in the figures are denoted by the same reference characters and description thereof will not be repeated.

<Overall Configuration>

FIG. 1 is an illustration of a typical example of an information processing system according to the present invention.

Referring to FIG. 1, an information processing system according to the present invention in accordance with an embodiment of this invention includes a plurality of portable information processing apparatuses. In the present example, portable game devices (hereinafter also simply referred to as game devices) 1 to 3 are shown as examples of the plurality of portable information processing apparatuses. Though three game devices are shown here, the least required number is two. A configuration including additional portable game devices is also possible.

In the present example, in the information processing system according to the embodiment of the present invention, a fixed terminal device 5 capable of wireless communication with the game devices that are portable information processing apparatuses is provided, though the fixed terminal device is not an indispensable component.

Game devices 1 to 3 are capable of giving/receiving data by carrying out wireless communication with one another. In the present example, a case in which game device 1 (hereinafter also simply referred to as an own device) communicates with other game devices and with fixed terminal device 5 will be described.

In FIG. 1, a range of communication 10 when game device 1 (own device) carries out wireless communication is plotted with a dotted line. Specifically, the example shown in FIG. 1 shows that game device 1 (own device) can communicate with each of game devices 2 and 3 and with fixed terminal device 5. In FIG. 1, in communication range 10 of own game device 1, game devices 2 and 3 corresponding to user names "Ichiro" and "Jiro" are present and game device 1 is shown to be engaged in wireless communication with game device 3 having the user name "Jiro".

Though details will be described later, game devices 1 and 3 carry out wireless communication with each other to exchange with each other, exchange data which will be described later. It is assumed that game devices 1 and 3 can utilize the exchanged exchange data.

As will be described later, fixed terminal device 5 distributes prescribed distribution data to game devices therearound. Then, it is assumed that, receiving the distribution data distributed from fixed terminal device 5, the game device can utilize the obtained distribution data.

<Game Device Configuration>

Figure 2:
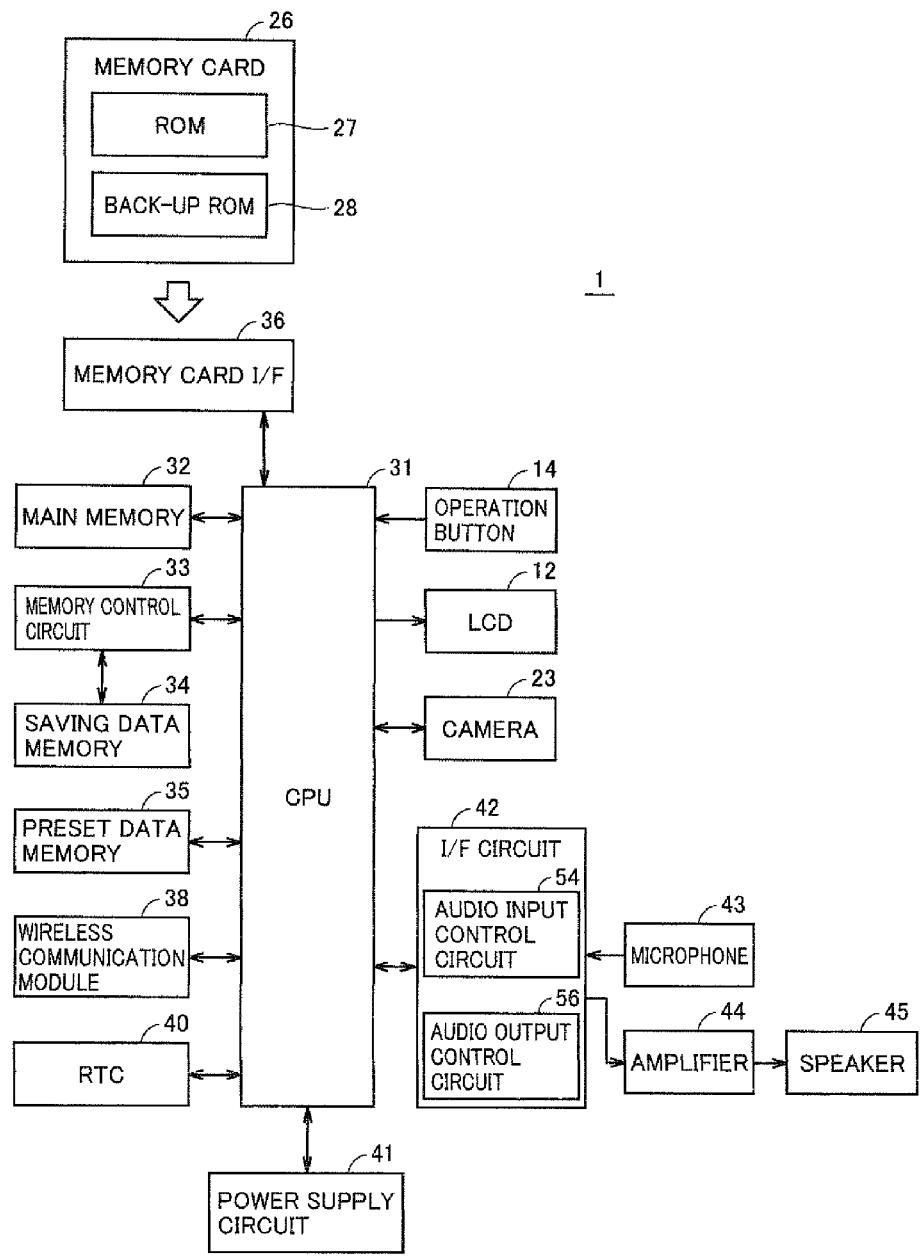
FIG. 2 is a schematic block diagram showing a configuration of a game device 1 according to an embodiment of the present invention.

FIG. 2 is a schematic block diagram showing a configuration of game device 1 according to an embodiment of the present invention. Since a configuration of game devices 2 and 3 is also the same, detailed description thereof will not be provided.

Referring to FIG. 2, game device 1 includes a CPU 31, a main memory 32, a memory control circuit 33, a saving data memory 34, a preset data memory 35, a memory card interface (memory card I/F) 36, a wireless communication module 38, a real time clock (RTC) 40, and a power supply circuit 41.

CPU 31 is operation processing means for executing a program. In the embodiment of the present invention, the program is recorded in a memory (for example, saving data memory 34) within game device 1, a memory card 26 or the like. The program executed by CPU 31 may be recorded in advance in a memory in game device 1, or it may be obtained from memory card 26, or it may be obtained from another device through communication with the device. CPU 31 is capable of multi-task control. Specifically, exchange data giving/receiving processing which will be described later can be performed in the background while game processing is performed.

To CPU 31, main memory 32, memory control circuit 33 and preset data memory 35 are connected. Further, saving data memory 34 is connected to memory control circuit 33.

Main memory 32 is storage means used as a work area and a buffer area for CPU 31. Specifically, main memory 32 stores various types of data used for the information processing above and stores programs obtained from the outside (from memory card 26 or other devices). In the embodiment of the present invention, a PSRAM (Pseudo-SRAM) is used, for example, as main memory 32.

As will be described later, saving data memory 34 is storage means for storing a program executed by CPU 31 and data such as images picked up by a camera 23.

Saving data memory 34 is implemented by a non-volatile storage medium, and for example, it is implemented by a NAND type flash memory in the present embodiment. Memory control circuit 33 is a circuit controlling reading and writing of data from/into saving data memory 34 in accordance with instructions from CPU 31.

Preset data memory 35 is storage means for storing data (preset data) including various parameters set in advance in game device 1. As preset data memory 35, a flash memory connected to CPU 31 through an SPI (Serial Peripheral Interface) bus may be used.

Memory card I/F 36 is connected to CPU 31. Memory card I/F 36 performs reading/writing of data from/into memory card 26 attached to a connector, in accordance with instructions from CPU 31.

Wireless communication module 38 has a function to carry out wireless communication with game devices of the same type, as will be described later.

To CPU 31, RTC 40 and power supply circuit 41 are further connected. RTC 40 counts time and outputs the result to CPU 31. For example, CPU 31 can also calculate the current time (date) and the like based on the time counted by RTC 40. Power supply circuit 41 controls electric power supplied from a power source provided in game device 1 and supplies electric power to each component of game device 1.

Further, game device 1 includes a microphone 43 and an amplifier 44. Microphone 43 and amplifier 44 are connected to an I/F circuit 42. Microphone 43 senses user's voice uttered to game device 1 and outputs an audio signal representing the voice to I/F circuit 42. Amplifier 44 amplifies an audio signal from I/F circuit 42 and outputs it from a speaker 45. IX circuit 42 is connected to CPU 31.

I/F circuit 42 includes an audio input control circuit 54 receiving an input of an audio signal from microphone 43 and an audio output control circuit 56 controlling an output of an audio signal to amplifier 44.

Audio input control circuit 54 senses an input level of an audio signal from microphone 43, performs A/D conversion of the audio signal, or converts the audio signal to audio data of a prescribed format.

Audio output control circuit 56 adjusts an audio signal to be output to amplifier 44, depending on whether the output signal is in stereo setting or monaural setting.

An operation button 14 includes a plurality of operation buttons that are not shown and connected to CPU 31. From operation button 14 to CPU 31, operation data representing an input state of each operation button (whether it is pressed or not) is output. Receiving the operation data from operation button 14, CPU 31 performs processing in accordance with the input to operation button 14.

Camera 23 is connected to CPU 31. Camera 23 picks up an image in accordance with an instruction from CPU 31 and outputs the picked-up image data to CPU 31. For example, CPU 31 issues an image pick-up instruction to camera 23, and the camera, receiving the image pick-up instruction, picks up an image and sends image data to CPU 31.

Further, an LCD 12 is connected to CPU 31. LCD 12 displays operation screens and the like that are not shown, in accordance with instructions from CPU 31.

Memory card 26 is detachable to a connector which is not shown, and when connected to the connector, it is connected to memory card I/F 36. Memory card 26 includes a ROM 27 and a back-up RAM 28, and in ROM 27, an application and the like to be executed by game device 1 are set (stored) in advance. In ROM 27, an identification number representing a name (title) for identifying an application stored in ROM 27 is stored. Further, in back-up RAM 28, pending data or resulting data of an application is stored (saved). Further, as will be described later, back-up RAM 28 stores exchange flag data if data (hereinafter also referred to as exchange data) to be provided to another game device is stored in the game device at the time of execution of the application.

Typically, application identification information (an application ID) which will be described later includes data (identification number) referring to a name (title) for identifying an application, however, it is not necessarily limited as such. In the present embodiment, in addition to the name for identifying an application, data allowing identification as to whether or not the data can be exchanged as exchange data (exchange condition data) is included.

Figure 3:
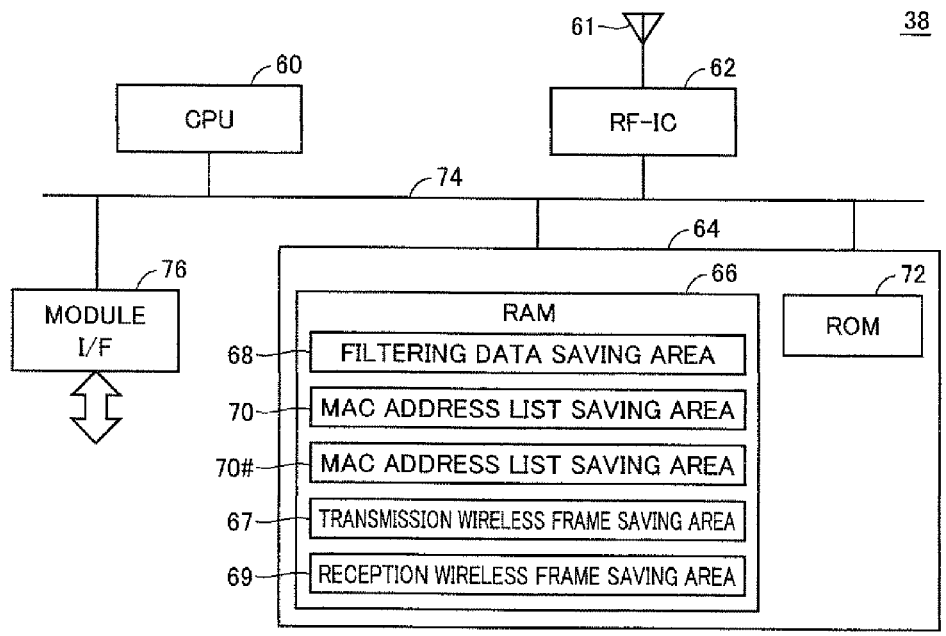
FIG. 3 shows a configuration of a wireless communication module 38 according to an embodiment of the present invention.

FIG. 3 shows a configuration of wireless communication module 38 according to an embodiment of the present invention.

Referring to FIG. 3, wireless communication module 38 according to the embodiment of the present invention includes a CPU 60, an RF-IC (Radio Frequency IC) 62, a memory control unit 64, a module I/F 76, and an internal bus 74 connected to these components.

Memory control unit 64 includes a RAM 66 and a ROM 72 saving at least a part of the program relating to wireless communication or the like. RAM 66 has a filtering data saving area 68, MAC address list saving areas 70, 70#, a transmission wireless frame saving area 67, and a reception wireless frame saving area 69.

As will be described later, filtering data saving area 68 is an area for saving at least one piece of filtering data registered in accordance with an instruction from CPU 31. The filtering data is data set in the exchange data and it includes data for determining whether processing such as exchange of the exchange data is permitted or not before carrying out substantial communication with another game device or the like representing a communication partner. Specifically, the filtering data includes an application ID which will be described later, for identifying an application of the exchange data.

In the present example, it is possible to provide a plurality of determination schemes as determination algorithms when an application ID is compared with another application ID as will be described later, and application IDs included in each piece of the filtering data can be saved collectively as a list corresponding to each of the determination schemes. When saved for each list, list header information including information indicating a scheme of a determination algorithm (algorithm identification information) is provided for each list. It is noted that the list header information includes system flag information for classifying lists for each type of the application of the exchange data.

MAC address list saving area 70 is an area for saving a MAC address of another game device registered in accordance with an instruction from CPU 31 as will be described later. Further, MAC address list saving area 70I is an area for saving a MAC address of fixed terminal device 5 registered in accordance with an instruction from CPU 31 as will be described later. The MAC address is used in MAC address filtering processing for determining whether a communication partner is the communication partner with which communication was established previously, before carrying out substantial communication with another game device or the like representing the communication partner, as will be described later.

In the present example, a configuration in which the area for saving the MAC address of another game device and the area for saving the MAC address of a fixed terminal device are provided separately from each other will be described. It is possible, however, to save addresses in the same area.

Transmission wireless frame saving area 67 is an area for saving data of a wireless frame (also referred to as a transmission wireless frame) to be transmitted to an external game device through RF-IC 62 as will be described later. Reception wireless frame saving area 69 is an area for saving data of a wireless frame (also referred to as a reception wireless frame) transmitted from an external game device and received through RF-IC 62 as will be described later. In reception wireless frame saving area 69, data of a distribution wireless frame transmitted from fixed terminal device 5 is also saved, as will be described later.

CPU 60 is operation processing means for executing a program relating to wireless communication.

CPU 60 is capable of realizing prescribed functions of wireless communication by means of a program read from ROM 72 stored in memory control unit 64. Specifically, by way of example, an application for carrying out communication between portable terminals and an application for carrying out communication between a portable terminal and a fixed terminal as will be described later are stored in ROM 72.

When CPU 60 executes the application for performing processing between portable terminals, processing for searching for a communication partner to exchange the exchange data (hereinafter also referred to as exchange partner search processing) is performed by wireless communication module 38. When a communication partner to exchange the exchange data is found through the exchange partner search processing by wireless communication module 38, a notification is sent to CPU 31 on the main body side of game device 1 as will be described later, and the processing for giving/receiving the exchange data is performed. In the present embodiment, in accordance with an instruction from CPU 31 on the main body side, processing for establishing connection with the communication partner is performed, and after connection is established, the processing for giving/receiving the exchange data is performed.

Similarly, when CPU 60 executes the application for carrying out communication between a portable terminal and a fixed terminal, processing for searching for a communication partner that provides distribution data (hereinafter also referred to as distribution partner search processing) is performed by wireless communication module 38. When a communication partner that provides the distribution data is found through the distribution partner search processing by wireless communication module 38, a notification is sent to CPU 31 on the main body side of game device 1 as will be described later, and the processing for obtaining distribution data is performed. In the present embodiment, in accordance with an instruction from CPU 31 on the main body side, processing for establishing connection with a fixed terminal device which is the communication partner is performed, and after connection is established, the processing for obtaining distribution data is performed.

For example, RF-IC 62 modulates data transmitted in accordance with an instruction from CPU 60 to another game device and transmits radio waves from an antenna 61. Radio wave intensity, however, is very weak, and it is set to a small value to such an extent that a user can use radio waves without any license under the provision of the Radio Law. Further, for example, wireless communication module 38 receives radio waves transmitted from another game device at antenna 61 and the reception data is demodulated at RF-IC 62. The demodulated reception data is stored in RAM 66 of memory control unit 64. Thus, wireless communication module 38 can carry out, for example, near field communication of which data transmission distance is within a range of 10 m.

Module I/F 76 is an interface between wireless communication module 38 and the main body portion such as CPU 31 of game device 1, and the exchange data transmitted from another game device, received at antenna 61 of the wireless communication module and stored in RAM 66 is output to CPU 31 on the main body side of game device 1 through module I/F 76 and stored in main memory 32. Further, in accordance with an instruction from CPU 31, exchange data as will be described later stored in saving data memory 34 is input to wireless communication module 38 through module I/F 76 and temporarily stored in RAM 66 of memory control unit 64, and the data can be output as transmission data through antenna 61, for example, to another external game device as described above. It is noted that the received exchange data may temporarily be stored in RAM 66 and thereafter stored in main memory 32, or it may directly be stored in main memory 32. In addition, the exchange data to be transmitted may also temporarily be stored in RAM 66 or may be transmitted without being stored. In the present example, a case where exchange data to be transmitted and received is temporarily stored in RAM 66 will not be described.

The data transmitted to another external game device is not limited to data input through module I/F 76 in accordance with an instruction from CPU 31 on the main body side of game device 1. A transmission wireless frame generated based on data stored in RAM 66 or the like provided in memory control unit 64 in accordance with an instruction from CPU 60 in wireless communication module 38 may be output as transmission data. As will be described later, the transmission wireless frame is output as a connection request signal from a client side.

Figure 4:
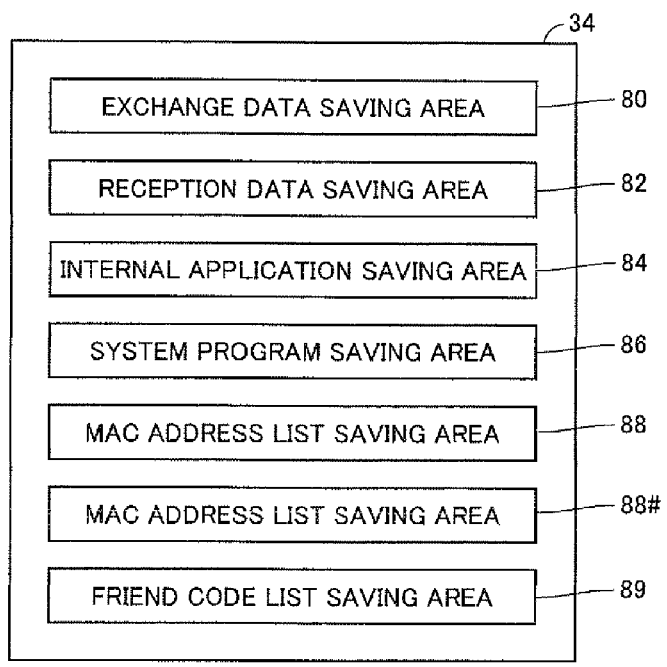
FIG. 4 shows a memory map of a saving data memory 34 according to an embodiment of the present invention.

FIG. 4 shows a memory map of saving data memory 34 according to an embodiment of the present invention.

Referring to FIG. 4, saving data memory 34 includes an exchange data saving area 80, a reception data saving area 82, an internal application saving area 84, a system program saving area 86, MAC address list saving areas 88, 88#, and a friend code list saving area 89.

Exchange data saving area 80 is an area for saving exchange data used when data exchange with another game device is carried out.

In exchange data saving area 80, a plurality of transmission BOXes that are a plurality of storage areas are provided as will be described later. A transmission BOX is provided for each application. Each transmission BOX is an area storing data usable by the application as exchange data to be provided to another game device, and the data actually used by the application is stored in a transmission BOX brought in correspondence with data identifying the application (for example, the application ID). As will be described later, a plurality of pieces of exchange data can be stored in each transmission BOX.

As described above, in the present example, the application ID includes data simply identifying an application, however, it is not limited to the above and it is assumed to include data (exchange condition data) allowing identification as to whether the exchange data is data as an object of exchange or not, as will be described later. Further, as will be described later, when the application IDs are saved in filtering data saving area 68 of wireless communication module 38 as a list for each determination algorithm scheme, it is possible to store information indicating the determination algorithm scheme (algorithm identification information) in correspondence with the application ID, to thereby identify in which list the application ID is to be saved. In addition, system flag information for distinguishing between an application stored in internal application saving area 84 which will be described later (also referred to as an internal application) and an application other than that such as an application saved in memory card 26 (also referred to as a game application), that is, for distinguishing between types of applications, can also be stored in correspondence with the application ID. In the present example, a case where system flag information is used for distinguishing between the internal application and an application other than that such as an application saved in memory card 26 (also referred to as a game application) is described, however, yet another application such as an application program distributed from a fixed terminal device may also have different system flag information allotted for use.

Reception data saving area 82 is an area for saving exchange data received from another game device when data exchange with another game device is carried out. In this reception data saving area 82, a plurality of reception BOXes that are a plurality of storage areas which will be described are provided. A reception BOX is provided for each application. Each reception BOX is an area for saving exchange data provided by another game device as being stored as reception data, and data actually utilized in the application is stored in a reception BOX brought in correspondence with data for identifying the application (such as the application ID). In addition, each reception BOX can store a plurality of pieces of reception data, as will be described later.

Internal application saving area 84 is an area saving a plurality of applications to be executed by game device 1, that are stored in game device 1. As described previously, game device 1 is capable of executing an application saved in memory card 26 and it can also execute an application saved in this internal application saving area 84. The application saved in internal application saving area 84 may be saved in advance, or it may be downloaded from the outside through the Internet or the like and saved. Internal application saving area 84 includes a saving area for saving an application body and a saving area provided for each application for saving save data exclusively used by a corresponding application (application-dedicated storage area).

Therefore, when a plurality of applications are saved in internal application saving area 84, a plurality of saving areas are provided in correspondence with respective applications.

System program saving area 86 is an area saving main body function programs for realizing a main body function of the information processing apparatus, including a menu program for selecting an application to be launched and programs for performing data giving/receiving processing for giving/receiving exchange data to/from a communication partner having exchange data and for performing data obtaining processing for obtaining distribution data from a communication partner.

MAC address list saving area 88 is an area for saving a MAC address which is device identification information allowing wireless communication module 38 to identify another game device as a communication partner with which communication was established previously. Further, MAC address list saving area 88# is an area for saving a MAC address which is device identification information allowing wireless communication module 38 to identify a fixed terminal device as a communication partner with which communication was established previously. As will be described later, in communication setting processing for carrying out wireless communication, MAC addresses saved in MAC address list saving areas 70 and 70# are saved in MAC address list saving areas 88 and 88# respectively.

Friend code list saving area 89 is an area where friend codes of other game devices registered as friends are saved. The friend code refers to a code for identifying whether an owner of another game device is a friend or not. It is assumed that one's own friend code is uniquely set for each game device and held in friend code list saving area 89. Namely, a friend code is different for each game device. Various schemes for registering friend codes of other game devices in friend code list saving area 89 are available, and for example, it is assumed that the internal application contains an application program for friend code registration processing. It is assumed that one's own friend code is displayed and a screen for inputting a friend code of another game device is displayed by executing the application program, although not shown. Then, it is assumed that the friend code of another game device is registered in friend code list saving area 89 by inputting and registering a friend code of another game device in the input screen. In addition, by informing a partner of one's own friend code, one's own friend code is registered in friend code list saving area 89 in another game device in accordance with the similar scheme. Though a case where a user inputs and registers a friend code has been described in the present example, a friend code of another game device may be registered in friend code list saving area 89 by giving/receiving a friend code to/from another game device through wireless communication. For example, when a game application is executed in the own device and another game device through wireless communication, a friend code of another game device may be registered in friend code list saving area 89.

Data communication by game device 1 in the present embodiment can broadly be divided into data communication for giving/receiving exchange data to/from another game device and data communication for receiving distribution data from a fixed terminal device.

First, data communication for giving/receiving exchange data between game device 1 and another game device according to an embodiment of the present invention will be described.

<Description of Functional Blocks for Giving/Receiving Exchange Data to/from Game Device 3>

Figure 5:
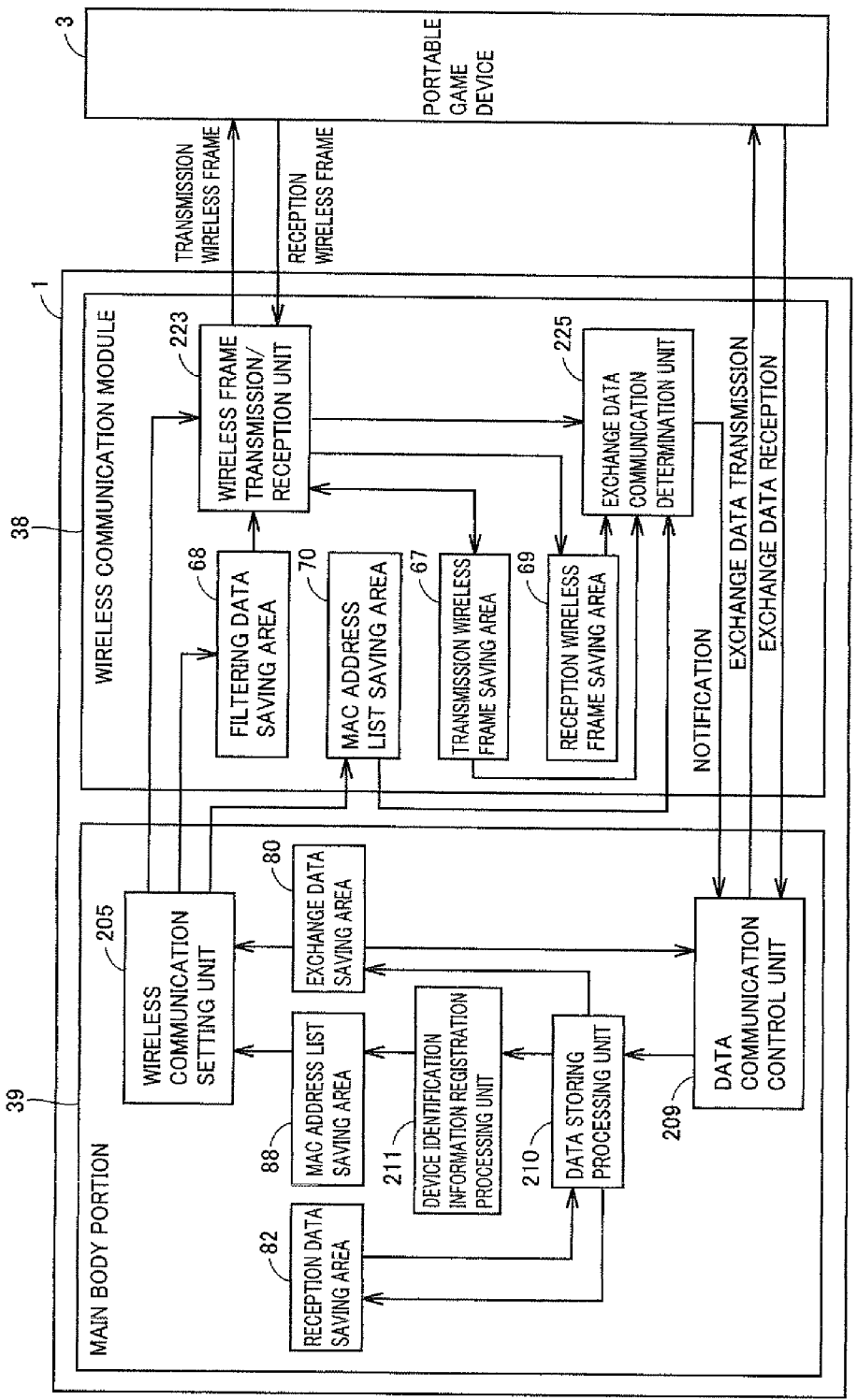
FIG. 5 represents functional blocks carrying out giving/receiving of exchange data in game device 1 according to an embodiment of the present invention.

FIG. 5 represents functional blocks carrying out giving/receiving of exchange data in game device 1 according to an embodiment of the present invention.

Referring to FIG. 5, game device 1 includes wireless communication module 38 and a main body portion 39 other than wireless communication module 38.

Main body portion 39 includes a wireless communication setting unit 205, a device identification information registration processing unit 211, a data communication control unit 209, exchange data saving area 80, reception data saving area 82, MAC address list saving area 88, and a data storing processing unit 210.

Wireless communication module 38 includes a wireless frame transmission/reception unit 223, an exchange data communication determination unit 225, filtering data saving area 68, MAC address list saving area 70, transmission wireless frame saving area 67, and reception wireless frame saving area 69.

Wireless communication setting unit 205 causes the MAC address list stored in MAC address list saving area 88 to be stored in MAC address list saving area 70.

Further, wireless communication setting unit 205 causes filtering data set as the exchange data saved in the transmission BOX in exchange data saving area 80 to be stored in filtering data saving area 68. It is noted that filtering data set as at least one piece of exchange data included in each transmission BOX is stored in filtering data saving area 68. In storing the filtering data in filtering data saving area 68, application IDs included in each piece of filtering data can collectively be saved as a list for each determination algorithm. Then, in saving the application IDs for each list, list header information including information indicating a determination algorithm scheme (algorithm identification information) and system flag information identifying a type of an application is provided for each list.

Further, wireless communication setting unit 205 outputs to wireless frame transmission/reception unit 223, an instruction to carry out wireless communication in wireless communication module 38.

Wireless frame transmission/reception unit 223 of wireless communication module 38 receives the instruction to carry out wireless communication, and in response, classifies the filtering data saved in filtering data saving area 68, that is, the application IDs included in the filtering data, further sets the transmission wireless frame including the data collectively saved as a list for each determination algorithm and causes the frame to be stored in transmission wireless frame saving area 67, and performs exchange partner search processing for searching for a communication partner, using the set transmission wireless frame. In the present example, it is assumed that wireless frame transmission/reception unit 223 transmits the transmission wireless frame to game device 3 which is a communication partner by way of example and receives the transmission wireless frame transmitted from game device 3, that is, the reception wireless frame. Then, wireless frame transmission/reception unit 223 causes the received reception wireless frame to be stored in reception wireless frame saving area 69.

Exchange data communication determination unit 225 determines whether or not the communication partner is the exchange partner with which the exchange data is to be exchanged, based on the received reception wireless frame. When it is determined that the communication partner is the exchange partner, a notification to that effect is issued to main body portion 39.

Specifically, determination is made as to whether the MAC address which is the device identification information included in the received reception wireless frame is registered in the MAC address list saved in MAC address list saving area 70 or not. In addition, determination is made as to whether the received reception wireless frame is a wireless frame allowing processing relating to giving/receiving of the exchange data or not. Further, the application ID included in the received reception wireless frame is compared with the application ID included in the transmission wireless frame saved in transmission wireless frame saving area 67, and based on the result of comparison, whether exchange of exchange data is possible with the communication partner or not is determined.

When it is determined that the MAC address included in the received reception wireless frame is not registered in the MAC address list, the received reception wireless frame is a wireless frame allowing processing relating to giving/receiving of exchange data, and exchange of exchange data with the communication partner is possible, exchange data communication determination unit 225 outputs a notification that exchange of the exchange data is possible to data communication control unit 209 of main body portion 39. Here, an example in which the notification that exchange of the exchange data is possible is output to data communication control unit 209 of main body portion 39 when three conditions are satisfied is described, however, the notification may be output when at least one condition is satisfied.

Receiving the notification that exchange of the exchange data is possible output from exchange data communication determination unit 225, data communication control unit 209 performs the exchange data giving/receiving processing for transmitting the exchange data saved in exchange data saving area 80 and receiving the exchange data from game device 3.

Data storing processing unit 210 determines whether or not an exchange condition is satisfied in regard to the exchange data received by data communication control unit 209. When it is determined that the condition is satisfied, the exchange data is stored in the reception BOX in reception data saving area 82, provided in correspondence with the application ID of the exchange data. In addition, data storing processing unit 210 checks the number of times of transfer set for the reception data stored in the reception BOX in reception data saving area 82 and determines whether a transfer condition is satisfied or not. When the transfer condition is satisfied, the reception data is copied and stored as the exchange data (transfer data) in the transmission BOX in exchange data saving area 80 provided in correspondence with the application ID, in order to transfer the reception data to another game device.

When the exchange data received from data communication control unit 209 is stored in the reception BOX in reception data saving area 82, device identification information registration processing unit 211 causes the MAC address which is the device identification information of game device 3 which is the exchange partner to be stored in MAC address list saving area 88, Namely, the device identification information is accumulated. Further, each time the received exchange data is stored in the reception BOX in reception data saving area 82, device identification information registration processing unit 211 adds the device identification information of the game device which is the exchange partner to MAC address saving area 88, as will be described later. Namely, the fact that the device identification information of the game device which is the exchange partner is added and registered in MAC address saving area 88 means that history of giving/receiving of exchange data to/from the game device corresponding to the device identification information is recorded.

Then, wireless communication setting unit 205 again causes the MAC address list stored in MAC address list saving area 88 to be stored in MAC address list saving area 70, and outputs an instruction to carry out wireless communication in wireless module 38 to wireless frame transmission/reception unit 223. Namely, processing the same as described above is repeated.

Wireless frame transmission/reception unit 223 of wireless communication module 38 again sets the transmission wireless frame and performs the exchange partner search processing for searching for a communication partner, using the set transmission wireless frame. For example, it is assumed in the present example that the transmission wireless frame is again transmitted to game device 3 and the transmission wireless frame transmitted from game device 3, that is, the reception wireless frame, is received.

Exchange data communication determination unit 225 determines whether or not the MAC address which is the device identification information included in the received reception wireless frame is registered in the MAC address list saved in MAC address list saving area 70 as described above.

When giving/receiving of the exchange data was carried out previously as described above, the MAC address which is the device identification information of game device 3 is stored in the MAC address list as described above and therefore exchange data communication determination unit 225 determines that the MAC address has been registered and the processing for giving/receiving the exchange data as subsequent data communication is not carried out. Namely, efficient data communication can be achieved without establishing communication with a communication partner with which communication has once been carried out.

Main body portion 39 and wireless communication module 38 may operate independently of each other. Namely, even when main body portion 39 has made transition to a sleep state, it is possible for wireless communication module 38 to perform the exchange partner search processing for searching for a communication partner, using the set transmission wireless frame. Only when a communication partner with which exchange is possible is found, a notification is sent to main body portion 39, connection with the communication partner is established, and giving/receiving of exchange data is carried out. Therefore, for example, even when a communication partner is found through the exchange partner search processing by wireless communication module 38 after main body portion 39 has made transition to such a power save state as a sleep state, a notification is not given to main body portion 39 and communication connection is not established unless exchange with the partner is possible. Therefore, power saving in game device 1 as a whole can be achieved.

In the following, details of each function of main body portion 39 and wireless communication module 38 will be described.

Figure 6:
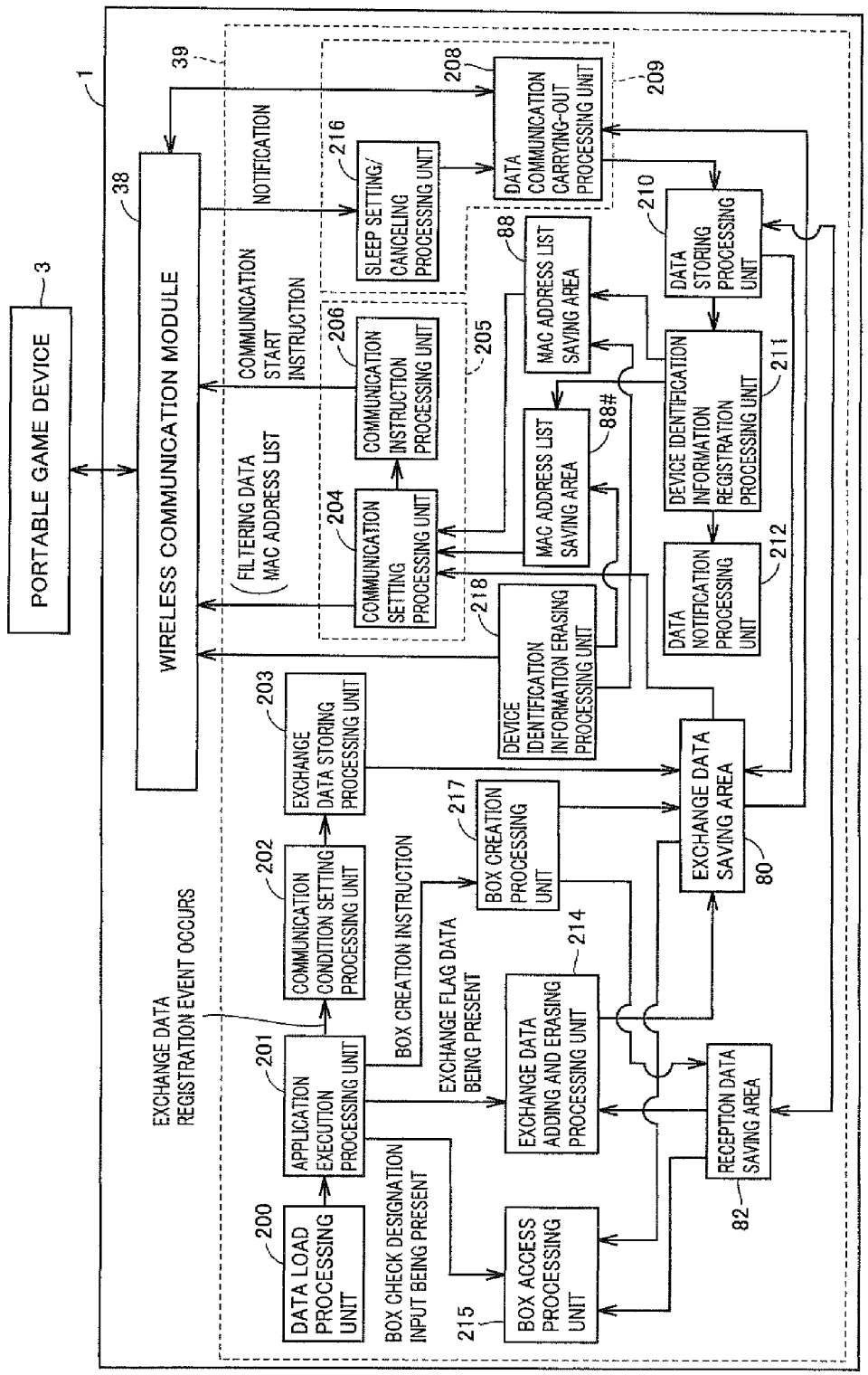
FIG. 6 shows details of the functional block of a main body portion 39 of the game device according to an embodiment of the present invention.

FIG. 6 shows details of the functional block of main body portion 39 of the game device according to an embodiment of the present invention.

Referring to FIG. 6, in the present example, by way of example, a case in which CPU 31 executes a main body function program saved in system program saving area 86 and an application stored in ROM 27 of memory card 26 to realize a prescribed function will be described, however, the function is not necessarily realized by CPU 31 and at least a partial function may be realized by using a dedicated IC (Integrated Circuit). Here, an example in which exchange data saving area 80, reception data saving area 82 and MAC address saving areas 88 and 88# of saving data memory 34 are accessed not through memory control circuit 33 is described, however, storage in saving data memory 34 may be carried out through memory control circuit 33 described with reference to FIG. 1.

It is noted that the functional blocks of main body portion 39 will be described here as functions common to processing between portable terminals and processing between a portable terminal and a fixed terminal as will be described later.

Main body portion 39 further includes, in addition to data communication control unit 209 and device identification information registration processing unit 211, functions of a data load processing unit 200, an application execution processing unit 201, a communication condition setting processing unit 202, an exchange data storing processing unit 203, a data notification processing unit 212, an exchange data adding and erasing processing unit 214, a BOX access processing unit 215, a BOX creation processing unit 217, and a device identification information erasing processing unit 218. Wireless communication setting unit 205 includes a communication setting processing unit 204 and a communication instruction processing unit 206. Data communication control unit 209 includes a data communication carrying-out processing unit 208 and a sleep setting/canceling processing unit 216.

Of the functions above, data load processing unit 200, communication setting processing unit 204, communication instruction processing unit 206, data communication carrying-out processing unit 208, data storing processing unit 210, device identification information registration processing unit 211, data notification processing unit 212, sleep setting/canceling processing unit 216, and device identification information erasing processing unit 218 are functions realized by CPU 31 executing the main body function program, by way of example. Application execution processing unit 201, communication condition setting processing unit 202, BOX access processing unit 215, BOX creation processing unit 217, exchange data storing processing unit 203, and exchange data adding and erasing processing unit 214 are realized by CPU 31 executing an application stored in ROM 27 of memory card 26, by way of example. Each function is assumed to be realized in accordance with multi-task control as needed.

Data load processing unit 200 loads an application (data). Application execution processing unit 201 executes the application based on the loaded, that is, obtained, data.

BOX creation processing unit 217 creates a transmission BOX and a reception BOX brought in correspondence with data identifying an application (such as an application ID) in exchange data saving area 80 and reception data saving area 82 in response to a BOX creation instruction as a result of the application execution processing.

When an exchange data registration event occurs as a result of the application execution processing, communication condition setting processing unit 202 sets a communication condition for the exchange data. For example, the number of times of transmission of exchange data from the game device and/or the number of times transfer of the exchange data using another game device in response to a user's setting instruction or the like is (are) set.

In the present example, regarding the exchange data, though a case where the number of times of transfer is set for data, exchanged with the data possessed by another game device will be described, however, the number of times of transfer can also similarly be set for data simply assigned without exchange (assignment data), for example, such data that one's own data is unidirectionally transmitted to another game device or one's own data is replicated and unidirectionally transmitted, or such data as only unidirectionally received from another game device to the contrary.

Exchange data storing processing unit 203 causes the exchange data having a communication condition set to be stored in a transmission BOX provided in exchange data saving area 80 of saving data memory 34 as a result of the application execution processing. Here, the exchange data is stored, while filtering data for determination processing for determining whether processing such as exchange or the like of exchange data can be performed or not before carrying out substantial communication as will be described later is set. It is noted that filtering data includes information indicating a determination algorithm scheme for identifying in which list an application ID for saving a list for each determination algorithm scheme should be saved together with the application ID (algorithm identification information) and system flag information for distinguishing a type of an application.

When it is determined that exchange flag data exists as a result of the application execution processing as will be described later, exchange data adding and erasing processing unit 214 checks the reception BOX in reception data saving area 82. When it is determined that exchange data satisfying the exchange condition exists in the reception BOX, the exchange data stored in the reception BOX in reception data saving area 82 is obtained and the exchange data stored in the transmission BOX in exchange data saving area 80 is deleted.

When a BOX check designation input is provided as a result of the application execution processing, BOX access processing unit 215 performs BOX access processing. For example, the transmission BOX and the reception BOX corresponding to the application IDs provided in exchange data saving area 80 and reception data saving area 82 respectively are accessed in response to a user's BOX check designation instruction, and the exchange data and/or the reception data stored therein is (are) displayed or the like to the user.

When it is determined that wireless communication by wireless communication module 38 is possible, communication setting processing unit 204 outputs the filtering data set as the exchange data stored in the transmission BOX in exchange data saving area 80 to wireless communication module 38, so that it is stored in filtering data saving area 68 of wireless communication module 38.

In the present example, by way of example, when the filtering data is stored in filtering data saving area 68 of wireless communication module 38, communication setting processing unit 204 classifies application IDs included in the filtering data by checking the system flag information, and further, it checks the algorithm identification information for identifying the determination algorithm. Then, the application IDs are stored in a list provided in accordance with the system flag information and the algorithm identification information in filtering data saving area 68.

Further, communication setting processing unit 204 outputs the MAC address list saved in MAC address list saving area 88, 88# to wireless communication module 38 and causes the list to be stored in MAC address list saving area 70, 70# of wireless communication module 38.

As will be described later, it is assumed that communication setting processing unit 204 is capable of updating a MAC address set in a transmission wireless frame after a prescribed time period passed.

Further, device identification information erasing processing unit 218 accesses and erases data in MAC address list saving areas 88, 88# in accordance with prescribed conditions. In the present embodiment, data in MAC address list saving areas 88 and 88# can be erased in accordance with a prescribed operation instruction from a user. Further, MAC address list saving areas 88 and 88# each have a prescribed data capacity. When a plurality of MAC addresses are saved and the prescribed capacity is full with no space left for saving, a saved old MAC address may be erased and a new MAC address may be saved. Further, separately from the prescribed operation instruction from the user, when prescribed conditions are satisfied, for example, after a prescribed time period passed, device identification information erasing processing unit 218 erases a part of the data in the MAC address list saving area as will be described later. When data in MAC address list saving area 88, 88# is erased, an instruction may be issued to also erase the MAC address list stored in MAC address list saving area 70, 70# in RAM 66 of wireless communication module 38.

Though an example in which the MAC address list stored in MAC address list saving area 70, 70# is erased is described in the present example, the MAC address list stored in MAC address list saving area 70, 70# of RAM 66 may be erased in response to an instruction from CPU 60 of wireless communication module 38 after a prescribed time period passed in wireless communication module 38, regardless of any instruction from the main body portion.

Communication instruction processing unit 206 outputs a communication start instruction of wireless communication to wireless communication module 38.

Figure 7:
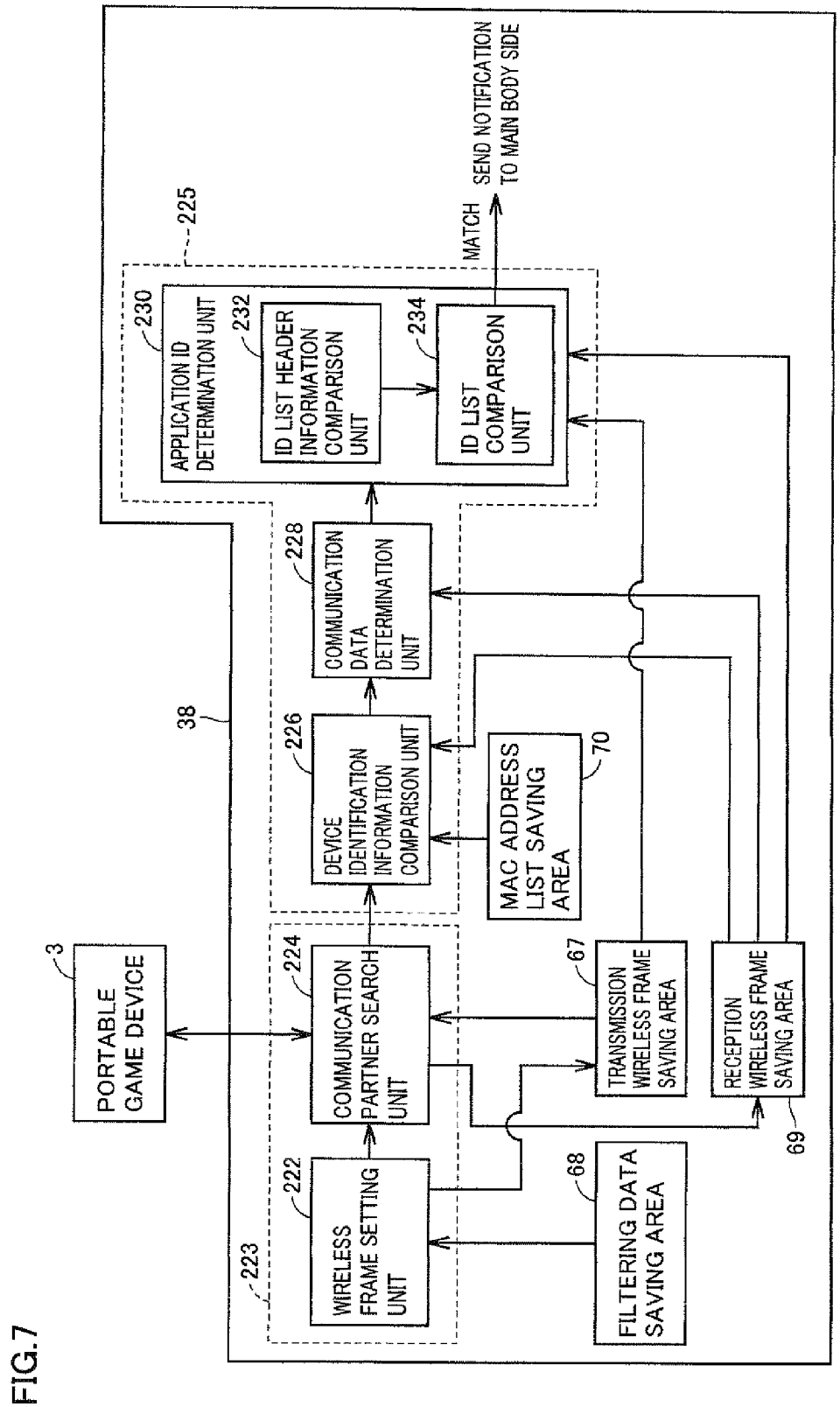
FIG. 7 shows details of the functional block of wireless communication module 38 performing processing between portable terminals according to an embodiment of the present invention.

FIG. 7 shows details of the functional block of wireless communication module 38 performing the processing between portable terminals according to an embodiment of the present invention.

Referring to FIG. 7, in the present example, by way of example, a case in which prescribed functions are realized by CPU 60 executing an application for performing the processing between portable terminals, that is saved in ROM 72, will be described, however, the case is not necessarily limited to the case where the functions are realized by CPU 60 and at least a partial function may be realized by a dedicated IC (Integrated Circuit).

Wireless communication module 38 includes wireless frame transmission/reception unit 223 and exchange data communication determination unit 225. Wireless frame transmission/reception unit 223 includes a wireless frame setting unit 222 and a communication partner search unit 224. Exchange data communication determination unit 225 includes a device identification information comparison unit 226, a communication data determination unit 228, and an application ID determination unit 230. Each function is assumed to be realized in accordance with multi-task control as needed.

Wireless frame setting unit 222 sets, in accordance with the communication start instruction of wireless communication, a transmission wireless frame for performing the exchange partner search processing which will be described later, so as to search for a communication partner, based on the filtering data saved in filtering data saving area 68. Details of the transmission wireless frame will be described later. Wireless frame setting unit 222 causes the set transmission wireless frame to be stored in transmission wireless frame saving area 67.

Communication partner search unit 224 performs the exchange partner search processing for searching for a communication partner within communication range 10 described above, using the set transmission wireless frame stored in transmission wireless frame saving area 67. In the present example, by way of example, a case of communication with game device 3 as a communication partner will be described. When a transmission wireless frame is transmitted to game device 3, communication partner search unit 224 receives the transmission wireless frame transmitted from game device 3 as a reception wireless frame and causes the frame to be stored in reception wireless frame saving area 69.

When a communication partner is found by communication partner search unit 224, that is, when the reception wireless frame is received from the communication partner, exchange data communication determination unit 225 determines whether or not the communication partner is an exchange partner with which exchange data is to be exchanged, based on the reception wireless frame. When it is determined that the communication partner is the exchange partner, a notification to that effect is issued.

Specifically, when a communication partner has been found by communication partner search unit 224, device identification information comparison unit 226 compares the MAC address representing the device identification information included in the reception wireless frame received from the game device which is the communication partner with the MAC address list saved in MAC address list saving area 70, to thereby find if there is any matching address.

When a communication partner has been found and when it is determined that the MAC address included in the reception wireless frame does not match with the MAC address list saved in MAC address list saving area 70 based on the result of comparison by device identification information comparison unit 226, communication data determination unit 228 checks the data contents in the received reception wireless frame, so as to determine whether or not the reception wireless frame can be processed in the processing between portable terminals.

When it is determined by communication data determination unit 228 that a reception wireless frame that can be processed has been received, application ID determination unit 230 determines whether or not the application ID stored in the received reception wireless frame satisfies prescribed conditions relating to exchange of the exchange data.

Specifically, application ID determination unit 230 includes an ID list header information comparison unit 232 and an ID list comparison unit 234. Processing by each unit will be described later.

When it is determined based on the result of comparison by ID list comparison unit 234 that the prescribed conditions are satisfied (application IDs matched), a notification to that effect is sent to the main body side.

Again referring to FIG. 6, sleep setting/canceling processing unit 216 receives the notification (in the present example, the notification from ID list comparison unit 234 in FIG. 7) from wireless communication module 38.

Sleep setting/canceling processing unit 216 sets the sleep state or cancels the sleep state of each function of main body portion 39 in accordance with prescribed conditions. By way of example, sleep setting/canceling processing unit 216 monitors an operation instruction input by a user using operation button 14, and when it is determined that no operation instruction has been input through operation button 14 for a prescribed time period, sleep setting/canceling processing unit 216 sets the sleep state in which processing by each function of main body portion 39 is stopped. With this function, it becomes possible to have the game device automatically enter the power save state when the user does not desire to operate the game device. Alternatively, the device may be set to the sleep state in response to an instruction input from the user. When an operation instruction is provided by the user using operation button 14 in the sleep state in which processing by each function of main body portion 39 is stopped, sleep setting/canceling processing unit 216 cancels the sleep state and returns to the original state. Namely, various types of processing in main body portion 39 become possible. Further, in the present example, other than the operation instruction using operation button 14 from the user, the sleep state is canceled when a notification is received from wireless communication module 38 while main body portion 39 is in the sleep state. In the present example, though sleep setting/canceling processing unit 216 is described as included in data communication control unit 209 by way of example, it is not particularly limited as such and such a function may be provided separately from data communication control unit 209.

When a notification is sent from wireless communication module 38, sleep setting/canceling processing unit 216 outputs the notification to data communication carrying-out processing unit 208.

When a present state is not the sleep state, sleep setting/canceling processing unit 216 directly outputs the notification from wireless communication module 38 to data communication carrying-out processing unit 208.

Data communication carrying-out processing unit 208 performs the processing for giving/receiving the exchange data to/from game device 3 in accordance with the notification from wireless communication module 38 in communication between portable terminals. Specifically, the exchange data saved in the transmission BOX in exchange data saving area 80 is transmitted to game device 3. Then, the exchange data is received from game device 3.

As will be described later, data communication carrying-out processing unit 208 performs the processing for obtaining distribution data from fixed terminal device 5 in accordance with the notification from wireless communication module 38 in communication between the portable terminal and the fixed terminal. Specifically, a request for the distribution data is transmitted to fixed terminal device 5 and the distribution data transmitted from fixed terminal device 5 is received.

Data storing processing unit 210 determines whether a condition for exchanging the exchange data received by data communication carrying-out processing unit 208 is satisfied or not, and causes the reception BOX corresponding to the application ID in reception data saving area 82 to store the exchange data based on a determination result. In addition, the number of times of transfer of the reception data is checked and whether a transfer condition is satisfied or not is determined. When it is determined that the transfer condition is satisfied, the reception data is copied and stored as the exchange data (transfer data) in the transmission BOX corresponding to the application ID in exchange data saving area 80.

When the exchange condition is satisfied, device identification information registration processing unit 211 causes a MAC address representing the device identification information of game device 3, which is an exchange partner, to be stored in MAC address list saving area 88.

Further, as will be described later, when the distribution data received by data communication carrying-out processing unit 208 is stored in reception data saving area 82, device identification information registration processing unit 211 causes the MAC address representing the device identification information of fixed terminal device 5, which is the distribution partner, to be stored in MAC address list saving area 88#.

Data notification processing unit 212 notifies the user that the exchange data has been exchanged or the like or the distribution data has been obtained.

Figure 8:
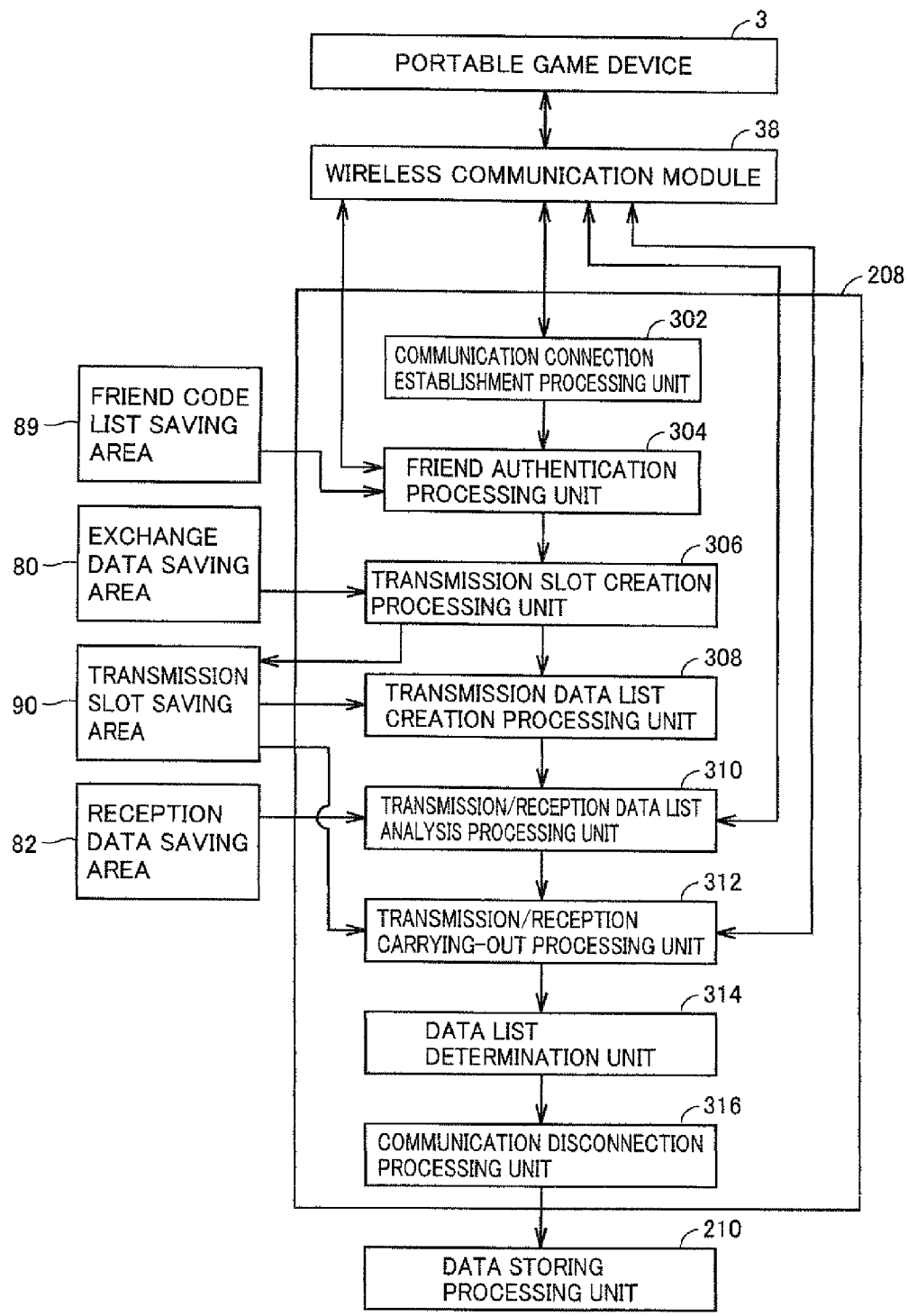
FIG. 8 is a diagram illustrating details of a data communication carrying-out processing unit 208 performing processing for giving/receiving exchange data in the processing between the portable terminals according to an embodiment of the present invention.

FIG. 8 is a diagram illustrating details of data communication carrying-out processing unit 208 performing the exchange data giving/receiving processing in the processing between the portable terminals according to an embodiment of the present invention.

Referring to FIG. 8, data communication carrying-out processing unit 208 will be described in the present example by way of example of a case where a prescribed function is implemented by CPU 31 executing an application for performing processing for giving/receiving exchange data in the processing between portable terminals that is saved in preset data memory 35, however, a case is not necessarily limited to the case where the function is implemented by CPU 31 and at least a partial function may be implemented by using a dedicated IC (Integrated Circuit).

Data communication carrying-out processing unit 208 includes a communication connection establishment processing unit 302, a friend authentication processing unit 304, a transmission slot creation processing unit 306, a transmission data list creation processing unit 308, a transmission/reception data list analysis processing unit 310, a transmission/reception carrying-out processing unit 312, a data list determination unit 314, and a communication disconnection processing unit 316. It is assumed that each function is implemented by multi-task control as necessary.

Communication connection establishment processing unit 302 establishes communication connection (forms a communication path) with a communication partner based on connection information such as a MAC address of the communication partner included in a notification from wireless communication module 38 that a game device having exchange data has been found.

Friend authentication processing unit 304 determines whether the communication partner is a friend or a non-friend, by giving/receiving a friend code stored in friend code list saving area 89.

Specifically, friend authentication processing unit 304 transmits its own friend code to game device 3 through wireless communication module 38. In addition, friend authentication processing unit 304 receives a friend code transmitted from game device 3 through wireless communication module 38. Then, whether the received friend code is saved in friend code list saving area 89 or not is determined. When the received friend code is saved in friend code list saving area 89, game device 3 is notified of the fact that friend authentication was successful. In addition, in game device 3 as well, in accordance with the similar scheme, whether the friend code of game device 1 which is a communication partner is saved in the friend code saving area or not is determined. Then, when it is determined in game device 3 that the friend code of game device 1 is saved in the friend code saving area, game device 1 is notified of the fact that friend authentication was successful. When friend authentication of the own device was successful and the own device is notified of the fact that friend authentication was successful from the communication partner, that is, when friend authentication was successful in both devices, friend authentication processing unit 304 determines that the communication partner is a friend. Depending on whether a communication partner is a friend or not, contents in exchange data stored in a subsequent transmission slot can be changed.

Transmission slat creation processing unit 306 creates a transmission slot provided in correspondence with each transmission BOX in transmission slot saving area 90 and causes the transmission slot to store data saved in each transmission BOX in exchange data saving area 80 as the exchange data to actually be given/received. It is noted that transmission slot saving area 90 is provided by using a partial area of main memory 32.

Transmission data list creation processing unit 308 creates a transmission data list for transmitting the exchange data based on the transmission slot provided for each transmission BOX provided in transmission slot saving area 90. The transmission data list includes such information as a data size of the exchange data stored in each transmission slot for each application.

Transmission/reception data list analysis processing unit 310 transmits the transmission data list created by transmission data list creation processing unit 308 to game device 3 through wireless communication module 38. In addition, transmission/reception data list analysis processing unit 310 receives the transmission data list transmitted from game device 3 (hereinafter also referred to as a reception data list). Then, after a capacity or the like of the reception BOX provided in correspondence with each application provided in reception data saving area 82 is checked, whether the exchange data can be saved in the reception BOX or not is determined based on the size of exchange data for each application transmitted from game device 3 and included in the reception data list. Then, whether the exchange data can be saved in the reception BOX or not is determined for each application included in the reception data list, and when it is determined that the exchange data can be saved, an OK determination flag is added for each application included in the reception data list. On the other hand, when it is determined that the exchange data cannot be saved in the reception BOX, an NG determination flag is added for each application included in the reception data list. Transmission/reception data list analysis processing unit 310 transmits (returns) to game device 3, the reception data list having the OK determination flag or the NG determination flag added. Similarly, in accordance with the similar scheme in game device 3 as well, an OK determination flag or an NG determination flag is added for each application, to the transmission data list transmitted from game device 1. Then, the transmission data list having the OK determination flag or the NG determination flag added for each application is transmitted (returned) to game device 1.

Transmission/reception data list analysis processing unit 310 of game device 1 obtains the transmission data list having the OK determination flag or the NG determination flag added.

Transmission/reception carrying-out processing unit 312 transmits the exchange data from the transmission slot saved in transmission slot saving area 90 through wireless communication module 38, based on the transmission data list having the OK determination flag or the NG determination flag added. In addition, transmission/reception carrying-out processing unit 312 receives the exchange data transmitted from game device 3 through wireless communication module 38 based on the reception data list having the OK determination flag or the NG determination flag added.

Data list determination unit 314 determines whether the data transmission/reception processing based on the transmission or reception data list has appropriately been performed or not. Specifically, whether or not the exchange data has appropriately been transmitted from the transmission slot provided in correspondence with each application based on the transmission data list or whether or not the exchange data transmitted from game device 3 has appropriately been received based on the reception data list is determined.

When it is determined that the data transmission/reception processing based on the transmission data list and the reception data list has appropriately been performed in data list determination unit 314, communication disconnection processing unit 316 performs processing for disconnecting communication connection with game device 3. Alternatively, when data transmission/reception has not appropriately been carried out, for example, when communication has been interrupted as well, processing for disconnecting communication connection with game device 3 is performed. Then, communication disconnection processing unit 316 notifies data storing processing unit 210 that communication connection has been disconnected.

Specific processing in each unit will be described hereinafter.

<Storage in Exchange Data Saving Area 80>

Figure 9:
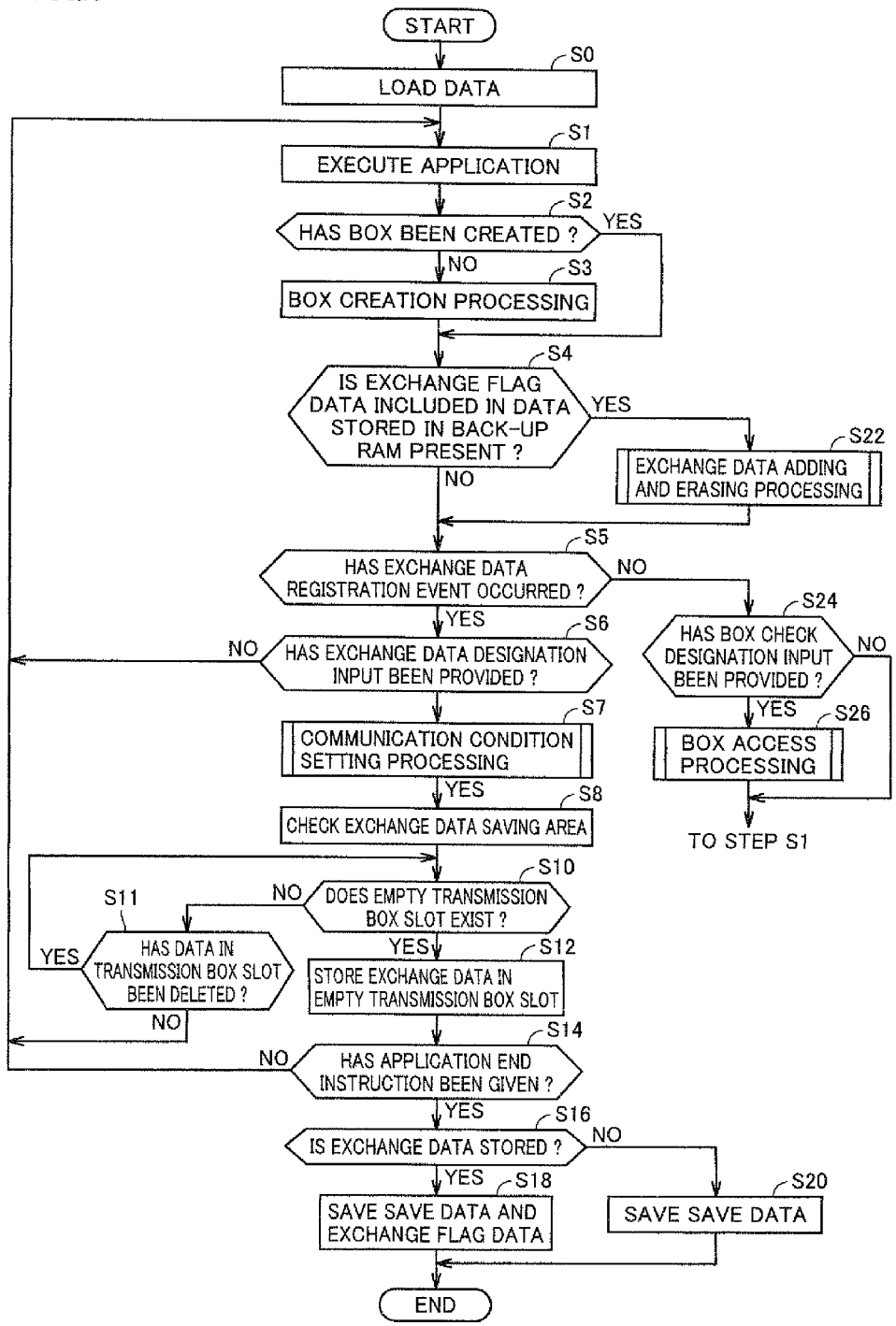
FIG. 9 is a flowchart representing processing for storing exchange data in a transmission BOX in an exchange data saving area 80 according to an embodiment of the present invention.

FIG. 9 is a flowchart representing the processing for storing exchange data in a transmission BOX in exchange data saving area 80 according to an embodiment of the present invention.

In the present example, when a user operates data usable by the application for the purpose to provide the data as exchange data to an external game device during execution of an application in game device 1, designated exchange data is stored in a corresponding transmission BOX in exchange data saving area 80. By way of example, execution of an application stored in the ROM of memory card 26 will be described.

Referring to FIG. 9, when main power of game device 1 is turned on and the user performs a prescribed operation, CPU 31 (data load processing unit 200) of game device 1 loads data that has been stored in memory card 26 (step S0). Namely, the data is developed on main memory 32.

Then, CPU 31 (application execution processing unit 201) executes the application based on the data developed on main memory 32 (step S1).

When the application is executed, first, CPU 31 (application execution processing unit 201) determines whether or not a BOX (a transmission BOX and a reception BOX) corresponding to the application has been created or not (step S2). When CPU 31 (application execution processing unit 201) determines in step S2 that the BOX has been created (YES in step S2), the process proceeds to step S4.

On the other hand, when CPU 31 (application execution processing unit 201) determines in step S2 that a BOX has not been created (NO in step S2), the process proceeds to step S3.

Specifically, application execution processing unit 201 outputs a BOX creation instruction to BOX creation processing unit 217.

Then, CPU 31 (BOX creation processing unit 217) creates a transmission BOX and a reception BOX brought in correspondence with its own application in exchange data saving area 80 and reception data saving area 82, respectively (step S3).

Figure 10:
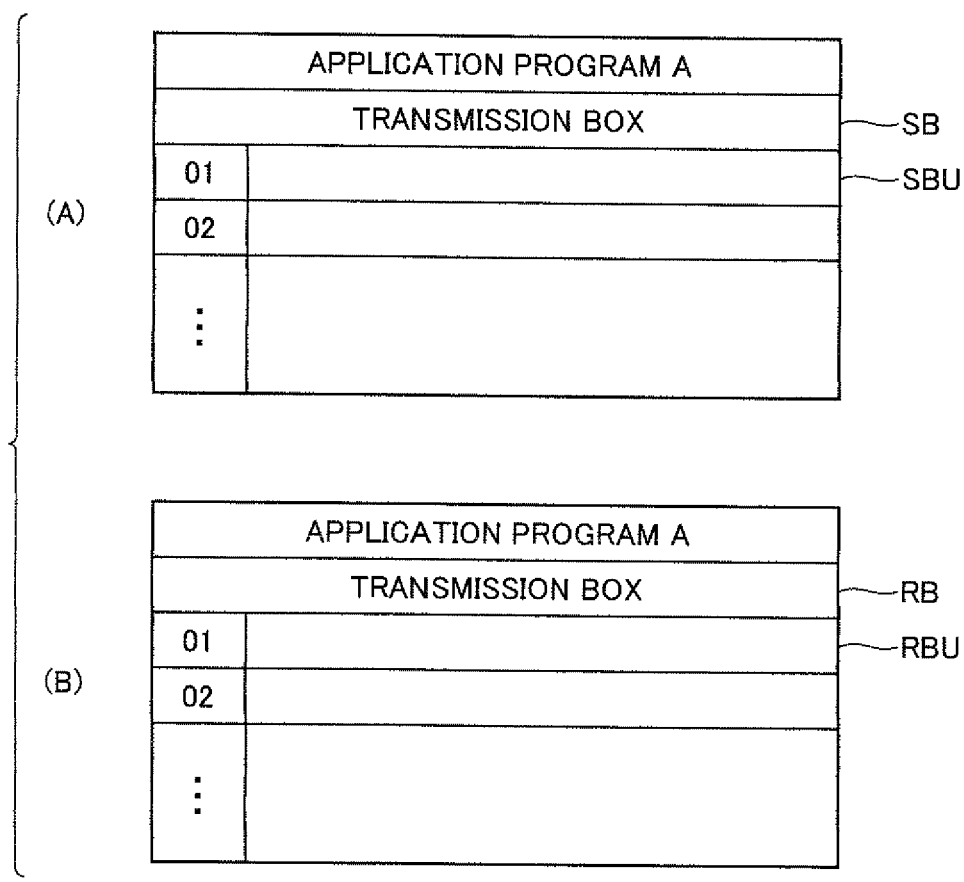
FIG. 10 is a conceptual diagram illustrating a transmission BOX and a reception BOX brought in correspondence with an application according to an embodiment of the present invention.

FIG. 10 is a conceptual diagram illustrating a transmission BOX and a reception BOX brought in correspondence with an application according to an embodiment of the present invention.

Referring to FIG. 10, here, a BOX created in correspondence with an application program A is shown by way of example. FIG. 10(A) shows a transmission BOX (box) SB provided in correspondence with an application A in exchange data saving area 80, and FIG. 10(B) shows a reception BOX (box) RB provided in correspondence with application A in reception data saving area 82. The transmission BOX is constituted of a plurality of transmission BOX slots SBU in each of which one piece of a plurality of pieces of data is stored. The reception BOX is also similarly constituted of a plurality of reception BOX slots RBU in each of which one piece of reception data is stored. A capacity of a storage area used for creating these transmission BOX and reception BOX as well as the number of transmission BOX slots and reception BOX slots are set as being defined for each application program in advance. It is noted that a maximum capacity of a storage area used as the transmission slot created in main memory 32 in transmission of the exchange data which will be described later is also set as being defined for each application program in advance.

FIG. 11 is a diagram illustrating an example in which data is stored in the transmission BOX according to an embodiment of the present invention.

Referring to FIG. 11, here, a case where pieces of data X and Y are stored in respective transmission BOX slots in transmission BOX (box) SB is shown. It is noted that a slot number is allotted to the transmission BOX slot, the data is stored in the ascending order of this number, and the data is stored as the exchange data in one transmission slot basically in the order of storage.

Figure 12:
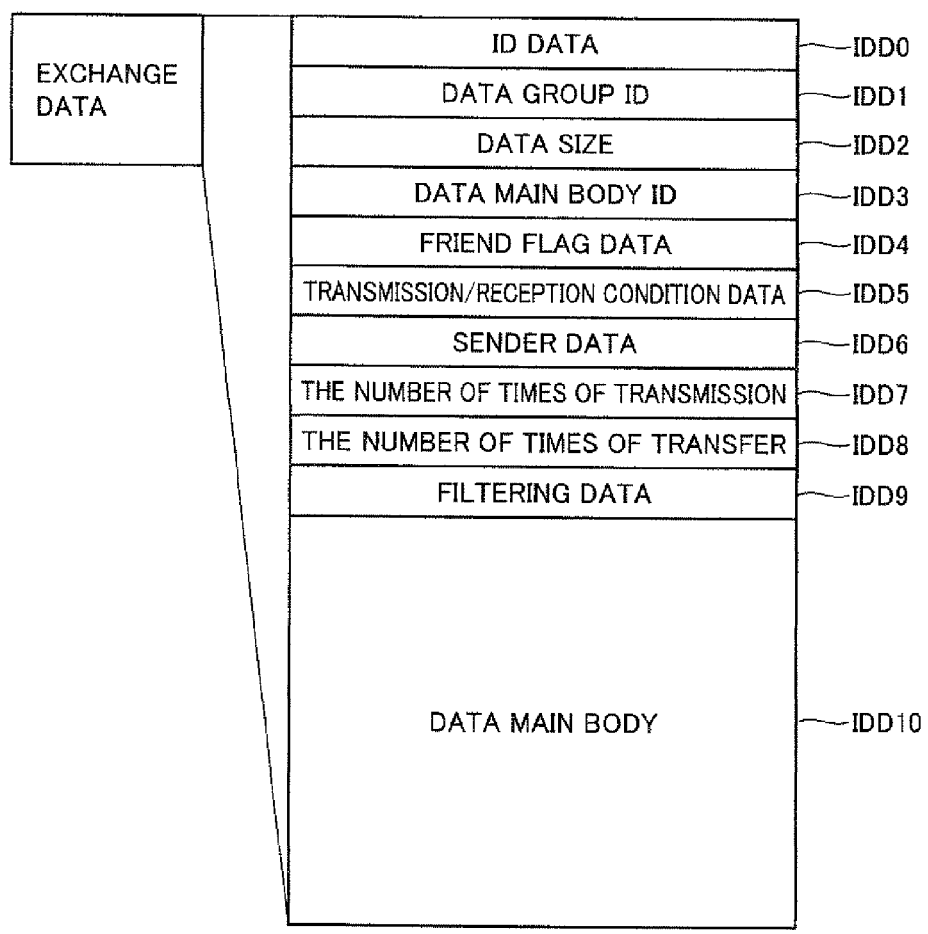
FIG. 12 is a diagram illustrating a data structure of data stored in a transmission BOX slot of the transmission BOX according to an embodiment of the present invention.

FIG. 12 is a diagram illustrating a data structure of data stored in a transmission BOX slot in the transmission BOX according to an embodiment of the present invention.

Referring to FIG. 12, a data structure of the exchange data stored in the transmission BOX slot is constituted of ID data IDD0, a data group ID IDD1, a data size IDD2, a data main body ID IDD3, friend flag data IDD4, transmission/reception condition data IDD5, sender data IDD6, the number of times of transmission IDD7, the number of times of transfer IDD8, filtering data IDD9, and a data main body IDD10.

ID data IDD0 is identification data indicating an application name provided in advance for each application.

Data group ID IDD1 is identification data for performing data grouping processing which will be described later. Specifically, data identical in data group ID is handled as data belonging to the same group.

In data size IDD2, a value indicating a data size of entire data is stored.

Data main body ID IDD3 is specific identification data allotted at the time of generation of the data main body. When the data main body includes the same contents, the same identification data is set.

Friend flag data IDD4 is flag data identifying whether a transmission target of data to serve as the exchange data is a friend, a non-friend, or any (ANY) of friend/non-friend. For example, flag data having "friend" set means that the transmission target of the data is a friend. Alternatively, flag data having "non-friend" set means that a transmission target of the data is a non-friend. Alternatively, flag data having "ANY" set means that a transmission target of the data is any of friend/non-friend.

Transmission/reception condition data IDD5 includes send flag data and receive flag data which will be described later.

Sender data IDD6 is information identifying a game device which is a sender and it includes a MAC address or the like by way of example.

The number of times of transmission IDD7 defines the number of times of transmission of data. For example, the number of times of transmission set to one means that data is transmitted as exchange data once and then transmission of the data ends. Alternatively, the number of times of transmission set to three means that the data is transmitted three times. It is noted that the number of times of transmission is set as processing performed by communication condition setting processing unit 202 described above.

The number of times of transfer IDD8 defines the number of times of transfer of the data. For example, when the data of which number of times of transfer is set to one is transmitted as the exchange data to another game device, the data is transferred once from another game device to yet another game device. It is noted that the number of times of transfer is set as the processing performed by communication condition setting processing unit 202 described above.

Filtering data IDD9 is data including an application ID for determining whether or not such processing as exchange of the exchange data can be performed, before substantial communication with another game device or the like which is a communication partner, and it includes algorithm identification information indicating a scheme of the determination algorithm of the application ID and system flag information for distinguishing a type of an application, together with the application ID.

Data main body IDD10 refers to data contents serving as the exchange data.

Referring again to FIG. 9, CPU 31 (application execution processing unit 201) determines whether or not exchange flag data indicating that the exchange data has been stored in the corresponding transmission BOX in exchange data saving area 80 is included in data stored in back-up RAM 28 (step S4).

When CPU 31 (application execution processing unit 201) determines in step S4 that exchange flag data indicating that the exchange data has been stored in the corresponding transmission BOX in exchange data saving area 80 is included in the data stored in back-up RAM 28 (YES in step S4), CPU 31 (application execution processing unit 201) performs exchange data addition processing and erasing processing (step S22). The processing, that is, the processing in exchange data adding and erasing processing unit 214, will be described later. After the adding processing and the erasing processing are performed, the process proceeds to step S5.

When it is determined by CPU 31 (application execution processing unit 201) in step S4 that the data stored in back-up RAM 28 does not include exchange flag data indicating that the exchange data has been stored in the corresponding transmission BOX in exchange data saving area 80 (NO in step S4), the process then proceeds to step S5.

Then, CPU 31 (application execution processing unit 201) determines whether or not an event of registering exchange data (hereinafter also referred to as an exchange data registration event) has occurred as a result of execution of the application (step S5). Namely, during execution of the application, whether or not transition has been made to a scene urging storage of data usable by the application being executed as exchange data in the corresponding transmission BOX in exchange data saving area 80 is determined.

Here, the exchange data refers to data used in the application program, and more preferably, it refers to data acquired or created by the user as a result of execution of the application program.

Though not shown, for example, the exchange data registration event includes such a case that a list of data usable by the application including data acquired or created in a game stored in the back-up RAM through execution of the application is displayed on LCD 12 and the user selects data that may be given to others from the list.

Storage of the exchange data will be described below. For example, an item the user got in the game or data of a character grown through the progress of the game may be adopted as exchange data. A user message may be added to an item. More specifically, a user may write a message on a "letter" item and the message may be stored as exchange data. By adopting items and characters reflecting a status of game progress as exchange data, user's individuality can be exhibited in the data, which adds zest to exchange.

The exchange data registration event may be expressed as an event in the game. For example, when a user performs an operation to place or deposit an item or a character at a prescribed location in the game, processing for storing the data corresponding to the item or character as exchange data in the transmission BOX in exchange data saving area 80 may be performed. In addition, such processing that a "letter" item may be put in a bottle and thrown to the sea to create a dramatic atmosphere in the game and the data of the "letter" item thrown to the sea is stored as the exchange data in the transmission BOX in exchange data saving area 80 may be performed.

In exchanging the exchange data, it is also possible to impose additional conditions (obtaining condition data). For example, data indicating such conditions as sex, age, address, or occupation of an owner of a device with which exchange is desired or of a user executing the application may be set as the obtaining condition data, or data of which exchange is desired, data indicating such desire, or the like may be included in the conditions for exchange. For example, the obtaining condition data can be obtained by allowing the user to select exchange conditions of exchange data in the exchange data registration event above. Alternatively, the application may set the obtaining condition data in association with an event in the game. Such obtaining condition data is included as the exchange condition data in an application ID as will be described later.

In the present example, the exchange data is described mainly as data to be exchanged with another game device in exchange with data held by another game device, however, the exchange data includes data not for exchange but simply for assignment (assignment data), for example, such data that one's own data is unidirectionally transmitted to another game device, such data that one's own data is replicated and unidirectionally transmitted, or such data as only unidirectionally received from another game device to the contrary.

In addition, conditions relating to transmission/reception of the data (transmission/reception condition data) can also be imposed as further additional conditions. For example, the transmission/reception condition data can also be obtained by allowing the user to select conditions relating to transmission/reception of the exchange data at the exchange data registration event mentioned above, or the application may set the obtaining condition data in association with an event in the game. For instance, in the example above, in a case where a "letter" item is put in a bottle and thrown to the sea to create a dramatic atmosphere in the game and the data of the "letter" item thrown to the sea is used as the exchange data, the transmission/reception condition data can also be set such that the data of one's own is transmitted unidirectionally to another game device. Alternatively, by way of another example, such an effect as having the user look for an item the user desires can also be set in a game, and thus the transmission/reception condition data is such that the exchange data of the item desired by the user is received unidirectionally from another game device. Such transmission/reception condition data is also included as the exchange condition data in an application ID as will be described later. The transmission/reception condition data can also be set such that the exchange data of an item the user desires is received unidirectionally from another game device. In a case where the exchange data is simply received unidirectionally from another game device, there is no data to be transmitted to another game device, and therefore, empty data or dummy data may be saved as the exchange data stored in the transmission BOX in exchange data saving area 80.

By imposing such additional conditions, in exchanging the exchange data, it becomes possible to realize wide variation of manners of obtaining exchange data such as obtaining of desired exchange data, and zest of exchange can be enhanced.

In the present example, as will be described later, it is assumed that a plurality of determination schemes can be provided as determination algorithms in making comparison between an application ID and another application ID, and depending on a data format in the application ID, that is, depending on presence/absence of exchange condition data, the algorithm identification information indicating the scheme of the determination algorithm is set differently.

On the other hand, when it is determined that the exchange data registration event has not occurred (NO in step S5), CPU 31 (application execution processing unit 201) determines whether a BOX check designation input has been provided or not (step S24).

When CPU 31 (application execution processing unit 201) determines that a BOX check designation input has been provided (YES in step S24), the process proceeds to step S26. Specifically, application execution processing unit 201 outputs to BOX access processing unit 215, an indication that a BOX check designation input has been provided. The processing, that is, the processing in BOX access processing unit 215, will be described later. Then, after the BOX access processing is performed, the process returns to step S1 and a normal application is executed. For example, such game processing as operating an object in a virtual space based on a user's operation is performed.

When CPU 31 (application execution processing unit 201) determines that a BOX check designation input has not been provided (NO in step S24) as well, the process returns to step S1.

Then, when it is determined in step S5 that the exchange data registration event has occurred (YES in step S5), CPU 31 (application execution processing unit 201) determines whether or not an exchange data designation input has been provided (step S6).

Then, in step S6, when it is determined that an exchange data designation input has been provided (YES in step S6), CPU 31 (communication condition setting processing unit 202) performs communication condition setting processing for setting the number of times of transmission of the exchange data and the number of times of transfer of the exchange data (step S7). The communication condition setting processing will be described later.

On the other hand, when CPU 31 (application execution processing unit 201) determines in step S6 that an exchange data designation input has not been provided (NO in step S6), the user does not desire exchange and the process returns again to step S1 in which a normal application is performed.

Then, after the communication condition setting processing is performed, CPU 31 (exchange data storing processing unit 203) checks exchange data saving area 80 (step S8). Specifically, the corresponding transmission BOX in exchange data saving area 80 is checked.

Then, after CPU 31 (exchange data storing processing unit 203) checked the corresponding transmission BOX in exchange data saving area 80, it determines whether or not an empty transmission BOX slot exists in the corresponding transmission BOX in exchange data saving area 80 (step S10).

When it is determined in step S10 that an empty transmission BOX slot exists in the corresponding transmission BOX in exchange data saving area 80 (YES in step S10), CPU 31 (exchange data storing processing unit 203) causes the exchange data to be stored in the empty transmission BOX slot (step S12).

On the other hand, when it is determined in step S10 that no empty transmission BOX slot exists (NO in step S10), CPU 31 (exchange data storing processing unit 203) determines whether or not data in the transmission BOX slot has been deleted (step S11). Though not shown, for example, it is possible to notify the user that no transmission BOX slot is empty and to urge the user to designate deletion of data in any transmission BOX slot. When such designation is made, the data in the transmission BOX slot is deleted.

When CPU 31 (exchange data storing processing unit 203) determines in step S11 that data in the transmission BOX slot has been deleted, the process returns again to step S10. Then, the exchange data is stored in the empty transmission BOX slot. It is noted that a sequence of the transmission BOX slots is updated as a result of deletion of data in the transmission BOX slot, so that the exchange data is stored in the last empty transmission BOX slot. As a result of this processing, the exchange data can be transmitted in the order of storage. Alternatively, the user may be allowed to change a sequence of the transmission BOX slots.

On the other hand, when CPU 31 (exchange data storing processing unit 203) determines in step S11 that data in the transmission BOX slot has not been deleted, the process returns again to step S1 and a normal application is executed. The processing up to here is the processing performed by exchange data storing processing unit 203.

Subsequent processing is processing by application execution processing unit 201.

Then, CPU 31 (application execution processing unit 201) determines whether or not an instruction to end the application has been given from the user (step S14).

When CPU 31 (application execution processing unit 201) determines in step S14 that an instruction to end the application has been given from the user, the process proceeds to next step S16. On the other hand, when it is determined in step S14 that an instruction to end the application has not been given from the user (NO in step S14), the process returns again to step S1 and a normal application is executed.

Then, in step S16, CPU 31 (application execution processing unit 201) determines whether or not the exchange data is stored in exchange data saving area 80. When it is determined that the exchange data is stored in exchange data saving area 80 (YES in step S16), CPU 31 (application execution processing unit 201) causes back-up RAM 28 to save exchange flag data indicating that the exchange data has been stored in exchange data saving area 80, together with save data (for example, data to be used in the application, such as acquired items and characters, created data including sentences, pictures, and the like) (step S18). Then, the process ends (END). When it is determined that the exchange data is not stored in exchange data saving area 80 (NO in step S16), CPU 31 (application execution processing unit 201) causes back-up RAM 28 to save only save data (step S20). Then, the process ends (END).

By saving the exchange flag data in back-up RAM 28 in this processing, in the determination processing in step S2 as described above, the exchange data adding and erasing processing can be performed if the exchange flag data is included.

In the present example, though the processing for storing the exchange data in exchange data saving area 80 when an application stored in the ROM of memory card 26 is executed has been described by way of example, the application is not particularly limited to an application stored in memory card 26. The processing for storing the exchange data when an application stored in internal application saving area 84 is executed can also be realized by using a saving area for saving the save data of the application provided for each application in internal application saving area 84, in correspondence with the back-up RAM described above. In addition, different types of system flag information are allotted to exchange data in a case where the application stored in internal application saving area 84 is executed and to exchange data in a case where an application stored, for example, in the ROM of memory card 26 other than the above, assuming that a type of the application program is different. Then, it is assumed that the algorithm identification information is included in the filtering data together with the application ID. This system flag information can be used in communication setting processing which will be described later.

In addition, in the present example, a function or the like for setting a communication condition is described as a function performed by an application stored in ROM 27 of memory card 26, however, it may be a function performed by a main body function program saved in system program saving area 86.

Moreover, in the present example, the BOX access processing and the BOX creation processing are described as functions performed by an application stored in ROM 27 of memory card 26, however, it may be a function performed by a main body function program saved in system program saving area 86.

Further, in the present example, a function or the like of adding and erasing exchange data is described as a function performed by the application stored in ROM 27 of memory card 26, however, it may be a function performed by the main body function program saved in system program saving area 86. Specifically, after the data stored in memory card 26 is loaded, whether or not exchange flag data exists in the developed data is determined, the processing for adding and erasing exchange data is performed, and thereafter the application may be executed.

Figure 13:
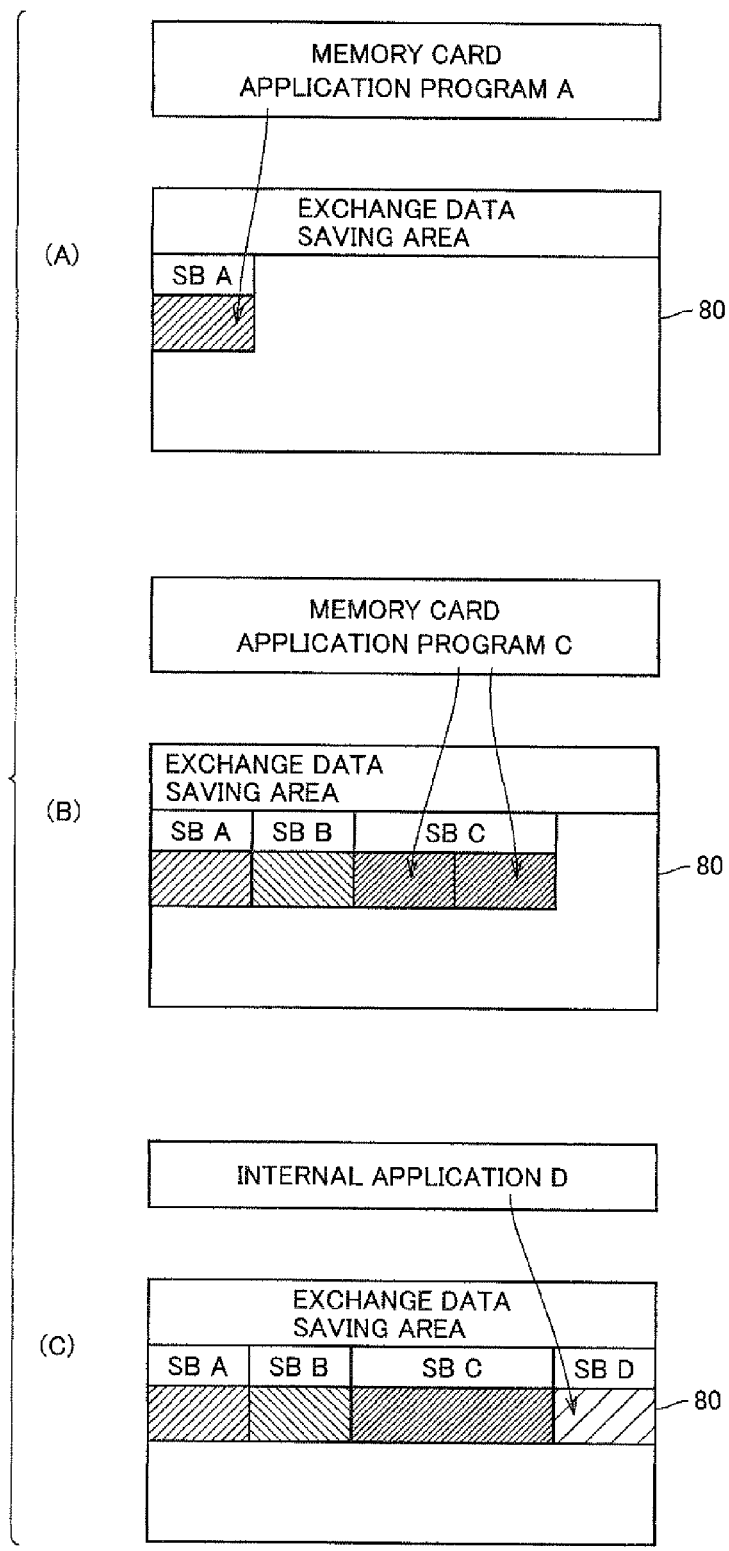
FIG. 13 illustrates an example in which exchange data is stored in the transmission BOX in exchange data saving area 80 by an application.

FIG. 13 illustrates an example in which exchange data is stored in the transmission BOX in exchange data saving area 80 by an application.

Referring to FIG. 13(A), here, for example, a case in which an application program having an application name A and stored in the memory card described above is executed so that exchange data is stored in a transmission BOX SBA in exchange data saving area 80 provided in correspondence with application program A is shown. Though the description is given here assuming that the application name is the same as the application ID for the sake of brevity of description, these are not necessarily the same in particular and may be different from each other. It is noted that the exchange data has filtering data including the application ID described above set. In the present example, it is possible to provide a plurality of determination schemes as the determination algorithms when an application ID is compared with another application ID. Though not shown here, algorithm identification information in accordance with the data format in the application ID, that is, presence/absence of exchange condition data, and system flag information identifying a type of an application can be registered together with the application ID as the information indicating the scheme of the determination algorithm.

Further, it is not necessary that one piece of exchange data is stored for one application. FIG. 13(B) shows an example in which an application program C stored in the memory card described above is executed so that two pieces of exchange data are stored in a corresponding transmission BOX SBC in exchange data saving area 80.

In addition, an application is not limited particularly to an application in the memory card, and as shown in FIG. 13(C), a case where the exchange data is stored in a corresponding transmission BOX SBD in exchange data saving area 80 as a result of execution of an internal application D stored in internal application saving area 84 of game device 1 is shown. It is noted that, since the exchange data corresponding to internal application D is stored, system flag information different from the system flag information stored in filtering data of the exchange data of application program A or the like is set as the system flag information stored in filtering data.

The exchange data stored in each slot in exchange data saving area 80 in the present example is transmitted to another game device when prescribed conditions which will be described later are satisfied.

<Communication Setting for Wireless Communication Module 38>

Figure 14:
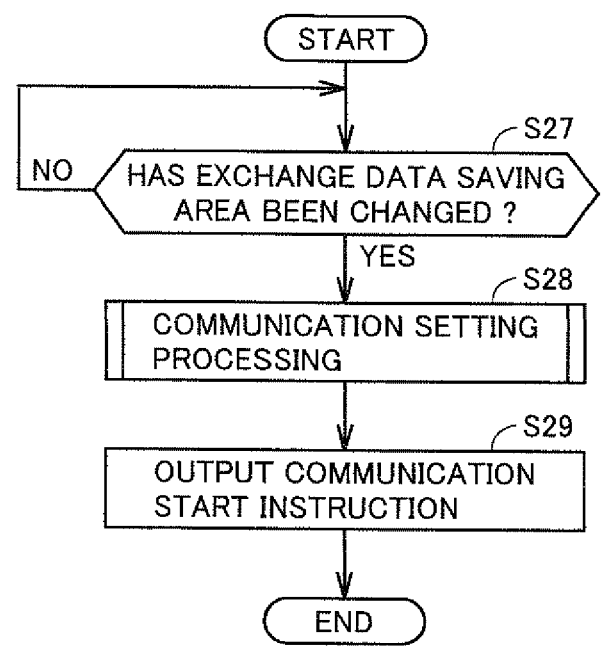
FIG. 14 is a flowchart representing processing for communication setting in wireless communication module 38.

FIG. 14 is a flowchart representing processing for communication setting in wireless communication module 38.

Referring to FIG. 14, CPU 31 (communication setting processing unit 204) determines whether or not exchange data saving area 80 has been changed (step S27). Specifically, whether at least one transmission BOX in exchange data saving area 80 has been changed or not is determined.

In the present example, a case in which an operation takes place using change in contents in at least one transmission BOX in exchange data saving area 80 as a trigger will be described by way of example. For example, it is assumed that processing in communication setting processing unit 204 is performed in response to storage of exchange data in the corresponding transmission BOX in exchange data saving area 80 as a result of execution of the application program as described with reference to FIG. 13.

In step S27, when the corresponding transmission BOX in exchange data saving area 80 has been changed (YES in step S27), the communication setting processing is performed (step S28).

Figure 15:
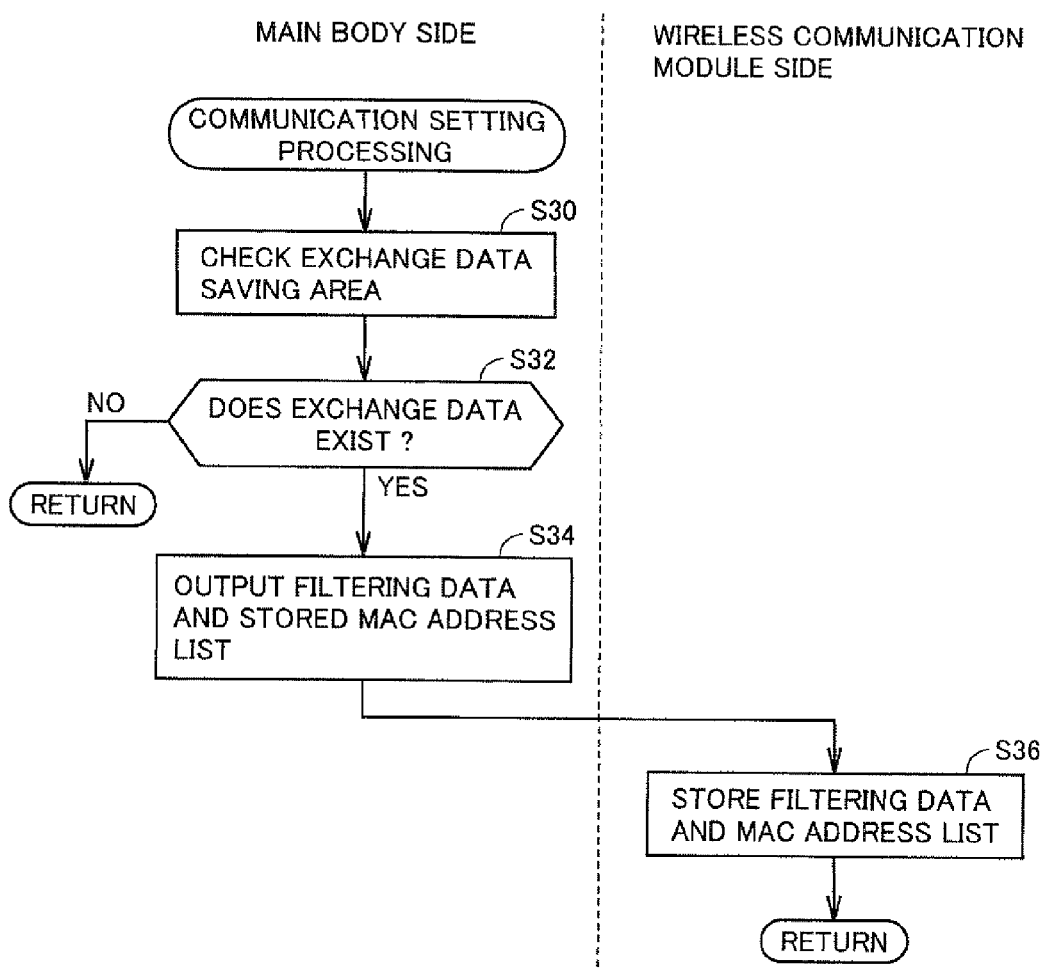
FIG. 15 is a flowchart representing processing for communication setting performed by a CPU 31 (a communication setting processing unit 204).

FIG. 15 is a flowchart representing processing for communication setting performed by CPU 31 (communication setting processing unit 204).

Referring to FIG. 15, first, CPU 31 on the main body side (communication setting processing unit 204) checks exchange data saving area 80 of saving data memory 34 (step S30). Then, CPU 31 (communication setting processing unit 204) determines whether or not exchange data exists in the transmission BOX in exchange data saving area 80 of saving data memory 34 (step S32).

When it is determined in step S32 that exchange data exists in the transmission BOX in exchange data saving area 80 (YES in step S32), CPU 31 (communication setting processing unit 204) outputs to wireless communication module 38, filtering data set as the exchange data stored in each transmission BOX and a MAC address list stored in MAC address list saving area 88, 88# (step S34).

On the side of the wireless communication module, in accordance with an instruction from CPU 31 (communication setting processing unit 204), the filtering data and the MAC address list are stored in filtering data saving area 68 and MAC address list saving area 70, 70# of RAM 66, respectively (step S36). Then, the process ends (RETURN).

In the present embodiment, the communication processing between portable terminals and the communication processing between portable and fixed terminals are performed continuously as a series of processing steps. Therefore, the MAC address list of the fixed terminal device used for the MAC address filtering processing in the communication processing between portable and fixed terminals which will be described later is also read from MAC address list saving area 88# and stored in MAC address list saving area 70#. Therefore, communication setting is made not independently but collectively for two different types of communication processing, and therefore efficient communication setting can be realized.

Further, as in the present example, MAC address list saving area 70 used for the MAC address filtering processing for the communication processing between portable terminals and MAC address list saving area 70# used for the MAC address filtering processing for the communication processing between portable and fixed terminals are provided separately, so that processing load in the MAC address filtering processing can be alleviated.

Further, the application ID serving as the filtering data is classified based on the system flag information. Furthermore, it is possible to provide a plurality of determination schemes as determination algorithms when an application ID is compared with another application ID, and the application IDs can be saved collectively in filtering data saving area 68 as a list corresponding to each determination scheme. Specifically, CPU 31 (communication setting processing unit 204) checks and classifies the system flag information brought in correspondence with the application ID included in the filtering data, further checks the algorithm identification information indicating the scheme of the determination algorithm, and instructs to save the application ID in the corresponding list provided for each piece of the system flag information and the algorithm identification information in filtering data saving area 68. When the IDs are to be saved for each list, list header information including system flag information and information indicating the scheme of the determination algorithm (algorithm identification information) is provided to each list.

This processing completes preparation for wireless communication by wireless communication module 38. Namely, CPU 60 of wireless communication module 38 is now able to generate a transmission wireless frame for the exchange partner search processing and to transmit it to another game device.

Specifically, CPU 60 is now able to transmit to another game device, the transmission wireless frame including the application ID allowing identification of the exchange data actually stored in the transmission BOX in exchange data saving area 80, that is included in the filtering data. In a case where the application IDs are saved collectively as a list corresponding to each of the system flag information and the algorithm identification information in filtering data saving area 68, the application ID can be included for each list in the transmission wireless frame. In the present example, a case in which pieces of exchange data are stored in a plurality of transmission BOXes in exchange data saving area 80 respectively is described, however, even when exchange data is stored in only one transmission BOX, the exchange data can be included in the transmission wireless frame as a list including one application ID.

Therefore, another game device that received the reception wireless frame checks the application ID included in the transmission wireless frame and compares it with the application ID brought in correspondence with the exchange data possessed by another game device. When the application IDs match with each other, it can be determined that exchange data can be exchanged and when they unmatch, that is, there is no match, exchange data cannot be exchanged.

In the above, in order to classify application IDs included in the filtering data, a scheme in which the system flag information and the algorithm identification information are used to classify the application IDs for each list so that the application IDs are included in the list has been described, however, further sophisticated classification of application IDs can be carried out by using the system flag information indicating a type of application programs described above.

Specifically, in creating a list for each piece of algorithm identification information above, the system flag information included in the filtering data of the exchange data can be checked so that application IDs of the exchange data corresponding to the application program contained in internal application saving area 84 are not included in the list for each piece of system flag information and algorithm identification information, Namely, it is possible not to create a list of application IDs in the exchange data corresponding to the application program contained in internal application saving area 84.

As a result of this processing, it is possible not to include in the transmission wireless frame, application IDs of the exchange data corresponding to the application program contained in internal application saving area 84.

The application program stored in internal application saving area 84 includes those contained in advance in all game devices. Therefore, when a transmission wireless frame including the application ID identifying the exchange data generated as a result of execution of the application program is transmitted to or received from game device 3 which is a communication partner, matching between the application IDs is basically highly likely, because game device 3 also contains the same application program. Namely, since each game device contains the same application program in internal application saving area 84, even though an application ID other than the application ID corresponding to the internal application does not match, communication with all game devices that will basically be communication partners may substantially be carried out. Therefore, by not including the application ID of the exchange data corresponding to the application program contained in internal application saving area 84 in a list for each piece of algorithm identification information, a communication partner can be restricted and the number of times of launch of the main body portion in the sleep state for performing data giving/receiving processing can be decreased and hence power consumption can be reduced.

In the case of this processing, in checking the exchange data giving/receiving application in creating the transmission slot which will be described later, an internal application in which exchange data is stored in the transmission BOX, other than the application that achieved matching based on comparison between the transmission wireless frame and the reception wireless frame, may be included in an application allowing giving/receiving of the exchange data.

Further, as the MAC address list output from CPU 31 on the main body side is stored in MAC address list saving area 70, it becomes possible to realize the MAC address filtering processing in the communication processing between portable terminals which will be described later.

When CPU 31 (communication setting processing unit 204) determines in step S32 that exchange data does not exist in a transmission BOX in exchange data saving area 80 (NO in step S32), the process ends without performing the processing above (RETURN). Here, since no exchange data exists in the transmission BOX, the processing for giving/receiving the exchange data to/from another game device in accordance with communication between portable terminals which will be described later is not performed, however, it is possible to receive distribution data in accordance with communication between portable and fixed terminals which will be described later.

Again referring to FIG. 14, CPU 31 (communication instruction processing unit 206) then outputs a communication start instruction of wireless communication to wireless communication module 38 (step S29). In response to the instruction, wireless communication by wireless communication module 38 starts. For example, when it is determined that an application using wireless communication module 38 has not been executed after the communication setting processing by communication setting processing unit 204 is performed, CPU 31 (communication instruction processing unit 206) outputs the communication start instruction of wireless communication to wireless communication module 38.

In the present example, by way of example, a case in which, in preparation for wireless communication by wireless communication module 38, depending on whether or not the contents in the transmission BOX in exchange data saving area 80 have been changed, for example, the processing by communication setting processing unit 204 is performed in response to storage of exchange data in the transmission BOX in exchange data saving area 80 by the application program as described with reference to FIG. 13 and the communication start instruction is output by communication instruction processing unit 206 has been described. The present example, however, is not particularly limited as such, and it is also possible to start the communication setting processing (step S28) when wireless communication is set to be valid at the time of power on. Alternatively, the communication setting processing (step S28) may be started in response to an operation instruction from a user, or the communication setting processing (step S28) may automatically be started every prescribed time period, or combination thereof may be applicable.

Figure 16:
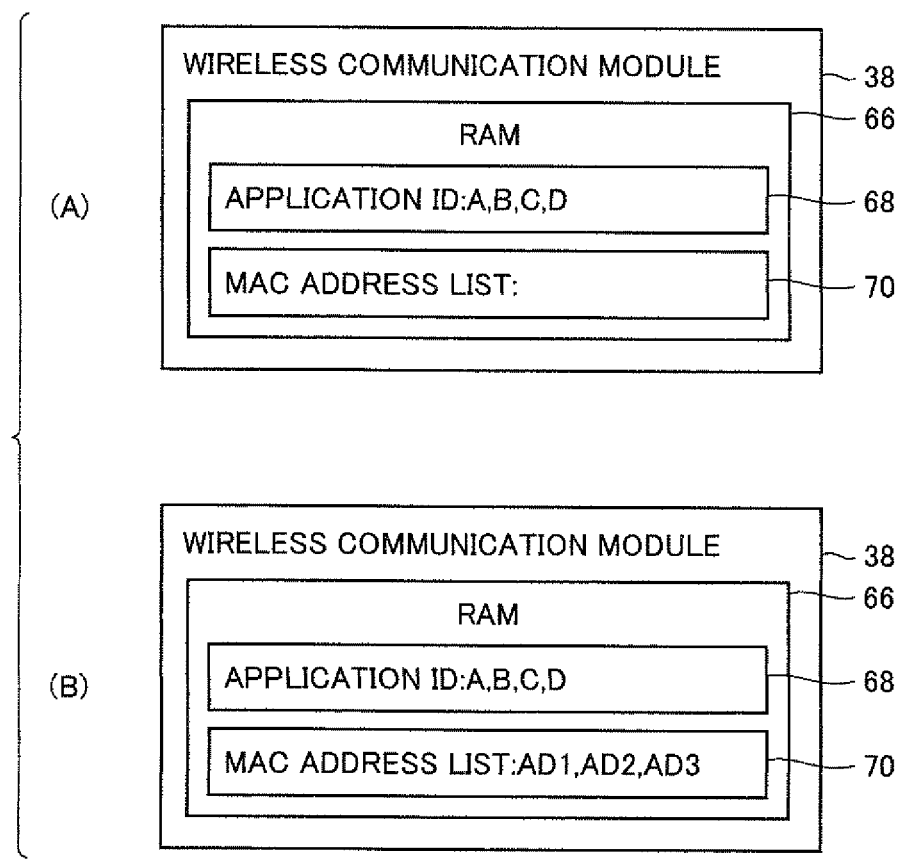
FIG. 16 illustrates a conceptual diagram of data stored in a RAM 66 in the communication setting processing.

FIG. 16 illustrates a conceptual diagram of data stored in RAM 66 in the communication setting processing.

Referring to FIG. 16(A), here, an example in which a list of application IDs "A, B C, and D" is stored in filtering data saving area 68 of RAM 66 is shown.

It is noted that, in FIG. 16(A), nothing is stored in the MAC address list. Though a case where an application ID corresponding to internal application D is also stored in filtering data saving area 68 is described here, it is also possible not to include the application ID as described above, which is also applicable below.

FIG. 16(B) shows an example in which a list of application IDs described with reference to FIG. 16(A) is stored in filtering data saving area 68 and MAC addresses AD1, AD2 and AD3 as a list of MAC addresses are stored in MAC address list saving area 70. The data of the MAC address list is used for MAC address filtering processing based on comparison of MAC addresses in communication between portable terminals as will be described later.

<Overall Flow of Wireless Communication by Wireless Communication Module 38>

Figure 17:
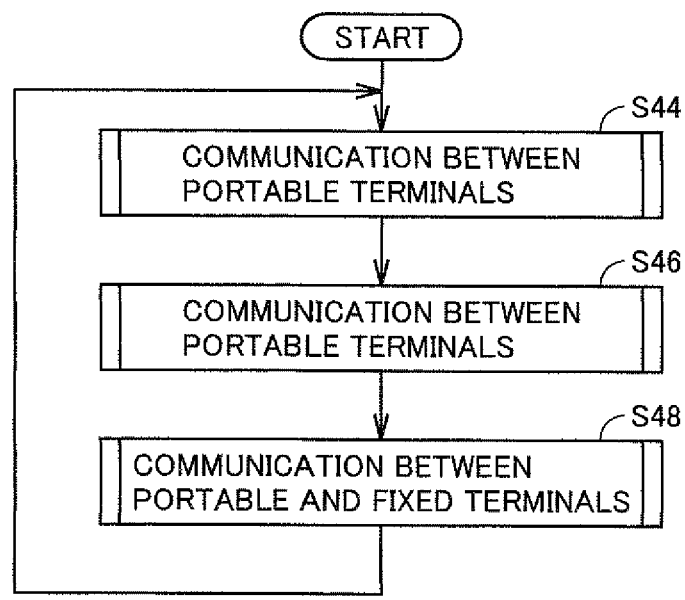
FIG. 17 is a flowchart representing wireless communication carried out by wireless communication module 38 according to an embodiment of the present invention.

FIG. 17 is a flowchart representing wireless communication carried out by wireless communication module 38 according to an embodiment of the present invention.

Referring to FIG. 17, in accordance with the communication start instruction from CPU 31, CPU 60 of wireless communication module 38 performs the following processing. Specifically, CPU 60 causes communication between portable terminals for a prescribed time period (step S44). Thereafter, CPU 60 causes communication between portable terminals again for a prescribed time period (step S46). Then, CPU 60 causes communication between portable and fixed terminals for a prescribed time period (step S48). Then, the process returns again to step S44 and CPU 60 again causes communication between portable terminals.

A length of the prescribed time period during which communication between portable terminals is carried out may or may not be the same as a length of the prescribed time period during which communication between the portable and fixed terminals is carried out.

In the present example, though a case in which communication between portable terminals is carried out and thereafter communication between portable and fixed terminals is carried out is described by way of example, the order is not particularly limited as such and communication between portable and fixed terminals may be carried out first.

In addition, a case in which communication between portable terminals is carried out twice and thereafter communication between portable and fixed terminals is carried out once is described in the present embodiment, however, the present embodiment is not limited as such and the number of times may freely be set.

Communication between portable terminals (FIG. 18) and communication between portable and fixed terminals (FIG. 86) are realized by CPU 60 of wireless communication module 38 executing the application for carrying out communication between portable terminals and the application for carrying out communication between portable and fixed terminals stored in ROM 72, by way of example. Therefore, regardless of whether or not the application is executed by CPU 31 on the main body side, for example, even when the application is not executed or the power save state such as the sleep state is set, wireless communication module 38 continues to carry out communication between portable terminals and communication between portable and fixed terminals above.

When an application using wireless communication module 38 is to be executed, CPU 31 on the main body side can also instruct wireless communication module 38 to stop wireless communication so as to end wireless communication and to carry out different communication based on the application.

When different communication ends, CPU 31 outputs, after the communication setting processing by communication setting processing unit 204 described above, the communication start instruction from communication instruction processing unit 206. Thus, wireless communication including communication between portable terminals and communication between portable and fixed terminals can be resumed.

<Communication Between Portable Terminals by Wireless Communication Module 38>

Figure 18:
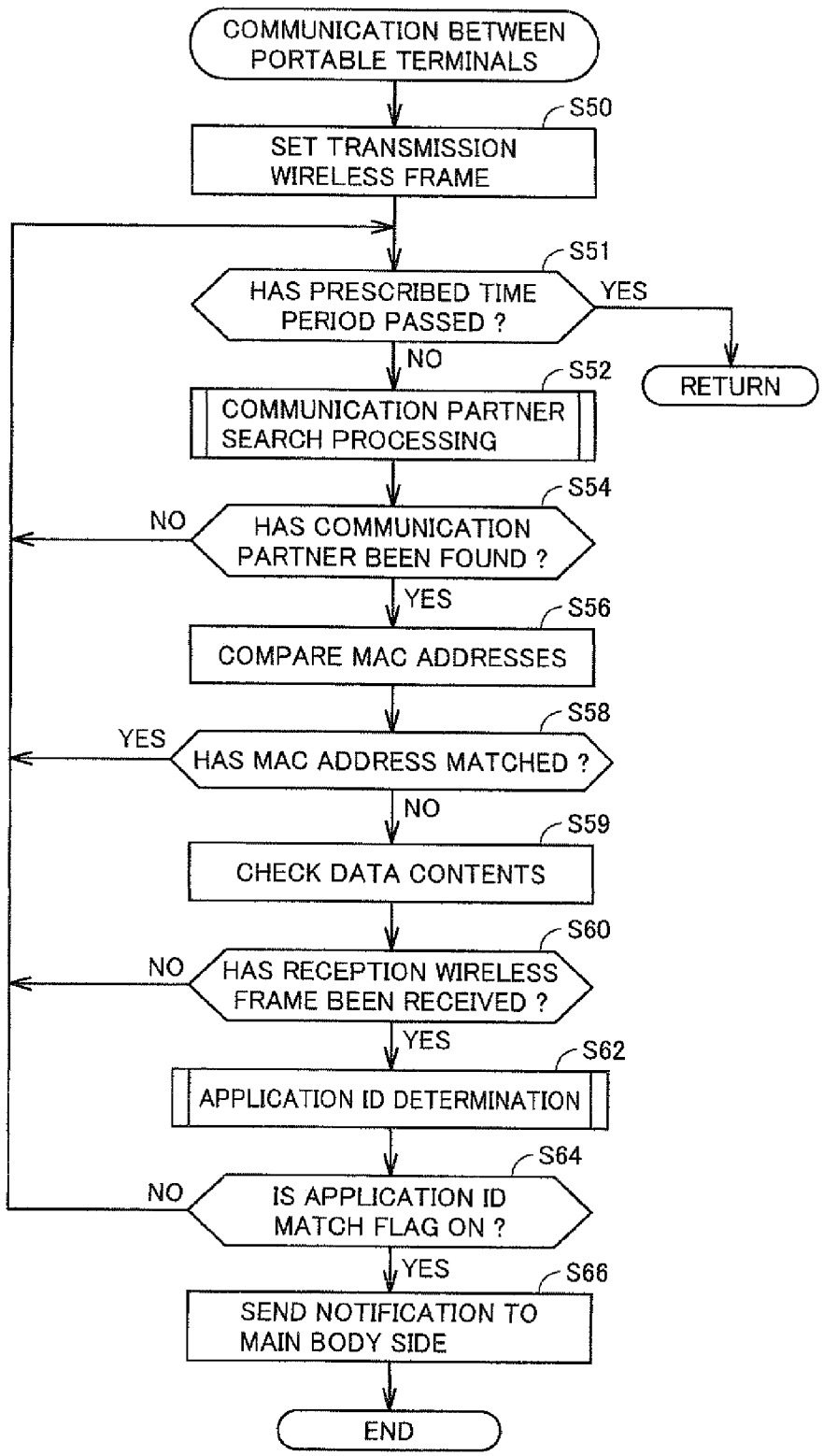
FIG. 18 is a flowchart representing communication between portable terminals according to an embodiment of the present invention.

FIG. 18 is a flowchart representing communication between portable terminals according to an embodiment of the present invention. This processing is the exchange partner search processing in which wireless communication module 38 searches for a communication partner for exchanging the exchange data, and by way of example, this processing is realized by CPU 60 executing the application for performing the processing between portable terminals that is stored in ROM 72.

Referring to FIG. 18, first, CPU 60 (wireless frame setting unit 222) sets a transmission wireless frame (step S50).

Specifically, CPU 60 (wireless frame setting unit 222) sets a transmission wireless frame based on the application ID stored in filtering data saving area 68 stored in RAM 66 as the transmission data to be transmitted to game device 3.

When the application IDs are saved collectively as a list corresponding to each determination scheme in filtering data saving area 68, the application IDs are included for each list in the transmission wireless frame. In that case, a transmission wireless frame including, together with the list, list header information including algorithm identification information indicating the scheme of the determination algorithm provided for identifying a list and system flag information is set. The set transmission wireless frame is saved in transmission wireless frame saving area 67 of RAM 66, as transmission data to externally be output through RF-IC 62. Further, the set transmission wireless frame is used in the application ID determination processing which will be described later.

Figure 19:
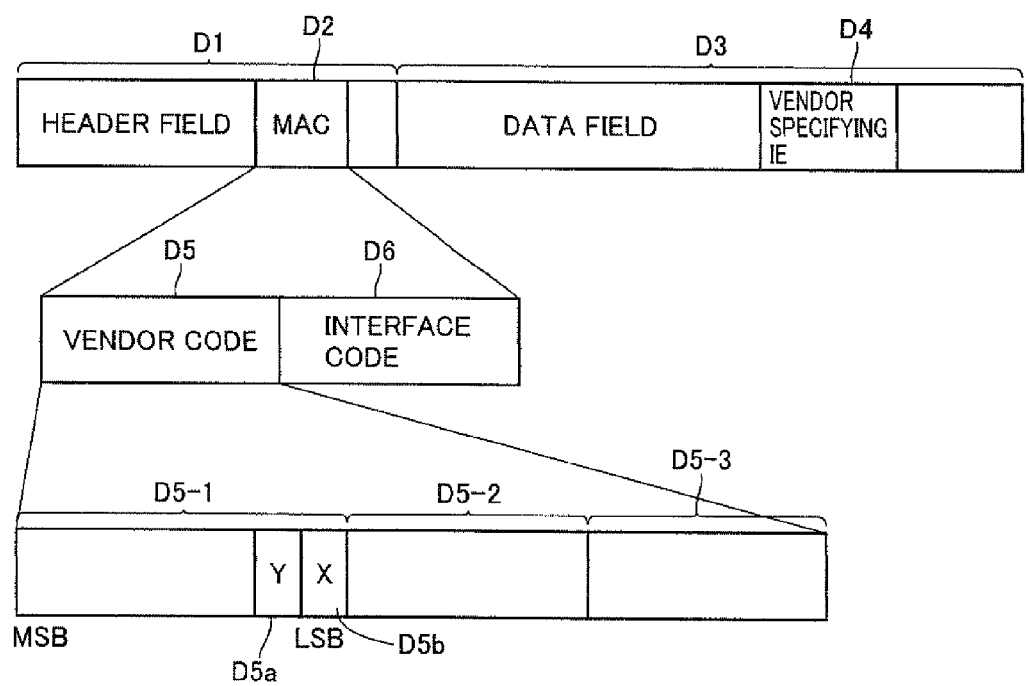
FIG. 19 shows a configuration of a transmission wireless frame transmitted by the game device in communication between portable terminals according to an embodiment of the present invention.

FIG. 19 shows a configuration of a transmission wireless frame transmitted by a game device in communication between portable terminals according to an embodiment of the present invention. A reception wireless frame that is received has the same configuration.

Referring to FIG. 19, the transmission wireless frame includes a header field D1 and a data field D3.

Header field D1 includes a MAC portion D2 or the like defining a MAC address, a frame length, and data for causing an interface (wireless communication module) receiving the transmission wireless frame as the reception wireless frame to recognize start of the reception wireless frame and for setting timing to establish synchronization.

Data field D3 includes a plurality of pieces of IE (Information Element) data. For example, IE data relating to an identification code used for wireless communication, an SSID (Service Set Identifier), and data of a wireless channel (frequency) set to prevent radio wave interference are stored.

In the present example, a case where data field D3 includes vendor specifying IE data D4 as the IE data for communication between portable terminals is shown. The vendor specifying IE data corresponds to communication determination conditions relating to whether or not exchange data communication processing is to be performed in communication between portable terminals in the present example.

The configuration of MAC portion D2 defining the MAC address will be described here.

MAC portion D2 includes a vendor code D5 allocated to each vendor of a network device and an interface code D6 allocated by each vendor differently for each interface.

Vendor code D5 and interface code D6 are each formed of 3 octets (1 octet=8 bits), and a least significant bit $D5b$ of a first octet $D5$-$1$ of vendor code D5 is denoted as X and a second least significant bit $D5a$ is denoted as Y, to thereby define a MAC address type.

Specifically, bit X is used as a bit to determine whether the address is a multicast address indicating a plurality of grouped destinations or a unicast address indicating only one destination. In the present example, it is assumed that the case where bit X=1 indicates the multicast address and the case where bit X=0 indicates the unicast address.

In the case of the unicast address, bit Y is used as a bit for determining whether the address is a global address or a local address. In the present example, it is assumed that the case where bit Y=0 with bit X=0 indicates the global address and the case where bit Y=1 indicates the local address.

In the present example, it is assumed that, as the MAC address type for communication between portable terminals included in the IE data, setting as bit X=0 and Y=1 is made. Namely, a local address is set in vendor code D5.

As will be described later, the local address can be changed.

Figure 20:
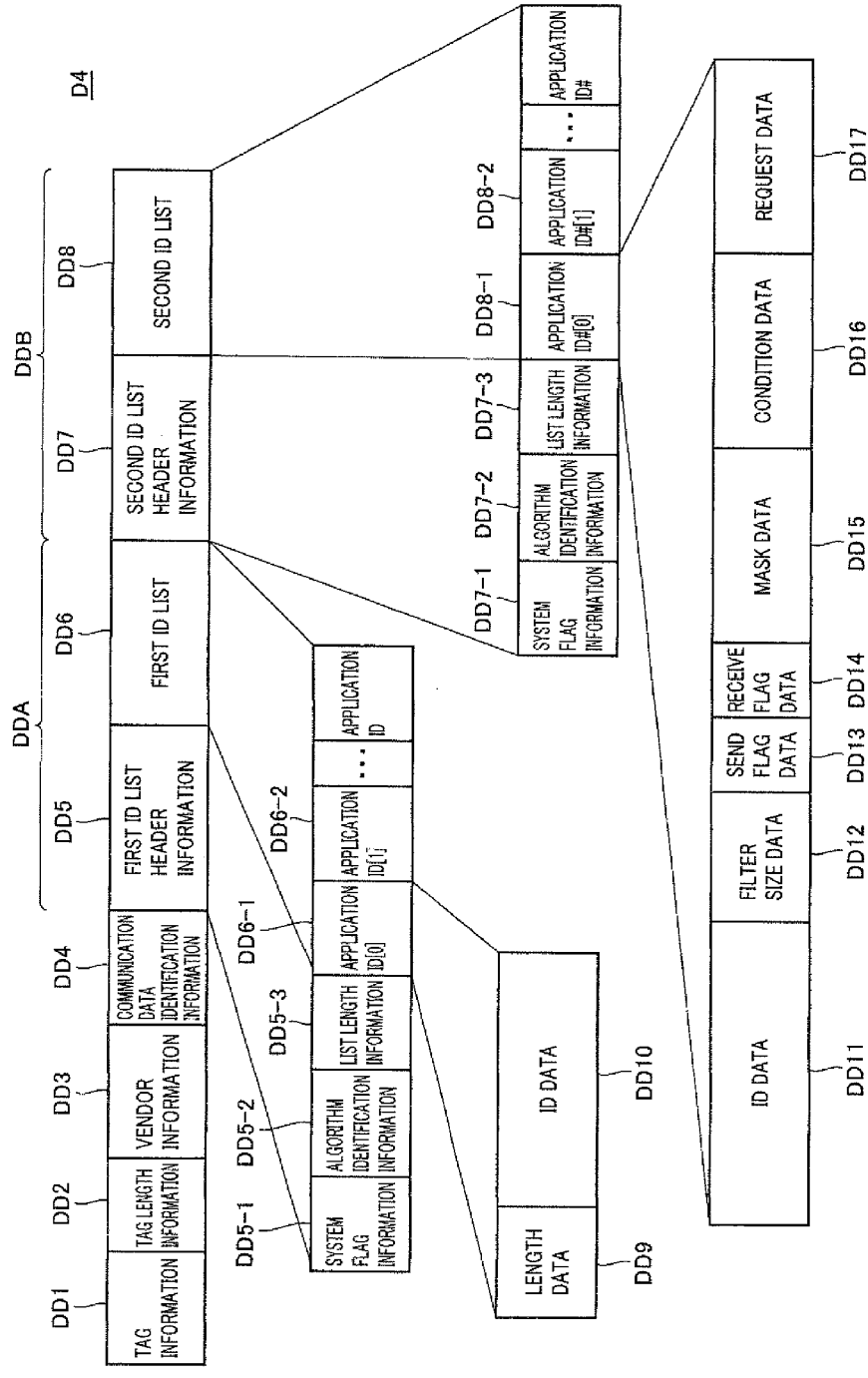
FIG. 20 shows a configuration of vendor specifying IE data D4.

FIG. 20 shows a configuration of vendor specifying IE data D4.

Referring to FIG. 20, the vendor specifying IF data includes tag information DD1, tag length information DD2, vendor information DD3, communication data identification information DD4, a first ID group DDA, and a second ID group DDB.

Tag information DD1 is identification data identifying each of a plurality of pieces of IE data. Tag length information DD2 includes data indicating a data length of vendor specifying IE data D4.

Vendor information DD3 is data for identifying a company or the like that provides the data.

Communication data identification information DD4 is data indicating a type of communication data, and in communication between portable terminals, information indicating communication data for communication between portable terminals is stored therein. It is noted that, in communication between portable and fixed terminals, the distribution wireless frame transmitted from fixed terminal device 5 stores different information indicating communication data for communication between portable and fixed terminals. By checking the information, determination is made as to whether the data is communication data for communication between portable terminals, that is, whether the reception wireless frame is a wireless frame that can be processed in the processing between portable terminals. Alternatively, determination is made as to whether the received distribution wireless frame is a wireless frame that can be processed in the processing between portable and fixed terminals.

In the present example, by way of example, a case in which the application IDs are saved collectively as a list in filtering data saving area 68 will be described.

Therefore, a format is such that lists of application IDs and the list header information provided for identifying the lists are provided. The list header information includes system flag information and algorithm identification information.

Such a format enables sharing among a plurality of application IDs, of the system flag information and the algorithm identification information identifying the algorithm for comparison and thus reduction in a data amount. Further, since the format is such that a list of application IDs is provided for each of the system flag information and the algorithm for comparison, retrieval in comparison is facilitated and a high speed comparison operation becomes possible. It is noted that the algorithm for comparison will be described later.

In the present example, by way of example, a case in which first ID group DDA and second ID group DDB are provided in accordance with two different pieces of algorithm identification information defining algorithms for comparison is shown. Here, by way of example, it is assumed that first ID group DDA and second ID group DDB are identical to each other in system flag information. In addition, by way of example, it is assumed that the system flag information indicates an application other than the application contained in internal application saving area 84.

First ID group DDA includes first ID list header information DD5 and a first ID list DD6.

First ID list DD6 includes a plurality of application IDs. In the present example, by way of example, a case where an application ID[0] DD6-1, an application ID[1] DD6-2, . . . are included is shown.

Each application ID includes length data DD9 and ID data DD10. Length data DD9 is data for indicating a length used for comparing ID data DD10. ID data DD10 is identification data indicating an application name provided in advance for each application. The application ID is set when an exchange data registration event occurs or an exchange data designation input is provided while an application is executed by CPU 31 as described above, in association with the exchange data. For example, in this case, it is assumed by way of example that exchange condition data and the like are not set.

First ID list header information DD5 is provided as the header information of the list of a plurality of application IDs in first ID list DD6.

Specifically, first ID list header information DD5 includes system flag information DD5-1 defining a type of an application corresponding to the exchange data, algorithm identification information DD5-2 defining the algorithm for comparison, and list length information DD5-3 defining a length or the number of application IDs provided as the list.

Second ID group DDB includes second ID list header information DD7 and a second ID list DD8.

Second ID list header information DD7 includes system flag information DD7-1, algorithm identification information DD7-2, and list length information DD7-3.

Second ID list header information DD7 includes system flag information DD7-1 defining the list of application IDs for the exchange data, algorithm identification information DD7-2 defining the algorithm for comparison, and list length information DD7-3 defining a length or the number of application ID#s provided as a list.

Second ID list DD8 includes a plurality of application ID#s. In the present example, by way of example, a case where an application ID#[0] DD8-1, an application ID#[1] DD8-2, . . . are included is shown.

Each application ID# includes ID data DD11, filter size data DD12, send flag data DD13, receive flag data DD14, mask data DD15, condition data DD16, and a request DD17.

In the present example, application ID# has the transmission/reception condition data and the obtaining condition data described above stored as the exchange condition data. Specifically, the send flag data and the receive flag data are data representing transmission/reception condition data. Further, the mask data, the condition data and request data are data representing the obtaining condition data. The application ID# is set when an exchange data registration event occurs or an exchange data designation input is provided while an application is executed by CPU 31 as described above, in association with the exchange data. In this case, by way of example, it is assumed that the exchange condition data including transmission/reception condition data, the obtaining condition data and the like are set in the exchange data registration event.

ID data DD11 is identification data representing an application name provided in advance for each application.

Filter size data DD12 is data defining a data length of mask data DD15, condition data DD16 and request data DD17. Therefore, the range of mask data DD15, condition data DD16 and request data DD17 is defined in accordance with a value of filter size data DD12.

Send flag data DD13 and receive flag data DD14 define transmission/reception condition data of the exchange data corresponding to ID data D11 included in application ID#. By way of example, these are data for defining communication conditions, for example, whether only transmission communication is possible, only reception communication is possible, only bidirectional communication is possible, or communication is possible under any condition.

Mask data DD15, condition data DD16 and request data DD17 are data defining the obtaining condition data for the exchange data.

Condition data DD16 is attribute data associated with the exchange data of the own device to be transmitted to a partner, such as data held in the own device or data indicating an attribute of the own device, when the exchange data is to be exchanged. Condition data DD16 is used to determine whether or not the exchange data to be transmitted from the own device satisfies the conditions requested by the partner.

Request data DD17 is attribute data associated with the exchange data requested of the partner from which the exchange data is received, when the exchange data is to be exchanged. Request data DD17 is used to determine whether or not the exchange data to be received from the partner satisfies the conditions requested by the own device.

Mask data DD15 is data setting a valid/invalid area of request data DD17. Namely, mask data 0015 defining request data DD17 as invalid means that the own device does not request any condition in exchanging the exchange data, or in other words, the conditions requested by the own device are always satisfied.

Since the list of application Ms is included as data in the transmission wireless frame, on a reception side that receives the transmission wireless frame as a reception wireless frame, for example, it is possible to determine, based on the list of application IDs, whether or not the exchange data of the same application is included. What is necessary is simply to determine whether conditions match when compared. Therefore, for example, it may be sufficient to transmit a hash value based on a hash function and to compare data on the reception side, rather than to transmit the application ID itself. The same applies also to handling of other pieces of information.

The transmission wireless frame is transmitted to an unspecified partner (game device) and it is received as a reception wireless frame by an unspecified partner (game device). As will be described later, the game device as a client repeatedly carries out transmission without specifying a destination. The game device (base side) that received the transmission wireless frame as the reception wireless frame transmits a transmission wireless frame based on the data held in itself to a game device (client side) that sent the transmission wireless frame, and as the data is given/received, unspecified game devices perform the communication processing.

Though a transmission wireless frame including a plurality of pieces of IE (Information Element) data has been described by way of example in the present example, the frame is not particularly limited to the above and the transmission wireless frame may include only the vendor specifying IE data.

Figure 21:
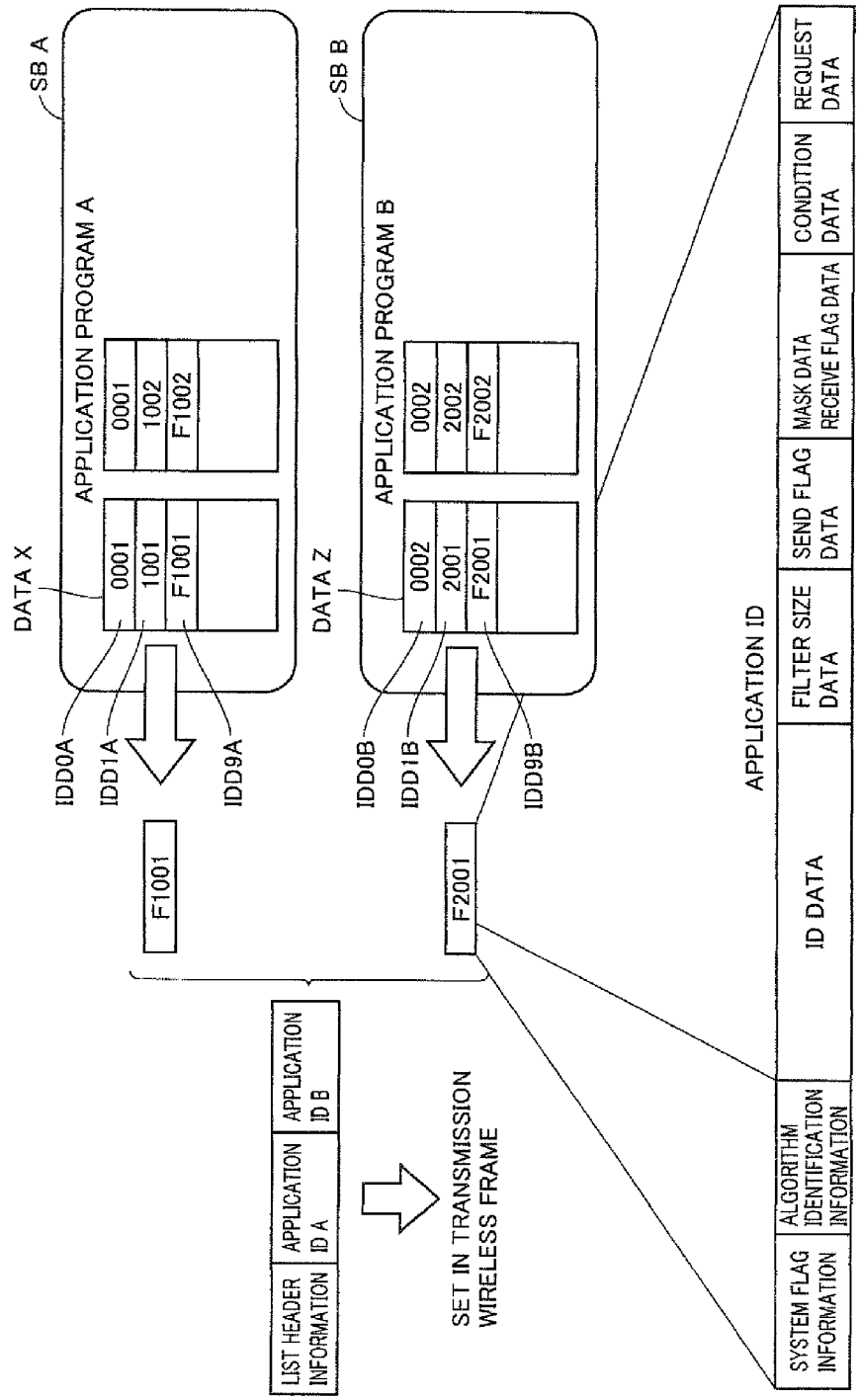
FIG. 21 is a conceptual diagram illustrating a state of an application ID saved in a filtering data saving area 68.

FIG. 21 is a conceptual diagram illustrating a state of an application ID saved in filtering data saving area 68.

Referring to FIG. 21, here, a case where transmission BOX SBA corresponding to application program A and a transmission BOX SBB corresponding to an application program B are provided is shown. A case where each transmission BOX stores data to serve as a plurality of pieces of exchange data is shown. As will be described later, by way of example, it is assumed that data is basically transmitted successively piece by piece from data at the left end in each transmission BOX. In the present example, data X at the left end in transmission BOX SBA and data Z at the left end in transmission BOX SBB are shown.

Data X includes ID data IDD0A ("0001"), a data group ID IDD1A ("1001"), and filtering data IDD9A ("F1001"), Data Z includes ID data IDD0B ("0002"), a data group ID IDD1B ("2001"), and filtering data IDD9B ("F2001").

As described above, when data in each transmission BOX in exchange data saving area 80 is checked and it is determined that exchange data exists, filtering data of the data stored in each transmission BOX is obtained and stored in filtering data saving area 68. In the present example, filtering data IDD9A ("F1001") of data X at the left end in transmission BOX SBA is obtained and stored in filtering data saving area 68. Similarly, filtering data IDD9B ("F2001") of data Z at the left end in transmission BOX SBB is obtained and stored in filtering data saving area 68 in a list format.

In storage in filtering data saving area 68, application IDs are saved as classified in a list format, based on system flag information and algorithm identification information.

The filtering data is constituted of the system flag information, the algorithm identification information, and the application IDs as described above. Then, the application IDs of the filtering data are classified based on the system flag information and the algorithm identification information. Here, a state where an application ID A of data X and an application ID B of data Z are grouped in a list format as belonging to the same category is shown. The list header information includes the system flag information, the algorithm identification information, and the list length information. Then, the application IDs of the filtering data saved in that format is set in the transmission wireless frame.

In the present example, by way of example, though a case in which the transmission wireless frame is set such that, when the application IDs are saved collectively as a list in accordance with the system flag information and the algorithm identification information in filtering data saving area 68, the application IDs are included for each list in the transmission wireless frame and list header information including together with the list, also the system flag information and the algorithm identification information provided for identifying the list is set has been described, the transmission wireless frame as described above can be set even when the application IDs are not saved for each list in filtering data saving area 68.

For instance, when a transmission wireless frame is to be set, wireless frame setting unit 222 can also set the transmission wireless frame by creating a list for each piece of the system flag information and the algorithm identification information and list header information for identifying the list, based on the application IDs included in the filtering data saved in filtering data saving area 68 and the system flag information and the algorithm identification information corresponding to the application IDs.

Again referring to FIG. 18, after the transmission wireless frame is set, CPU 60 (communication partner search unit 224) then determines whether or not a prescribed time period has passed (step S51). When it is determined in step S51 that the prescribed time period has not passed (NO in step S51), CPU 60 performs the communication partner search processing for searching for a communication partner (another game device) (step S52). The communication partner search processing will be described later.

Then, CPU 60 (communication partner search unit 224) determines whether or not a communication partner has been found in the communication partner search processing (step S54).

When a communication partner has not been found in step S54 (NO in step S54), the process returns to step S51.

When a communication partner has been found in step S54 (YES in step S54), CPU 60 (device identification information comparison unit 226) compares the MAC addresses (step S56). Specifically, the MAC address included in the reception wireless frame is compared with the MAC address stored in MAC address list saving area 70 described above. The MAC address is identification information for identifying the object of communication as described above, and each game device has its own specific MAC address allocated. MAC address list saving area 70 has MAC addresses allocated to respective game devices saved therein.

Then, CPU 60 (device identification information comparison unit 226) determines whether or not the MAC address of another game device included in the reception wireless frame matches with a MAC address stored in the MAC address list (step S58).

Then, when it is determined in step S58 that the MAC addresses match with each other (YES in step S58), the process again returns to step S51. Namely, communication with another game device corresponding to the MAC address is terminated without performing subsequent processing. Therefore, each time data as the communication object is received from another game device within communication range 10, determination as to whether matching with a MAC address which is the identification information is achieved or not is repeated.

Figure 22:
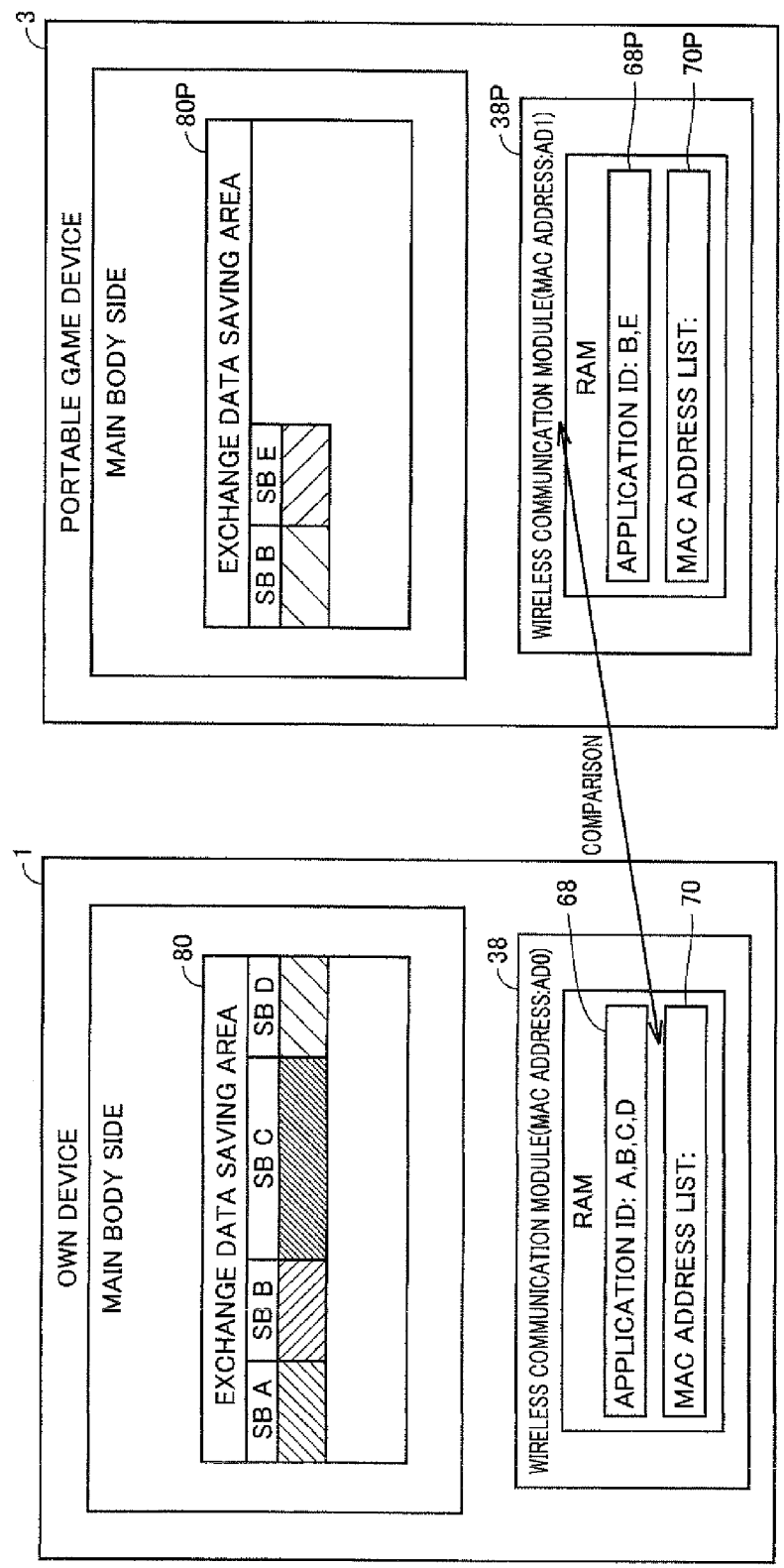
FIG. 22 is a conceptual diagram of MAC address comparison according to an embodiment of the present invention.

FIG. 22 shows a concept of MAC address comparison according to an embodiment of the present invention.

In the present example, communication connection between game device 1 and game device 3 as another game device and a communication partner will be described.

Referring to FIG. 22, here, a case where respective pieces of exchange data are stored in transmission. BOXes SBA to SBD in exchange data saving area 80 on the side of game device 1 is shown.

As described with reference to FIG. 16(A), a case where application IDs "A, B, C, and D" are stored in filtering data saving area 68 of RAM 66 of wireless communication module 38 is shown.

It is noted that nothing is stored in the MAC address list.

Then, the side of game device 3 will be described. Here, corresponding similar components of game device 3 are denoted by the same reference characters with additional letter "P". Specifically, exchange data saving area 80 of game device 1 corresponds to an exchange data saving area 80P of game device 3.

Further, wireless communication module 38 of game device 1 corresponds to a wireless communication module 38P of game device 3, which is also applicable to other components.

Here, an example in which respective pieces of exchange data are stored in transmission BOXes SBB and SBE in exchange data saving area 80P of game device 3 is shown.

In accordance with the same scheme, on the side of game device 3 as well, a case where application IDs "B, E" are stored in a filtering data saving area 68P of wireless communication module 38P is shown.

It is noted that nothing is stored in the MAC address list. Here, it is assumed that the MAC address of the own device, that is, game device 1, is set to AD0.

Further, it is assumed that the MAC address of game device 3 is set to AD1.

For example, when a reception wireless frame is received from game device 3, MAC address AD1 of game device 3 is not registered in the MAC address list of game device 1 and therefore it is determined that MAC addresses do not match. Therefore, the process proceeds to next processing.

In the present example, a case where determination as to registration in the MAC address list is made in game device 1 is described, however, the similar processing is also performed on the side of game device 3.

Figure 23:
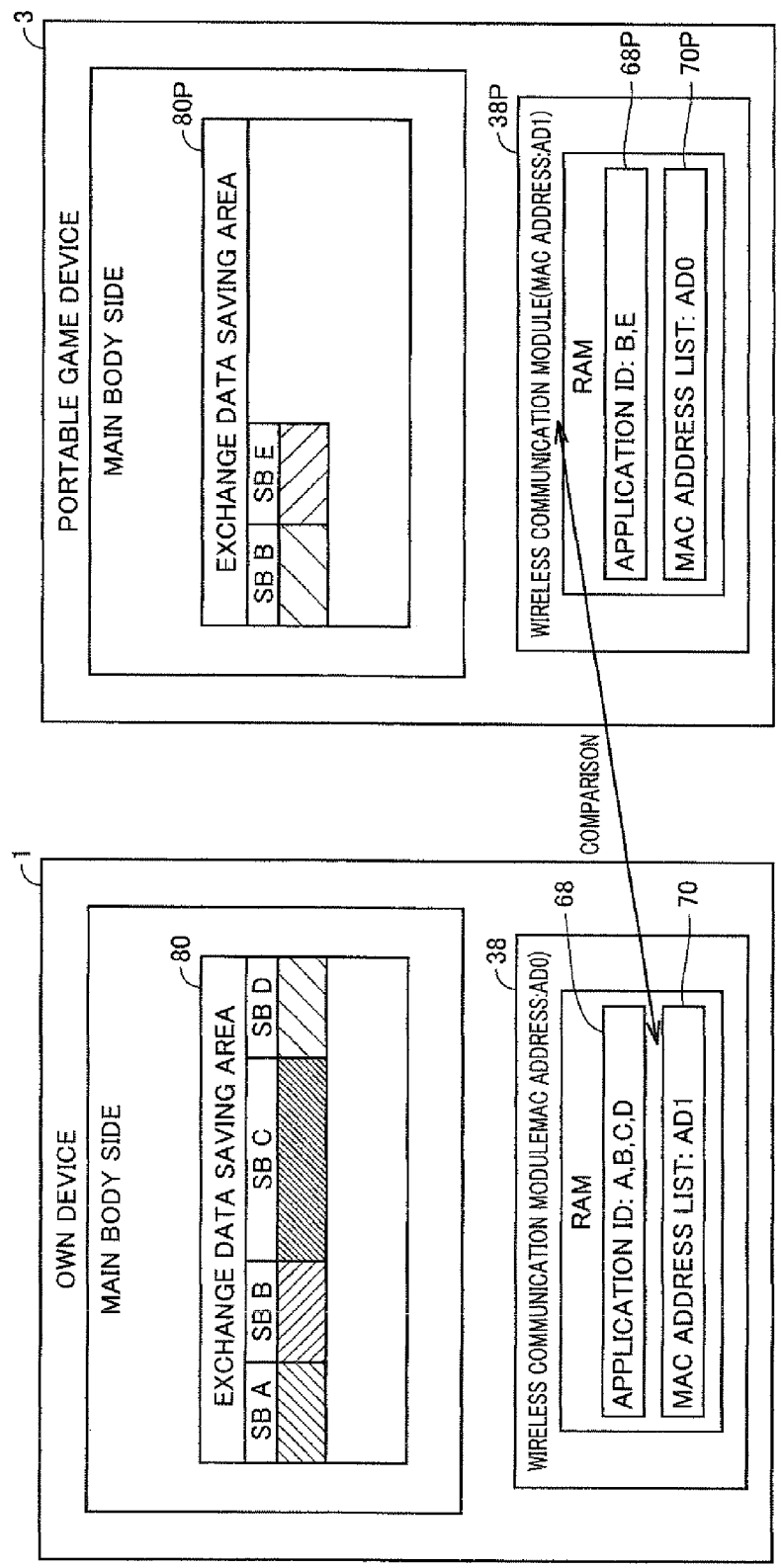
FIG. 23 is another conceptual diagram of MAC address comparison according to an embodiment of the present invention.

FIG. 23 shows another concept of MAC address comparison according to an embodiment of the present invention.

Referring to FIG. 23, as compared with the configuration in FIG. 22, contents registered in the MAC address list are different. Specifically, an example in which MAC address AD1 is registered in MAC address list saving area 70 of wireless communication module 38 is shown.

In addition, similarly, a case where MAC address AD0 is registered in a MAC address list saving area 70P on the side of game device 3 is shown.

For example, when a reception wireless frame is received from game device 3, it is determined that MAC addresses match because MAC address AD1 of game device 3 is registered in the MAC address list of game device 1.

Therefore, in this case, subsequent communication processing with game device 3 as another game device corresponding to the MAC address is not performed (MAC address filtering processing). Namely, substantial communication with a game device registered in the MAC address list, with which communication processing was performed previously, is not carried out. It is noted that similar processing is performed also on the side of game device 3.

As described above, the MAC address list stored in MAC address list saving area 70 can also be erased, for example, in accordance with a prescribed operation instruction. Once the list is erased, it becomes possible to again carry out data communication also with a device with which communication processing was performed previously. Namely, a situation also of the device to/from which exchange data was given/received previously may have been changed (for example, new exchange data may have been set) and giving/receiving of exchange data may be possible. Therefore, whether or not exchange of exchange data is possible is again determined, and if possible, exchange data may be given/received.

For example, when exchange data is stored in the empty BOX slot in step S12 in FIG. 9, the address list or lists stored in MAC address list saving areas 88 and 70 may be erased.

Again referring to FIG. 18, when it is determined in step S58 that the MAC addresses do not match (NO in step S58), CPU 60 (communication data determination unit 228) checks the contents in reception data (step S59).

Then, CPU 60 (communication data determination unit 228) determines whether or not the reception wireless frame as the reception data is a wireless frame that can be processed in the processing between portable terminals (step S60).

Specifically, determination is made as to whether or not the vendor information for identifying the company or the like that provides the data described with reference to FIG. 19 matches with the vendor information held in advance in game device 1. The case where the vendor information matches means that sources of transmitted data are devices of the same type allowing mutual communication connection, and the case where the vendor information does not match means that sources of transmitted data are devices completely different in type, between which communication connection is impossible.

Further, determination is made as to whether the communication data identification information matches with the communication data identification information held in advance in game device 1. The case where the communication data identification information matches means that it is the communication data for communication between portable terminals, that is, the wireless frame can be processed in the processing between portable terminals. It is assumed that the vendor information as the object of comparison on the side of game device 1 is registered in advance in ROM 72. Further, it is assumed that the communication data identification information as the object of comparison on the side of game device 1 is also registered in advance in ROM 72.

Meanwhile, the communication data identification information in communication between portable terminals is different from the communication data identification information included in a distribution wireless frame output from fixed terminal device 5 in communication between portable and fixed terminals, which will be described later. Therefore, even though a beacon (distribution wireless frame) output from fixed terminal device 5 happens to be received in communication between portable terminals, data communication does not take place because the communication data identification information is different, and thus what is possible is only communication between the game devices of the same type.

CPU 60 (communication data determination unit 228) switches the communication data identification information to be compared, depending on whether communication is communication between portable terminals or between portable and fixed terminals, and determines whether or not the communication data identification information matches with the communication data identification information included in the reception data (reception wireless frame).

Namely, when it is determined in step S60 that a reception wireless frame has not been received (NO in step S60), the process again returns to step S51. Therefore, when data is received from a device with which communication connection is impossible or data that is not an object of communication is received, subsequent processing is not performed and communication is terminated. In the present example, though a case in which determination is made as to whether the vendor information and the communication data identification information both match or not has been described, only determination as to whether the communication data identification information matches or not may be made.

Then, when it is determined that the reception wireless frame has been received (YES in step S60), CPU 60 (application ID determination unit 230) then performs the application ID determination processing (step S62).

The application ID determination processing will be described later.

Then, CPU 60 (application ID determination unit 230) determines whether or not an application ID match flag is ON based on the result of the determination processing (step S64). Specifically, looking up the list of application IDs included in the received reception wireless frame and the list of application IDs included in the transmission wireless frame held in the own device, determination is made as to whether at least one application ID is determined as matching. Namely, what is determined here is whether or not the transmitting side and the receiving side have exchange data exchangeable through communication connection with each other. When both sides have the same application ID, the data can mutually be used by executing the same application after data exchange. Even though the application ID is not the same, determination as YES may be made in step S64 when there is a data-compatible application and the application ID satisfies such relation.

When it is determined that the application ID match flag is ON (YES in step S64), CPU 60 (application ID determination unit 230) notifies the main body side that another game device having the exchange data corresponding to the matching application ID has been found, that is, the communication partner is an exchange partner to exchange the exchange data (step S66). Then, the process ends (END).

Subsequent processing for giving/receiving data in which connection with another game device as the communication partner is established and exchange data corresponding to the matching application ID is given/received to/from another game device is performed as an application of CPU 31 on the main body side using wireless communication module 38.

Therefore, by notifying the main body side that another game device having the exchange data has been found, wireless communication carried out independently by CPU 60 alone of wireless communication module 38, that is, the exchange partner search processing for searching for a communication partner to exchange the exchange data performed by wireless communication module 38, ends.

On the other hand, when the application ID match flag is not ON (match flag OFF) in step S64 (NO in step S64), the process returns to step S51.

With this processing, in the present example, only when a communication partner with which exchange can be carried out is found through the exchange partner search processing by wireless communication module 38, a notification is issued to CPU 31 on the main body side, connection with the communication partner is established, and giving/receiving of exchange data is carried out. Therefore, for example, even in a case where a communication partner is found in the exchange partner search processing by wireless communication module 38 while CPU 31 on the main body side is in a power save state such as a sleep state, a notification is not issued to CPU 31 on the main body side and communication connection is not established unless exchange is allowed. Therefore, power consumption of game device 1 as a whole can be reduced.

<Application ID Determination Processing>

In the present embodiment, the application ID determination processing of the transmission wireless frame shown in FIG. 20, having the application IDs organized in a list corresponding to each determination scheme, will be described.

Figure 24:
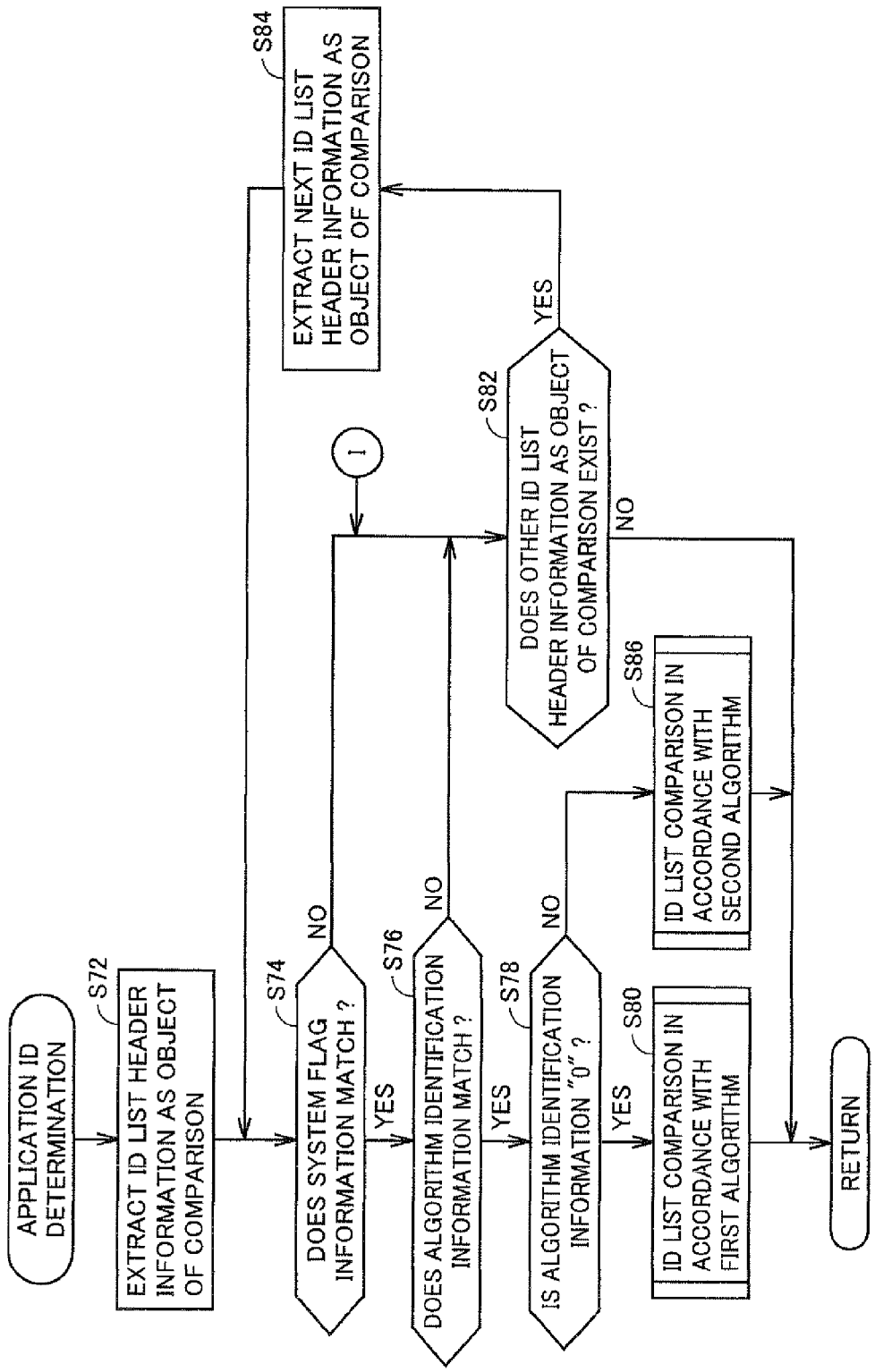
FIG. 24 is an overall flowchart in an application ID determination unit 230.

FIG. 24 is an overall flowchart of application ID determination unit 230.

Referring to FIG. 24, CPU 60 (ID list header information comparison unit 232) first extracts ID list header information as an object of comparison (step S72).

For example, initially, the first ID list header information included in the vendor specifying IE data of the reception wireless frame (game device 3) saved in reception wireless frame saving area 69 and the first ID list header information included in the vendor specifying IE data of the transmission wireless frame (own device 1) saved in transmission wireless frame saving area 67 are extracted.

As will be described later, in the present flow, the pieces of ID list header information are extracted one by one from the reception wireless frame saved in reception wireless frame saving area 69 and from the transmission wireless frame saved in transmission wireless frame saving area 67 and the comparison processing is performed on every combination until the system flag information and the algorithm identification information match.

Then, CPU 60 (ID list header information comparison unit 232) determines whether or not the system flag information included in the ID list header information extracted from the reception wireless frame saved in reception wireless frame saving area 69 matches with the system flag information included in the ID list header information extracted from the transmission wireless frame saved in transmission wireless frame saving area 67 (step S74).

When it is determined in step S74 that the pieces of system flag information match (YES in step S74), CPU 60 (ID list header information comparison unit 232) then determines whether or not the algorithm identification information included in the ID list header information extracted from the reception data matches with the algorithm identification information included in the ID list header information extracted from the transmission wireless frame saved in the transmission wireless frame saving area 67 (step S76).

When it is determined in step S76 that the pieces of algorithm identification information do not match (NO in step S76), the process proceeds to step S82.

When it is determined in step S76 that the pieces of algorithm identification information match (YES in step S76), CPU 60 (ID list header information comparison unit 232) then determines whether or not the algorithm identification information included in the ID list header information extracted from the reception wireless frame saved in reception wireless frame saving area 69 is "0" (step S78).

When the algorithm identification information is "0" in step S78, CPU 60 (ID list comparison unit 234) performs the ID list comparison processing in accordance with a first algorithm (step S80). Then, the process ends (RETURN). The ID list comparison processing in accordance with the first algorithm will be described later.

On the other hand, when the algorithm identification information is not "0", that is, when it is "1" in step S78, CPU 60 (ID list comparison unit 234) performs the ID list comparison processing in accordance with a second algorithm (step S86). Then, the process ends (RETURN). The ID list comparison processing in accordance with the second algorithm will be described later.

On the other hand, when it is determined in step S74 that the pieces of system flag information do not match (NO in step S74), CPU 60 (ID list header information comparison unit 232) then determines whether or not other ID list header information exists as an object of comparison (step S82).

When it is determined in step S82 that another piece of ID list header information exists as an object of comparison, the ID list header information as the next object of comparison is extracted (step S84). Then, the process proceeds to step S74 and similar processing is repeated. For example, the second ID list header information is extracted by way of example.

On the other hand, when CPU 60 (ID list header information comparison unit 232) determines in step S82 that no other ID list header information to be the object of comparison exists, the process ends (RETURN).

Namely, when pieces of ID list header information are extracted from the reception wireless frame saved in reception wireless frame saving area 69 and from the transmission wireless frame saved in transmission wireless frame saving area 67 and matching cannot be achieved in any combination, it is determined that the exchange data does not exist and the process ends.

For example, as in the present example, a case where the transmission wireless frame (own device 1) includes two pieces of ID list header information and the reception wireless frame (game device) also includes two pieces of ID list header information, and the pieces of ID list header information are extracted and comparison is made on every combination is described. First, the first ID list header information included in the vendor specifying IF data of the transmission wireless frame (own device 1) is extracted, the first ID list header information included in the reception wireless frame (game device) is extracted, and these pieces of information are compared with each other. Then, the first ID list header information included in the vendor specifying IE data of the transmission wireless frame (own device 1) and the second ID list header information included in the reception wireless frame (game device) are extracted and these pieces of information are compared with each other. Then, the second ID list header information included in the vendor specifying IE data of the transmission wireless frame (own device 1) is extracted, the first ID list header information included in the reception wireless frame (game device) is extracted, and these pieces of information are compared with each other. Then, the second ID list header information included in the vendor specifying IE data of the transmission wireless frame (own device 1) and the second ID list header information included in the reception wireless frame (game device) are extracted and these pieces of information are compared with each other.

Namely, simply stated, first, the first piece of ID list header information is extracted from the transmission wireless frame (own device 1) and fixed, and pieces of ID list header information are extracted in order from the reception wireless frame (game device) and compared. When the pieces of system flag information and algorithm identification information do not match, then the next piece of ID list header information is extracted from the transmission wireless frame (own device 1) and fixed, and pieces of ID list header information are extracted in order from the reception wireless frame (game device) and compared. Such processing is repeated as many times as the number of pieces of the ID list header information included in the transmission wireless frame (own device 1). When the last piece of ID list header information is extracted from the transmission wireless frame (own device 1) and fixed and pieces of ID list header information are extracted in order from the reception wireless frame (game device) and compared and when the pieces of system flag information and algorithm identification information still do not match, it is determined in step S82 that no piece of ID list header information as the object of comparison exists (NO in step S82) and the application ID determination processing ends (RETURN).

With this scheme, whether or not the comparison processing is to be continued is determined based on the reception wireless frame saved in reception wireless frame saving area 69 and the ID list header information included in the vendor specifying IE of the transmission wireless frame saved in transmission wireless frame saving area 67 before comparison of application IDs, and therefore it becomes possible to perform the comparison processing at high speed.

Figure 25:
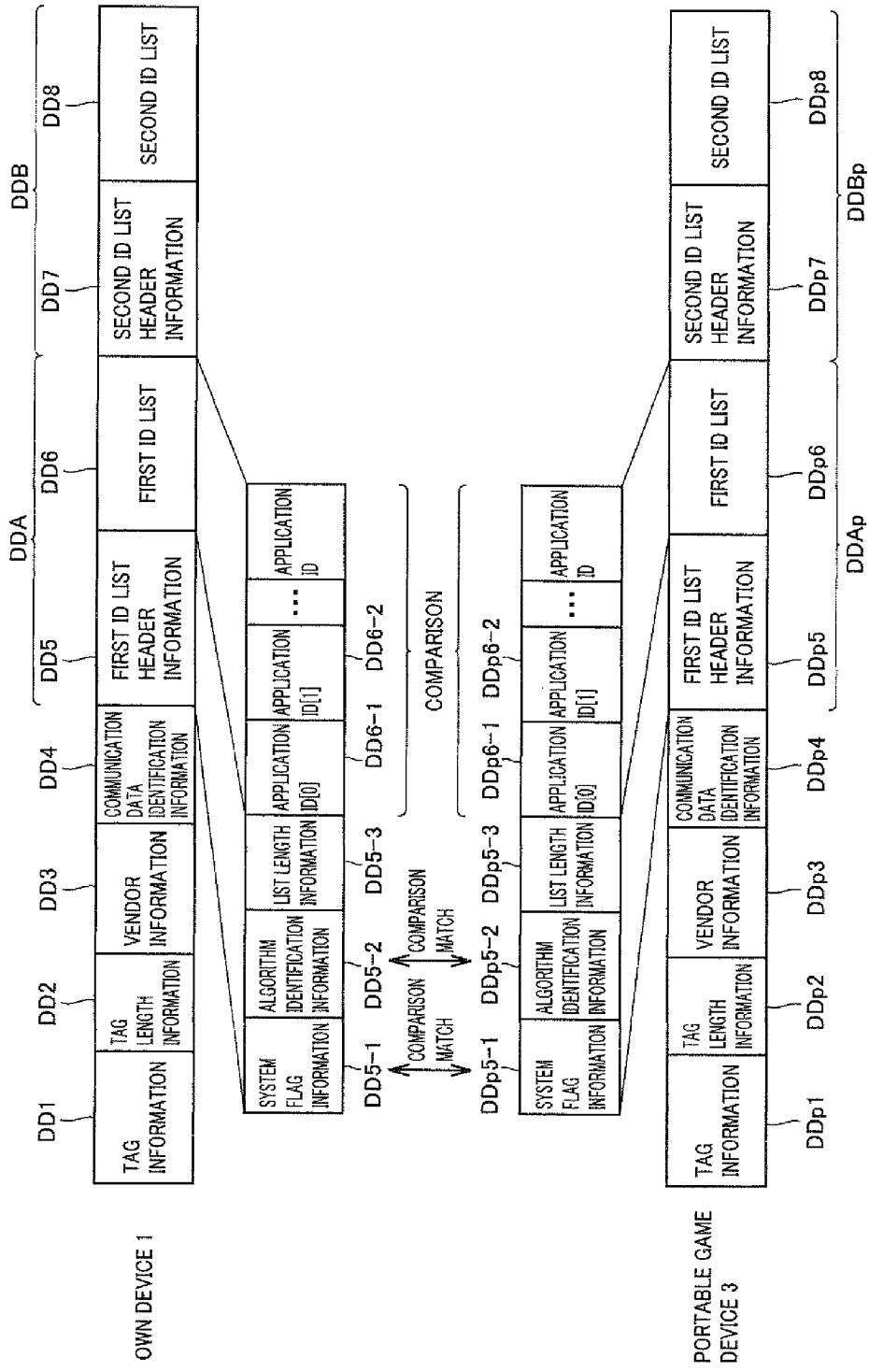
FIG. 25 illustrates comparison of vendor specifying IE as an object of comparison according to an embodiment of the present invention.

FIG. 25 illustrates comparison of vendor specifying IE as the object of comparison according to an embodiment of the present invention.

Referring to FIG. 25, a data configuration similar to that described with reference to FIG. 20 is shown here.

The upper side represents the configuration of vendor specifying IF included in the transmission wireless frame saved in transmission wireless frame saving area 67 of own device 1, and the lower side represents the configuration of vendor specifying IE included in the reception wireless frame saved in reception wireless frame saving area 69 of game device 3.

In the present example, a case where system flag information DD5-1 included in first ID list header information DD5 of own device 1 is compared with system flag information DDp5-1 included in first ID list header information DDp5 of game device 3 and these pieces of information are found to be matching, algorithm identification information DDS-2 is compared with algorithm identification information DDp5-2 and these pieces of information are found to be matching, and application ID[0], ID[1], . . . included in first ID list DD6 of own device 1 and application ID[0], ID[1], . . . included in a first ID list DDp6 of game device 3 are to be compared is shown.

Figure 26:
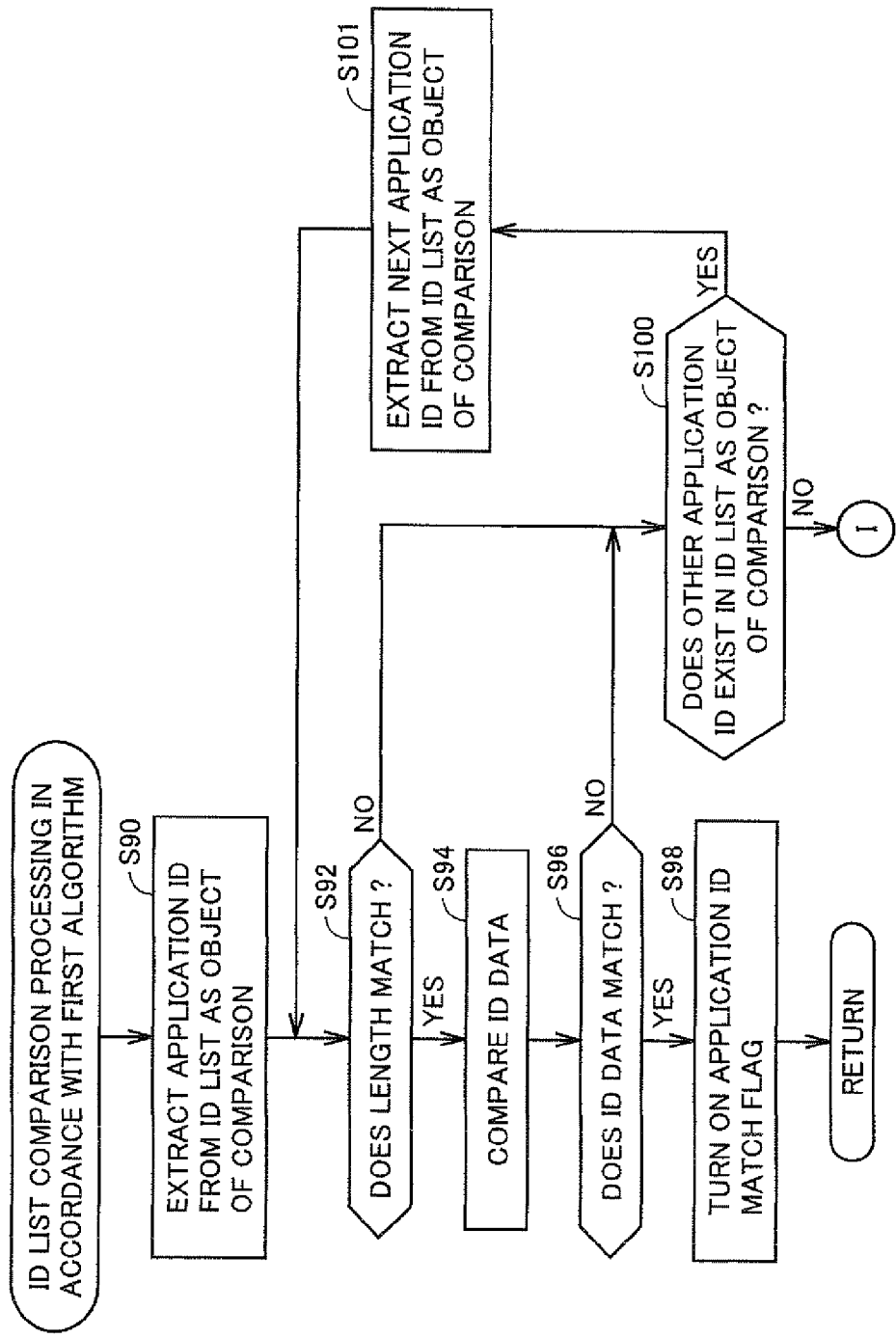
FIG. 26 is a flowchart representing processing for ID list comparison in accordance with a first algorithm according to an embodiment of the present invention.

FIG. 26 is a flowchart representing processing of ID list comparison in accordance with the first algorithm according to an embodiment of the present invention.

Referring to FIG. 26, CPU 60 (ID list comparison unit 234) first extracts an application ID from the ID list as the object of comparison (step S90).

For example, an application ID[0] in first ID list DD6 in the transmission wireless frame (own device 1) saved in transmission wireless frame saving area 67 and an application ID[0] in first ID list DDp6 in the reception wireless frame (game device 3) saved in reception wireless frame saving area 69 are extracted as shown in FIG. 25.

In this flow, application IDs are extracted one by one from each ID list as the object of comparison and the comparison processing is performed on every combination, until a length to be compared and the ID data match as will be described later.

Then, CPU 60 (ID list comparison unit 234) determines whether or not the lengths to be compared match (step S92).

When it is determined in step S92 that the lengths to be compared match (YES in step S92), CPU 60 (ID list comparison unit 234) compares the ID data (step S94).

Then, CPU 60 (ID list comparison unit 234) determines whether or not the ID data match (step S96).

When it is determined in step S96 that the ID data does not match (NO in step S96), the process proceeds to step S100.

When it is determined in step S96 that the ID data matches (YES in step S96), CPU 60 (ID list comparison unit 234) sets the application ID match flag to ON (step S98). Then, the process ends (RETURN).

On the other hand, when it is determined in step S92 that the lengths to be compared do not match, CPU 60 (ID list comparison unit 234) then determines whether or not other application ID in the ID list exists as the object of comparison (step S100). When it is determined in step S100 that another application ID in the ID list exists as the object of comparison, another application ID is extracted from the ID list as the object of comparison (step S101). Then, the process again returns to step S92.

For example, as shown in FIG. 25, an application ID[1] in first ID list DD6 in the transmission wireless frame (own device 1) saved in transmission wireless frame saving area 67 is extracted and the similar processing is performed.

On the other hand, when it is determined in step S100 that no other application ID in the ID list exists as the object of comparison, CPU 60 (ID list comparison unit 234) proceeds to "I".

Namely, when application IDs are extracted one by one from the ID lists as the objects of comparison in the reception wireless frame saved in reception wireless frame saving area 69 and in the transmission wireless frame saved in transmission wireless frame saving area 67 until the lengths to be compared and the ID data match and when matching cannot be achieved in any combination, the process proceeds to step S82 in FIG. 24 and the processing described above is again repeated.

For example, in the present example, by way of example, a case in which first ID list DD6 in the transmission wireless frame (own device 1) saved in transmission wireless frame saving area 67 and first ID list DDp6 in the reception wireless frame (game device 3) saved in reception wireless frame saving area 69 are extracted as the ID lists as the object of comparison will be described. For example, by way of example, it is assumed that first ID list DD6 and first ID list DDp6 both have (n+1) application IDs.

In this case, a case where application IDs are extracted one by one from each of the ID lists as the objects of comparison and comparison is made on every combination is described. First, application ID[0] DD6-1 in first ID list DD6 in the transmission wireless frame (own device 1) is extracted, an application ID[0] DDp6-1 in first ID list DDp6 included in the reception wireless frame (game device) is extracted, and these IDs are compared with each other. Then, application ID[0] DD6-1 in first ID list DD6 in the transmission wireless frame (own device 1) and an application ID[1] DDp6-2 in first ID list DDp6 included in the reception wireless frame (game device) are extracted and compared with each other.

Then, application ID[0] DD6-1 in first ID list DD6 in the transmission wireless frame (own device 1) and an application ID[2], an application ID[3], . . . , an application ID[n] in first ID list DDp6 included in the reception wireless frame (game device) are extracted successively and compared.

Then, application ID[1] DD6-2 in first ID list DD6 in the transmission wireless frame (own device 1) is extracted, application ID[0] DDp6-1 in first ID list DDp6 included in the reception wireless frame (game device) is extracted, and these IDs are compared with each other. Then, application ID[1] DD6-2 in first ID list DD6 in the transmission wireless frame (own device 1) and application ID[1] DDp6-2 in first ID list DDp6 included in the reception wireless frame (game device) are extracted and compared with each other.

Then, application ID[1] DD6-2 in first ID list DD6 in the transmission wireless frame (own device 1) and application ID[2], application ID[3], . . . , application ID[n] in first ID list DDp6 included in the reception wireless frame (game device) are successively extracted and compared. This processing is repeated in the similar manner for application ID[2], application ID[3], . . . , application ID[n] in first ID list DD6 in the transmission wireless frame (own device 1).

Namely, simply stated, from the ID lists as the objects of comparison, first, a first application ID is extracted from the transmission wireless frame (own device 1) and fixed, and application IDs are successively extracted from the reception wireless frame (game device) and compared. When the lengths to be compared and the ID data do not match, a next application ID is then extracted from the transmission wireless frame (own device 1) and fixed and application IDs are successively extracted from the reception wireless frame (game device) and compared. Such processing is repeated as many times as the number of application IDs included in the ID list in the transmission wireless frame (own device 1). When the last application ID is extracted from the transmission wireless frame (own device 1) and fixed and application IDs are successively extracted from the reception wireless frame (game device) and compared and when the lengths to be compared and the ID data still do not match, it is determined in step S100 that no other application ID exists in the ID list as the object of comparison (NO in step S100) and the process proceeds to "I".

Comparison between pieces of ID data described above will be described here.

Figure 27:
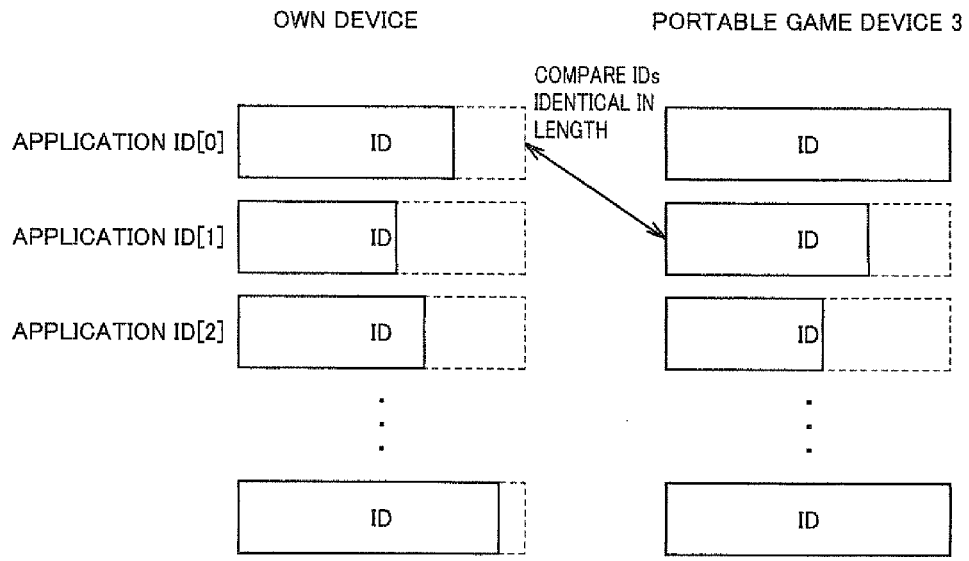
FIG. 27 illustrates comparison of ID data according to an embodiment of the present invention.

FIG. 27 illustrates comparison of ID data according to an embodiment of the present invention.

Referring to FIG. 27, as shown in the present example, when ID data of the application ID included in the transmission wireless frame saved in transmission wireless frame saving area 67 of own device 1 is compared with ID data of the application ID included in the reception wireless frame saved in reception wireless frame saving area 69 of game device 3, pieces of the ID data having the same length are compared with each other. For example, by way of example, it is assumed that the ID data is information specifying an application, such as an application name.

Specifically, using the length data indicating the length to be compared of the ID data described above and included in the application ID described with reference to FIG. 20, data comparison is made only with the ID data matching in length data.

Namely, comparison is made only with the ID data matching in length data, that is, with the ID data of which length to be compared is the same. Therefore, it is unnecessary to compare ID data of which length to be compared is different. Thus, it becomes possible to make comparison of application IDs at high speed.

In the foregoing, a scheme in which the application ID match flag is set to ON when the ID data of own device 1 matches with the ID data of game device 3 identical in length data has been described. The manner of comparison, however, is not limited to the above, and yet other comparison may be made.

Figure 28:
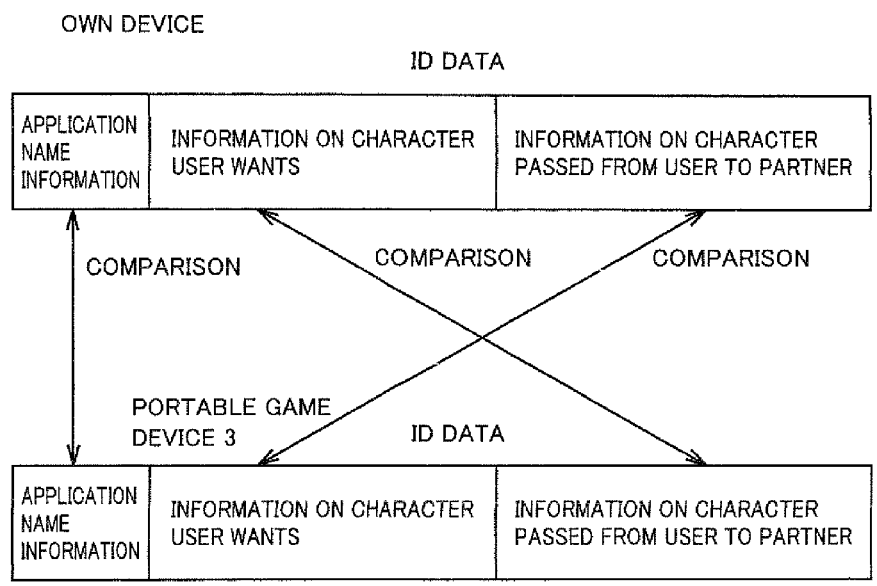
FIG. 28 illustrates yet another type of comparison of ID data according to an embodiment of the present invention.

FIG. 28 illustrates yet other comparison of ID data according to an embodiment of the present invention.

Referring to FIG. 28, here, a case where ID data includes not only the information specifying an application such as an application name (application name information) but also other pieces of information is shown.

As other pieces of information, a piece of character information that the user of own device wants and a piece of character information that the user of own device passes to a partner are stored, using at least a part of ID data of the own device.

On the other hand, similarly on the side of another game device as well, not only the application name information but also other pieces of information are stored, including a piece of character information the user of another game device wants and a piece of character information the user of another game device passes to a partner, using at least a part of the ID data.

Then, determination is made as to whether or not the pieces of the application name information match, as to whether or not the piece of character information included in the ID data of the own device, that the user wants, matches with the piece of character information included in the ID data of another game device, that the user of another game device passes to a partner, and as to whether or not the piece of character information included in the ID data of the own device and to be passed by the user of own device to the partner matches the piece of character information included in the ID data of another game device, that the user of another game device wants. When the pieces of the application name information match and the pieces of character information to be exchanged also match, it is determined that application IDs match.

With the comparison scheme, before actually exchanging the exchange data between game device 1 as the own device and another game device 3, when it is determined based on the contents in exchange data (character information) to be exchanged that the exchange data is mutually desired data, the application ID match flag is set to ON and the main body is notified of that fact. When one of the devices does not wish exchange, the application ID match flag is not set to ON and the notification is not given to the main body side. Therefore, it becomes possible to exchange only the exchange data desired by the users.

Namely, since the ID data includes other pieces of information (for example, exchange data) in addition to the information specifying an application such as the application name, it becomes possible to avoid undesirable processing for giving/receiving data, and hence zest in using the game device as the information processing apparatus increases.

Regarding comparison, the scheme may be distinguished from the scheme described with reference to FIG. 26, by using, for example, a different piece of algorithm identification information.

Highly sophisticated exchange processing realized by adding exchange condition data as additional conditions to the ID data will now be described.

Specifically, an example including transmission/reception condition data and obtaining condition data as the exchange condition data will be described.

Figure 29:
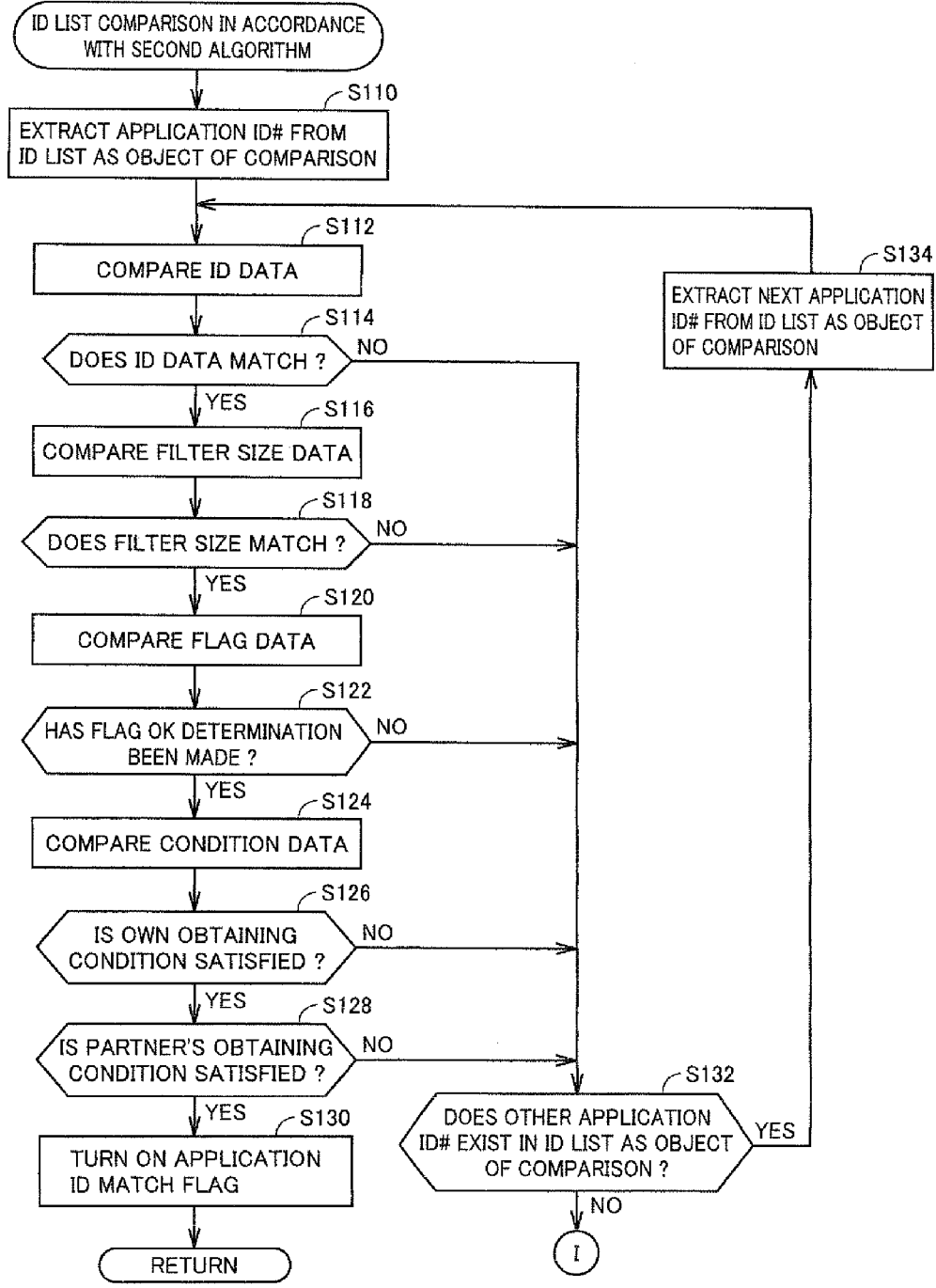
FIG. 29 is a flowchart representing processing for ID list comparison in accordance with a second algorithm according to an embodiment of the present invention.

FIG. 29 is a flowchart representing processing for ID list comparison in accordance with a second algorithm according to an embodiment of the present invention.

In the present example, when the algorithm identification information is "1", CPU 60 (ID list comparison unit 234) performs the ID list comparison processing in accordance with the second algorithm.

In the present example, by way of example, it is assumed that the algorithm identification information included in the second ID list header information included in the vendor specifying IE data in the transmission wireless frame (own device 1) saved in transmission wireless frame saving area 67 and the algorithm identification information included in the second ID list header information included in the vendor specifying IE data in the reception wireless frame (game device 3) saved in reception wireless frame saving area 69 are both "1".

In this case, for example, the second ID list included in the transmission wireless frame saved in transmission wireless frame saving area 67 and the second ID list included in the reception wireless frame saved in reception wireless frame saving area 69 described with reference to FIG. 25 by way of example are the objects of comparison.

Referring to FIG. 29, first, CPU 60 (ID list comparison unit 234) extracts application ID#s from the ID lists as the objects of comparison (step S110).

For example, as shown in FIGS. 20 and 25, an application ID#[0] in second ID list DDS in the transmission wireless frame (own device 1) saved in transmission wireless frame saving area 67 and an application ID#[0] in a second ID list DDp8 in the reception wireless frame (game device 3) saved in reception wireless frame saving area 69 are extracted.

As will be described later, in this flow, application IDs are extracted one by one from each of the ID lists as the objects of comparison and the comparison processing is performed on every combination until determination conditions such as the ID data and the obtaining conditions are satisfied.

Then, CPU 60 (ID list comparison unit 234) compares the pieces of the ID data included in the extracted application ID#s (step S112).

Specifically, the ID data of application ID#[0] in second ID list DD8 and the ID data of application ID#[0] in second ID list DDp8 are compared with each other.

Then, in step S114, CPU 60 (ID list comparison unit 234) determines whether or not the pieces of the ID data match (step S114).

When it is determined in step S114 that the pieces of the ID data match (YES in step S114), CPU 60 (ID list comparison unit 234) compares pieces of the filter size data (step S116).

Then, CPU 60 (ID list comparison unit 234) determines whether or not the filter sizes match (step S118). Specifically, the filter size data of application ID#[0] in second ID list DD8 and the filter size data of application ID#[0] in second ID list DDp8 are compared with each other. As described above, the filter size data is data defining the data size of each of the mask data, the condition data and the request data.

When the pieces of the filter size data are different, the pieces of the data as the objects of comparison have different sizes. Therefore, it can be determined that the conditions do not match without performing subsequent data comparison processing which will be described later.

Then, when it is determined in step S118 that the filter sizes match (YES in step S118), CPU 60 (ID list comparison unit 234) then determines whether or not the transmission/reception condition data is satisfied. Specifically, the send flag data and the receive flag data representing the transmission/reception condition data are compared (step S120). Comparison of the send flag data and the receive flag data will be described later.

Then, CPU 60 (ID list comparison unit 234) determines whether or not the transmission/reception condition data is satisfied, that is, whether or not the flag data indicates OK determination, based on the result of comparison (step S122).

FIG. 30 illustrates comparison of the send flag data and the receive flag data representing the transmission/reception condition data according to an embodiment of the present invention.

Referring to FIG. 30(A), formats of the send flag data and the receive flag data representing the transmission/reception condition data in own device 1 will be described.

Specifically, in accordance with combination of a send flag and a receive flag, the transmission/reception condition data for the exchange data can be set.

Specifically, the send flag set to "1" and the receive flag set to "0" mean that only transmission communication of the exchange data from own device 1 is permitted.

Alternatively, the send flag set to "0" and the receive flag set to "1" mean that only reception communication of the exchange data from another game device is permitted.

Alternatively, the send flag and the receive flag set to "1" and "1" respectively mean that communication of exchange data is permitted under any condition. Therefore, here, communication in accordance with transmission/reception condition data of a communication partner is carried out.

Alternatively, the send flag and the receive flag set to "0" and "0" respectively mean that only bidirectional communication of exchange data between own device 1 and another game device is permitted.

With regard to the transmission/reception condition data, a case where the transmission/reception condition data is satisfied, that is, where the flag data indicates OK determination (hereinafter also simply referred to as flag OK determination), will be described.

When the send flag is "1" and the receive flag is "0" in own device 1 and when the send flag is "0" and the receive flag is "1" or the send flag is "1" and the receive flag is "1" in the communication partner, flag OK determination is made.

When the send flag is "0" and the receive flag is "1" in own device 1 and when the send flag is "1" and the receive flag is "0" or the send flag is "1" and the receive flag is "1" in the communication partner, flag OK determination is made.

When the send flag is "1" and the receive flag is "1" in own device 1 and when the send flag is "0" and the receive flag is "0", or the send flag is "0" and the receive flag is "1", or the send flag is "1" and the receive flag is "0", or the send flag is "1" and the receive flag is "1" in the communication partner, flag OK determination is made.

When the send flag is "0" and the receive flag is "0" in own device 1 and when the send flag is "0" and the receive flag is "0" or the send flag is "1" and the receive flag is "1" in the communication partner, flag OK determination is made.

Specific examples of flag data comparison relating to the transmission/reception condition data will be described with reference to FIG. 30(B).

In Example 1, comparison in a case where the send flag is "0" and the receive flag is "1" in own device 1 and the send flag is "1" and the receive flag is "0" in game device 3 is shown. Therefore, the transmission/reception condition data of own device 1 permits only reception communication and the transmission/reception condition data of game device 3 permits only transmission communication. Accordingly, reception flag OK determination is made, that is, communication is permitted.

In Example 2, comparison in a case where the send flag is "1" and the receive flag is "0" in own device 1 and the send flag is "0" and the receive flag is "1" in game device 3 is shown. Therefore, the transmission/reception condition data of own device 1 permits only transmission communication and the transmission/reception condition data of game device 3 permits only reception communication. Accordingly, flag OK determination is made, that is, communication is permitted.

In Example 3, comparison in a case where the send flag is "1" and the receive flag is "1" in own device 1 and the send flag is "1" and the receive flag is "0" in game device 3 is shown. Therefore, the transmission/reception condition data of own device 1 permits communication under any condition and the transmission/reception condition data of game device 3 permits only transmission communication. Accordingly, flag OK determination is made, that is, communication is permitted.

In Example 4, comparison in a case where the send flag is "1" and the receive flag is "0" in own device 1 and the send flag is "1" and the receive flag is "0" in game device 3 is shown. Therefore, the transmission/reception condition data of own device 1 permits only transmission communication and the transmission/reception condition data of game device 3 permits only transmission communication. Accordingly, flag NG determination is made, that is, communication is not permitted.

In Example 5, comparison in a case where the send flag is "0" and the receive flag is "0" in own device 1 and the send flag is "1" and the receive flag is "0" in game device 3 is shown. Therefore, the transmission/reception condition data of own device 1 permits only bidirectional communication and the transmission/reception condition data of game device 3 permits only transmission communication. Accordingly, flag NG determination is made, that is, communication is not permitted.

With this scheme, by adding the transmission/reception condition data (send flag data and receive flag data) representing the exchange condition data to the ID data for comparison, it becomes possible to increase variation of the manner of communication at the time of data exchange in such cases that only transmission of exchange data is desired, only reception of exchange data is desired, only transmission/ reception of exchange data is desired with a communication partner, or communication in accordance with the transmission/reception condition data of a communication partner is carried out. Thus, zest of data exchange can be enhanced.

Again referring to FIG. 29, when flag OK determination has been made in step S122 (YES in step S122), CPU 60 (ID list comparison unit 234) determines whether or not mutual obtaining conditions are satisfied. Specifically, as determination as to whether the obtaining conditions are satisfied, the pieces of condition data are compared (step S124). Comparison of the condition data will be described later.

Then, CPU 60 (ID list comparison unit 234) determines whether or not the obtaining condition of own device is satisfied (step S126).

Then, when it is determined that the obtaining condition of own device is satisfied (YES in step S126), CPU 60 then determines whether or not the obtaining condition of the partner is satisfied (step S128).

Then, when it is determined that the obtaining condition of the partner is satisfied (YES in step S128), CPU 60 (ID list comparison unit 234) turns ON the application ID match flag (step S130). Then the process ends (RETURN).

Figure 31:
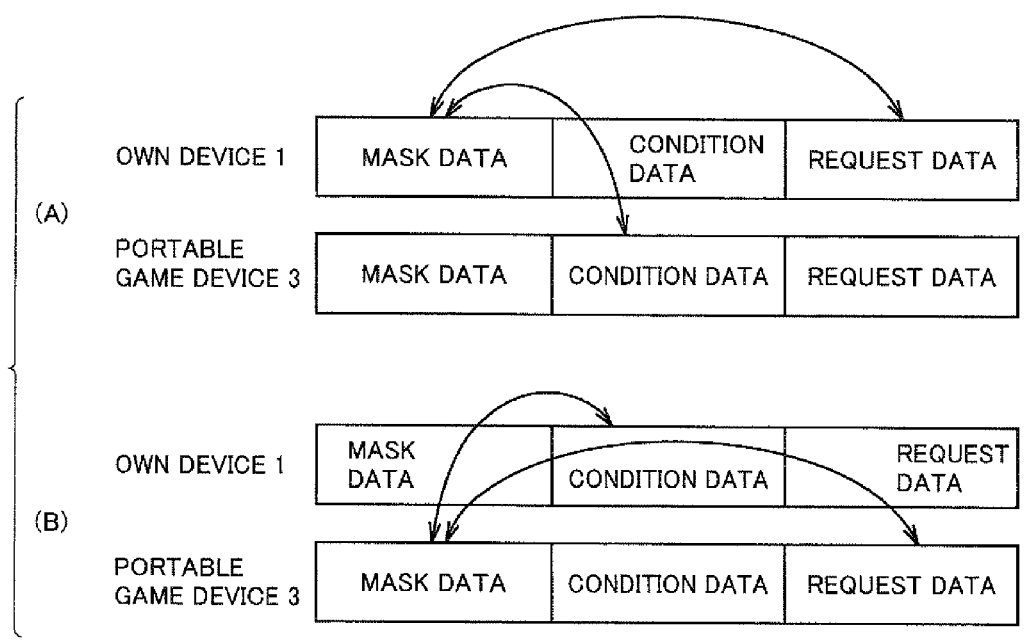
FIG. 31 illustrates comparison of condition data as to whether an obtaining condition is satisfied or not, according to an embodiment of the present invention.

FIG. 31 illustrates comparison of the condition data as to whether the obtaining condition is satisfied or not, according to an embodiment of the present invention.

FIG. 31(A) illustrates comparison of the condition data of the own device.

The condition data is generated from the obtaining condition data of own device 1 (mask data, condition data, request data) and the obtaining condition data of game device 3 (mask data, condition data, request data).

Specifically, as comparison of the condition data, whether or not the product of the mask data of own device 1 and the condition data of game device 3 has the same value as the product of the mask data of own device 1 and the request data of own device 1 is determined.

FIG. 31(B) illustrates comparison of the condition data relating to whether or not the obtaining condition of the partner is satisfied.

Specifically, as comparison of the condition data, whether or not the product of the mask data of game device 3 and the condition data of own device 1 has the same value as the product of the mask data of game device 3 and the request data of game device 3 is determined.

Figure 32:
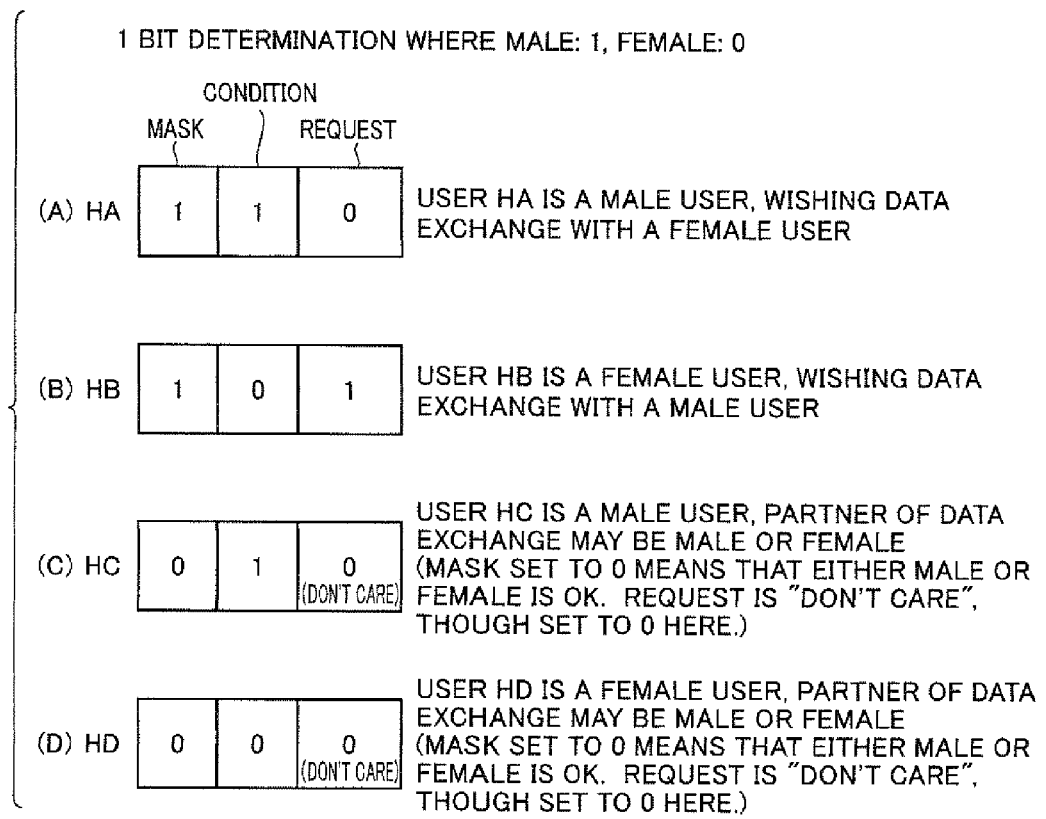
FIG. 32 shows specific examples of obtaining condition data according to an embodiment of the present invention.

FIG. 32 shows specific examples of the obtaining condition data according to an embodiment of the present invention.

Referring to FIG. 32, here, four examples of the obtaining condition data are shown.

Specifically, the obtaining condition data set by users HA, HB, HC, and HD are shown.

It is assumed that the mask data, the condition data and the request data are each of 1 bit.

In the present example, a case where, for storing the exchange data in the exchange data registration event above, sex is set as the obtaining condition data when users HA, HB, HC, and HD wish to have data exchanged is described.

Specifically, a case where data indicating sex (male: "1", female: "0") is used as attribute data associated with the exchange data of the own device to be transmitted to a partner and the exchange data to be received from the partner is described.

FIG. 32(A) shows obtaining condition data of user HA, in which mask data is "1", condition data is "1" and request data is "0". This is a case where the condition data being "1" indicates that user HA is a male user and the request data being "0" indicates that data exchange with a female user is requested. In a case where the mask data is "0", setting of the request data can be invalid. Namely, setting can be such that data exchange is desired with a user of any sex.

FIG. 32(B) shows obtaining condition data of user HB, in which mask data is "1" condition data is "0" and request data is "1". This is a case where the condition data being "0" indicates that user HB is a female user and the request data being "1" indicates that data exchange with a male user is desired.

FIG. 32(C) shows obtaining condition data of user HC, in which mask data is "0", condition data is "1" and request data is "0". This is a case where the condition data being "1" indicates that user HC is a male user. Since the mask data is "0", the sex of a partner of data exchange is not limited. Therefore, the request data may be "0" or "1", that is, "don't care." For the sake of brevity of description, it is set to "0" here.

FIG. 32(D) shows obtaining condition data of user HD, in which mask data is "0", condition data is "0" and request data is "0". This is a case where the condition data being "0" indicates that user HD is a female user. Since the mask data is "0", the sex of a partner of data exchange is not limited. Therefore, the request data may be "0" or "1", that is, "don't care." For the sake of brevity of description, it is set to "0" here.

FIG. 33 shows specific examples of condition data comparison based on the obtaining condition data illustrated in FIG. 32.

In the present example, comparison of the condition data of user HA with other users, that is, users HB, HC and HD, will be described.

Referring to FIG. 33(A), comparison in the condition data between users HA and HB is shown here.

The processing on the side of user HA will be described.

The product of the condition data of the partner and the user's own mask data is "0" & "1"="0".

In addition, the product of the user's own request data and the user's own mask data is "0" & "1"="0".

Therefore, in this case, it is determined that the user's own condition data matches and hence the user's own obtaining condition is satisfied.

Further, the product of the user's own condition data and the mask data of the partner is "1" & "1"="1".

The product of the request data of the partner and the mask data of the partner is "1" & "1"="1".

Therefore, in this case, it is determined that the condition data of the partner matches and hence the obtaining condition of the partner is satisfied.

Namely, in data comparison of the obtaining condition on the side of user HA, it is determined that the user's own obtaining condition and the partner's obtaining condition are both satisfied.

Though the processing on the side of user HA has been described above, the processing is also performed similarly on the side of user HB.

The product of the condition data of the partner and the user's own mask data is "1" & "1"="1".

In addition, the product of the user's own request data and the user's own mask data is "1" & "1"="1".

Therefore, in this case, it is determined that the user's own condition data matches and hence the user's own obtaining condition is satisfied.

Further, the product of the user's own condition data and the mask data of the partner is "0" & "1"="0".

The product of the request data of the partner and the mask data of the partner is "0" & "1"="0".

Therefore, in this case, it is determined that the condition data of the partner matches and hence the obtaining condition of the partner is satisfied.

Namely, in data comparison of the obtaining condition on the side of user HB, it is determined that the user's own obtaining condition and the partner's obtaining condition are both satisfied.

Therefore, user HA who is a male user wishing to exchange data with a female user can exchange data with user HB who is a female user, since the condition for data exchange is satisfied.

Referring to FIG. 33(B), comparison in the condition data between users HA and HC is shown here.

The processing on the side of user HA will be described.

The product of the condition data of the partner and the user's own mask data is "1" & "1"="1".

In addition, the product of the user's own request data and the user's own mask data is "0" & "1"="0".

Therefore, in this case, it is determined that the user's own condition data does not match and hence the user's own obtaining condition is not satisfied.

Further, the product of the user's own condition data and the mask data of the partner is "1" & "0"="0".

The product of the request data of the partner and the mask data of the partner is "0" & "0"="0".

Therefore, in this case, it is determined that the condition data of the partner matches and hence the obtaining condition of the partner is satisfied.

Namely, in data comparison of the obtaining condition on the side of user HA, it is determined that the partner's condition data matches and hence the obtaining condition is satisfied, while the user's own condition data does not match and hence the user's own obtaining condition is not satisfied.

Though the processing on the side of user HA has been described above, the processing is also performed similarly on the side of user HC.

The product of the condition data of the partner and the user's own mask data is "1" & "0"="0".

In addition, the product of the user's own request data and the user's own mask data is "0" & "0"="0".

Therefore, in this case, it is determined that the user's own condition data matches and hence the user's own obtaining condition is satisfied.

Further, the product of the user's own condition data and the mask data of the partner is "1" & "1"="1".

The product of the request data of the partner and the mask data of the partner is "0" & "1"="0".

Therefore, in this case, it is determined that the condition data of the partner does not match and hence the obtaining condition of the partner is not satisfied.

Namely, in data comparison of the obtaining condition on the side of user HC, it is determined that, though the user's own condition data matches and the user's own obtaining condition is satisfied, the condition data of the partner does not match and hence the obtaining condition of the partner is not satisfied.

Therefore, user HC who is a male user and does not care the sex of the partner of data exchange can exchange the exchange data with user HA who is a male user. On the other hand, user HA who is a male user does not wish to exchange data with male user HC. Therefore, data exchange is impossible.

Referring to FIG. 33(C), comparison in the condition data between users HA and HD is shown here.

The processing on the side of user HA will be described.

The product of the condition data of the partner and the user's own mask data is "0" & "1"="0".

In addition, the product of the user's own request data and the user's own mask data is "0" & "1"="0".

Therefore, in this case, it is determined that the user's own condition data matches and hence the user's own obtaining condition is satisfied.

Further, the product of the user's own condition data and the mask data of the partner is "1" & "0"="0".

The product of the request data of the partner and the mask data of the partner is "0" & "0"="0".

Therefore, in this case, it is determined that the condition data of the partner matches and hence the obtaining condition of the partner is satisfied.

Namely, in data comparison of the obtaining condition on the side of user HA, it is determined that the user's own obtaining condition and the partner's obtaining condition are both satisfied.

Though the processing on the side of user HA has been described above, the processing is also performed similarly on the side of user HD.

The product of the condition data of the partner and the user's own mask data is "1" & "0"="0".

In addition, the product of the user's own request data and the user's own mask data is "0" & "0"="0".

Therefore, in this case, it is determined that the user's condition data matches and hence the user's own obtaining condition is satisfied.

Further, the product of the user's own condition data and the mask data of the partner is "0" & "1"="0".

The product of the request data of the partner and the mask data of the partner is "0" & "1"="0".

Therefore, in this case, it is determined that the condition data of the partner matches and hence the obtaining condition of the partner is satisfied.

Namely, in data comparison of the obtaining condition on the side of user HD, it is determined that the user's own obtaining condition and the partner's obtaining condition are both satisfied.

Therefore, user HD who is a female user and does not care the sex of the partner of data exchange can exchange the exchange data with user HA who is a male user. Further, user HA is a male user and wishes to exchange data with female user RD. Therefore, data exchange is possible.

Though an example of comparison using sex as the obtaining condition data has been described above, the obtaining condition data is not particularly limited as such and other data may be set as the obtaining condition data.

FIG. 34 shows other specific examples of the obtaining condition data according to an embodiment of the present invention.

Referring to FIG. 34, three examples of the obtaining condition data are shown here.

Specifically, obtaining condition data set by users HE, HF, and HG are shown.

It is assumed that the mask data, the condition data and the request data are each consisting of 2 bits.

In the present example, by way of example, for example, a case where, for storing the exchange data in the exchange data registration event above, users HE, HF, and HG set as the obtaining condition data, course data of a game of which data exchange is desired will be described.

Specifically, an example where presence/absence of data (present: "1", absent: "0") and whether exchange is desired or not (desired: "1", not desired; "0") are used as attribute data associated with the exchange data of the own device to be transmitted to a partner and the exchange data to be received from the partner will be described.

By way of example, the condition data consists of 2 bits, which correspond to a course P and a course Q, respectively. For example, when the user has data of the corresponding course, the bit of the condition data assumes "1", and when the user does not have data of the corresponding course, the bit assumes "0".

In addition, the request data consists of 2 bits, which also correspond to course P and course Q, respectively. For example, when the user wishes to obtain data of the corresponding course, the bit of the request data assumes "1", and when the user does not wish to obtain data of the corresponding course, the bit assumes "0".

Moreover, the mask data consists of 2 bits, which also correspond to course P and course Q, respectively. When the mask data is "0", setting of the request data can be invalid. Namely, the exchange data may or may not be obtained.

Referring to FIG. 34(A), the obtaining condition data of user HE is shown, and a case in which the mask data is "01", the condition data is "11" and the request data is "01" for courses P and Q is shown.

Here, the condition data being "11" indicates that user HE has courses P and Q. The request data being "01" indicates that data exchange of course Q is desired. Since the mask data for course P is "0", the request data of course P may be "0" or "1", that is, "don't care." Here, for the sake of brevity of description, it is set to "0".

Referring to FIG. 34(B), the obtaining condition data of user HF is shown, and a case in which the mask data is "11", the condition data is "10" and the request data is "01" for courses P and Q is shown.

Here, the condition data being "10" indicates that user HF has course P. The request data being "01" indicates that data exchange of course Q is desired.

Referring to FIG. 34(C), the obtaining condition data of user HG is shown, and a case in which the mask data is "11", the condition data is "01" and the request data is "11" for courses P and Q is shown.

Here, the condition data being "01" indicates that user HG has course Q. The request data being "11" indicates that data exchange of courses P and Q is desired.

FIG. 35 shows specific examples of condition data comparison based on the obtaining condition data illustrated in FIG. 34.

In the present example, comparison of the condition data of user HE with other users, that is, users HF and HG, will be described.

Referring to FIG. 35(A), comparison in the condition data between users BE and HF is shown here.

The processing on the side of user HE will be described.

The product of the condition data of the partner and the user's own mask data is "10" & "01"="00".

In addition, the product of the user's own request data and the user's own mask data is "01" & "01"="01".

Therefore, in this case, it is determined that the user's own condition data does not match and hence the user's own obtaining condition is not satisfied.

Further, the product of the user's own condition data and the mask data of the partner is "11" & "11"="11".

The product of the request data of the partner and the mask data of the partner is "01" & "11"="01".

Therefore, in this case, it is determined that the condition data of the partner does not match and hence the obtaining condition of the partner is not satisfied.

Namely, in data comparison of the obtaining condition on the side of user HE, it is determined that the user's own obtaining condition and the partner's obtaining condition are both unsatisfied.

Though the processing on the side of user HE has been described above, the processing is also performed similarly on the side of user HF.

The product of the condition data of the partner and the user's own mask data is "11" & "11"="11".

In addition, the product of the user's own request data and the user's own mask data is "01" & "11"="01".

Therefore, in this case, it is determined that the user's own condition data does not match and hence the user's own obtaining condition is not satisfied.

Further, the product of the user's own condition data and the mask data of the partner is "10" & "01"="00".

The product of the request data of the partner and the mask data of the partner is "01" & "01"="01".

Therefore, in this case, it is determined that the condition data of the partner does not match and hence the obtaining condition of the partner is not satisfied.

Namely, in data comparison of the obtaining condition on the side of user HF as well, it is determined that the user's own obtaining condition and the partner's obtaining condition are both unsatisfied.

Therefore, between user HE who wishes to exchange data of course Q and user HF who does not have the data of course Q, the obtaining condition data for data exchange is not satisfied and therefore data exchange is impossible.

Referring to FIG. 35(B), comparison in the condition data between users HE and HG is shown here.

The processing on the side of user HE will be described.

The product of the condition data of the partner and the user's own mask data is "01" & "01"="01".

In addition, the product of the user's own request data and the user's own mask data is "01" & "01"="01".

Therefore, in this case, it is determined that the user's own condition data matches and hence the user's own obtaining condition is satisfied.

Further, the product of the user's own condition data and the mask data of the partner is "11" & "11" "11".

The product of the request data of the partner and the mask data of the partner is "11" & "11"="11".

Therefore, in this case, it is determined that the condition data of the partner matches and hence the obtaining condition of the partner is satisfied.

Namely, in data comparison of the obtaining condition on the side of user HE, it is determined that the user's own obtaining condition and the partner's obtaining condition are both satisfied.

Though the processing on the side of user HE has been described above, the processing is also performed similarly on the side of user HG.

The product of the condition data of the partner and the user's own mask data is "11" & "11"="11".

In addition, the product of the user's own request data and the user's own mask data is "11" & "11"="11".

Therefore, in this case, it is determined that the user's own condition data matches and hence the user's own obtaining condition is satisfied.

Further, the product of the user's own condition data and the mask data of the partner is "01" & "01"="01".

The product of the request data of the partner and the mask data of the partner is "01" & "01"="01".

Therefore, in this case, it is determined that the condition data of the partner matches and hence the obtaining condition of the partner is satisfied.

Namely, in data comparison of the obtaining condition on the side of user HG as well, it is determined that the user's own obtaining condition and the partner's obtaining condition are both satisfied.

Therefore, between user HE who wishes to exchange data of course Q and user HG who has the data of course Q, the obtaining condition data for data exchange is satisfied, and between user HG who wishes to exchange data of course P and user HE who has the data of course P, the obtaining condition data for data exchange is satisfied. Therefore, data exchange is possible.

Again referring to FIG. 29, when it is determined in step S114 that the ID data does not match (NO in step S114), determination is made as to whether other application ID# in the ID list exists as the object of comparison or not (step S132).

In addition, when the filter size does not match in step S118 (NO in step S118), the process proceeds to step S132.

When flag OK determination is not made in step S122 (NO in step S122), the process proceeds to step S132.

When the own obtaining condition is not satisfied in step S126 (NO in step S126), the process proceeds to step S132.

When the partner's obtaining condition is not satisfied in step S128 (NO in step S128), the process proceeds to step S132.

In step S132, when another application ID# exists in the ID list as the object of comparison (YES in step S132), a next application ID# is extracted from the ID list as the object of comparison (step S134). Then, the process proceeds to step S112 and similar processing is repeated.

For example, an application ID#[1] in second ID list DD8 is extracted and similar processing is performed as shown in FIG. 20.

On the other hand, in step S132, when no other application ID# exists in the ID list as the object of comparison (NO in step S132), the process proceeds to "I".

Namely, until the determination condition of the ID data, the obtaining condition data and the like is satisfied, application ID#s are extracted one by one from the ID list as the object to be compared in the reception wireless frame saved in reception wireless frame saving area 69 and in the transmission wireless frame saved in transmission wireless frame saving area 67, and when conditions are not satisfied in any combination, the process proceeds to step S82 in FIG. 24 and the processing described above is again repeated.

For example, a case in which second ID list DD8 in the transmission wireless frame (own device 1) saved in transmission wireless frame saving area 67 and second ID list DDp8 in the reception wireless frame (game device 3) saved in reception wireless frame saving area 69 are extracted as the ID lists as the objects of comparison will be described. For example, by way of example, it is assumed that second ID list DD8 and second ID list DDp8 both hold (n+1) application ID#s.

In this case, a case where application IDs are extracted one by one from each of the ID lists as the objects of comparison and every combination is compared is described. First, application ID#[0] DD8-1 in second ID list DD8 in the transmission wireless frame (own device 1) is extracted, an application ID#[0] DDp8-1 in second ID list DDp8 included in the reception wireless frame (game device) is extracted, and these are compared with each other. Then, application ID#[0] DD8-1 in second ID list DD8 in the transmission wireless frame (own device 1) and an application ID#[1] DDp8-2 in second ID list DDp8 included in the reception wireless frame (game device) are extracted and compared with each other.

Then, an application ID#[2], an application ID#[3], . . . , an application ID#[n] in second ID list DDp8 included in the reception wireless frame (game device) are extracted successively and compared with application ID#[0] DD8-1 in second ID list DD8 in the transmission wireless frame (own device 1).

Then, application ID#[1] DD8-2 in second ID list DD8 in the transmission wireless frame (own device 1) is extracted, application ID#[0] DDp8-1 in second ID list DDp8 included in the reception wireless frame (game device) is extracted, and these IDs are compared with each other. Then, application ID#[1] DD8-2 in second ID list DD8 in the transmission wireless frame (own device 1) and application ID#[1] DDp8-2 in second ID list DDp8 included in the reception wireless frame (game device) are extracted and compared with each other.

Then, application ID#[2], application ID#[3], . . . , application ID#[n] in second ID list DDp8 included in the reception wireless frame (game device) are extracted successively and compared with application ID#[1] DD8-2 in second ID list DD8 in the transmission wireless frame (own device 1). This processing is repeated in the similar manner for application ID#[2], application ID#[3], . . . , application ID#[n] in second ID list DD8 in the transmission wireless frame (own device 1).

Namely, simply stated, from the ID lists as the objects of comparison, first, a first application ID# is extracted from the transmission wireless frame (own device 1) and fixed, and application ID#s are successively extracted from the reception wireless frame (game device) and compared. When determination conditions of the ID data, the obtaining condition data, and the like do not match, a next application ID# is then extracted from the transmission wireless frame (own device 1) and fixed, and application ID#s are successively extracted from the reception wireless frame (game device) and compared. Such processing is repeated as many times as the number of application ID#s included in the ID list in the transmission wireless frame (own device 1). When the last application ID# is extracted from the transmission wireless frame (own device 1) and fixed and application ID#s are successively extracted from the reception wireless frame (game device) and compared and when determination conditions of the ID data, the obtaining condition data and the like are still unsatisfied, it is determined in step S132 that no other application ID# exists in the ID list as the object of comparison (NO in step S132) and the process proceeds to "I".

In the flow in FIG. 29 above, a scheme in which flag data comparison (step S120) and condition data comparison (step S124) are made in a manner not associated each other has been described. For example, in such a case where the transmission/reception condition data of own device 1 designates only transmission communication as described with reference to FIG. 30, reception of the exchange data from the partner is not desired, and therefore determination as to whether the user's own obtaining condition is satisfied or not is unnecessary. On the contrary, in such a case where the transmission/reception condition data of own device 1 designates only reception communication, transmission of the exchange data to the partner is not desired, and therefore determination as to whether the obtaining condition of the partner is satisfied or not is unnecessary. Therefore, the processing for comparing and determining condition data from step S124 to step S128 may be changed depending on the result of flag data comparison in step S120.

In addition, in the present example, though the ID list comparison processing performed in accordance with the first and second algorithms when the algorithm identification information is "0" and "1" has been described, the manner of comparison is not limited thereto, and a different piece of algorithm identification information (such as "2") may be provided and the ID list comparison processing in accordance with a different algorithm may be performed.

Moreover, in the present example, though a scheme in which the obtaining condition data includes the mask data has been described, the scheme including the condition data and the request data is also applicable. In such a case, in comparison of the condition data, whether the user's own obtaining condition and the partner's obtaining condition are satisfied or not may be determined by comparing the user's own condition data with the request data of the partner and by comparing the user's own request data with the condition data of the partner.

Figure 36:
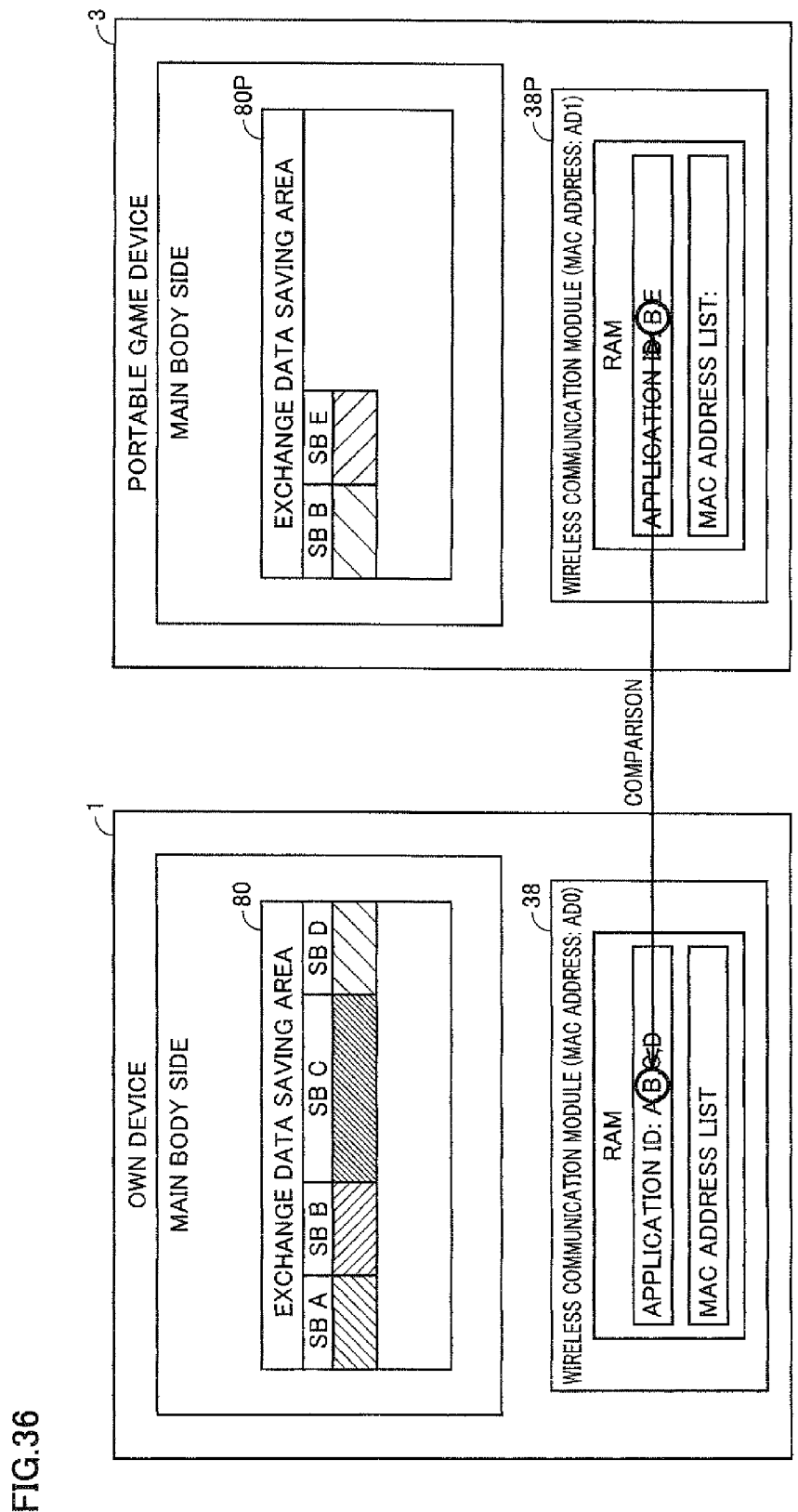
FIG. 36 is a conceptual diagram of application ID comparison according to an embodiment of the present invention.

FIG. 36 is a conceptual diagram of application ID comparison according to an embodiment of the present invention.

Referring to FIG. 36, here, situations of game devices 1 and 3 similar to the example described with reference to FIG. 22 are shown. A case where application IDs "A, B, C, and D" are stored in filtering data saving area 68 of RAM 66 of wireless communication module 38 is shown. In addition, a case where application IDs "B and E" are stored in filtering data saving area 68P of wireless communication module 38P of game device 3 is shown.

As described above, based on the data stored in filtering data saving area 68, the transmission wireless frame for transmission is set, and whether or not the match flag is ON is determined based on comparison with an application ID included in the reception wireless frame for reception.

In the present example, a case where the match flag is ON for application ID "B" is shown.

Figure 37:
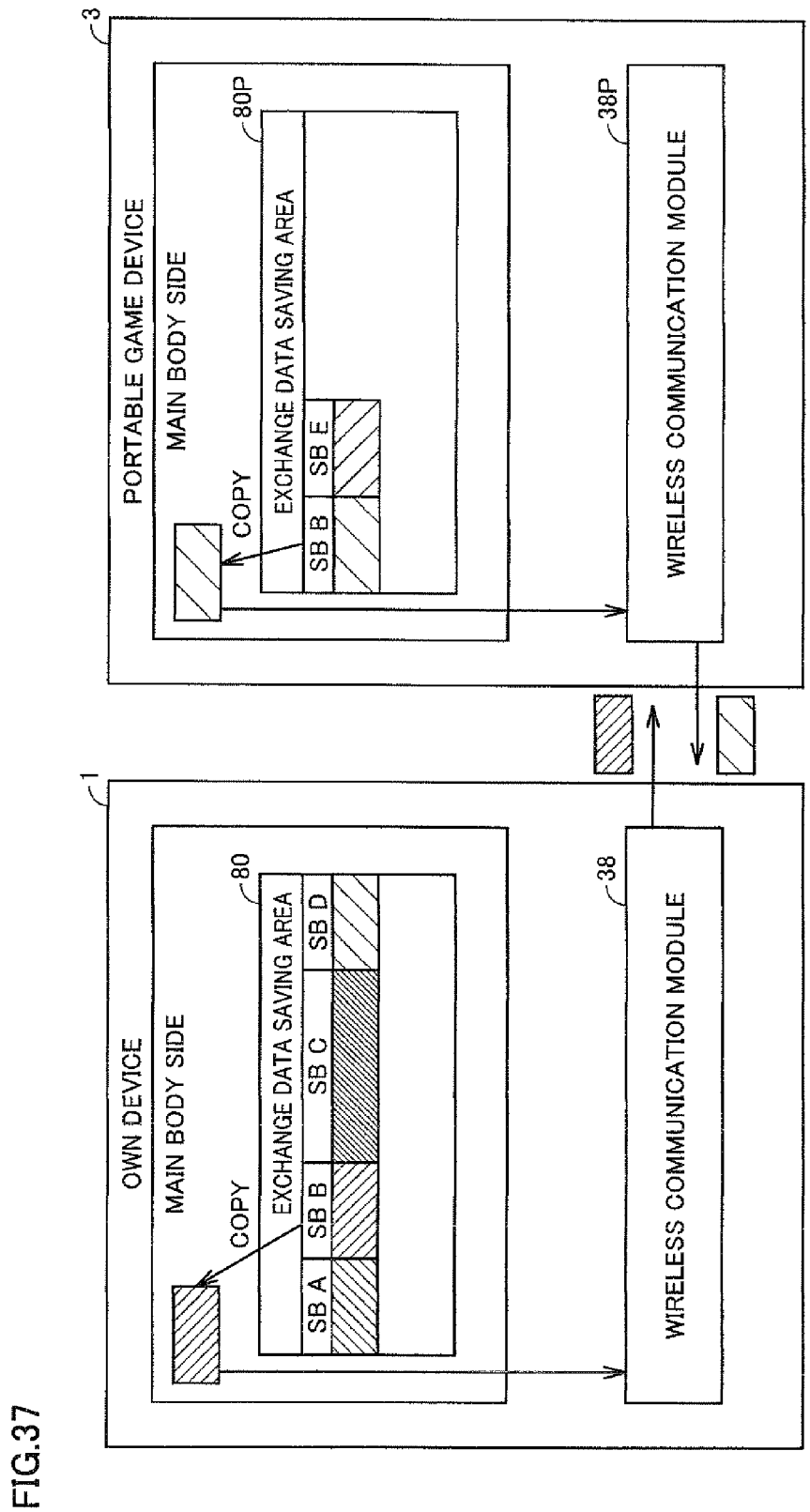
FIG. 37 is a (first) illustration representing processing for exchanging exchange data between game devices according to an embodiment of the present invention.
Figure 38:
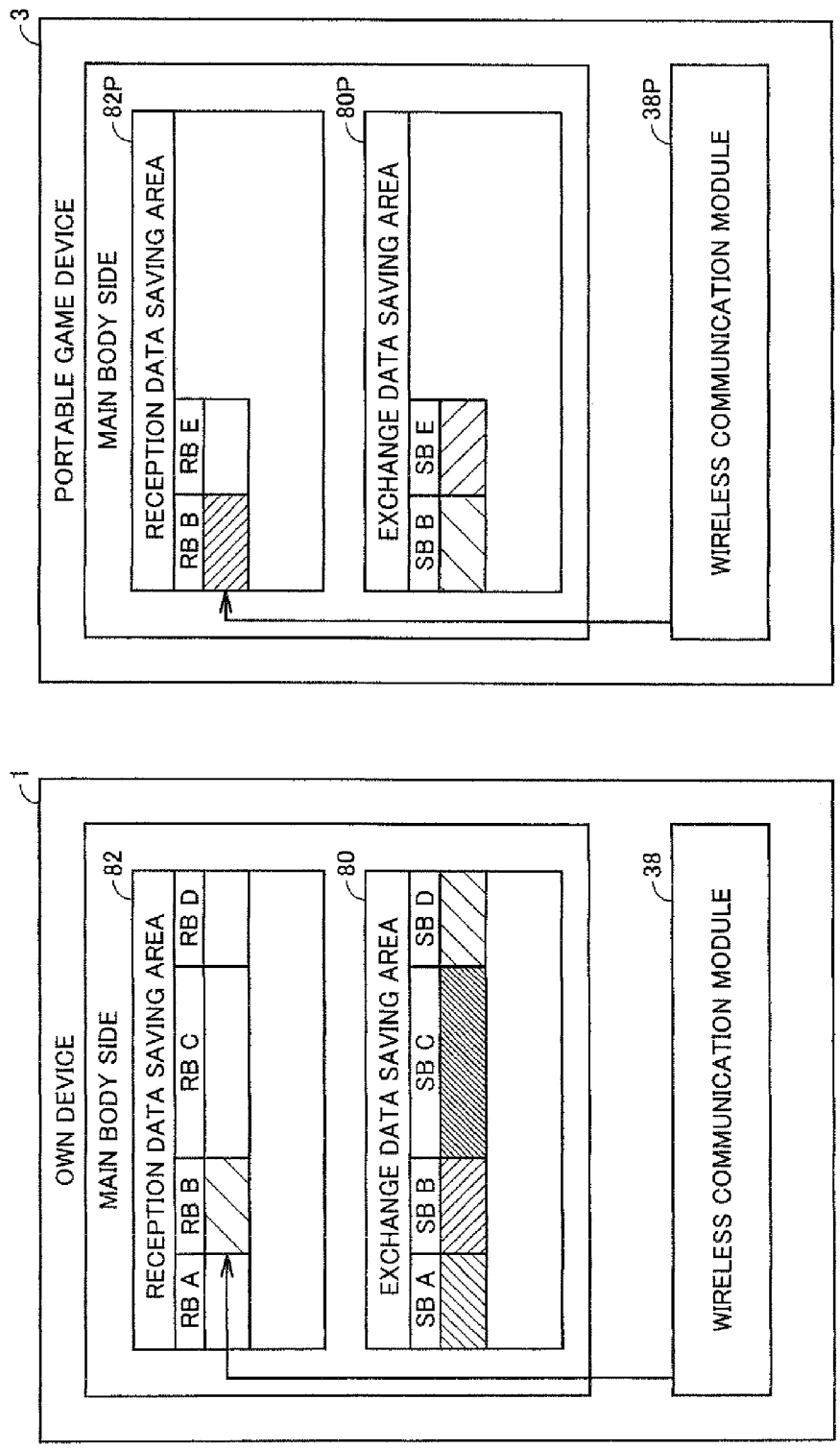
FIG. 38 is a (second) illustration representing processing for exchanging exchange data between game devices according to an embodiment of the present invention.
Figure 39:
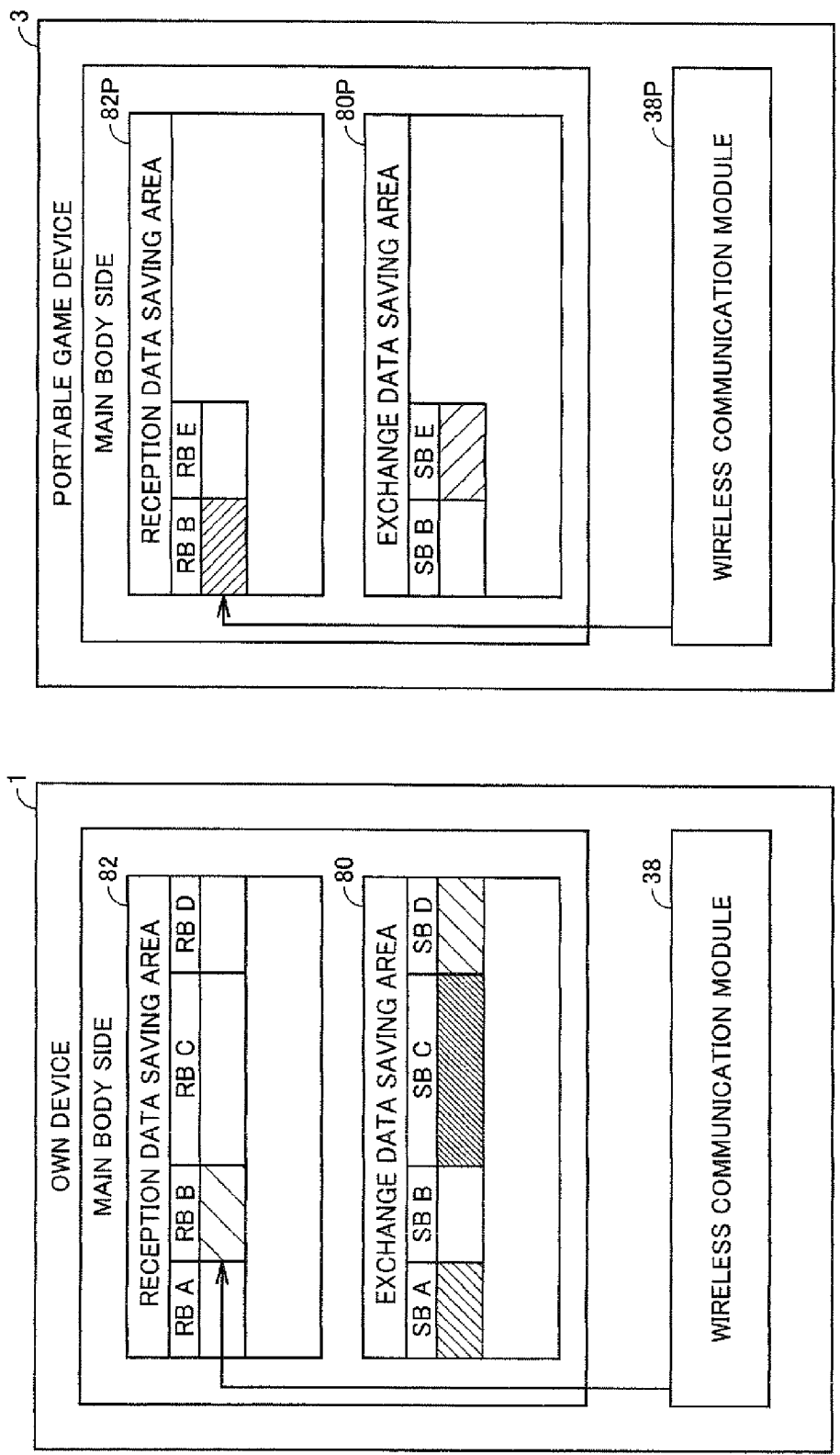
FIG. 39 is a (third) illustration representing processing for exchanging exchange data between game devices according to an embodiment of the present invention.

FIGS. 37 to 39 are diagrams illustrating processing for exchanging exchange data between game devices according to an embodiment of the present invention.

In the present example, a case where processing for giving/receiving exchange data between game device 1 and game device 3 as another game device which is a communication partner is performed will be described.

As described above, receiving a notification from wireless communication module 38 that another game device having the exchange data corresponding to the matching application ID has been found, CPU 31 (data communication carrying-out processing unit 208) performs the processing for giving/receiving data.

Referring to FIG. 37, first, data is read from a transmission BOX (exchange data saving area 80) storing the exchange data corresponding to the matching application ID and the data is copied in a transmission slot. For example, copy data is created in the transmission slot provided in main memory 32. Then, the copy data stored in the transmission slot is transmitted to game device 3 through wireless communication module 38.

In game device 3 as well, a notification that a game device having the exchange data corresponding to the matching application ID has been found is output from wireless communication module 38P to the main body, as in game device 1.

Then, on the main body side, data is read from a transmission BOX (exchange data saving area 80) storing the exchange data corresponding to the matching application ID and the data is copied in a transmission slot. The copy data stored in the transmission slot is transmitted to game device 1 through wireless communication module 38P.

Referring to FIG. 38, game device 1 obtains the exchange data transmitted from game device 3 through wireless communication module 38. Then, when the exchange data in game device 1 is transmitted and the exchange condition for receiving the exchange data in game device 3 is satisfied, the exchange data is stored in a reception BOX RBB (reception data saving area 82) provided in correspondence with the application ID.

Similarly, game device 3 obtains the exchange data transmitted from game device 1 through wireless communication module 38P. Then, when the exchange data in game device 3 is transmitted and the exchange condition for receiving the exchange data in game device 1 is satisfied, the exchange data is stored in reception BOX RBB (reception data saving area 82P) provided in correspondence with the application ID.

Then, referring to FIG. 39, in the present example, by way of example, the data stored in the transmission BOX in exchange data saving area 80 of game device 1 is erased. In the present example, data in the area corresponding to transmission BOX SBB in exchange data saving area 80 is erased.

Similarly, in the present example, by way of example, the data stored in the transmission BOX in exchange data saving area 80P of game device 3 is erased. In the present example, data in the area corresponding to transmission BOX SBB in exchange data saving area SOP is erased.

Through this processing, the exchange data that has been transmitted to the communication partner is erased and hence the exchange data exchange processing is completed.

As will be described later, exchange data is erased in such a manner that the data in the transmission BOX slot in the transmission BOX in the exchange data saving area is erased as the application using the exchange data stored in the transmission BOX is launched and executed.

Though a case where the exchange data is erased is described in the present example, the exchange data may be maintained as it is, without being erased. In that case, what takes place is not the exchange data exchange processing but giving/receiving of replicated data.

In addition, in the present example, by way of example, though a case in which one piece of exchange data corresponding to a matching application ID is subjected to the exchange processing is described, what is exchanged is not particularly limited to one piece of exchange data, and similar processing is performed on each piece of exchange data in a case where there are a plurality of pieces of exchange data corresponding to a matching application ID.

Figure 40:
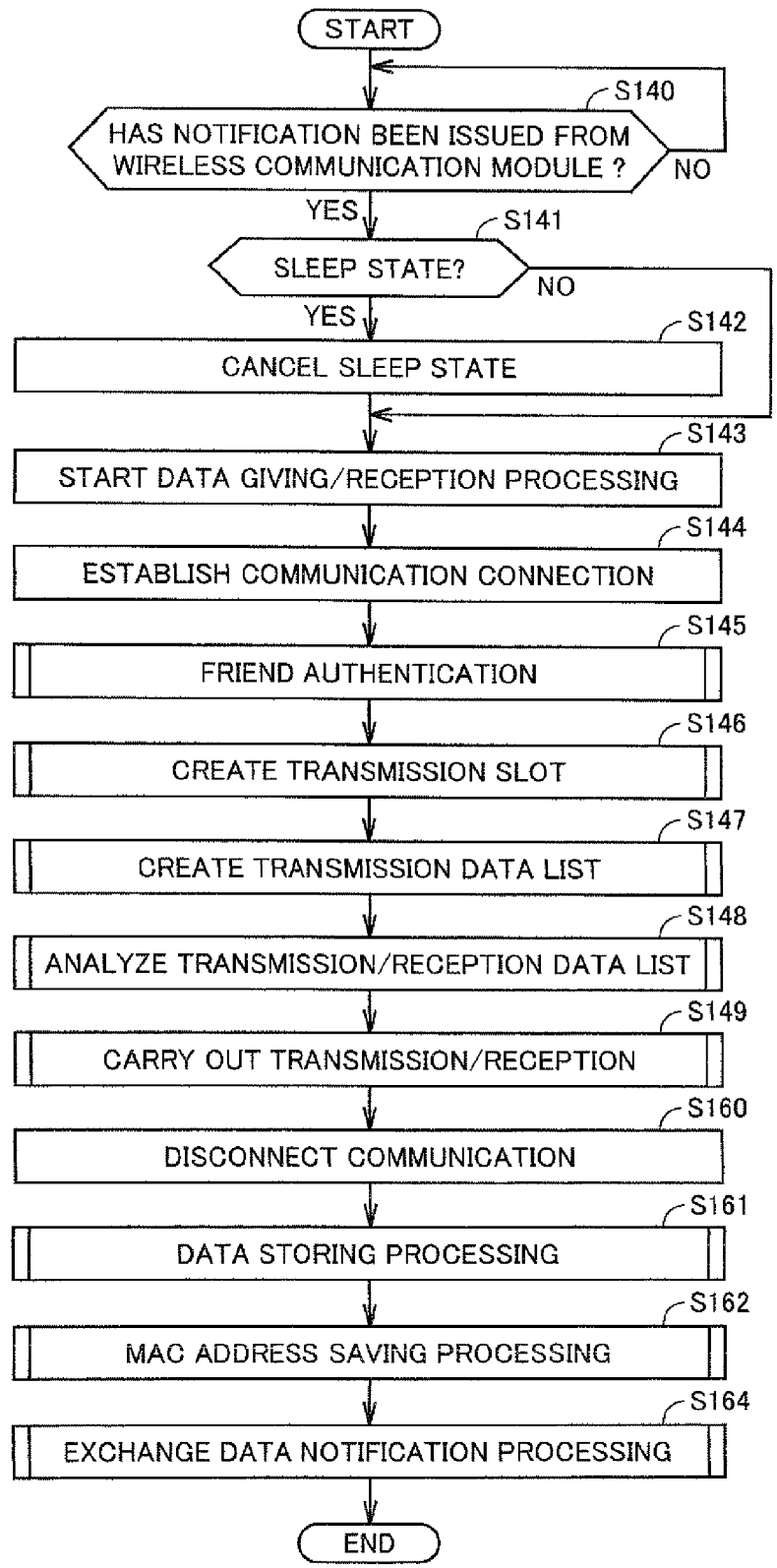
FIG. 40 is a flowchart of data transmission/reception processing according to an embodiment of the present invention.

FIG. 40 is a flowchart of data giving/receiving processing according to an embodiment of the present invention.

The data giving/receiving processing is realized by CPU 31 executing a main body function program stored in system program saving area 86 described above, by way of example. The data giving/receiving processing starts, for example, when the main body is launched and it is continuously performed in the background.

Referring to FIG. 40, first, CPU 31 (sleep setting/canceling processing unit 216) determines whether or not a notification has been issued from wireless communication module 38 (step S140).

When it is determined in step S140 that a notification has been issued from wireless communication module 38 (YES in step S140), CPU 31 (sleep setting/canceling processing unit 216) determines whether or not the function on the main body side is in the sleep state (step S141).

Then, when it is determined that the function on the main body side is in the sleep state (YES in step S141), CPU 31 (sleep setting/canceling processing unit 216) cancels the sleep state (step S142).

Then, CPU 31 (data communication carrying-out processing unit 208) starts processing for giving/receiving data (step S143). On the other hand, when it is determined that the function on the main body side is not in the sleep state (NO in step S141), the process proceeds to step S143. Hereafter, description will be given using each function of data communication carrying-out processing unit 208.

First, CPU 31 (communication connection establishment processing unit 302) establishes communication connection with a communication partner based on connection information such as a MAC address of the communication partner included in a notification from wireless communication module 38 that a game device having exchange data has been found (step S144).

In the present example, though a case where connection with a communication partner is established after a notification that a game device has been found is issued, that is, a case where CPU 31 (communication connection establishment processing unit 302) performs processing for establishing connection, is described, processing for establishing connection with a communication partner may be performed before a notification that a game device has been found is issued, for example, between step S64 and step S66 in FIG. 18 in wireless communication module 38.

Then, CPU 31 (friend authentication processing unit 304) performs friend authentication processing for determining whether the communication partner is a friend or not (step S145). Details of the friend authentication processing will be described later.

Then, CPU 31 (transmission slot creation processing unit 306) performs transmission slot creation processing for creating a transmission slot for transmitting exchange data to the communication partner (step S146). Details of the transmission slot creation processing will be described later.

Then, CPU 31 (transmission data list creation processing unit 308) performs transmission data list creation processing for creating a transmission data list based on the created transmission slot (step S147). Details of the transmission data list creation processing will be described later.

Then, CPU 31 (transmission/reception data list analysis processing unit 310) performs processing for transmitting the created transmission data list to the communication partner, determining whether the exchange data can be transmitted to the communication partner or not, receiving a transmission data list created by the communication partner, and determining whether the exchange data from the communication partner can be received or not (transmission/reception data list analysis processing) (step S148). Details of the transmission/reception data list analysis processing will be described later.

Then, CPU 31 (transmission/reception carrying-out processing unit 312) performs transmission/reception processing for actually transmitting exchange data that can be transmitted in the transmission data list and for receiving exchange data transmitted from the communication partner in the transmission data list of the communication partner (also referred to as a reception data list), based on a result of the transmission/reception data list analysis processing (step S149). Details of the processing will be described later.

Then, when the transmission/reception processing ends or when communication connection is cut off, CPU 31 (communication disconnection processing unit 316) disconnects communication (step S160).

Then, CPU 31 (data storing processing unit 210) performs processing for storing or the like the exchange data received from the communication partner (also referred to as data storing processing) (step S161). Details of the data storing processing will be described later.

Then, CPU 31 (device identification information registration processing unit 211) performs processing for storing a MAC address representing device identification information of the communication partner in MAC address list saving area 88 (MAC address saving processing) (step S162). Details of the MAC address saving processing will be described later.

Then, CPU 31 (data notification processing unit 212) performs processing for notifying the user that the exchange data has been exchanged (exchange data notification processing) (step S164). Details of the exchange data notification processing will be described later.

Each processing will be described hereinafter in detail.

<Friend Authentication Processing>

Figure 41:
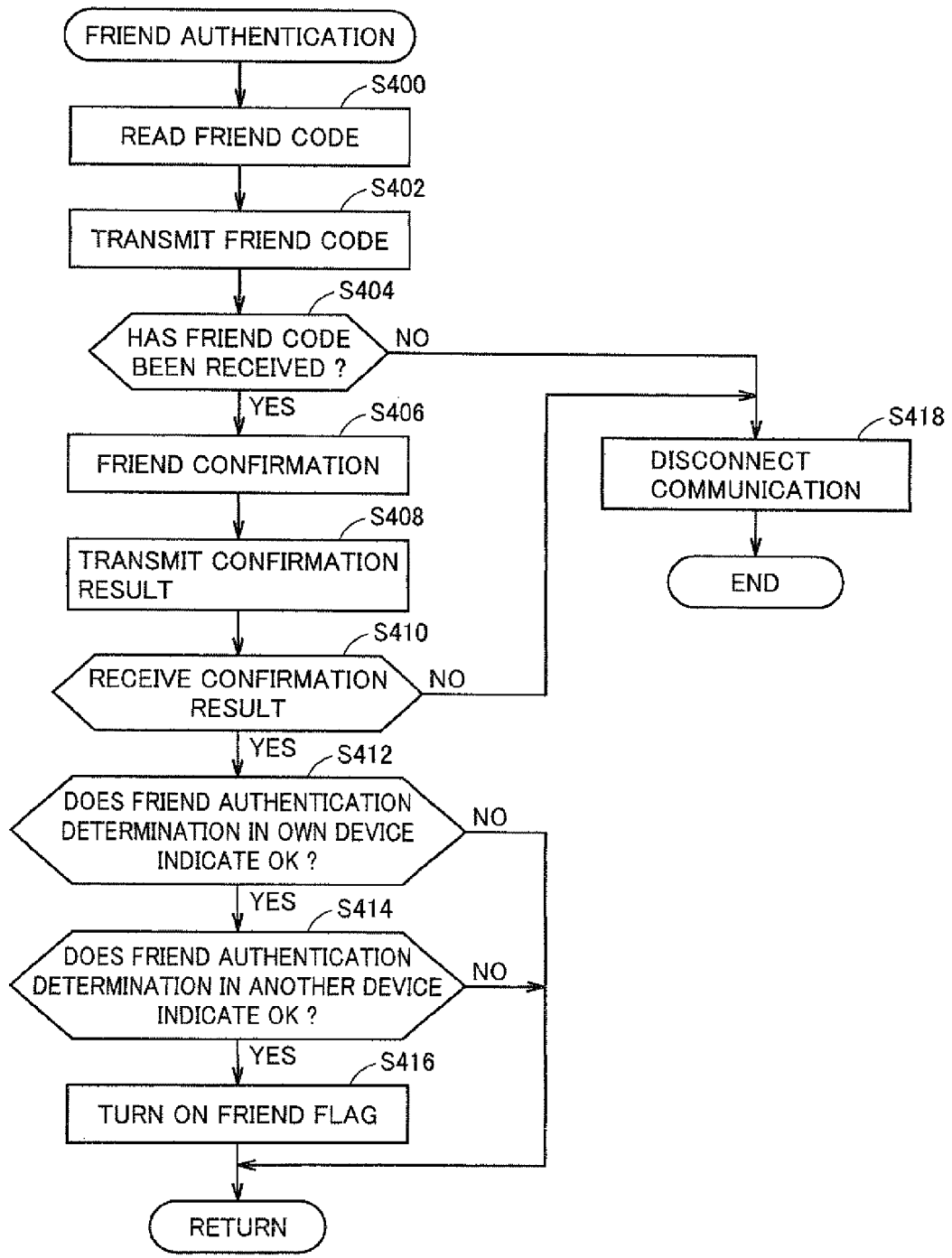
FIG. 41 is a flowchart of friend authentication processing according to an embodiment of the present invention.

FIG. 41 is a flowchart of the friend authentication processing according to an embodiment of the present invention.

Referring to FIG. 41, CPU 31 (friend authentication processing unit 304) reads a friend code (step S400). Specifically, one's own friend code stored in friend code list saving area 89 of saving data memory 34 is obtained.

Then, CPU 31 (friend authentication processing unit 304) transmits the friend code to game device 3 through wireless communication module 38 (step S402).

Then, CPU 31 (friend authentication processing unit 304) determines whether a friend code has been received from game device 3 through wireless communication module 38 or not (step S404).

Then, when CPU 31 (friend authentication processing unit 304) determines that the friend code has been received from game device 3 through wireless communication module 38 (YES in step S404), it carries out friend confirmation (step S406). Specifically, whether the received friend code has been saved in friend code list saving area 89 of saving data memory 34 or not is determined.

Then, when it is determined that the received friend code has been saved in friend code list saving area 89 of saving data memory 34, friend authentication determination as successful (OK) is made.

On the other hand, when it is determined that the received friend code has not been saved in friend code list saving area 89 of saving data memory 34, friend authentication determination as failure (NG) is made.

Then, CPU 31 (friend authentication processing unit 304) transmits a result of friend confirmation to game device 3 through wireless communication module 38 (step S408). Specifically, whether friend authentication determination indicates OK or NG is transmitted.

Then, CPU 31 (friend authentication processing unit 304) determines whether a result of friend confirmation has been received from game device 3 through wireless communication module 38 or not (step S410). Specifically, whether or not a result of confirmation indicated by friend authentication determination as OK or NG has been received from game device 3 is determined.

When it is determined that the result of friend confirmation has been received from game device 3 (YES in step S410), CPU 31 (friend authentication processing unit 304) determines whether friend authentication determination in the own device indicates OK or not (step S412).

When it is determined in step S412 that friend authentication determination indicates OK (YES in step S412), CPU 31 (friend authentication processing unit 304) determines whether friend authentication determination in another device indicates OK or not (step S414).

When it is determined that friend authentication determination in the own device and another device indicates OK (YES in step S414), CPU 31 (friend authentication processing unit 304) turns ON a friend flag (step S416). Then, the processing in friend authentication processing unit 304 ends (RETURN).

On the other hand, when it is determined that a friend code has not been received from game device 3 through wireless communication module 38 (NO in step S404), CPU 31 (friend authentication processing unit 304) determines that communication connection has been interrupted and disconnects communication (step S418).

In addition, when it is determined in step S410 that a result of friend confirmation has not been received from game device 3 through wireless communication module 38 (NO in step S410), determination that communication connection has been interrupted and communication is disconnected (step S418).

In addition, when it is determined in steps S412 and S414 that friend authentication determination in the own device does not indicate OK (NO in step S412) or friend authentication determination in another device does not indicate OK (NO in step S414), CPU 31 (friend authentication processing unit 304) ends the processing without turning ON the friend flag (RETURN).

Figure 42:
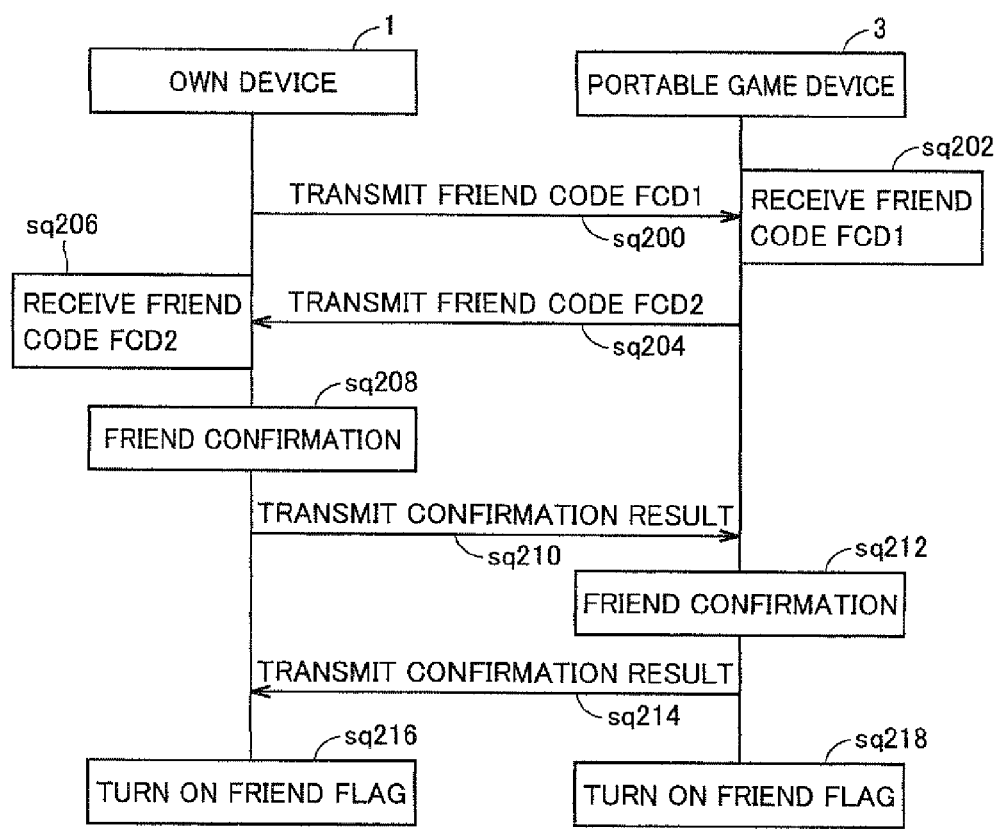
FIG. 42 is a diagram illustrating a flow of data in the friend authentication processing according to an embodiment of the present invention.

FIG. 42 is a diagram illustrating a flow of data in the friend authentication processing according to an embodiment of the present invention.

Referring to FIG. 42, initially, a friend code FCD1 is transmitted from the own device (sequence sq200). Then, game device 3 receives friend code FCD1 (sequence sq202).

Then, a friend code FCD2 is transmitted from game device 3 (sequence sq204). Then, the own device receives friend code FCD2 (sequence sq206).

Then, friend confirmation is carried out in the own device (sequence sq208). Specifically, whether or not received friend code FCD2 is stored in friend code list saving area 89 is determined. When the friend code is stored, friend authentication determination indicates success (OK), and when the friend code is not stored, friend authentication determination indicates failure (NG). Then, a result of friend confirmation is transmitted from the own device to game device 3 (sequence sq210). In addition, in game device 3, friend confirmation is carried out (sequence sq212). Specifically, whether received friend code FCD1 is stored in the friend code list saving area or not is determined. When the friend code is stored, friend authentication determination indicates success (OK), and when the friend code is not stored, friend authentication determination indicates failure (NG).

Then, the result of friend confirmation is transmitted from game device 3 to the own device (sequence sq214).

Then, when it is determined that friend authentication determination in the own device and another device indicates OK, the friend flag is turned ON on own device 1 side (sequence sq216). Similarly, when it is determined also on game device 3 side that friend authentication determination on both of game device 3 side and game device 1 side indicates OK, the friend flag is turned ON (sequence sq218).

Though the flowchart of the friend authentication processing in FIG. 41 illustrates the processing on game device 1 side, the processing on game device 3 side is different in that the processing in step S404 is performed before step S400 and the processing in step S410 is performed before step S408, however, they are otherwise identical and hence details thereof will not be repeated.

In the present example, though a case where friend authentication determination is made based on whether a friend code of game device 3 is stored in friend code list saving area 89 in the own device or not has been described, for example, such a scheme that, instead of making friend authentication determination in the own device, own device 1 is notified of a result of authentication determination made by an external authentication server or the like storing a friend code list, may also be adopted. Specifically, data is communicated with a wireless access point device connected to an external network and the own device side transmits a friend code to the authentication server connected to the network through the wireless access point device. Then, such a scheme that a result of friend authentication determination made by the authentication server is received by the own device through the wireless access point device can be adopted.

<Transmission Slot Creation Processing>

Figure 43:
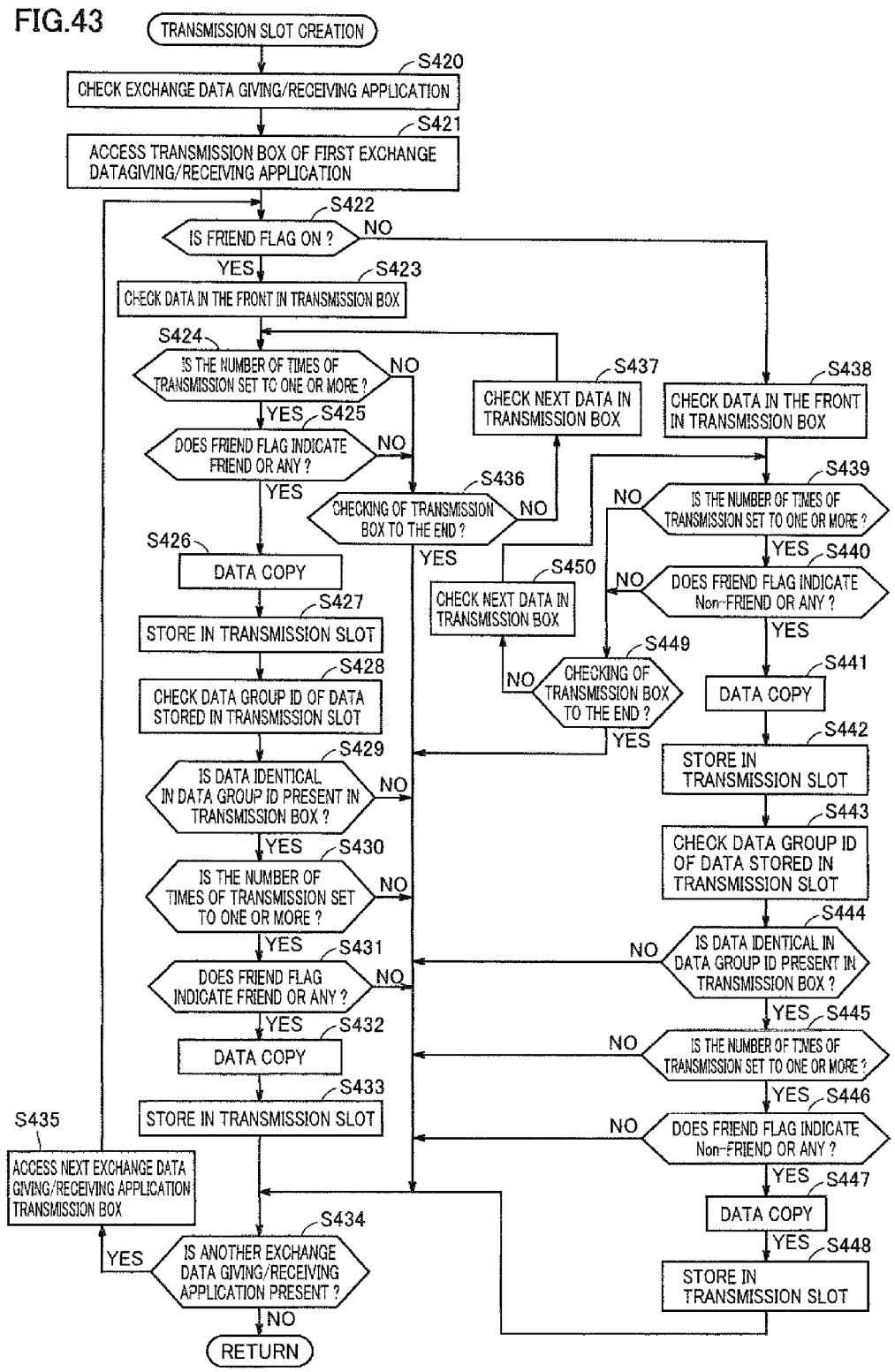
FIG. 43 is a flowchart illustrating processing for creating a transmission slot according to an embodiment of the present invention.

FIG. 43 is a flowchart illustrating processing for creating a transmission slot according to an embodiment of the present invention.

Referring to FIG. 43, CPU 31 (transmission slot creation processing unit 306) checks an application capable of giving/receiving exchange data (hereinafter also referred to as an exchange data giving/receiving application) (step S420). Specifically, all application IDs having a match flag turned ON are checked based on application ID determination on the basis of a transmission wireless frame on game device 1 side and a reception wireless frame transmitted from game device 3 described above. Since the application ID determination processing is the same as described above, detailed description thereof will not be repeated. Namely, an application capable of giving/receiving exchange data can be grasped based on matching of an application ID. Alternatively, when processing is such that an application ID of exchange data corresponding to the application program contained in internal application saving area 84 is not included in a transmission wireless frame, separately from grasp of an application based on match of an application ID through the processing above, whether or not exchange data is included in the transmission BOX corresponding to the application program contained in internal application saving area 84 is determined. When the exchange data is included, the application should only be added also to the exchange data giving/receiving application. Subsequent processing is not different between the application program stored in memory card 26 and the application program stored in internal application saving area 84, and hence description will be given without special distinction.

Figure 44:
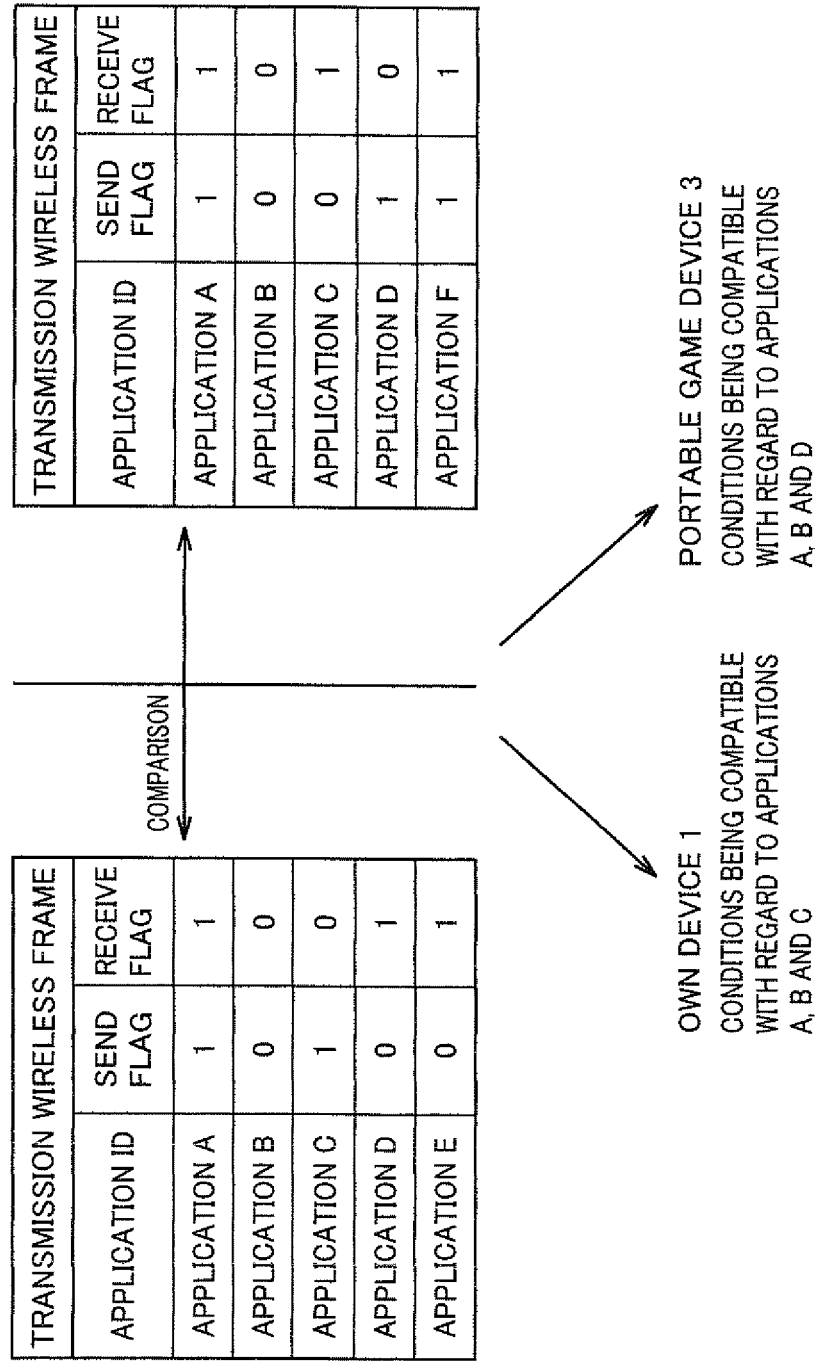
FIG. 44 is a diagram schematically illustrating processing for checking an application (also referred to as an exchange data giving/receiving application) capable of giving/receiving exchange data based on comparison of a transmission wireless frame.

FIG. 44 is a diagram schematically illustrating processing for checking an application capable of giving/receiving exchange data (also referred to as an exchange data giving/receiving application) based on comparison of a transmission wireless frame.

Referring to FIG. 44, here, a list format is shown and a case where application IDs of applications A, B, C, D, and E are stored in the transmission wireless frame on the own device side is shown. As described above, ID data IDD0 corresponding to application A is stored in the application ID and application A is identified based on the ID data, however, for the sake of brevity of illustration, description below will be given with reference to an application name instead of the ID data, which is also applicable to other applications.

In addition, transmission/reception condition data included in each application ID is shown. An application capable of giving/receiving exchange data in that case will be described.

Specifically, a case where application A has a send flag and a receive flag representing the transmission/reception condition data set to "11", which indicates that communication is permitted under any condition, is shown. In addition, a case where application B has a send flag and a receive flag representing the transmission/reception condition data set to "00", which indicates that only bidirectional communication can be carried out, is shown. A case where application C has a send flag and a receive flag representing the transmission/reception condition data set to "10", which indicates that only transmission communication can be carried out, is shown. Moreover, a case where application D has a send flag and a receive flag representing the transmission/reception condition data set to "01", which indicates that only reception communication can be carried out, is shown. A case where application E has a send flag and a receive flag representing the transmission/reception condition data set to "01", which indicates that only reception communication can be carried out, is shown.

In addition, a case where a transmission wireless frame (a reception wireless frame) on the another device side stores application IDs of applications A, B, C, D, and F is shown. Moreover, transmission/reception condition data included in each application ID is shown.

Specifically, a case where application A has a send flag and a receive flag representing the transmission/reception condition data set to "11", which indicates that communication is permitted under any condition, is shown. In addition, a case where application B has a send flag and a receive flag representing the transmission/reception condition data set to "00", which indicates that only bidirectional communication can be carried out, is shown. A case where application C has a send flag and a receive flag representing the transmission/reception condition data set to "01", which indicates that only reception communication can be carried out, is shown. Moreover, a case where application D has a send flag and a receive flag representing the transmission/reception condition data set to "10", which indicates that only transmission communication can be carried out, is shown. A case where application F has a send flag and a receive flag representing the transmission/reception condition data set to "11", which indicates that communication is permitted under any condition, is shown.

Based on application ID determination described above, an application of which application ID matches and the transmission/reception condition is compatible is determined as an application capable of giving/receiving exchange data. In the present example, in application ID determination, with regard to ID list comparison in accordance with the second algorithm, though only a case where the transmission/reception condition data matches has been discussed as the exchange condition data for the sake of brevity of illustration, an application capable of giving/receiving exchange data may be determined based on determination including other conditions such as the obtaining condition data.

By way of example, in the present example, it is assumed that, when only the transmission/reception condition data is determined, in accordance with the scheme described with reference to FIG. 30, on own device 1 side, the transmission/reception condition data is compatible with regard to applications A, B and C and they are determined as the exchange data giving/receiving applications.

Similarly, it is assumed that, on game device 3 side, the transmission/reception condition data is compatible with regard to applications A, B and D and they are determined as the exchange data giving/receiving applications.

Referring again to FIG. 43, then, CPU 31 (transmission slot creation processing unit 306) accesses the transmission BOX of the first exchange data giving/receiving application (step S421). For example, in accordance with the scheme described with reference to FIG. 44 above, when application A is the exchange data giving/receiving application, transmission BOX SBA provided in correspondence with application A is accessed.

Then, CPU 31 (transmission slot creation processing unit 306) determines whether the friend flag is ON or not (step S422). Specifically, whether or not the friend flag has been turned ON in accordance with the friend authentication processing (step S145) by friend authentication processing unit 304 in FIG. 40 is determined. Subsequent processing will be different depending on whether the friend flag is ON or not.

When CPU 31 (transmission slot creation processing unit 306) determines in step S422 that the friend flag is ON (YES in step S422), it checks the data in the front in the transmission BOX (step S423). Specifically, the data in the front stored in the transmission BOX slot is checked.

Then, CPU 31 (transmission slot creation processing unit 306) determines whether the number of times of transmission stored in the data in the front is set to one or more (step S424). As will be described later, the number of times of transmission smaller than 1, that is, the number of times of transmission being 0, means that transmission has ended and storage in the transmission slot is not carried out.

When CPU 31 (transmission slot creation processing unit 306) determines in step S424 that the number of times of transmission stored in the data in the front is set to one or more (YES in step S424), it determines whether friend flag data stored in the data indicates friend or ANY (step S425).

When CPU 31 (transmission slot creation processing unit 306) determines in step S425 that friend flag data stored in the data indicates friend or ANY (YES in step S425), it copies the data in the front in the transmission BOX (step S426). Then, CPU 31 (transmission slot creation processing unit 306) causes the transmission slot created in transmission slot saving area 90 of main memory 32 to store the copied data (step S427).

On the other hand, when CPU 31 (transmission slot creation processing unit 306) determines in step S424 that the number of times of transmission stored in the data in the front is smaller than one (NO in step S424), it determines whether checking as far as last data stored in the transmission BOX has been carried out or not (step S436).

When CPU 31 (transmission slot creation processing unit 306) determines in step S436 that checking as far as last data stored in the transmission BOX has not been carried out (NO in step S436), it checks next data in the transmission BOX (step S437). Then, the process again returns to step S424 and the similar processing is repeated. Namely, data of which number of times of transmission is set to one or more is selected.

Meanwhile, when it is determined in step S425 that the friend flag data stored in the data does not indicate friend nor ANY (NO in step S425) as well, the process proceeds to step S436.

Then, when CPU 31 (transmission slot creation processing unit 306) determines in step S436 that checking as far as last data stored in the transmission BOX has not been carried out (NO in step S436), it checks next data in the transmission BOX (step S437). Then, the process again returns to step S424 and the similar processing is repeated. Namely, data of which friend flag data indicates friend or ANY is selected.

Then, when CPU 31 (transmission slot creation processing unit 306) determines in step S436 that checking as far as last data stored in the transmission BOX has been carried out (YES in step S436), the process proceeds to step S434 because there is no data of which condition matches. Namely, in this case, data is not copied in the transmission slot.

Then, in step S428, CPU 31 (transmission slot creation processing unit 306) checks a data group ID of the data stored in the transmission slot.

Then, CPU 31 (transmission slot creation processing unit 306) determines whether data identical in data group ID is present in the transmission BOX or not (step S429).

Then, when CPU 31 (transmission slot creation processing unit 306) determines that data identical in data group ID is present in the transmission BOX (YES in step S429), it determines whether the number of times of transmission stored in the data is set to one or more (step S430).

When CPU 31 (transmission slot creation processing unit 306) then determines that the number of times of transmission is set to one or more (YES in step S430), it then determines whether friend flag data stored in the data indicates friend or ANY (step S431).

When CPU 31 (transmission slot creation processing unit 306) determines in step S431 that friend flag data stored in the data indicates friend or ANY (YES in step S431), it copies the data in the transmission BOX (step S432). Then, CPU 31 (transmission slot creation processing unit 306) causes the transmission slot to store the copied data identical in data ID group (step S433).

As a result of the processing, one piece of data in the transmission BOX (of which friend flag indicates friend or ANY) is stored in the transmission slot. Then, when the data group ID of the stored data is checked and the friend flag indicates friend or ANY also with regard to the data identical in data group ID, the data is stored in the same slot. Namely, a plurality of pieces of data stored in the transmission slot are transmitted as one piece of exchange data. In the present example, processing for grouping data having matching data group ID is also referred to as data grouping processing. Thus, creation of the transmission slot of one exchange data giving/receiving application in a case where the friend flag is ON is completed.

On the other hand, when CPU 31 (transmission slot creation processing unit 306) determines in step S429 that data identical in data group ID is not present in the transmission BOX (NO in step S429), the process proceeds to step S434. In addition, when CPU 31 (transmission slot creation processing unit 306) determines in step S430 that the number of times of transmission stored in the data is smaller than 1 (NO in step S430), the process proceeds to step S434. Moreover, when CPU 31 (transmission slot creation processing unit 306) determines in step S431 that the friend flag data stored in the data does not indicate friend nor ANY (NO in step S431), the process proceeds to step S434.

Meanwhile, when CPU 31 (transmission slot creation processing unit 306) determines in step S422 that the friend flag is not ON (NO in step S422), it then checks the data in the front in the transmission BOX (step S438). Specifically, the data in the front stored in the transmission BOX slot is checked.

Then, CPU 31 (transmission slot creation processing unit 306) determines whether or not the number of times of transmission stored in the data in the front is set to one or more (step S439). As will be described later, the number of times of transmission smaller than 1, that is, the number of times of transmission being 0, means that transmission has ended and storage in the transmission slot is not carried out.

When CPU 31 (transmission slot creation processing unit 306) determines in step S439 that the number of times of transmission stored in the data in the front is set to one or more (YES in step S439), it then determines whether friend flag data stored in the data indicates non-friend or ANY (step S440).

When CPU 31 (transmission slot creation processing unit 306) determines in step S440 that friend flag data stored in the data indicates non-friend or ANY (YES in step S440), it copies the data in the front in the transmission BOX (step S441). Then, CPU 31 (transmission slot creation processing unit 306) causes the transmission slot to store the copied data (step S442).

On the other hand, when CPU 31 (transmission slot creation processing unit 306) determines in step S439 that the number of times of transmission stored in the data in the front is smaller than one (NO in step S439), it determines whether checking as far as last data stored in the transmission BOX has been carried out or not (step S449).

When CPU 31 (transmission slot creation processing unit 306) determines in step S449 that checking as far as last data stored in the transmission BOX has not been carried out (NO in step S449), it checks next data in the transmission BOX (step S450). Then, the process again returns to step S439 and the similar processing is repeated. Namely, data of which number of times of transmission is set to one or more is selected.

Meanwhile, when it is determined in step S440 that the friend flag data stored in the data does not indicate non-friend nor ANY (NO in step S440) as well, the process proceeds to step S449.

Then, when CPU 31 (transmission slot creation processing unit 306) determines in step S449 that checking as far as last data stored in the transmission BOX has not been carried out (NO in step S449), it checks next data in the transmission BOX (step S450). Then, the process again returns to step S439 and the similar processing is repeated. Namely, data of which friend flag data indicates non-friend or ANY is selected.

When CPU 31 (transmission slot creation processing unit 306) determines in step S449 that checking as far as last data stored in the transmission BOX has been carried out (YES in step S449), the process proceeds to step S434 because there is no data of which condition matches, Namely, in this case, data is not copied in the transmission slot.

Then, in step S443, CPU 31 (transmission slot creation processing unit 306) checks a data group ID of the data stored in the transmission slot.

Then, CPU 31 (transmission slot creation processing unit 306) determines whether data identical in data group ID is present in the transmission BOX or not (step S444).

Then, when CPU 31 (transmission slot creation processing unit 306) determines that data identical in data group ID is present in the transmission BOX (YES in step S444), it determines whether the number of times of transmission stored in the data is set to one or more (step S445).

When CPU 31 (transmission slot creation processing unit 306) determines that the number of times of transmission is set to one or more (YES in step S445), it then determines whether friend flag data stored in the data indicates non-friend or ANY (step S446).

When CPU 31 (transmission slot creation processing unit 306) determines in step S446 that friend flag data stored in the data indicates non-friend or ANY (YES in step S446), it copies the data in the transmission BOX (step S447). Then, CPU 31 (transmission slot creation processing unit 306) causes the transmission slot to store the copied data identical in data ID group (step S448).

As a result of the processing, one piece of data in the transmission BOX (of which friend flag indicates non-friend or ANY) is stored in the transmission slot. Then, when the data group ID of the stored data is checked and the friend flag indicates non-friend or ANY also with regard to the data identical in data group ID, the data is stored in the same slot. Namely, a plurality of pieces of data stored in the transmission slot are transmitted as one piece of exchange data. As a result of this processing, creation of the transmission slot of one exchange data giving/receiving application in a case where the friend flag is not ON is completed.

On the other hand, when CPU 31 (transmission slot creation processing unit 306) determines in step S444 that data identical in data group ID is not present in the transmission BOX (NO in step S444), the process proceeds to step S434. In addition, when CPU 31 (transmission slot creation processing unit 306) determines in step S445 that the number of times of transmission stored in the data is smaller than 1 (NO in step S445), the process proceeds to step S434. Moreover, when CPU 31 (transmission slot creation processing unit 306) determines in step S446 that the friend flag data stored in the data does not indicate non-friend nor ANY (NO in step S446), the process proceeds to step S434

Then, CPU 31 (transmission slot creation processing unit 306) determines whether another exchange data giving/receiving application is present or not (step S434).

When CPU 31 (transmission slot creation processing unit 306) determines in step S434 that another exchange data giving/receiving application is present, it accesses the transmission BOX of a next exchange data giving/receiving application (step S435). For example, in accordance with the scheme described with reference to FIG. 44 above, in a case where application B is the next exchange data giving/receiving application, transmission BOX SBB provided in correspondence with application B is accessed. Then, the process returns to step S422 and similar processing is repeated.

By repeating the processing, the transmission BOX is accessed for all exchange data giving/receiving applications and thus the transmission slot creation processing is performed.

Figure 45:
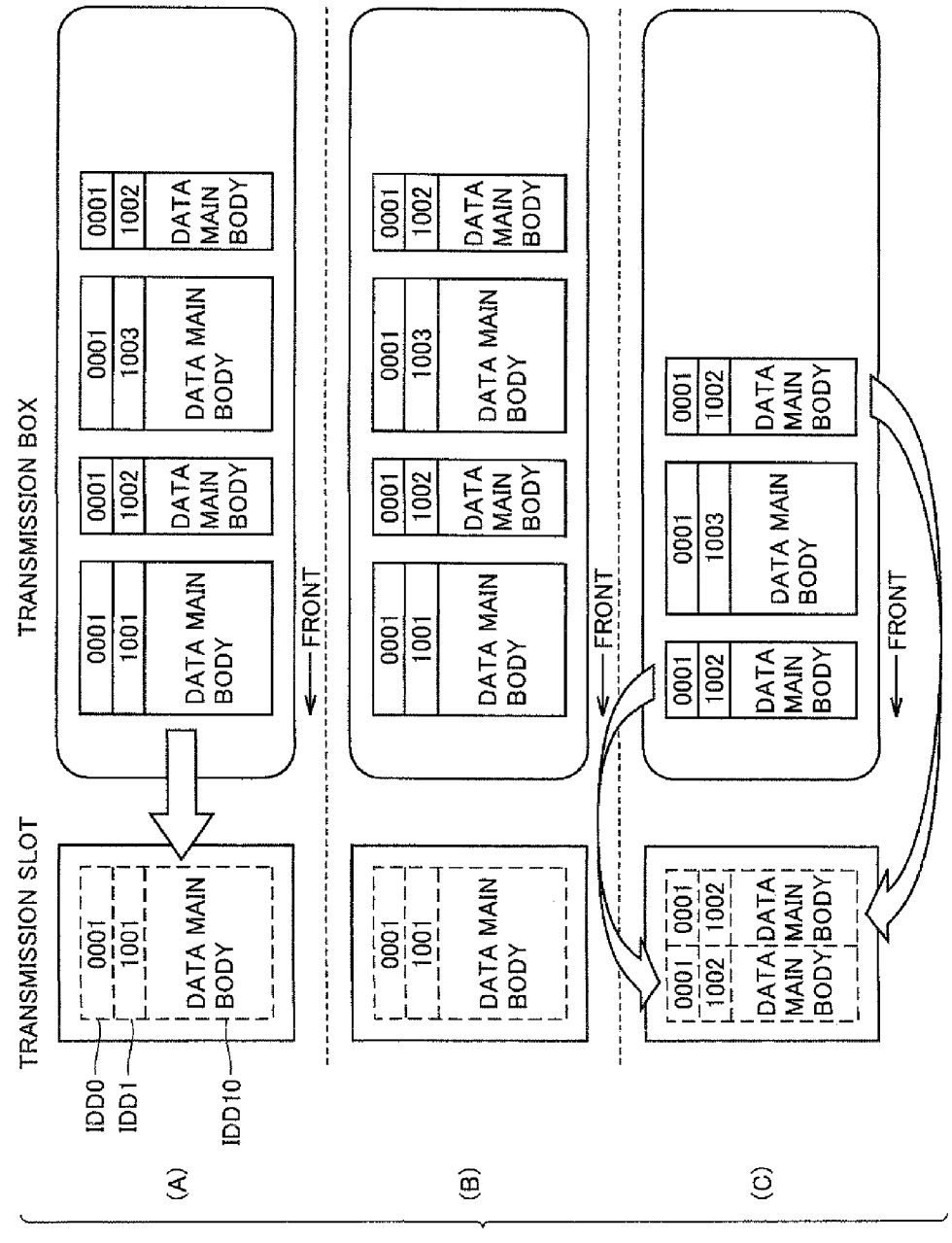
FIG. 45 is a conceptual diagram of creation of a transmission slot according to an embodiment of the present invention.

FIG. 45 is a conceptual diagram of creation of a transmission slot according to an embodiment of the present invention.

Referring to FIG. 45, here, a case where four pieces of data are stored in the transmission BOX is shown. Specifically, data constituted of ID data IDD0, data group ID IDD1 and data main body IDD10 is shown. The second data and the fourth data are identical in value of the data group ID, and other pieces of data have different data group IDs set.

For the sake of brevity of illustration, it is assumed that a friend flag will not be considered here. In addition, it is also assumed that data of which number of times of transmission is set to one or more is stored.

In accordance with the processing above, initially, FIG. 45(A) shows a case where data in the front (at the left end) in the transmission BOX is checked and the first data is stored in the transmission slat.

Then, whether data identical in data group ID is stored in the transmission BOX or not is determined. Since data identical in data group ID is not stored in the transmission BOX, creation of the transmission slot is completed as shown in FIG. 45(B).

Meanwhile, a case where three pieces of data are stored in the transmission BOX after the exchange data stored in the created transmission slot was transmitted in FIG. 45(B) is shown in FIG. 45(C) by way of example here.

Similarly to the processing above, initially, the data in the front in the transmission BOX is checked and the first data is stored in the transmission slot. Then, whether data identical in data group ID is stored in the transmission BOX or not is determined. Since the third data identical in data group ID is stored in the transmission BOX, the data is stored in the transmission slot and creation of the transmission slot is completed.

Here, data grouping processing based on the data group ID has been described. Data grouping processing based on the friend flag will now be described.

Figure 46:
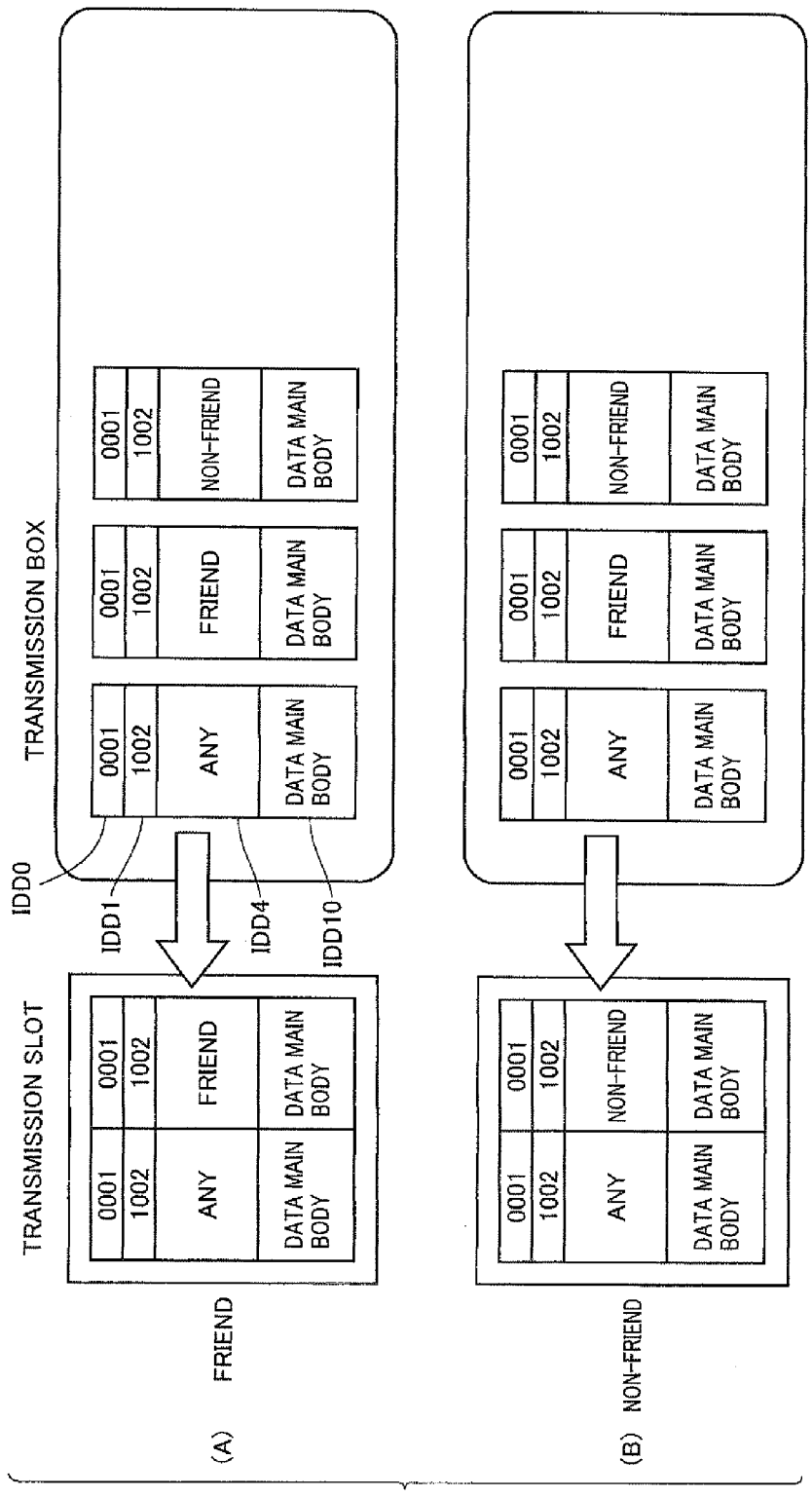
FIG. 46 is another conceptual diagram of creation of a transmission slot according to an embodiment of the present invention.

FIG. 46 is another conceptual diagram of creation of a transmission slot according to an embodiment of the present invention.

Referring to FIG. 46, here, a case where three pieces of data are stored in the transmission BOX is shown. Specifically, data constituted of ID data IDD0, data group ID IDD1, friend flag data IDD4, and data main body IDD10 is shown.

Specifically, three pieces of data common in ID data IDD0 and data group ID IDD1 and different from one another in friend flag data IDD4 are shown. For the sake of brevity of illustration, it is assumed that data of which number of times of transmission is set to one or more is stored.

Initially, a case where the friend flag is ON (friend) will be described. In accordance with the processing above, initially, the data in the front (at the left end) in the transmission BOX is checked. Since the data at the left end has friend flag indicating ANY, initially, it is first stored in the transmission slot. Then, whether data identical in data group ID is stored in the transmission BOX or not is determined, and it is determined that data identical in data group ID is stored in the transmission BOX. Then, with regard to the data identical in data group ID, whether data of which friend flag is set to friend or ANY is stored in the transmission BOX or not is further determined. Since the friend flag of the second data is set to friend, it is further stored in the transmission slot and creation of the transmission slot is completed.

In addition, a case where the friend flag is not ON (non-friend) will be described. In accordance with the processing above, initially, the data in the front (at the left end) in the transmission BOX is checked. Since the data at the left end has the friend flag set to ANY, initially, it is first stored in the transmission slot. Then, whether data identical in data group ID is stored in the transmission BOX or not is determined, and it is determined that data identical in data group ID is stored in the transmission BOX. Then, with regard to the data identical in data group ID, whether data of which friend flag is set to non-friend or ANY is stored in the transmission BOX or not is further determined. Since the friend flag of the third data is set to non-friend, it is further stored in the transmission slot and creation of the transmission slot is completed.

Therefore, by using the friend flag, the transmission slot can be created in the data grouping processing, with exchange data for friend and exchange data for non-friend being distinguished from each other.

Figure 47:
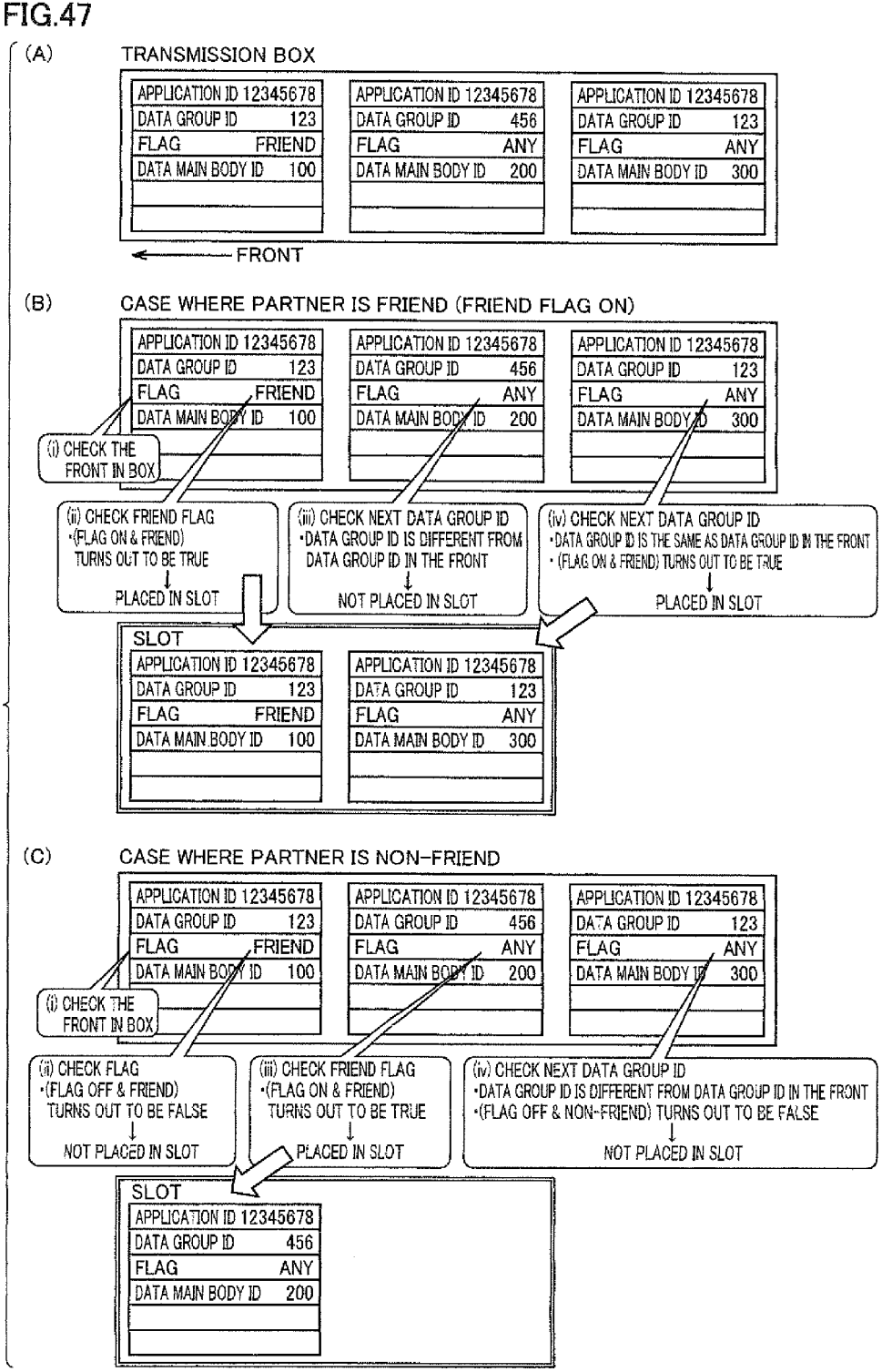
FIG. 47 is a diagram illustrating a specific example of creation of a transmission slot according to an embodiment of the present invention.

FIG. 47 is a diagram illustrating a specific example of creation of a transmission slot according to an embodiment of the present invention.

Referring to FIG. 47(A), here, a case where three pieces of data are stored in the transmission BOX is shown.

Specifically, an application ID common to the three pieces of data is "12345678". In addition, the front and third data have a data group ID "123" and the second data has a data group ID "456". Further, the front data has friend flag data indicating "friend" and the second and third friend flag data indicate "ANY". Moreover, a case where the first to third data main bodies are different from one another and hence data main body IDs of "100", "200" and "300" are allotted respectively is shown.

Referring to FIG. 47(B), here, a flow of creation of a transmission slot in a case where a partner is a friend is shown.

Initially, (i) data in the front in the transmission BOX is checked (check). (ii) Then, the friend flag is checked (check). In the present example, since the flag is ON and the friend flag indicates friend, a condition is satisfied (TRUE). Therefore, the data is placed in the transmission slot. (iii) A next data group ID is checked (check). The data group ID is different from that of the front data. Therefore, data is not placed in the transmission slot. (iv) A next data group ID is checked (check). The data group ID is the same as that of the front data.

Namely, a condition is satisfied (TRUE). Therefore, the data is placed in the transmission slot.

Referring to FIG. 47(C), here, a flow of creation of a transmission slot in a case where a partner is a non-friend is shown.

Initially, (i) data in the front in the transmission. BOX is checked (check). (ii) Then, the friend flag is checked (check). In the present example, since the flag is OFF and the friend flag indicates friend, a condition is not satisfied (FALSE). Therefore, the data is not placed in the transmission slot. (iii) The friend flag of next data is checked (check). In the present example, since the flag is OFF and the friend flag indicates ANY, a condition is satisfied (TRUE). Therefore, the data is placed in the transmission slot. (iv) A next data group ID is then checked (check). The data group ID is different from that of the second data. Therefore, the data is not placed in the transmission slot.

Figure 48:
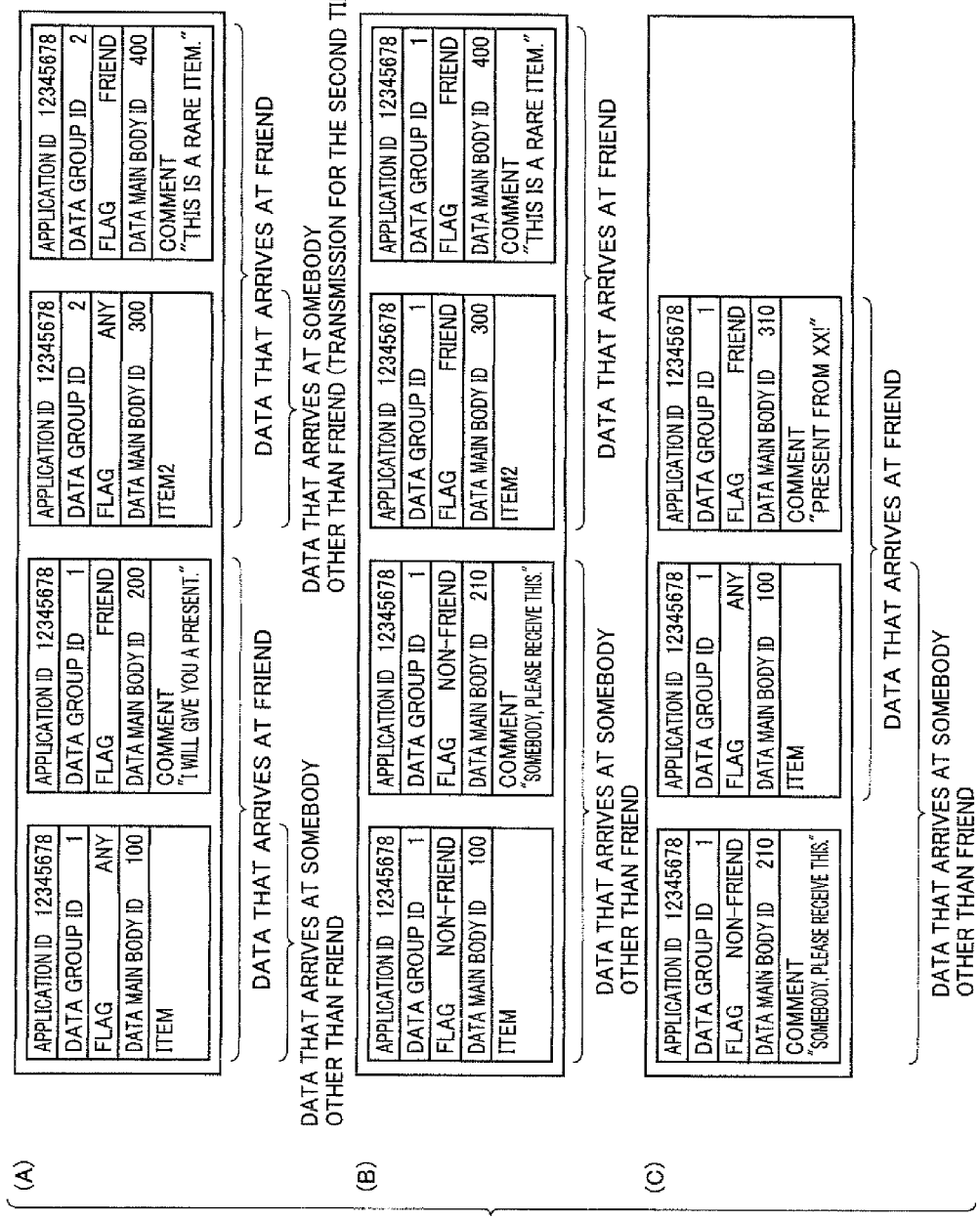
FIG. 48 is a diagram illustrating relation between data stored in a transmission BOX and a friend according to an embodiment of the present invention.

FIG. 48 is a diagram illustrating relation between the data stored in the transmission BOX and a friend according to an embodiment of the present invention.

Referring to FIG. 48(A), here, a case where four pieces of data are stored in the transmission BOX is shown.

Specifically, an application ID common to the four pieces of data is "12345678". In addition, the front and second data have a data group ID "1" and the third and fourth data have a data group ID "2". Further, the front and third data have friend flag data indicating "ANY" and the second and fourth friend flag data indicate "friend". Moreover, a case where the first to fourth data main bodies are different from one another and hence data main body IDs of "100", "200", "300", and "400" are allotted respectively is shown. The first data main body is assumed to store data on an item. In addition, the second data main body is assumed to store comment data "I will give you a present," The third data main body is assumed to store data on an item 2. Further, the fourth data main body is assumed to store comment data "this is a rare item."

When the friend flag is ON (friend), the first and second data are stored in the transmission slot. After the first and second data are transmitted from the transmission slot, the third and fourth data are stored in the transmission slot for transmission for the second time. Therefore, in accordance with the scheme, in transmission of an item, an item to which comments have been added can be transmitted to friend.

On the other hand, when the friend flag is OFF (non-friend), the first data is stored in the transmission slot. After the first data is transmitted from the transmission slot, the third data is stored in the transmission slot for transmission for the second time. Therefore, in accordance with the scheme, in transmission of an item, an item to which comments are not added can be transmitted to non-friend. Namely, when an item is transmitted depending on whether a partner is friend or non-friend, addition of comments can be changed and zest in data exchange is enhanced.

Referring to FIG. 48(B), here, a case where four pieces of data are stored in the transmission BOX is shown.

Specifically, an application ID common to the four pieces of data is "12345678". In addition, the four pieces of data have a common data group ID "1". Further, the front and second data have friend flag data indicating "non-friend" and the third and fourth friend flag data indicate "friend". Moreover, a case where the first to fourth data main bodies are different from one another and hence data main body IDs of "100", "210" "300", and "400" are allotted respectively is shown. The first data main body is assumed to store data on an item. In addition, the second data main body is assumed to store comment data "somebody, please receive this." The third data main body is assumed to store data on an item 2. Further, the fourth data main body is assumed to store comment data "this is a rare item."

When the friend flag is ON (friend), the third and fourth data are stored in the transmission slot. Therefore, in accordance with the scheme, in transmission of an item, item 2 can be transmitted to friend, together with comments.

On the other hand, when the friend flag is OFF (non-friend), the first and second data are stored in the transmission slot. Therefore, in accordance with the scheme, in transmission of an item, an item 1 can be transmitted to non-friend, together with comments. Namely, a type of an item to be transmitted can be changed depending on whether a partner is friend or non-friend, and hence zest in data exchange is enhanced.

Referring to FIG. 48(C), here, a case where three pieces of data are stored in the transmission BOX is shown.

Specifically, an application ID common to the three pieces of data is "12345678". In addition, the three pieces of data have a common data group ID "1". Further, the front data has friend flag data indicating "non-friend", the second friend flag data indicates "ANY", and the third friend flag data indicates "friend". Moreover, a case where the first to third data main bodies are different from one another and hence data main body IDs of "210", "100" and "310" are allotted respectively is shown. The first data main body is assumed to store comment data "somebody, please receive this." The second data main body is assumed to store data on an item. Further, the third data main body is assumed to store comment data "present from XX!"

When the friend flag is ON (friend), the second and third data are stored in the transmission slot. Therefore, in accordance with the scheme, in transmission of an item, comments "present from XX!" can be added.

On the other hand, when the friend flag is OFF (non-friend), the first and second data are stored in the transmission slot. Therefore, in accordance with the scheme, in transmission of an item, comments "somebody, please receive this" can be added. Namely, an item to be transmitted and contents in added comments can be changed depending on whether a partner is friend or non-friend, and hence zest in data exchange with appropriate comments being added is enhanced.

<Transmission Data List Creation Processing>

Figure 49:
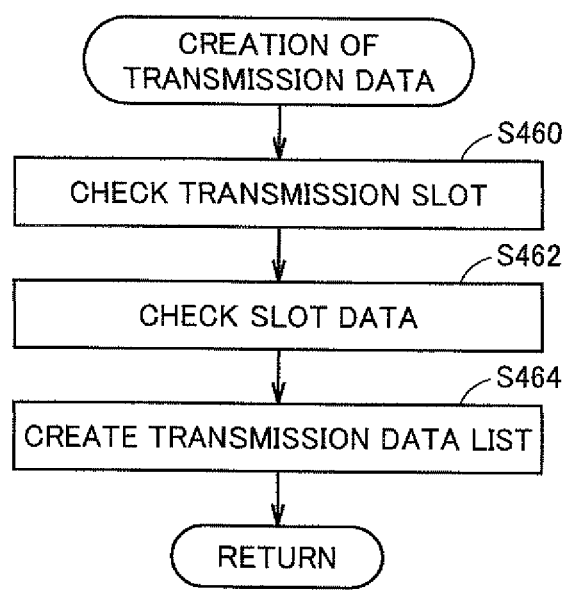
FIG. 49 is a flowchart illustrating processing for creating a transmission data list according to an embodiment of the present invention.

FIG. 49 is a flowchart illustrating processing for creating a transmission data list according to an embodiment of the present invention.

Referring to FIG. 49, CPU 31 (transmission data list creation processing unit 308) checks the transmission slot (step S460). Specifically, the transmission slot for each exchange data giving/receiving application created by transmission slot creation processing unit 306 and saved in transmission slot saving area 90 is checked.

Then, CPU 31 (transmission data list creation processing unit 308) checks data in each transmission slot (step S462). Specifically, ID data, transmission/reception condition data, a data size, or the like of each piece of data stored in the transmission slot is checked.

Then, CPU 31 (transmission data list creation processing unit 308) creates the transmission data list (step S464). Then, the process ends (RETURN).

FIG. 50 is a diagram illustrating the transmission data list according to an embodiment of the present invention.

In the present example, a case where applications A, B and C are exchange data giving/receiving applications on the own device side will be described based on comparison in FIG. 44.

In addition, a case where applications A, B and D are exchange data giving/receiving applications on game device 3 side will be described.

As shown in FIG. 50(A), here, the transmission data list on the own device side is shown.

Specifically, pieces of transmission/reception condition data corresponding to respective applications A, B and C and data sizes stored in the transmission slots provided in correspondence with respective applications A, B and C are stored. In addition, a flag field indicating whether game device 3 can receive exchange data or not is provided.

As shown in FIG. 50(B), here, the transmission data list on game device 3 side is shown.

Specifically, pieces of transmission/reception condition data corresponding to respective applications A, B and D and data sizes stored in the transmission slots provided in correspondence with respective applications A, B and D are stored. In addition, a flag field indicating whether own device 1 can receive exchange data or not is provided.

The transmission data list created on the own device side is transmitted to game device 3 side. Then, whether exchange data listed in the transmission data list can be received on game device 3 side or not is determined, and a result is written in the flag field for reply.

Similarly, the transmission data list created on game device 3 side (also referred to as the reception data list, from a point of view of the own device side) is transmitted. Then, whether exchange data listed in the reception data list can be received on the own device side or not is determined, and a result is written in the flag field for reply.

<Transmission/Reception Data List Analysis Processing>

Figure 51:
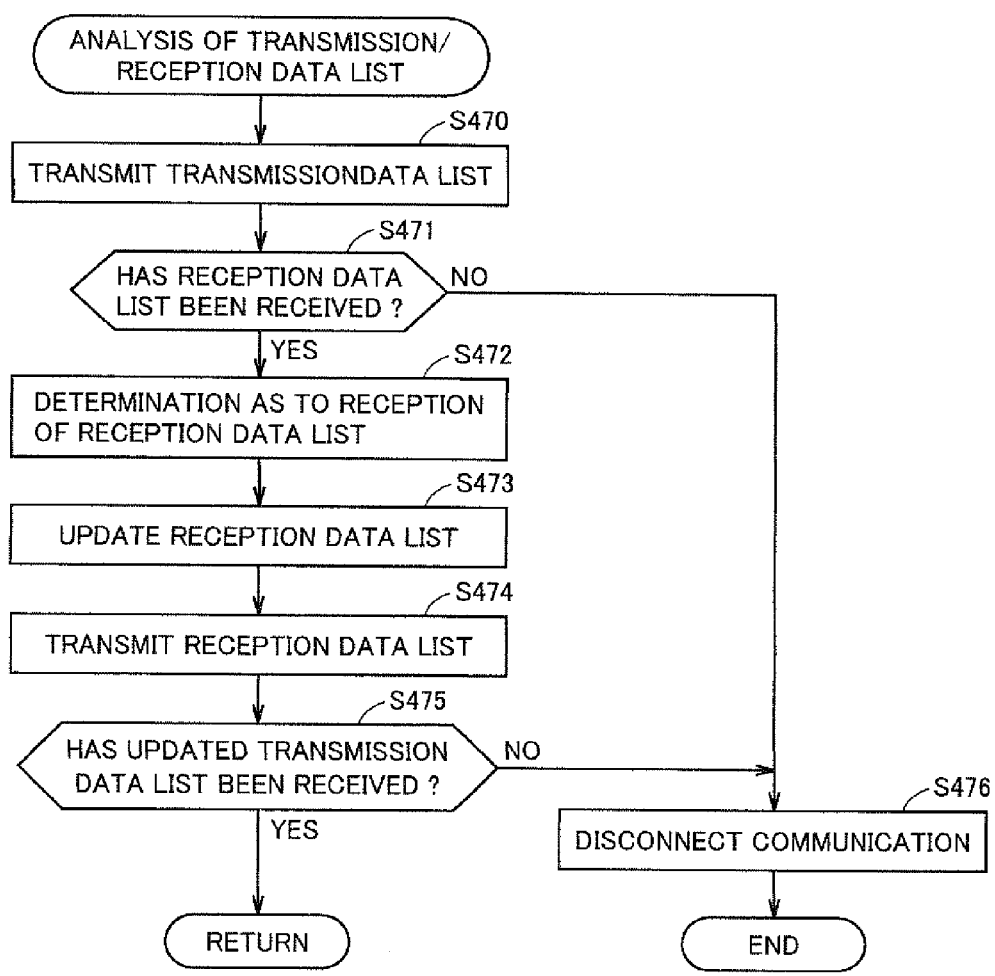
FIG. 51 is a flowchart illustrating transmission/reception data list analysis processing according to an embodiment of the present invention.

FIG. 51 is a flowchart illustrating the transmission/reception data list analysis processing according to an embodiment of the present invention.

Referring to FIG. 51, CPU 31 (transmission/reception data list analysis processing unit 310) transmits the transmission data list created in transmission data list creation processing unit 308 (step S470). In the present example, the transmission data list is transmitted to game device 3.

Then, CPU 31 (transmission/reception data list analysis processing unit 310) determines whether the reception data list has been received or not (step S471). Specifically, whether the transmission data list created by game device 3 which is a communication partner and transmitted thereby (reception data list) has been received or not is determined.

Then, when it is determined that the reception data list has been received (YES in step S471), CPU 31 (transmission/reception data list analysis processing unit 310) makes determination as to reception of the reception data list (step S472). Specifically, whether the exchange data listed in the reception data list and transmitted from game device 3 can be received or not is determined.

As described above, a capacity of a reception BOX and the number of pieces of data that can be received are defined for each application, and data exceeding the capacity of the reception BOX or the number of pieces of data that can be received cannot be received.

Therefore, whether the data can be received or not is determined by checking the size of exchange data listed in the reception data list as well as the capacity of the reception BOX and the number of pieces of data that can be received, of the corresponding application.

Then, CPU 31 (transmission/reception data list analysis processing unit 310) performs processing for updating the reception data list (step S473).

Specifically, when it is determined that the data can be received, CPU 31 (transmission/reception data list analysis processing unit 310) performs processing for adding an OK determination flag to the flag field in the reception data list. On the other hand, when it is determined that the data cannot be received, processing for adding an NG determination flag to the flag field in the reception data list is performed.

Then, CPU 31 (transmission/reception data list analysis processing unit 310) transmits the updated reception data list (step S474). In the present example, the reception data list is transmitted (returned) to game device 3.

Then, CPU 31 (transmission/reception data list analysis processing unit 310) determines whether the updated transmission data list has been received or not (step S475). Processing similar to that on the own device side is performed also on game device 3 side. Namely, whether the data can be received or not is determined by checking the size of exchange data listed in the transmission data list as well as the capacity of the reception BOX and the number of pieces of data that can be received, of the corresponding application. Then, the updated transmission data list, with the OK determination flag or the NG determination flag being added to the flag field in the transmission data list transmitted from the own device, is returned.

Then, when CPU 31 (transmission/reception data list analysis processing unit 310) determines that the updated transmission data list has been received (YES in step S475), the process ends (RETURN).

On the other hand, when it is determined in step S471 that the reception data list has not been received (NO in step S471) or when the updated transmission data list has not been received (NO in step S475), CPU 31 (transmission/reception data list analysis processing unit 310) determines that communication has been cut off and disconnects communication connection (step S476). Then, the process ends (END).

Figure 52:
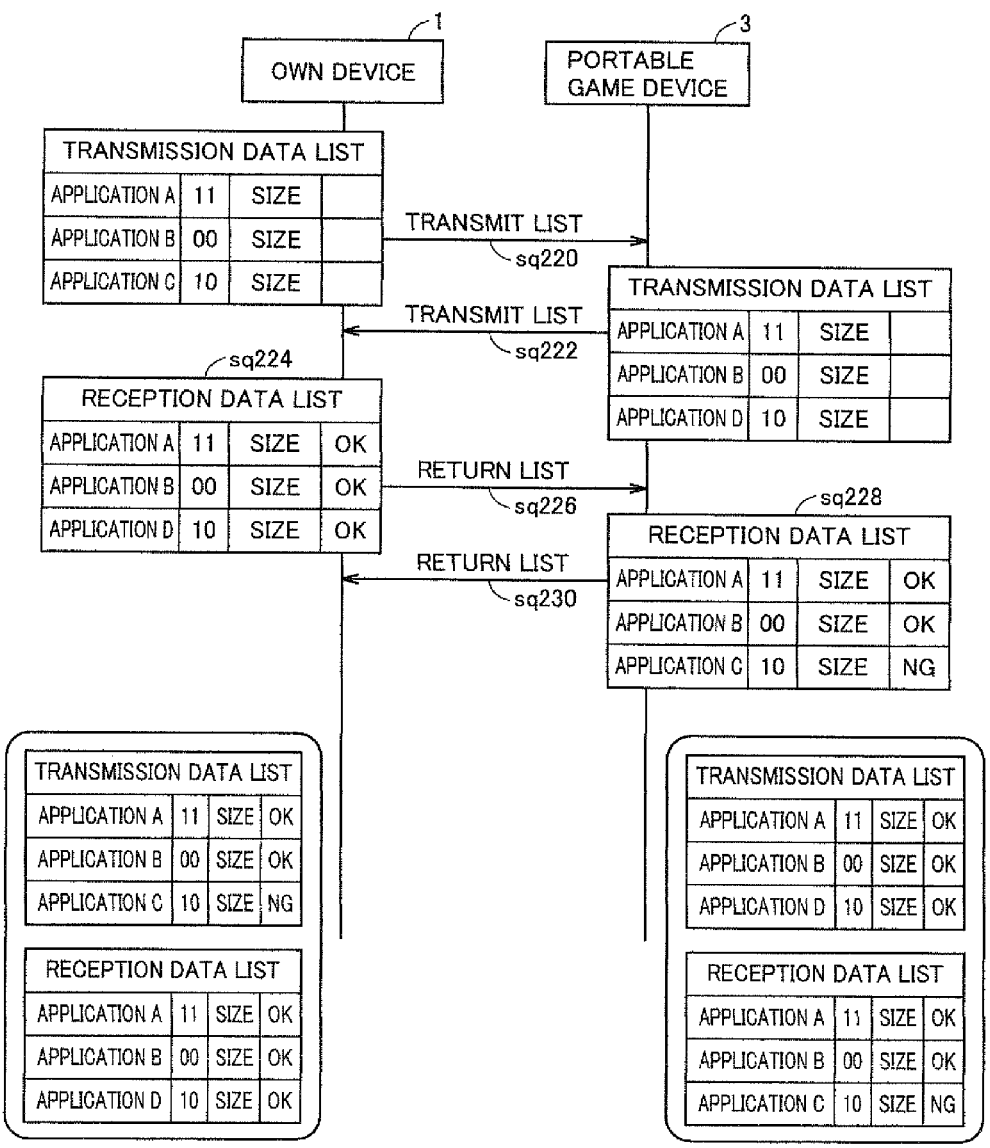
FIG. 52 is a diagram illustrating a flow of transmission/reception of the transmission/reception data list according to the present embodiment.

FIG. 52 is a diagram illustrating a flow of transmission/reception of the transmission/reception data list according to the present embodiment.

Referring to FIG. 52, the created transmission data list is transmitted from the own device side (sequence sq220). In addition, the created transmission data list is transmitted from game device 3 side (sequence sq222).

Then, on the own device side, the transmission data list transmitted from game device 3 (reception data list) is analyzed, whether the listed exchange data can be received or not is determined, and the reception data list is updated (sequence sq224).

In the present example, a case where applications A, B and D each have the OK determination flag indicating that reception can be made added to the flag field is shown by way of example.

Then, the updated reception data list is returned (sequence sq226).

In addition, on game device 3 side, the transmission data list transmitted from the own device side is analyzed, whether the listed exchange data can be received or not is determined, and the reception data list is updated (sequence sq228). In the present example, a case where applications A and B each have the OK determination flag indicating that reception can be made added to the flag field but application C has the NG determination flag indicating that reception cannot be made added is shown by way of example.

Then, the updated reception data list is returned (sequence sq230).

As a result of the processing, on the own device side, the transmission data list updated on game device 3 side is received, and whether or not to actually transmit/receive exchange data can be determined in accordance with the OK determination flag or the NG determination flag written in the flag field in the transmission data list.

In the present example, it is determined in accordance with the transmission data list that transmission of applications A and B is permitted but transmission of application C is not permitted.

In addition, by receiving the reception data list created by game device 3 and writing whether reception can be made or not in the flag field for reply on the own device side, exchange data actually transmitted from game device 3 can be grasped.

In the present example, it can be grasped that exchange data of applications A, B and D is transmitted from game device 3 and received on the own device side in accordance with the reception data list.

This is also applicable to game device 3 side.

Specifically, on game device 3 side, it is determined that transmission of applications A, B and D is permitted in accordance with the transmission data list.

In addition, in can be grasped in accordance with the reception data list that the exchange data of applications A and B is transmitted from the own device side and received, however, the exchange data of application C is not transmitted from the own device side (because reception cannot be made).

<Transmission/Reception Carrying-Out Processing>

Figure 53:
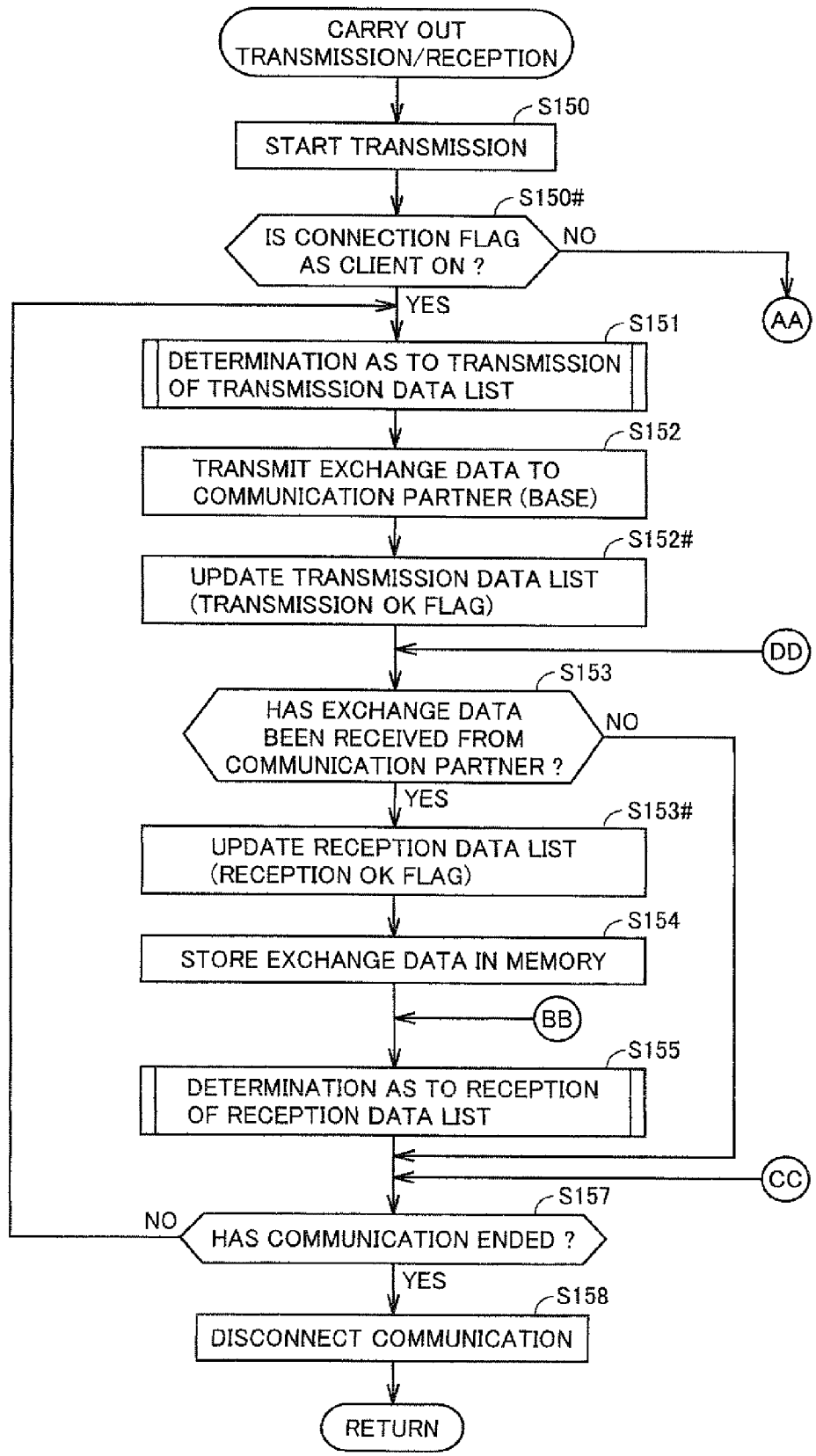
FIG. 53 is a flowchart illustrating transmission/reception carrying-out processing according to an embodiment of the present invention.

FIG. 53 is a flowchart illustrating transmission/reception carrying-out processing according to an embodiment of the present invention.

The transmission/reception carrying-out processing in the present example is mainly performed by transmission/reception carrying-out processing unit 312 in FIG. 8, however, transmission data list transmission determination processing (step S151) and reception data list reception determination processing (step S155) which will be described later are processing performed by data list determination unit 314 in FIG. 8. In addition, processing for determining whether communication has ended or not in step S157 and disconnecting communication in step S158 is processing performed by communication disconnection processing unit 316 in FIG. 8.

Referring to FIG. 53, CPU 31 (transmission/reception carrying-out processing unit 312) starts transmission processing (step S150).

Here, in transmission processing, one of two game devices carrying out giving/receiving of exchange data to/from each other serves as a base and the other serves as a client, however, in the present example, it is assumed that exchange data is output from a game device on the client side outputting a connection request signal to a game device on the base side. In the present example, it is noted that processing in a case where game device 1 serves as a client will be described. Then, processing in a case where game device 3 serves as a base will be described.

Then, CPU 31 (transmission/reception carrying-out processing unit 312) determines whether a connection flag as a client is ON or not, in order to determine whether the own device is a base or a client (step S150#). Setting of the connection flag will be described later.

Then, when the connection flag as the client is ON, that is, when it is determined that the own device is the client (YES in step S150#), CPU 31 (data list determination unit 314) performs transmission data list transmission determination processing for determining whether all pieces of data that can be transmitted in the transmission data list have been transmitted or not (step S151).

Figure 54:
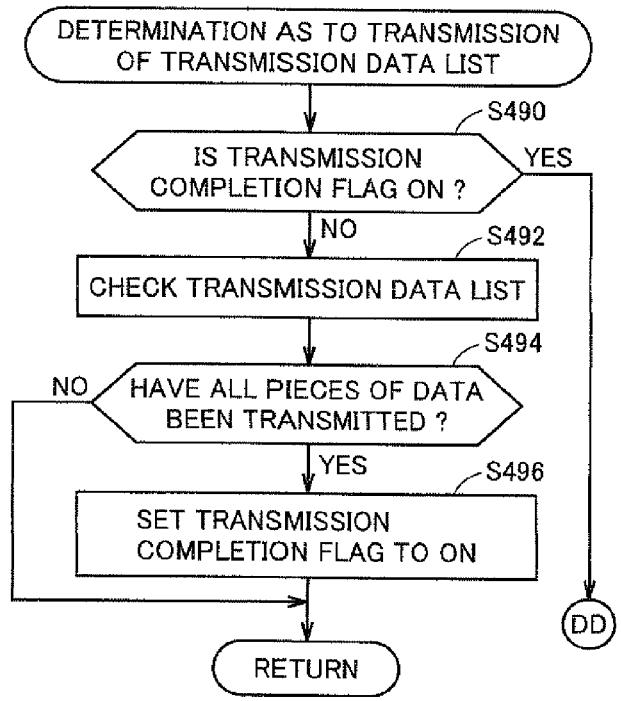
FIG. 54 is a flowchart illustrating transmission data list transmission determination processing according to an embodiment of the present invention.

FIG. 54 is a flowchart illustrating the transmission data list transmission determination processing according to an embodiment of the present invention.

Referring to FIG. 54, CPU 31 (data list determination unit 314) determines whether a transmission completion flag which will be described later is ON or not (step S490).

When the transmission completion flag is not ON in step S490 (NO in step S490), CPU 31 (data list determination unit 314) checks the transmission data list (step S492). Specifically, the transmission completion flag set for data that can be transmitted in the transmission data list is checked.

Then, CPU 31 (data list determination unit 314) determines whether all pieces of data that can be transmitted in the transmission data list have been transmitted or not (step S494). Specifically, whether all transmission completion flags have been set for the pieces of the data that can be transmitted in the transmission data list or not is determined.

When it is determined in step S494 that all pieces of data that can be transmitted in the transmission data list have been transmitted (YES in step S494), CPU 31 (data list determination unit 314) sets the transmission completion flag to ON (step S496). Then, the process ends (RETURN).

When the transmission completion flag is ON in step S490 (YES in step S490), CPU 31 (data list determination unit 314) does not have to check the transmission data list and the process ends (proceeds to DD). Namely, the process proceeds to step S153.

Referring again to FIG. 53, then, CPU 31 (transmission/reception carrying-out processing unit 312) transmits exchange data to a communication partner (base) (step S152). Specifically, the exchange data that can be transmitted in the transmission data list is transmitted. It is noted that exchange data smaller in data size may be transmitted first among pieces of data that can be transmitted in the transmission data list.

Then, CPU 31 (transmission/reception carrying-out processing unit 312) updates the transmission data list (step S152#). Specifically, when the exchange data is transmitted, a transmission OK flag indicating that the exchange data has been transmitted is set in the transmission data list.

On the other hand, when the connection flag as the client is not ON, that is, when it is determined that the own device is the base (NO in step S150#), the process proceeds to "AA". Processing in "AA" and later is processing on the base side and will be described later.

Then, CPU 31 (transmission/reception carrying-out processing unit 312) determines whether exchange data has been received from the communication partner (base) within a prescribed period of time or not (step S153).

When it is determined in step S153 that the exchange data has been received from the communication partner (base) within the prescribed period of time (YES in step S153), CPU 31 (transmission/reception carrying-out processing unit 312) updates the reception data list (step S153#). Specifically, when the exchange data is received, a reception OK flag indicating that the exchange data has been received is set in the reception data list.

Then, CPU 31 (transmission/reception carrying-out processing unit 312) causes main memory 32 to store the exchange data (step S154). It is noted that, at this time point, the exchange data is temporarily stored in the main memory for data storing processing which will be described later and it is not saved in the reception BOX provided for each application.

Then, CPU 31 (data list determination unit 314) performs reception data list reception determination processing for determining whether all pieces of data that can be received in the reception data list have been received or not (step S155).

Figure 55:
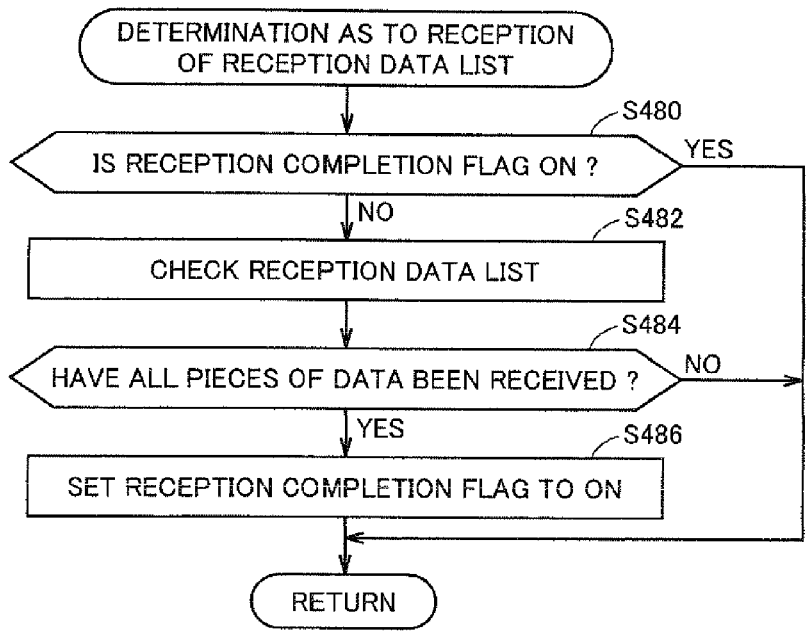
FIG. 55 is a flowchart illustrating reception data list reception determination processing according to an embodiment of the present invention.

FIG. 55 is a flowchart illustrating the reception data list reception determination processing according to an embodiment of the present invention.

Referring to FIG. 55, CPU 31 (data list determination unit 314) determines whether the reception completion flag is ON or not (step S480).

When the reception completion flag is not ON in step S480 (NO in step S480), CPU 31 (data list determination unit 314) checks the reception data list (step S482). Specifically, the reception completion flag set for data that can be received in the reception data list is checked.

Then, CPU 31 (data list determination unit 314) determines whether all pieces of data that can be received in the reception data list have been received or not (step S484). Specifically, whether all reception completion flags have been set for the pieces of the data that can be received in the reception data list is determined.

When it is determined in step S484 that all pieces of data that can be received in the reception data list have been received (YES in step S484), CPU 31 (data list determination unit 314) sets the reception completion flag to ON (step S486). Then, the process ends (RETURN).

When the reception completion flag is ON in step S480 (YES in step S480), CPU 31 (data list determination unit 314) does not have to check the reception data list and the process ends (RETURN).

Referring again to FIG. 53, then, CPU 31 (communication disconnection processing unit 316) determines whether communication has ended or not (step S157). Specifically, when both of the transmission completion flag and the reception completion flag are ON, it is determined that transmission/reception has been completed, that is, communication has ended. In addition, when communication has been cut off as well, it is determined that communication has ended.

When it is determined that communication has ended (YES in step S157), CPU 31 (communication disconnection processing unit 316) disconnects communication connection (step S158) Then, the process ends (RETURN).

On the other hand, when CPU 31 (communication disconnection processing unit 316) determines that communication has not ended (NO in step S157), the process returns to step S151.

Processing on the base side will now be described.

In the present example, the processing in a case where game device 3 serves as the base will be described.

Figure 56:
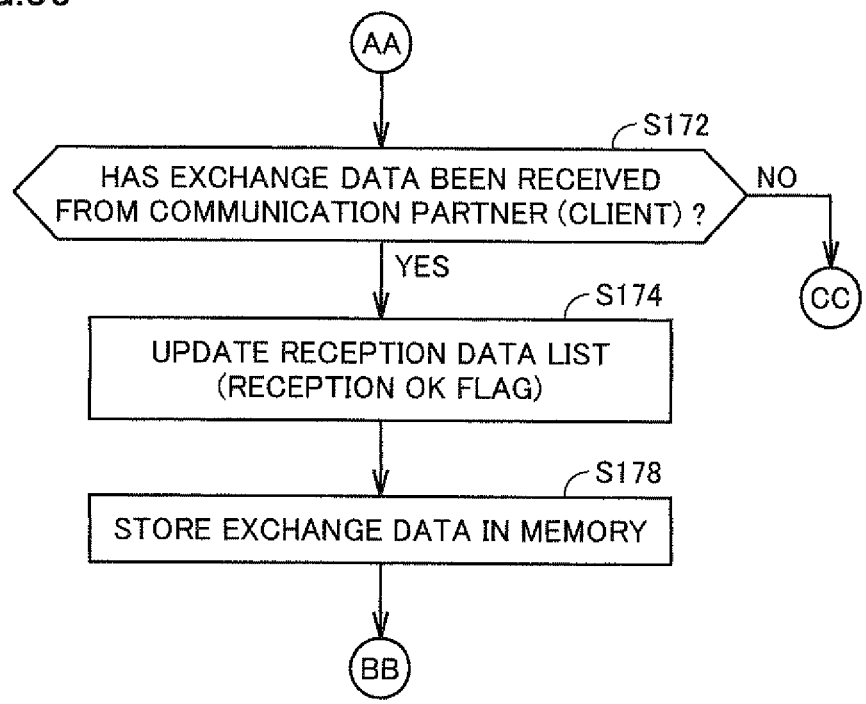
FIG. 56 is a flowchart partially illustrating processing on a base side in the transmission/reception carrying-out processing according to an embodiment of the present invention.

FIG. 56 is a flowchart partially illustrating processing on the base side in the transmission/reception carrying-out processing according to an embodiment of the present invention.

The processing on the base side is also substantially the same as the processing on the client side, and only timing of reception and transmission is basically different.

Referring to FIG. 56, when the connection flag as the client is not ON, that is, when the connection flag as the base is ON and it is determined that the own device is the base (NO in step S150#), CPU 31 (transmission/reception carrying-out processing unit 312) determines whether the exchange data has been received from the communication partner (client) within a prescribed period of time (step S172).

Then, when it is determined in step S172 that the exchange data has been received from the communication partner (client) within the prescribed period of time (YES in step S172), the reception data list is updated (step S174). Specifically, when the exchange data is received, a reception OK flag indicating that the exchange data has been received is set in the reception data list.

Then, CPU 31 (transmission/reception carrying-out processing unit 312) causes main memory 32 to store the exchange data (step S178). It is noted that, at this time point, the exchange data is temporarily stored in main memory 32 for data storing processing which will be described later and it is not saved in the reception BOX provided for each application.

Then, the process proceeds to "BB". Namely, the process proceeds to step S155 in FIG. 53. Subsequent processing is as described above.

In addition, when CPU 31 (transmission/reception carrying-out processing unit 312) determines in step S172 that the exchange data has not been received from the communication partner (client) within the prescribed period of time (NO in step S172), the process then proceeds to "CC". Namely, the process proceeds to step S157 in FIG. 53.

Then, in step S157, CPU 31 (communication disconnection processing unit 316) determines whether communication has ended or not. When neither of the transmission completion flag and the reception completion flag is ON, the process returns to step S151. Then, the processing is repeated.

Figure 57:
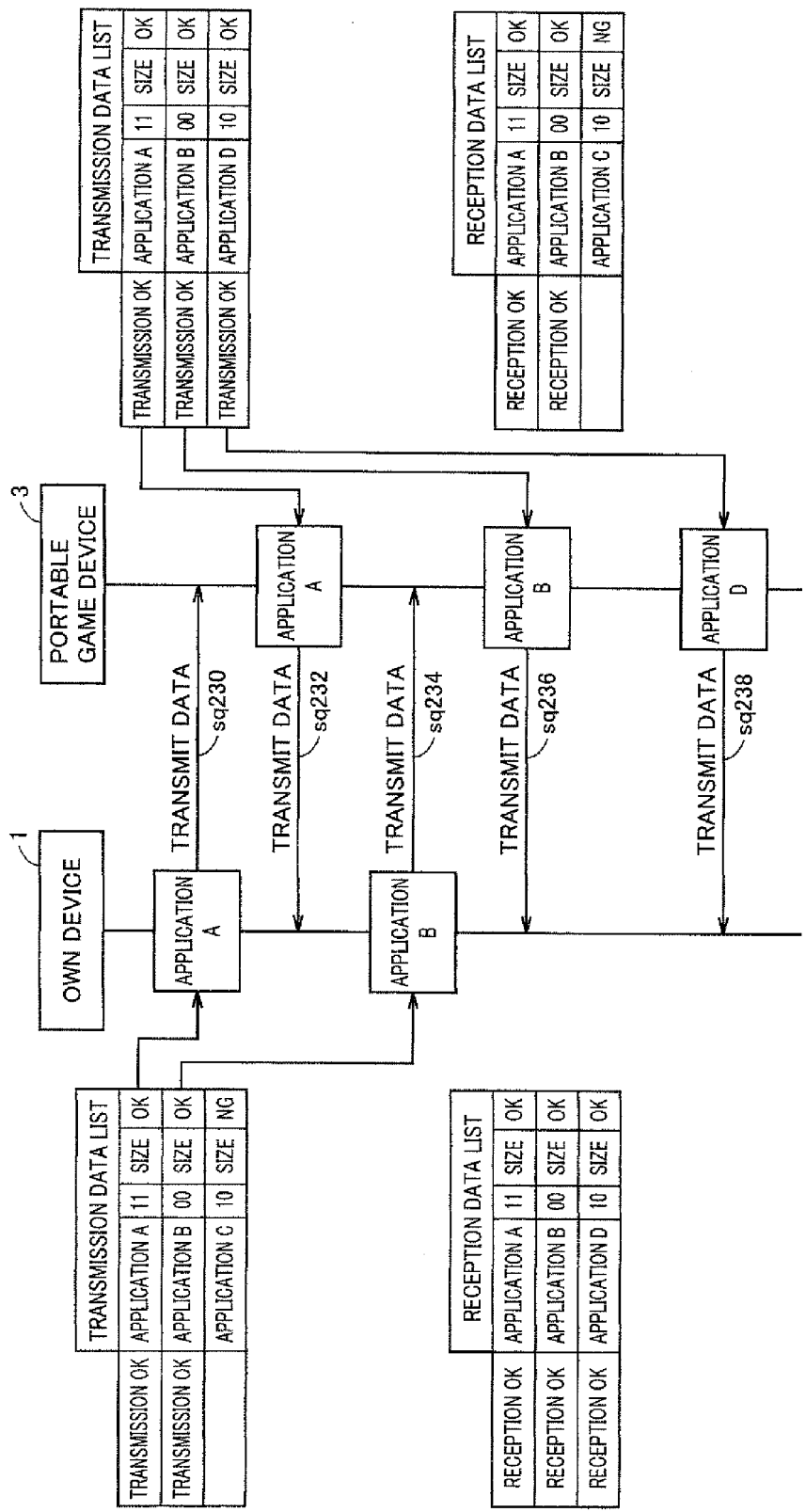
FIG. 57 is a diagram illustrating a flow of data in the transmission/reception carrying-out processing according to an embodiment of the present invention.

FIG. 57 is a diagram illustrating a flow of data in the transmission/reception carrying-out processing according to an embodiment of the present invention. In the present example, the transmission/reception carrying-out processing based on the transmission data list and the reception data list described with reference to FIG. 52 will be described.

Referring to FIG. 57, exchange data of application A is transmitted from the own device side to game device 3 side (sequence sq230). In accordance with the processing for transmitting the exchange data, the transmission OK flag is set in correspondence with application A in the transmission data list on the own device side. In addition, on game device 3 side, the reception OK flag is set in correspondence with application A in the reception data list on game device 3 side.

Then, the exchange data of application A is transmitted from game device 3 side to the own device side (sequence sq232). In accordance with the processing for transmitting the exchange data, the transmission OK flag is set in correspondence with application A in the transmission data list on game device 3 side. In addition, on the own device side, the reception OK flag is set in correspondence with application A in the reception data list.

Then, the exchange data of application B is transmitted from the own device side to game device 3 side (sequence sq234). In accordance with the processing for transmitting the exchange data, the transmission OK flag is set in correspondence with application A in the transmission data list on the own device side. In addition, on game device 3 side, the reception OK flag is set in correspondence with application B in the reception data list on game device 3 side.

Then, the exchange data of application B is transmitted from game device 3 side to the own device side (sequence sq236). In accordance with the processing for transmitting the exchange data, the transmission OK flag is set in correspondence with application B in the transmission data list on game device 3 side. In addition, the reception OK flag is set in correspondence with application B in the reception data list on the own device side.

Then, on the own device side, data transmission processing is not performed because the transmission data list has the transmission completion flag turned ON and a data reception stand-by state is set because the reception completion flag is not ON but OFF.

Then, the exchange data of application D is transmitted from game device 3 side to the own device side (sequence sq238). In accordance with the processing for transmitting the exchange data, the transmission OK flag is set in correspondence with application D in the transmission data list on game device 3 side. In addition, on the own device side, the reception OK flag is set in correspondence with application D in the reception data list. Thus, the reception completion flag is turned ON on the own device side.

Therefore, since the transmission completion flag and the reception completion flag are turned ON on the own device side, communication ends. Similarly, since the transmission completion flag and the reception completion flag are turned ON also on game device 3 side, communication ends.

Namely, through the processing above, the processing for giving/receiving exchange data to/from the communication partner ends.

In the present example, though a case where exchange data is transmitted from the own device side to game device 3 side alternately sequentially from application A has been described, the order is not particularly limited as such, and exchange data smaller in data size may be transmitted first among the pieces of data that can be transmitted in the transmission data list so that data transmission/reception will be as successful as possible.

<Data Storing Processing>

Figure 58:
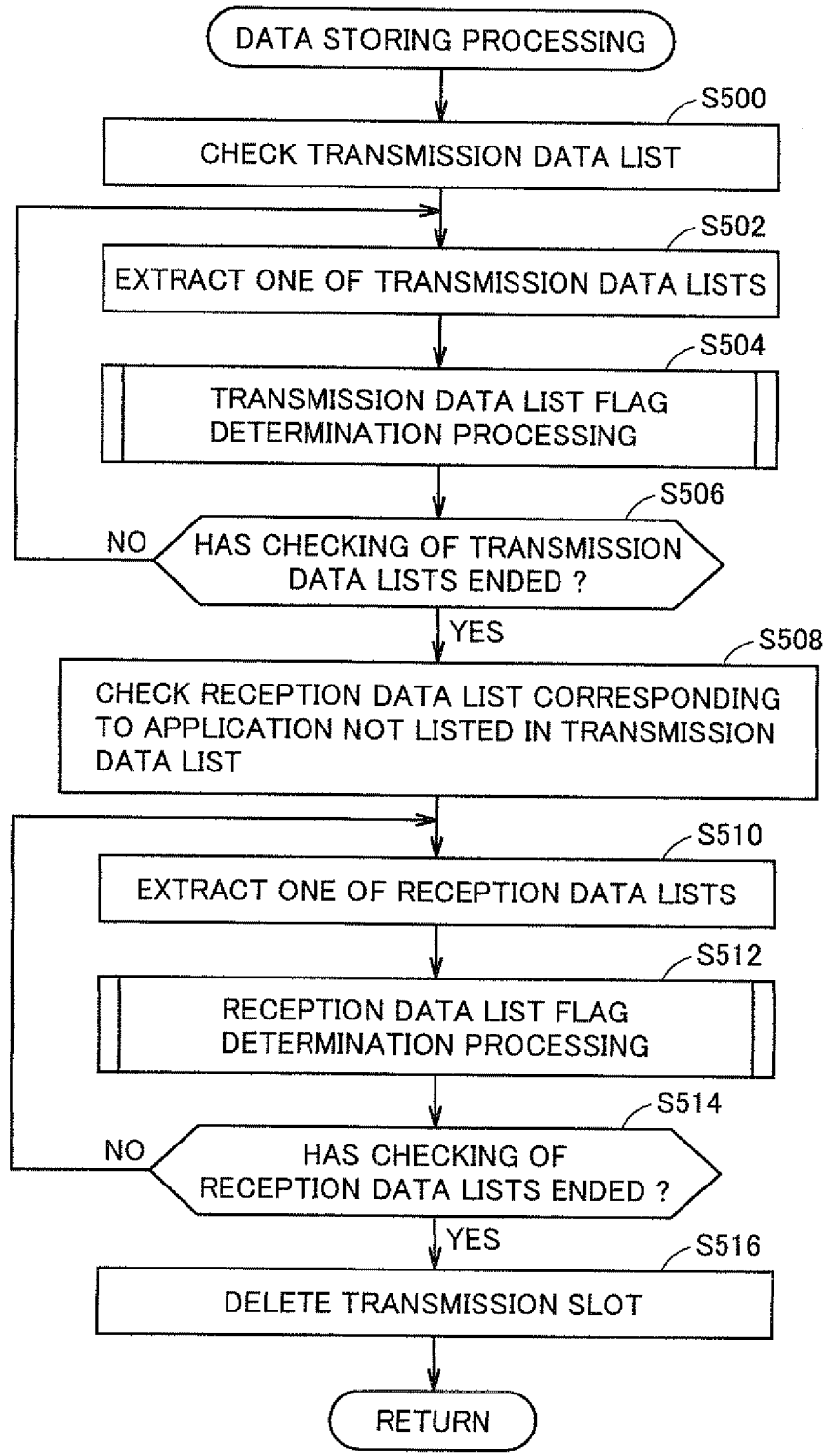
FIG. 58 is a flowchart of data storing processing according to an embodiment of the present invention.

FIG. 58 is a flowchart of data storing processing according to an embodiment of the present invention.

Referring to FIG. 58, CPU 31 (data storing processing unit 210) checks the transmission data list (step S500). Specifically, the transmission data list on the own device side is checked. It is noted that, in the processing from steps S500 to S506, whether or not a transmission/reception condition is satisfied with regard to the application listed in the transmission data list on the own device side is determined. It is noted that, since only the application transmitting exchange data to game device 3 is listed in the transmission data list on the own device side, the application only receiving the exchange data from game device 3 is not listed. Therefore, whether the application only receiving the exchange data from game device 3 satisfies a reception condition or not is determined in processing from steps S508 to S514.

Then, CPU 31 (data storing processing unit 210) extracts one of transmission data lists (step S502).

Then, CPU 31 (data storing processing unit 210) performs transmission data list flag determination processing (step S504).

Figure 59:
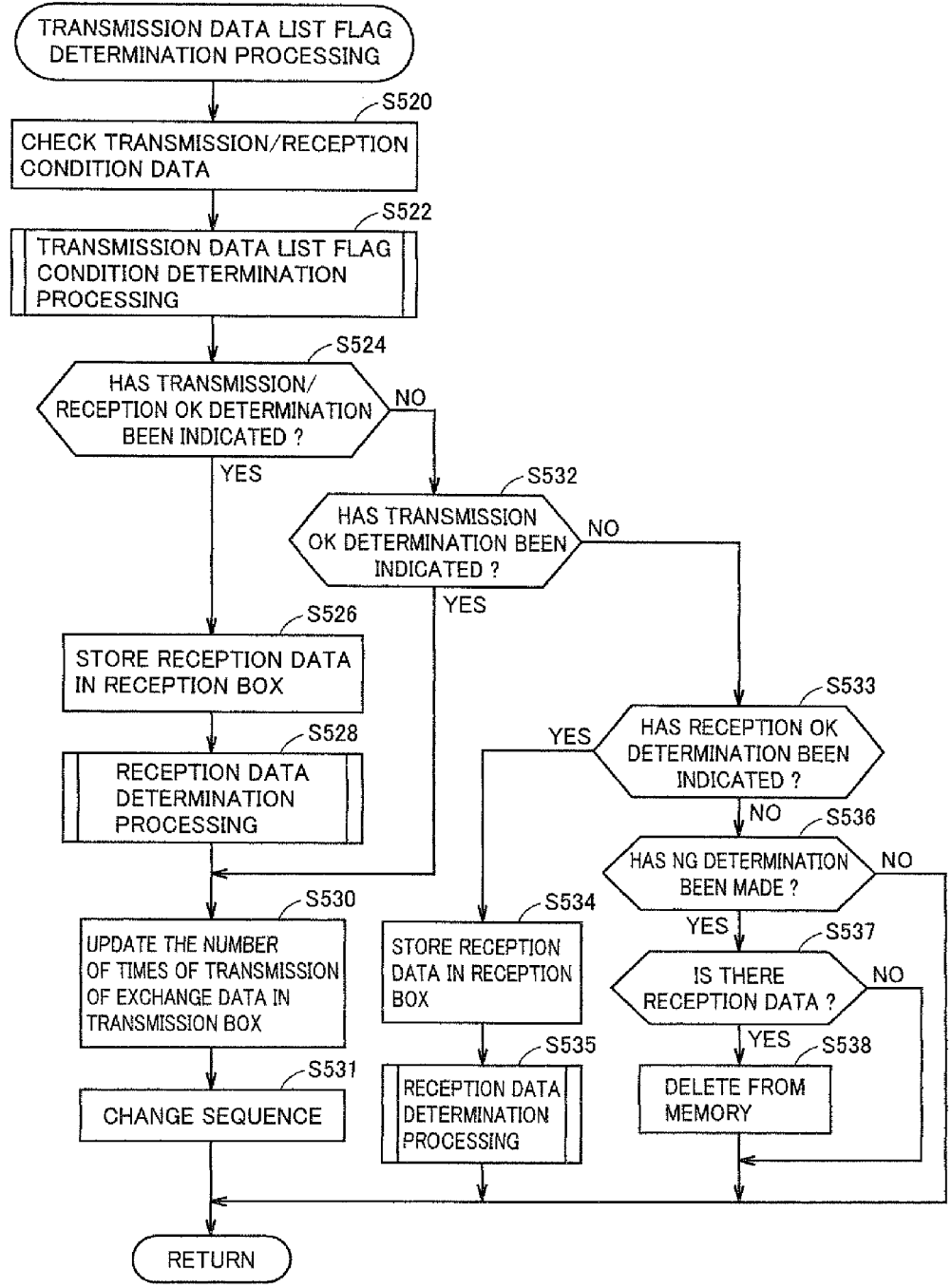
FIG. 59 is a flowchart of transmission data list flag determination processing according to an embodiment of the present invention.

FIG. 59 is a flowchart of the transmission data list flag determination processing according to an embodiment of the present invention.

Referring to FIG. 59, CPU 31 (data storing processing unit 210) checks transmission/reception condition data (send flag and receive flag) of one extracted transmission data list (step S520).

Then, CPU 31 (data storing processing unit 210) performs transmission data list flag condition determination processing for determining whether the condition is satisfied or not in accordance with the transmission/reception condition data (step S522).

Figure 60:
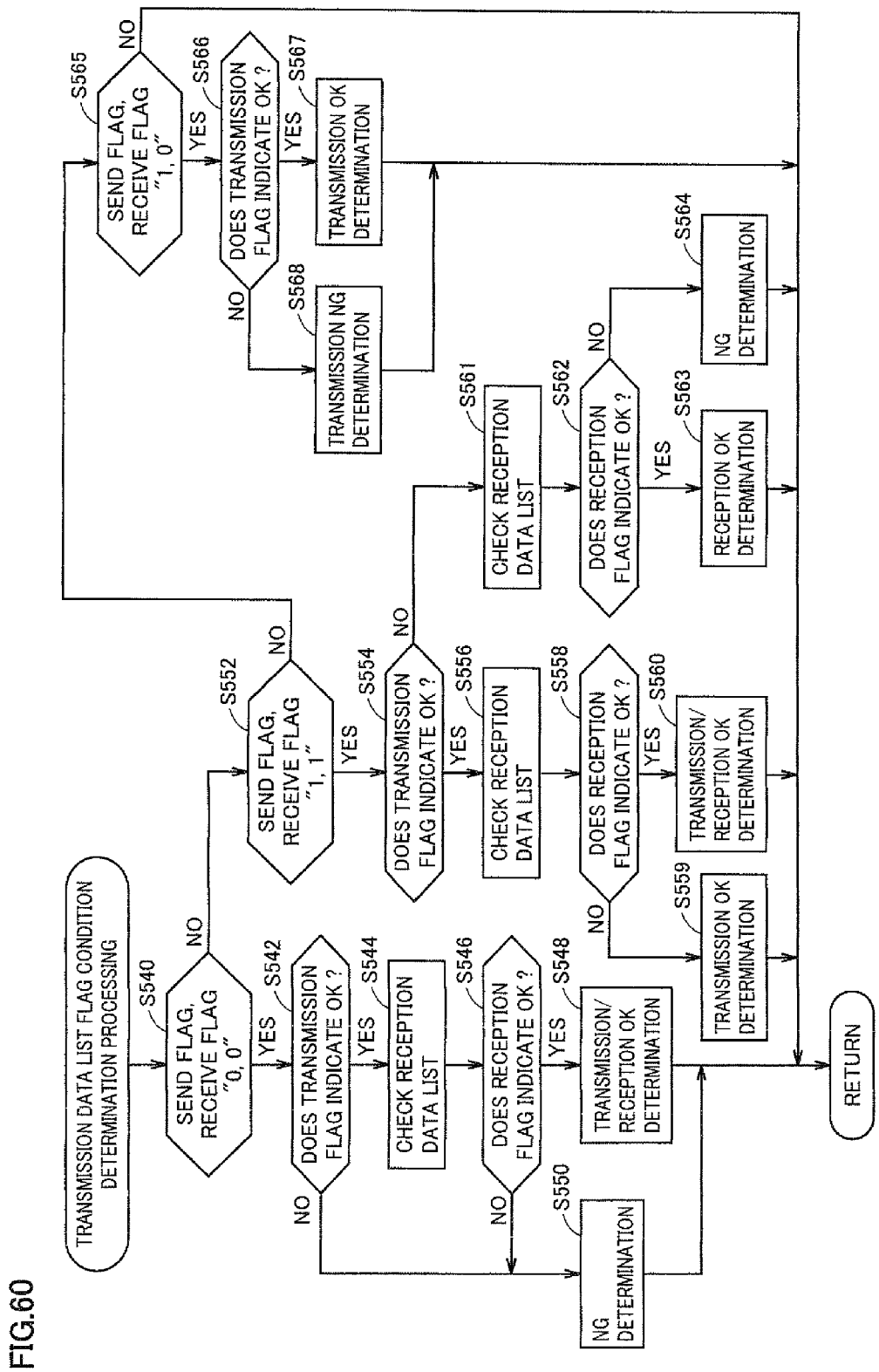
FIG. 60 is a flowchart of transmission data list flag condition determination processing according to an embodiment of the present invention.

FIG. 60 is a flowchart of the transmission data list flag condition determination processing according to an embodiment of the present invention.

Referring to FIG. 60, whether the send flag and the receive flag representing the transmission/reception condition data are set to "0, 0" or not is determined (step S540). Namely, whether the transmission/reception condition data indicates only bidirectional communication (exchange communication) or not is determined.

When it is determined in step S540 that the send flag and the receive flag representing the transmission/reception condition data are set to "0, 0" (YES in step S540), whether the transmission flag of the transmission data list indicates OK or not is determined (step S542).

When it is determined in step S542 that the transmission flag of the transmission data list indicates OK (YES in step S542), the reception data list is checked (step S544). Specifically, the reception data list of the corresponding application is checked.

Then, whether the reception flag of the reception data list indicates OK or not is determined (step S546).

When it is determined in step S546 that the reception flag of the reception data list indicates OK (YES in step S546), transmission/reception OK determination is made (step S548). Namely, this fact means that the transmission/reception condition data indicates only bidirectional communication (exchange communication) and the condition is satisfied. Then, the process ends (RETURN).

On the other hand, when it is determined in step S542 that the transmission flag of the transmission data list does not indicate OK (NO in step S542), NG determination is made (step S550). Namely, this fact means that the transmission/reception condition data indicates only bidirectional communication (exchange communication) and the condition is not satisfied. Then, the process ends (RETURN).

In addition, when it is determined in step S546 that the reception flag of the reception data list does not indicate OK (NO in step S546), NG determination is made (step S550). Namely, this fact means that the transmission/reception condition data indicates only bidirectional communication (exchange communication) and the condition is not satisfied. Then, the process ends (RETURN).

Then, when it is determined in step S5540 that the send flag and the receive flag representing the transmission/reception condition data are not set to "0, 0" (NO in step S540), whether the send flag and the receive flag representing the transmission/reception condition data are set to "1, 1" or not is determined (step S552). Namely, whether the transmission/reception condition data indicates bidirectional communication (communication being permitted under any condition) or not is determined.

When it is determined in step S552 that the send flag and the receive flag representing the transmission/reception condition data are set to "1, 1" (YES in step S552), whether the transmission flag of the transmission data list indicates OK or not is determined (step S554).

When it is determined step S554 that the transmission flag of the transmission data list indicates OK (YES in step S554), the reception data list is checked (step S556). Specifically, the reception data list of the corresponding application is checked.

Then, whether the reception flag of the reception data list indicates OK or not is determined (step S558).

When it is determined in step S558 that the reception flag of the reception data list indicates OK (YES in step S558), transmission/reception OK determination is made (step S560). Namely, this fact means that the transmission/reception condition data indicates bidirectional communication (communication being permitted under any condition) and the conditions for transmission and reception are both satisfied. Then, the process ends (RETURN).

On the other hand, when it is determined in step S558 that the reception flag of the reception data list does not indicate OK (NO in step S558), transmission OK determination is made (step S559). Namely, this fact means that the transmission/reception condition data indicates bidirectional communication (communication being permitted under any condition) and only the transmission condition is satisfied. Then, the process ends (RETURN).

On the other hand, when it is determined in step S554 that the transmission flag of the transmission data list does not indicate OK (NO in step S554), the reception data list is checked (step S561).

Specifically, the reception data list of the corresponding application is checked.

Then, whether the reception flag of the reception data list indicates OK or not is determined (step S562).

When it is determined in step S562 that the reception flag of the reception data list indicates OK (YES in step S562), reception OK determination is made (step S563). Namely, this fact means that that the transmission/reception condition data indicates bidirectional communication (communication being permitted under any condition) and only the reception condition is satisfied. Then, the process ends (RETURN).

On the other hand, when it is determined in step S562 that the reception flag of the reception data list does not indicate OK (NO in step S562), NG determination is made (step S564). Namely, this fact means that the transmission/reception condition data indicates bidirectional communication (communication being permitted under any condition) and neither of the transmission condition and the reception condition is satisfied. Then, the process ends (RETURN).

On the other hand, when it is determined in step S552 that the send flag and the receive flag representing the transmission/reception condition data are not set to "1, 1" (NO in step S552), whether the send flag and the receive flag representing the transmission/reception condition data are set to "1, 0" or not is determined (step S565). Namely, whether or not the transmission/reception condition data indicates only transmission communication or not is determined.

When it is determined in step S565 that the send flag and the receive flag representing the transmission/reception condition data are set to "1, 0" (YES in step S565), whether the transmission flag of the transmission data list indicates OK or not is determined (step S566).

When it is determined in step S566 that the transmission flag of the transmission data list indicates OK (YES in step S566), transmission OK determination is made (step S567). Namely, this fact means that the transmission/reception condition data indicates only transmission communication and only the transmission condition is satisfied. Then, the process ends (RETURN).

On the other hand, when it is determined in step S566 that the transmission flag of the transmission data list does not indicate OK (NO in step S566), NG determination is made (step S568). Namely, this fact means that the transmission/reception condition data indicates only transmission communication and the transmission condition is not satisfied. Then, the process ends (RETURN).

It is noted that, in a case where the send flag and the receive flag representing the transmission/reception condition data are set to "0, 1", regarding the exchange data, the transmission/reception condition data means only reception communication and hence a transmission slot is not formed. Therefore, the transmission/reception condition data is not present in the transmission data list.

Referring again to FIG. 59, then, CPU 31 (data storing processing unit 210) determines whether a result of determination in the transmission data list flag condition determination processing indicates transmission/reception OK determination or not (step S524).

When CPU 31 (data storing processing unit 210) determines in step S524 that a result of determination in the transmission data list flag condition determination processing indicates transmission/reception OK determination (YES in step S524), it causes the reception BOX of the corresponding application to store the reception data (step S526).

Then, CPU 31 (data storing processing unit 210) performs reception data determination processing (step S528). Details of the reception data determination processing will be described later.

On the other hand, when CPU 31 (data storing processing unit 210) determines that a result of determination in the transmission data list flag condition determination processing does not indicate transmission/reception OK determination (NO in step S524), the process proceeds to step S532.

Then, CPU 31 (data storing processing unit 210) determines whether the result of determination in the transmission data list flag condition determination processing indicates transmission OK determination or not (step S532).

When it is determined in step S532 that the result of determination in the transmission data list flag condition determination processing indicates transmission OK determination (YES in step S532), CPU 31 (data storing processing unit 210) updates the number of times of transmission of the exchange data in the corresponding transmission BOX (step S530). Specifically, the number of times of transmission is decreased by 1. For example, when the number of times of transmission is set to two, the number of times of transmission is updated to one. The number of times of transmission means the number of times of transmission of the exchange data from the transmission slot. Therefore, when the number of times of transmission is set to 0, no exchange data is transmitted from the transmission slot.

Then, a sequence of pieces of data in the transmission BOX is changed (step S531). Specifically, the exchange data stored in the transmission slot in the transmission BOX and then transmitted is arranged at the end. It is noted that, even in a case where a plurality of pieces of data are stored in the transmission slot from the transmission BOX, all pieces of transmitted data are arranged at the end in the transmission BOX. Therefore, data arranged in the transmission BOX is sequentially transmitted. Then, the process ends (RETURN).

On the other hand, when CPU 31 (data storing processing unit 210) determines that the result of determination in the transmission data list flag condition determination processing does not indicate transmission OK determination (NO in step S532), the process proceeds to step S533.

Then, CPU 31 (data storing processing unit 210) determines whether the result of determination in the transmission data list flag condition determination processing indicates reception OK determination or not (step S533). When it is determined in step S533 that the result of determination in the transmission data list flag condition determination processing indicates reception OK determination (YES in step S533), CPU 31 (data storing processing unit 210) causes the reception BOX of the corresponding application to store the reception data (step S534). Then, CPU 31 (data storing processing unit 210) performs reception data determination processing (step S535). Details of the reception data determination processing will be described later.

On the other hand, then, when CPU 31 (data storing processing unit 210) determines that the result of determination in the transmission data list flag condition determination processing does not indicate reception OK determination (NO in step S533), it determines whether NG determination has been made or not (step S536).

Then, when it is determined in step S536 that NG determination has been made (YES in step S536), CPU 31 (data storing processing unit 210) determines whether there is reception data or not (step S537).

Then, when it is determined that there is reception data (YES in step S537), CPU 31 (data storing processing unit 210) deletes the reception data from the main memory (step S538).

Then, the process ends (RETURN).

Then, when CPU 31 (data storing processing unit 210) determines in step S536 that NG determination has not been made (NO in step S536) or determines in step S537 that there is no reception data (NO in step S537), the process ends (RETURN).

Referring again to FIG. 58, CPU 31 (data storing processing unit 210) determines whether checking of all transmission data lists has ended or not (step S506). Specifically, whether checking of all transmission data lists has ended or not is determined.

When CPU 31 (data storing processing unit 210) determines that checking of all transmission data lists has not ended (NO in step S506), the process returns to step S502, one next transmission data list is extracted and the similar processing is repeated.

When CPU 31 (data storing processing unit 210) determines that checking of all transmission data lists has ended (YES in step S506), it checks the reception data list corresponding to the application not listed in the transmission data list (step S508). As described above, in the transmission data list on the own device side, only the application transmitting the exchange data to game device 3 is listed. Therefore, since only the transmission/reception condition of the exchange data of the application listed in the transmission data list on the own device side is determined in the processing above, an application only receiving the exchange data from game device 3 is not listed. Therefore, determination as to the application carrying out only reception from game device 3 and not listed in the transmission data list on the own device side is made.

Then, CPU 31 (data storing processing unit 210) extracts one of the reception data lists (step S510).

Then, CPU 31 (data storing processing unit 210) performs reception data list flag determination processing (step S512).

Figure 61:
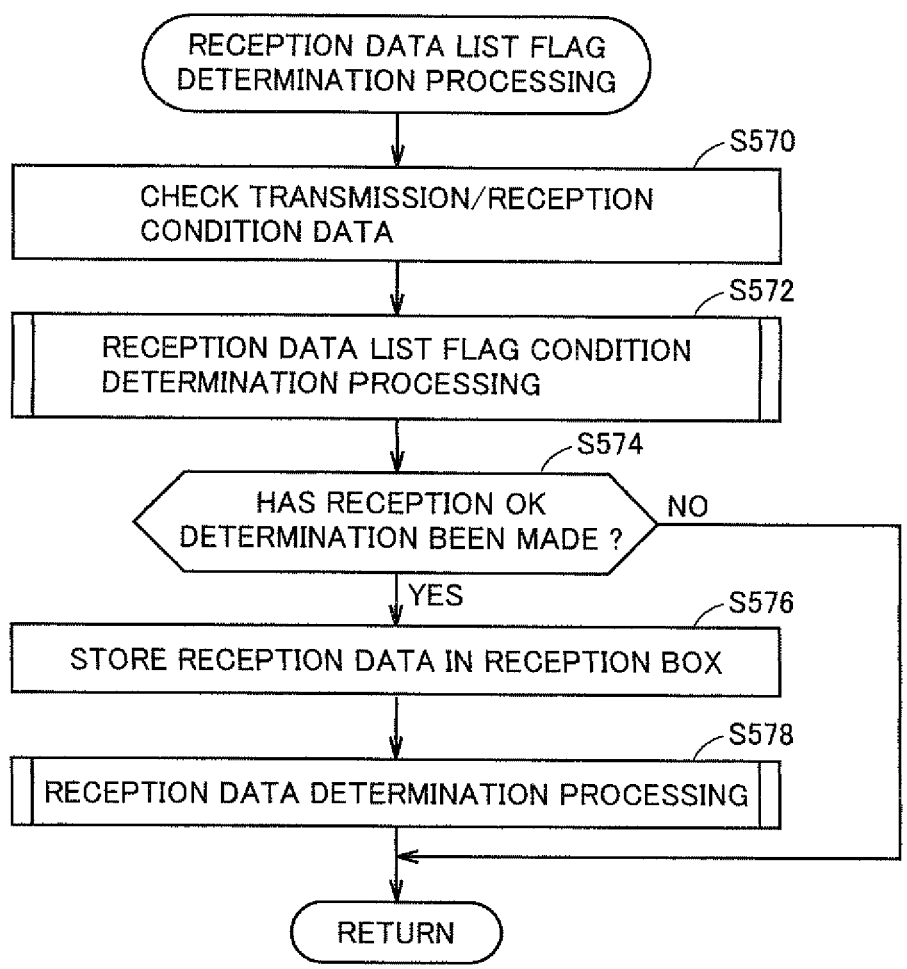
FIG. 61 is a flowchart illustrating reception data list flag determination processing according to an embodiment of the present invention.

FIG. 61 is a flowchart illustrating the reception data list flag determination processing according to an embodiment of the present invention.

Referring to FIG. 61, CPU 31 (data storing processing unit 210) checks the transmission/reception condition data (step S570).

Then, CPU 31 (data storing processing unit 210) performs the reception data list flag condition determination processing (step S572).

Figure 62:
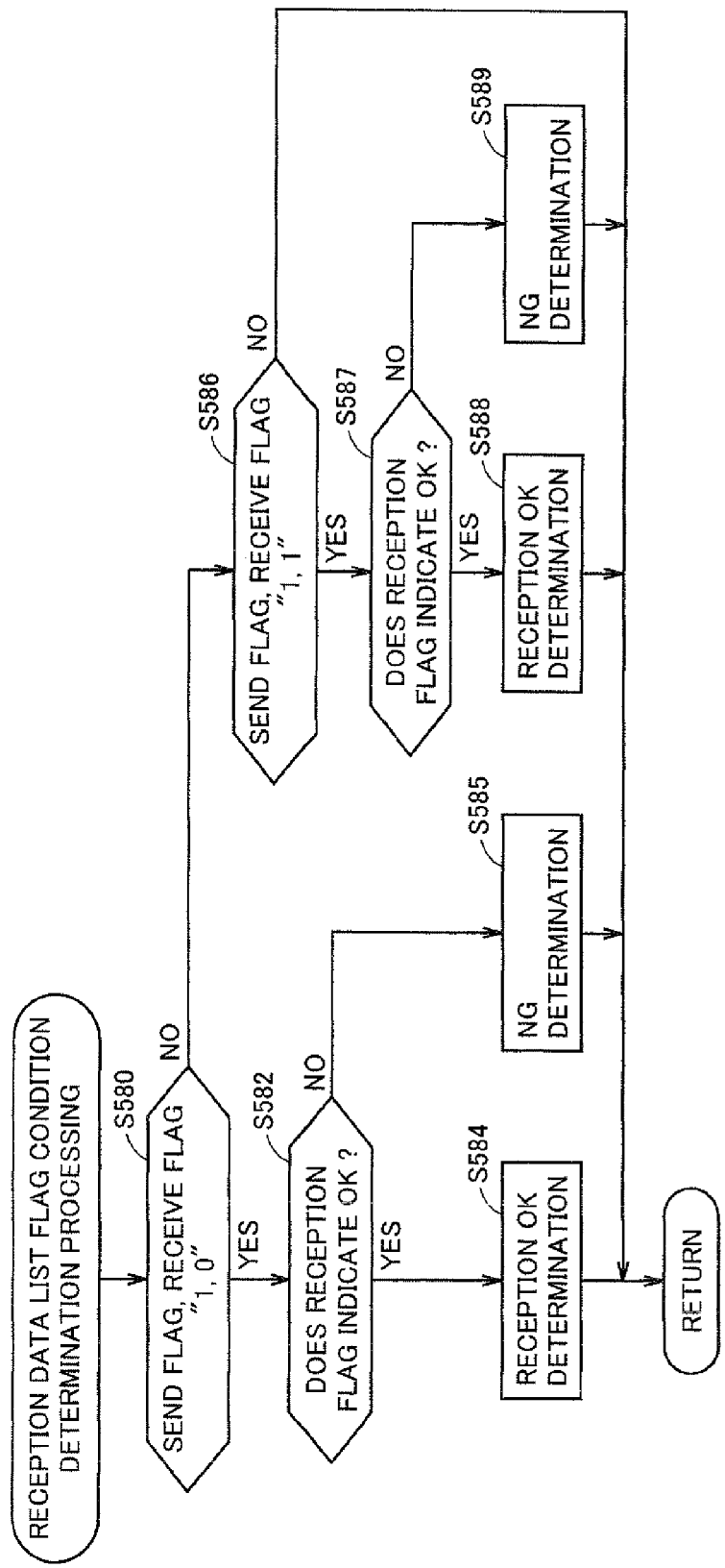
FIG. 62 is a flowchart of reception data list flag condition determination processing according to an embodiment of the present invention.

FIG. 62 is a flowchart of the reception data list flag condition determination processing according to an embodiment of the present invention.

As described above, determination as to the application only receiving the exchange data from game device 3 should be made, and therefore, in the transmission data list transmitted from game device 3, two pieces of transmission/reception condition data set to "1, 0" and "1, 1" respectively should be subjected to determination.

Referring to FIG. 62, whether the send flag and the receive flag representing the transmission/reception condition data are set to "1, 0" or not is determined (step S580). Namely, whether the transmission/reception condition data in game device 3 indicates only transmission communication or not is determined.

When it is determined in step S580 that the send flag and the receive flag representing the transmission/reception condition data are set to "1, 0" (YES in step S580), whether the reception flag of the reception data list indicates OK or not is determined (step S582).

When it is determined in step S582 that the reception flag of the reception data list indicates OK (YES in step S582), reception OK determination is made (step S584). Namely, this fact means that the transmission/reception condition data in game device 3 indicates only transmission communication and the condition is satisfied. Then, the process ends (RETURN).

On the other hand, when it is determined in step S582 that the reception flag of the reception data list does not indicate OK (NO in step S582), NG determination is made (step S585). Namely, this fact means that the transmission/reception condition data in game device 3 indicates only transmission communication and the condition is not satisfied. Then, the process ends (RETURN).

Then, when it is determined in step S580 that the send flag and the receive flag representing the transmission/reception condition data are not set to "1, 0" (NO in step S580), whether the send flag and the receive flag representing the transmission/reception condition data are set to "1, 1" or not is determined (step S586). Namely, whether the transmission/reception condition data indicates bidirectional communication (communication being permitted under any condition) or not is determined.

When it is determined in step S586 that the send flag and the receive flag representing the transmission/reception condition data are set to "1, 1" (YES in step S586), whether the reception flag of the reception data list indicates OK or not is determined (step S587).

When it is determined in step S587 that the reception flag of the reception data list indicates OK (YES in step S587), reception OK determination is made (step S588). Namely, this fact means that the transmission/reception condition data indicates bidirectional communication (communication being permitted under any condition) and the reception condition is satisfied. Then, the process ends (RETURN).

On the other hand, when it is determined in step S587 that the reception flag of the reception data list does not indicate OK (NO in step S587), NG determination is made (step S589). Namely, this fact means that the transmission/reception condition data indicates bidirectional communication (communication being permitted under any condition) and the condition is not satisfied. Then, the process ends (RETURN).

On the other hand, when it is determined in step S586 that the send flag and the receive flag representing the transmission/reception condition data are not set to "1, 1" (NO in step S586), the process ends (RETURN).

Referring again to FIG. 61, CPU 31 (data storing processing unit 210) determines whether reception OK determination has been made or not (step S574).

When it is determined in step S574 that reception OK determination has been made (YES in step S574), CPU 31 (data storing processing unit 210) causes the reception BOX of the corresponding application to store the reception data (step S576).

Then, reception data determination processing is performed (step S578). Details of the reception data determination processing will be described later. Then, the process ends (RETURN).

On the other hand, when CPU 31 (data storing processing unit 210) determines in step S574 that reception OK determination has not been made, that is, NG determination has been made (NO in step S574), the process ends (RETURN).

Referring again to FIG. 58, CPU 31 (data storing processing unit 210) determines whether checking of all reception data lists has ended or not (step S514).

When CPU 31 (data storing processing unit 210) determines in step S514 that checking of all reception data lists has not ended (NO in step S514), the process returns to step S510, one next reception data list is extracted, and the similar processing is repeated.

Then, when it is determined in step S514 that checking of all reception data lists has ended (YES in step S514), CPU 31 (data storing processing unit 210) deletes the transmission slot (step S516). Then, the process ends (RETURN).

Figure 63:
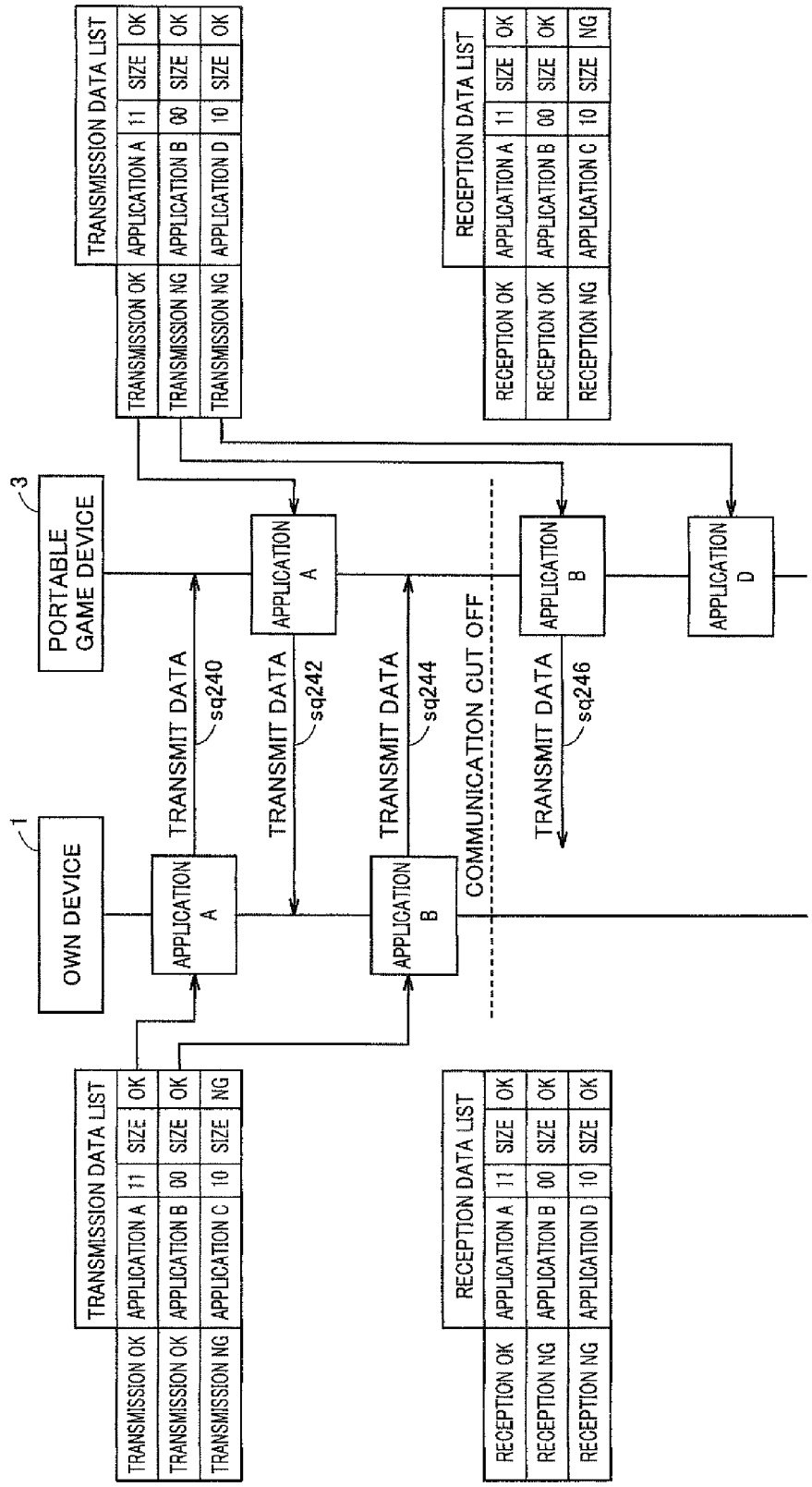
FIG. 63 is another diagram illustrating a flow of data in the transmission/reception carrying-out processing according to an embodiment of the present invention.

FIG. 63 is another diagram illustrating a flow of data in the transmission/reception carrying-out processing according to an embodiment of the present invention. In the present example, the transmission/reception carrying-out processing based on the transmission data list and the reception data list described with reference to FIG. 52 will be described.

Referring to FIG. 63, exchange data of application A is transmitted from the own device side to game device 3 side (sequence sq240). In accordance with the processing for transmitting the exchange data, the transmission OK flag is set in correspondence with application A in the transmission data list on the own device side. In addition, on game device 3 side, the reception OK flag is set in correspondence with application A in the reception data list on game device 3 side.

Then, the exchange data of application A is transmitted from game device 3 side to the own device side (sequence sq242). In accordance with the processing for transmitting the exchange data, the transmission OK flag is set in correspondence with application A in the transmission data list on game device 3 side. In addition, on the own device side, the reception OK flag is set in correspondence with application A in the reception data list.

Then, the exchange data of application B is transmitted from the own device side to game device 3 side (sequence sq244). In accordance with the processing for transmitting the exchange data, the transmission OK flag is set in correspondence with application B in the transmission data list on the own device side. In addition, on game device 3 side, the reception OK flag is set in correspondence with application B in the reception data list on game device 3 side.

Thereafter, for example, it is assumed that communication has been cut off due to communication fault.

Then, it is assumed that an attempt to transmit the exchange data of application B from game device 3 side to the own device side is made but it failed because communication was cut of (sequence sq246). In accordance with the processing for transmitting the exchange data, the transmission NG flag is set in correspondence with application B in the transmission data list on game device 3 side.

In addition, the reception NG flag is set in correspondence with application B in the reception data list on the own device side.

Subsequently, since the exchange data of application D cannot be transmitted either, the transmission NG flag is set. In addition, on the own device side, the reception NG flag is set in correspondence with application D in the reception data list.

Namely, it is assumed that, with regard to application A, the processing for giving/receiving the exchange data to/from the communication partner was performed, however, the processing was interrupted with regard to application B. It is assumed that the processing was not performed for applications C and D either.

Figure 64:
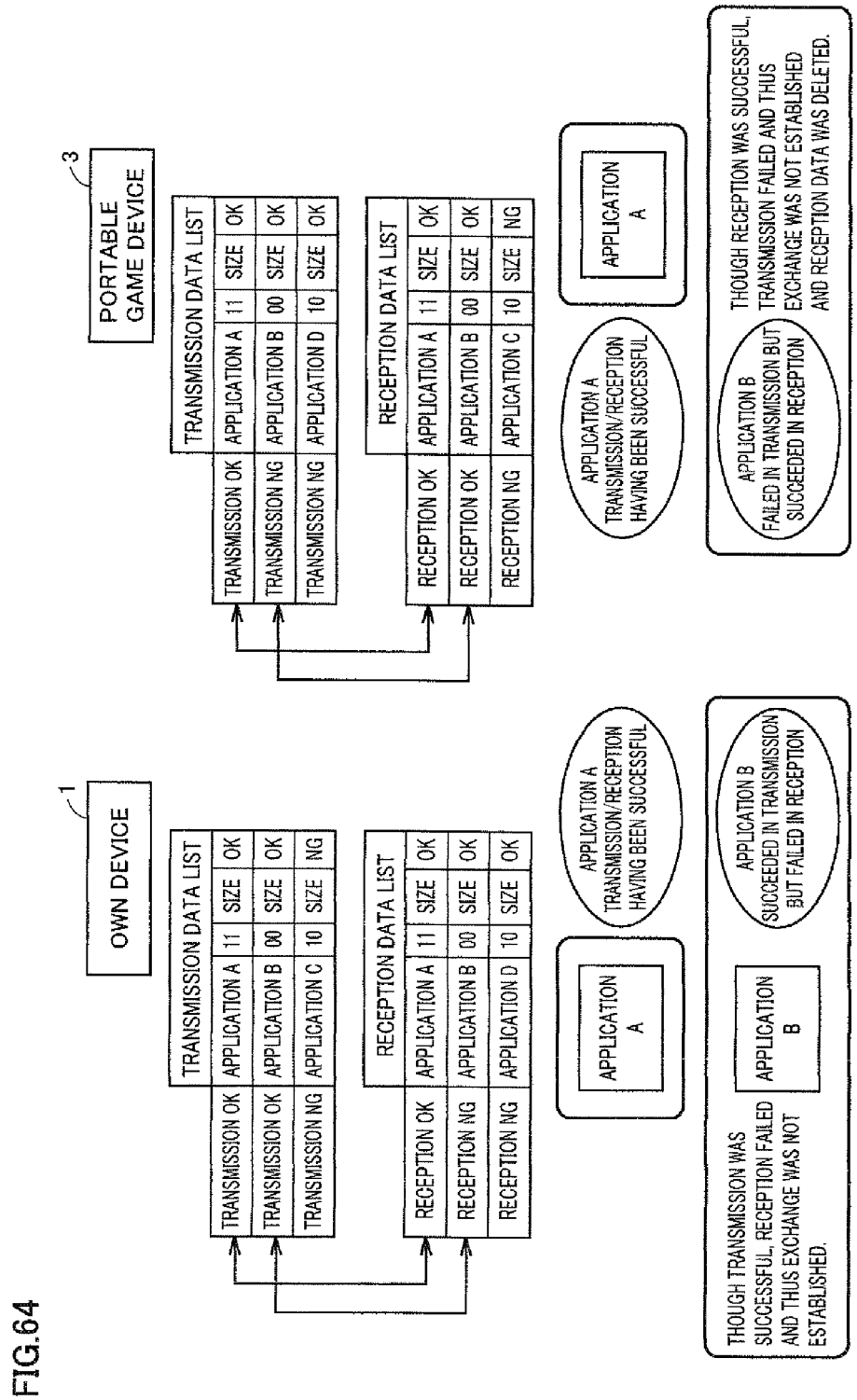
FIG. 64 is a conceptual diagram illustrating storage of reception data into a reception BOX in data storing processing according to an embodiment of the present invention.

FIG. 64 is a conceptual diagram illustrating storage of reception data into a reception BOX in the data storing processing according to an embodiment of the present invention.

In the present example, a case of the transmission/reception carrying-out processing described with reference to FIG. 63 will be described.

Referring to FIG. 64, with regard to application A on the own device side, the transmission/reception condition data is set to "1, 1" and bidirectional communication (communication being permitted under any condition) is set. Then, since the transmission OK flag and the reception OK flag are set for the transmission data list and the reception data list respectively, transmission/reception OK determination is made. Therefore, since transmission/reception OK determination is made, the reception data is stored in the reception BOX provided in correspondence with application A.

On the other hand, with regard to application B on the own device side, the transmission/reception condition data is set to "0, 0" and only bidirectional communication (exchange communication) is set. Then, since the transmission OK flag and the reception NG flag are set for the transmission data list and the reception data list respectively, NG determination is made. Therefore, since NG determination is made, exchange is not established and the process ends. It is noted that, since reception with regard to application B on the own device side has not been successful, the reception data is not deleted from the main memory.

It is noted that NG determination is made also for applications C and D in accordance with the similar scheme, and regarding communication as not having been successfully established, the process ends.

For application A on game device 3 side, the transmission/reception condition data is set to "1, 1" and bidirectional communication (communication being permitted under any condition) is set. Then, since the transmission OK flag and the reception OK flag are set for the transmission data list and the reception data list respectively, transmission/reception OK determination is made. Therefore, since transmission/reception OK determination is made, the reception data is stored in the reception BOX provided in correspondence with application A.

On the other hand, with regard to application B on game device 3 side, the transmission/reception condition data is set to "0, 0" and only bidirectional communication (exchange communication) is set. Then, since the transmission NG flag and the reception OK flag are set for the transmission data list and the reception data list respectively, NG determination is made. Therefore, since NG determination is made, exchange is not established and the process ends. It is noted that reception data with regard to application B on game device 3 is stored in the main memory. Therefore, the reception data is deleted from the main memory and not stored in the reception BOX provided in correspondence with application B.

It is noted that NG determination is made also for applications C and D in accordance with the similar scheme, and regarding communication as not having been successfully established, the process ends.

Therefore, on both of the own device side and game device 3 side, in order to satisfy the transmission/reception condition data with regard to application A, transmission/reception is processed as having been successful. Therefore, even when communication is cut off during the process, the transmission/reception condition data is checked. When it is determined that communication has been successful, the processing can be valid and thus data can appropriately be given/received.

On the other hand, with regard to application B, since the transmission/reception condition data is not satisfied on the own device side and on game device 3 side, the processing is performed as being regarded as communication error. Namely, even when communication is cut off during the process and only reception data is received or only transmission data is transmitted, a communication error can appropriately be determined and the processing can be invalid. Thus, data can appropriately be given/received.

This is also applicable to applications C and D.

Figure 65:
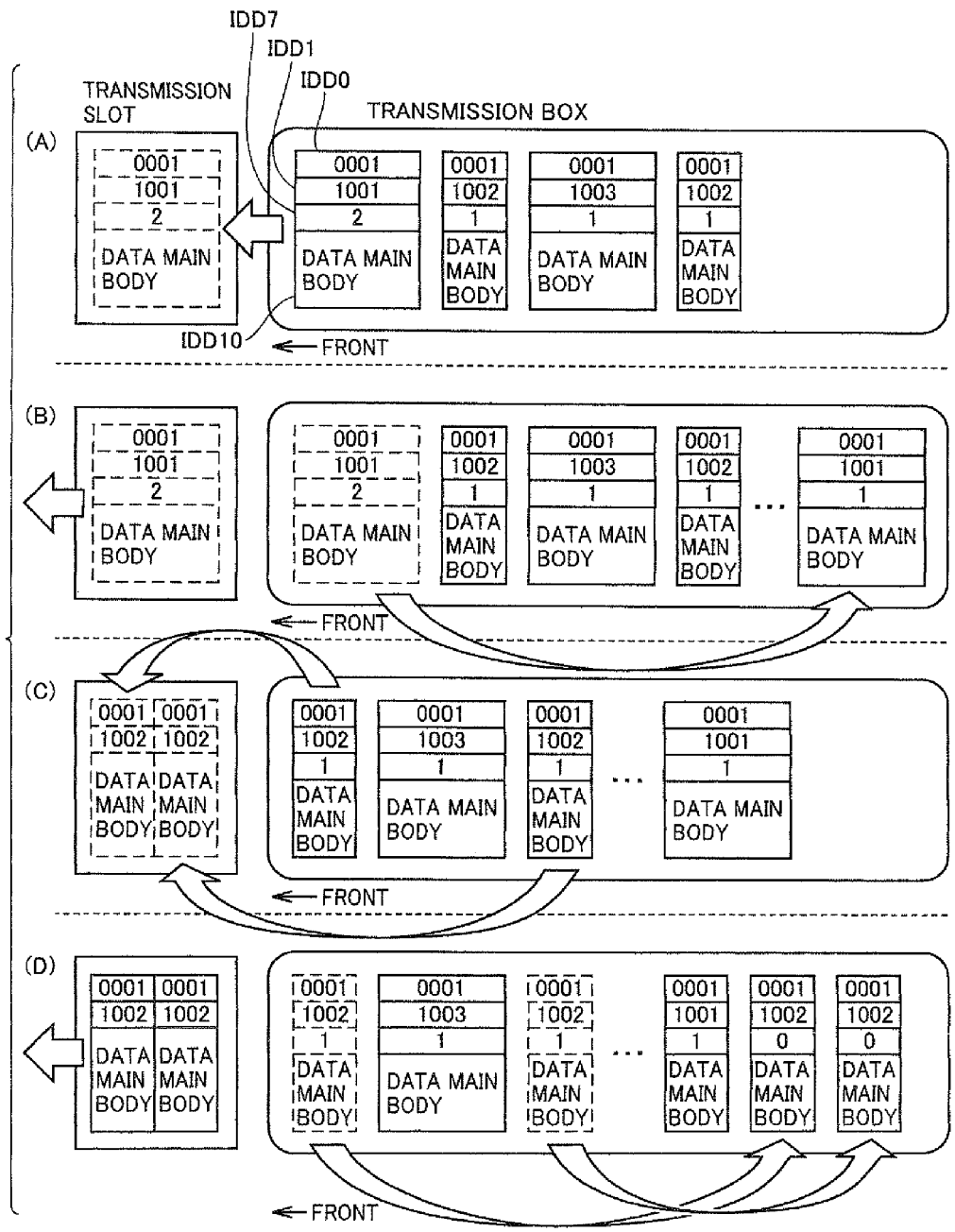
FIG. 65 is a conceptual diagram illustrating update of the number of times of transmission and change in sequence of pieces of exchange data in the data storing processing according to an embodiment of the present invention.

FIG. 65 is a conceptual diagram illustrating update of the number of times of transmission of exchange data and change in sequence in the data storing processing according to an embodiment of the present invention.

Referring to FIG. 65, here, a case where four pieces of data are stored in the transmission BOX is shown. For the sake of brevity of illustration, ID data IDD0, data group ID IDD1, the number of times of transmission IDD7, and data main body IDD10 are shown as the data structure of the exchange data stored in the transmission BOX. In the present example, a flow of data in the transmission slot and the transmission BOX in data transmission performed twice will be described. FIGS. 65(A) and 65(B) show data transmission for the first time. FIGS. 65(C) and 65(D) show data transmission for the second time.

In accordance with the processing described above, initially, as shown in FIG. 65(A), a case where data in the front (at the left end) in the transmission BOX is checked and the first data is stored in the transmission slot is shown. It is noted that the number of times of transmission of first data is set to two. It is noted that the number of times of transmission of data has been set in the communication condition setting processing (step S7) in FIG. 9.

Then, in accordance with the processing described above, whether data identical in data group ID is stored in the transmission BOX or not is determined. Since data identical in data group ID is not stored in the transmission BOX, creation of the transmission slot is completed.

Then, as shown in FIG. 65(B), a case where, after the exchange data stored in the transmission slot is transmitted, the data in the front in the transmission BOX is arranged at the end in the transmission BOX as a result of the data storing processing is shown. Then, the number of times of transmission is updated from two to one.

In FIG. 65(C), in data transmission for the second time, the data in the front (at the left end) in the transmission BOX is checked, the first data is stored in the transmission slot, and in accordance with the processing described above, whether data identical in data group ID is stored in the transmission BOX or not is determined. Since the data identical in data group ID is stored in the transmission BOX, third data is further stored in the transmission slot and creation of the transmission slot is completed. It is noted that the number of times of transmission of the first and third data is set to one.

Then, as shown in FIG. 65(D), a case where, after the exchange data stored in the transmission slot is transmitted, the first data in the front in the transmission BOX and the third data are arranged at the end in the transmission BOX as a result of the data storing processing is shown. Then, the number of times of transmission is updated from one to zero.

Therefore, the data arranged in the transmission BOX is sequentially transmitted and transmission of the same exchange data is suppressed, so that zest in transmission/reception of the exchange data is enhanced.

(Data Transfer Processing)

A data transfer scheme according to an embodiment of the present invention will now be described.

Figure 66:
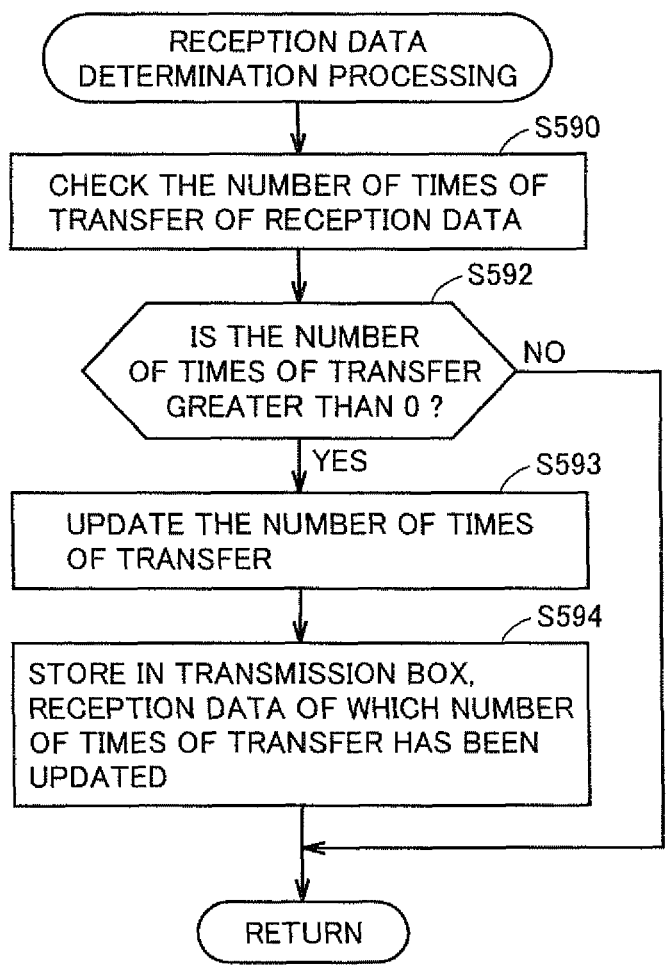
FIG. 66 is a flowchart of reception data determination processing according to an embodiment of the present invention.

FIG. 66 is a flowchart of reception data determination processing according to an embodiment of the present invention.

Referring to FIG. 66, after CPU 31 (data storing processing unit 210) caused the reception BOX to store the reception data, it checks the number of times of transfer of the stored reception data (step S590).

Then, CPU 31 (data storing processing unit 210) determines whether the transfer condition is satisfied or not, that is, in the present example, whether the number of times of transfer is greater than 0 or not (step S592).

When the transfer condition is satisfied in step S592, that is, when it is determined in the present example that the number of times of transfer is greater than 0 (YES in step S592), CPU 31 (data storing processing unit 210) updates the number of times of transfer (step S593). Specifically, the number of times of transfer is decreased by one. For example, when the number of times of transfer was set to one, the number of times of transfer is updated to 0. The number of times of transfer means the number of times of transfer of the reception data. Therefore, when the number of times of transfer is set to 0, the game device that received the reception data having that number of times of transfer set does not transfer (transmit) the reception data of another game device.

Then, when it is determined that the transfer condition is satisfied, CPU 31 (data storing processing unit 210) copies the reception data of which number of times of transfer has been updated and causes the transmission BOX to store the data (step S594). Then, the process ends (RETURN).

On the other hand, when CPU 31 (data storing processing unit 210) determines in step S592 that the transfer condition is not satisfied, that is, when it is determined that the number of times of transfer is not greater than 0 (NO in step S592), the processing in steps S593 and 594 is skipped and the process ends (RETURN).

Namely, when the reception data satisfying the transfer condition (of which value for the number of times of transfer greater than 0 is set) is received, the reception data is copied and stored in the transmission BOX. Namely, the data is stored in the transmission BOX and stored in the transmission slot, and the reception data is automatically further transmitted to another game device without user's awareness.

In the present example, by way of example, though a case where the reception data is stored in the reception BOX, thereafter the number of times of transfer of the stored reception data is checked, and the data is stored in the transmission BOX based on whether the transfer condition is satisfied or not is described, the reception data determination processing may be performed before storage in the reception BOX. Specifically, the reception data determination processing in step S578 may be performed between step S574 and step S576.

Figure 67:
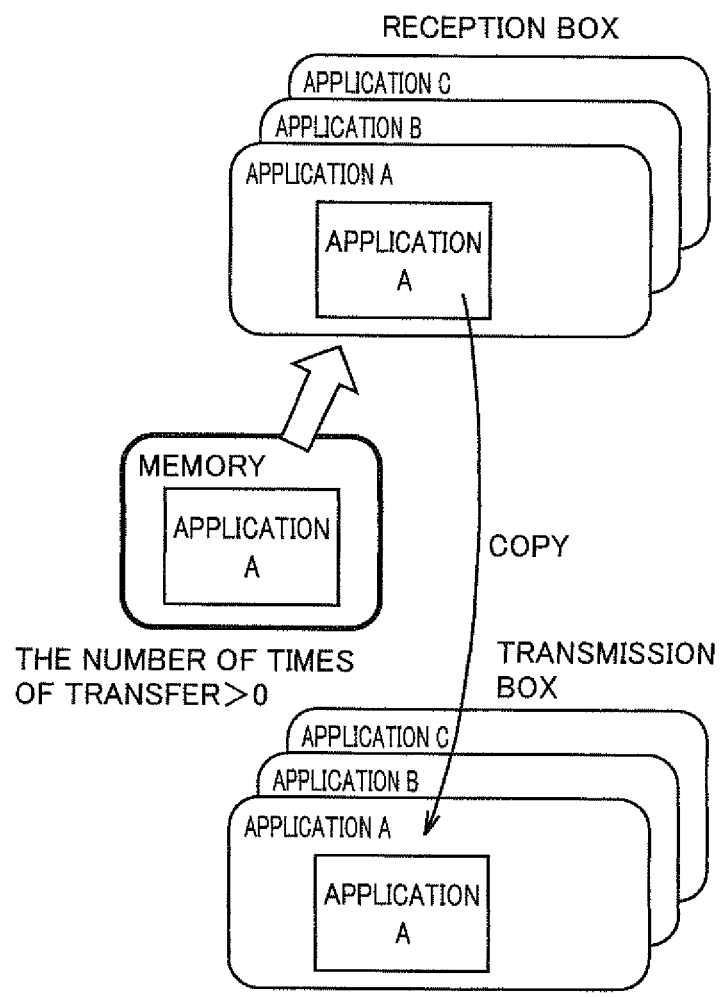
FIG. 67 is a diagram illustrating a flow of the reception data satisfying a transfer condition according to an embodiment of the present invention.

FIG. 67 is a diagram illustrating a flow of the reception data satisfying a transfer condition according to an embodiment of the present invention.

Referring to FIG. 67, the reception data temporarily stored in the main memory is stored in the reception BOX provided for corresponding application A. Then, in accordance with the processing in FIG. 66 above, the number of times of transfer of the reception data is checked. In the present example, the number of times of transfer of the reception data is assumed to be greater than 0. Therefore, the reception data is copied and stored in the transmission BOX provided for the corresponding application. In the present example, a case where the reception data of application A is stored in the reception BOX and the transmission BOX is shown.

Figure 68:
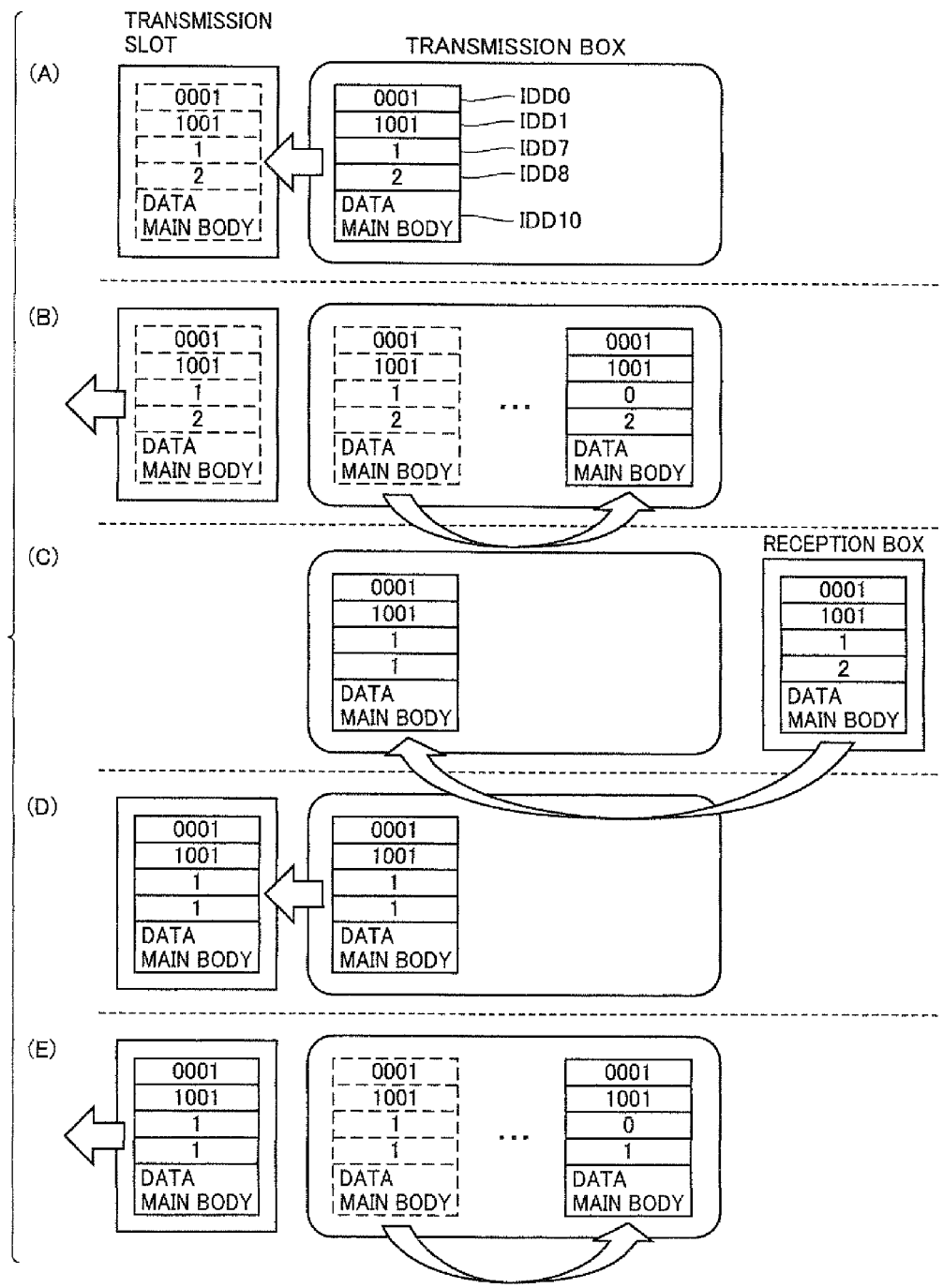
FIG. 68 is a conceptual diagram illustrating processing in an example where exchange data of which number of times of transfer greater than 0 is set is stored in the transmission BOX according to an embodiment of the present invention.

FIG. 68 is a conceptual diagram illustrating processing in an example where exchange data having the number of times of transfer greater than 0 is stored in the transmission BOX according to an embodiment of the present invention.

Referring to FIG. 68, here, a case where one piece of data is stored in the transmission BOX is shown. For the sake of brevity of illustration, here, ID data IDD0, data group ID IDD1, the number of times of transmission IDD7, the number of times of transfer IDD8, and data main body IDD10 are shown as the data structure of the exchange data stored in the transmission BOX. It is noted that FIGS. 68(A) and 68(B) show processing in the own device in the present example. FIGS. 68(C) and 68(D) show processing in another device such as game device 3.

In accordance with the processing described above, initially, as shown in FIG. 68(A), a case where data in the front (at the left end) in the transmission BOX is checked and the first data is stored in the transmission slot is shown. It is noted that the number of times of transmission of the first data is set to one and the number of times of transfer is set to two. It is noted that the number of times of transmission and the number of times of transfer of the data have been set in the communication condition setting processing (step S7) in FIG. 9. In addition, it is assumed that, in the communication condition setting processing, when the number of times of transfer is greater than 0, the number of times of transmission cannot be set to a number greater than 1.

Then, as shown in FIG. 68(B), a case where, after the exchange data stored in the transmission slot is transmitted, the data in the front in the transmission BOX is arranged at the end in the transmission BOX as a result of the data storing processing is shown. Then, the number of times of transmission is updated from one to zero. Therefore, since the number of times of transmission of the data is set to 0, it is not copied and stored from the transmission BOX to the transmission slot.

FIG. 68(C) shows a case where, for example, the reception data transmitted from the own device is received by another device such as game device 3 and stored in the reception BOX is shown.

Then, a case where, in the reception BOX, the number of times of transfer is checked, the number of times of transfer is set to two and hence the number of times of transfer is updated to one, and the data is copied and stored in the transmission BOX is shown.

FIG. 68(D) shows a case where the data stored in the transmission BOX, of which number of times of transfer is set to one, is again stored in the transmission slot in another device such as game device 3 is shown.

Then, as shown in FIG. 68(E), a case where, in another device such as game device 3, the exchange data stored in the transmission slot is transmitted, and thereafter the data in the front in the transmission BOX is arranged at the end of the transmission BOX as a result of the data storing processing is shown. Then, the number of times of transmission is updated from one to zero. Therefore, since the number of times of transmission of the data is set to 0, the data is not copied and stored from the transmission BOX to the transmission slot. The processing is performed in each game device each time the exchange data is transferred.

Figure 69:
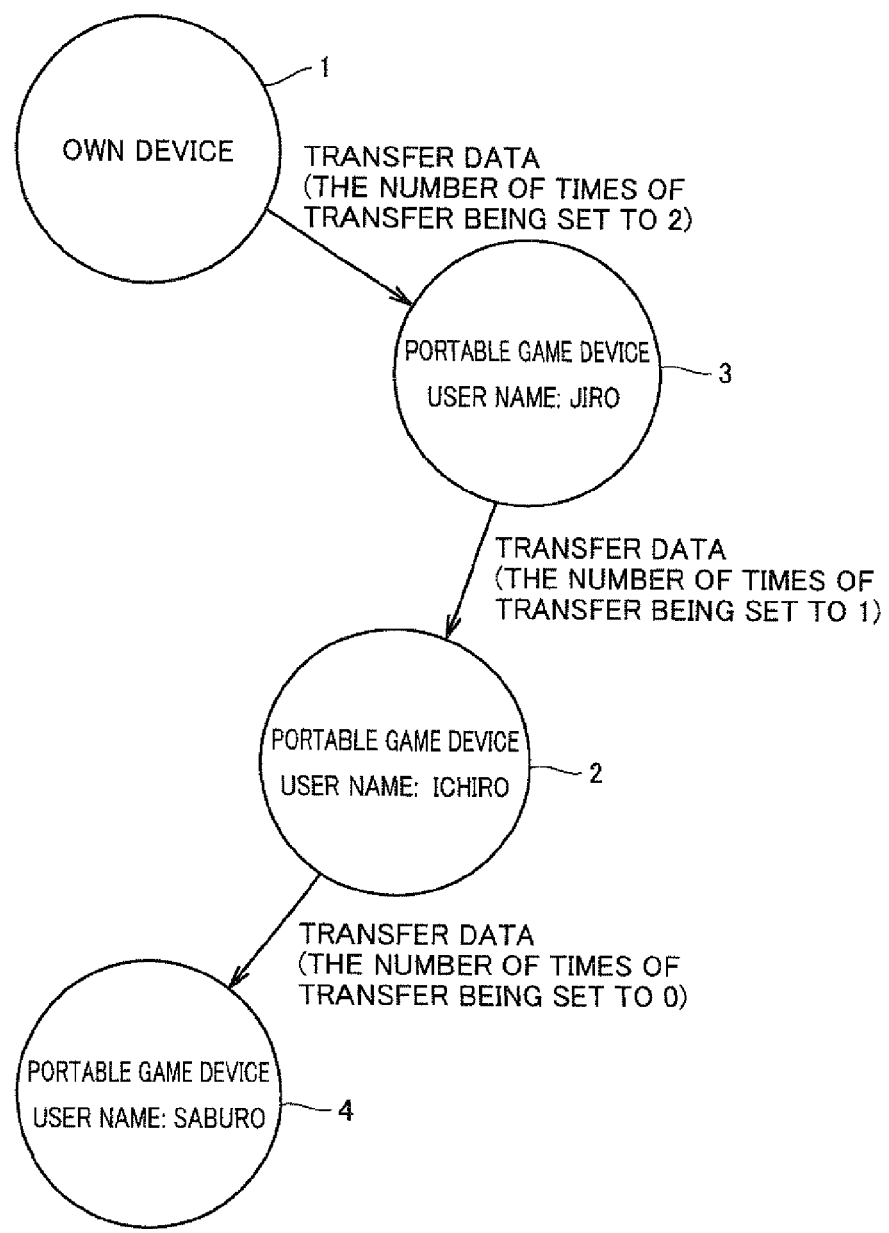
FIG. 69 is a diagram illustrating a conceptual diagram of transfer of exchange data according to an embodiment of the present invention.

FIG. 69 is a diagram illustrating a conceptual diagram of transfer of exchange data according to an embodiment of the present invention.

Referring to FIG. 69, in the present example, a case where own device 1 and game devices 2 to 4 are provided is shown.

In the present example, since the exchange data is transferred, it is described as the transfer data. For example, it is assumed that the number of times of transfer of the transfer data is set in own device 1. It is noted that the number of times of transmission is set to one.

The transfer data of which number of times of transfer is set to 2 is transmitted from own device 1 to game device 3. Then, the transfer data of which number of times of transfer is set to 1 is transmitted from game device 3 to game device 2. Then, the transfer data of which number of times of transfer is set to 0 is transmitted from game device 2 to game device 4.

Therefore, the transfer data transmitted from own device 1 to game device 3 (the number of times of transfer being set to 2) is transferred twice from game device 3 through other devices.

Therefore, the number of times of transfer of the exchange data can be set and zest in transmission/reception of the exchange data is enhanced.

In addition, by setting the number of times of transfer, endless transfer of the exchange data can be suppressed and data communication reflecting intention of a sender who transmits the exchange data can be achieved. Further, by setting the number of times of transfer, endless transfer of the exchange data can be suppressed and communication traffic can be decreased.

<MAC Address Saving Processing>

Figure 70:
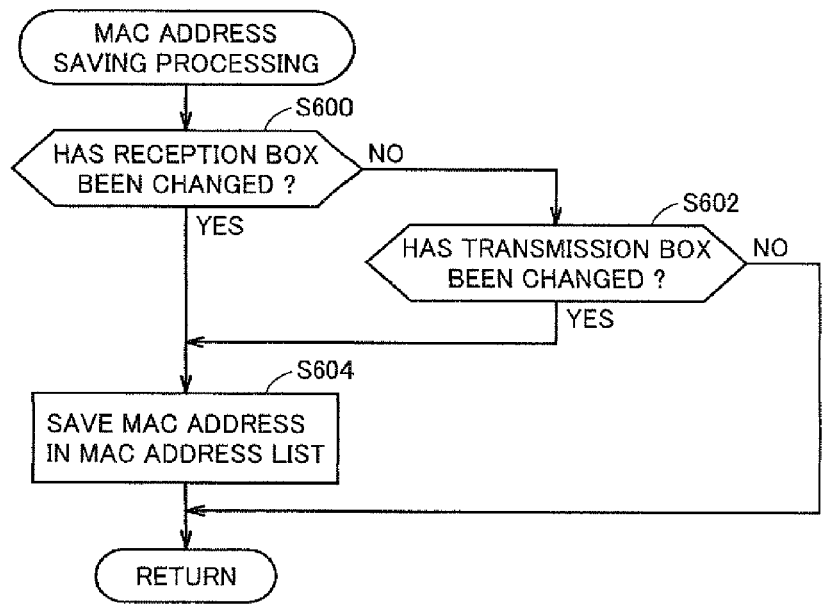
FIG. 70 is a flowchart of MAC address saving processing according to the present embodiment.

FIG. 70 is a flowchart of MAC address saving processing according to the present embodiment.

Referring to FIG. 70, CPU 31 (device identification information registration processing unit 211) determines whether at least one reception BOX in reception data saving area 82 has been changed or not (step S600).

When it is determined in step S600 that at least one reception BOX in reception data saving area 82 has not been changed (NO in step S600), CPU 31 (device identification information registration processing unit 211) then determines whether at least one transmission BOX in exchange data saving area 80 has been changed or not (step S602).

Then, when it is determined in step S600 that at least one reception BOX in reception data saving area 82 has been changed (YES in step S600) or when it is determined that at least one transmission BOX in exchange data saving area 80 has been changed (YES in step S602), CPU 31 (device identification information registration processing unit 211) causes saving data memory 34 to save the MAC address for identifying the communication partner in MAC address list saving area 88 (step S604). The MAC address saved in MAC address list saving area 88 is included in a part of the MAC address list and used in the communication setting processing described above.

On the other hand, when CPU 31 (device identification information registration processing unit 211) determines in step S602 that neither of the reception BOX and the transmission BOX has been changed (NO in step S602), the MAC address for identifying the communication partner is not saved but the process ends (RETURN). Therefore, in this case, since the exchange data could not appropriately been obtained, the MAC address is not saved in MAC address list saving area 70. Therefore, the processing described above can again be performed to resume the data giving/receiving processing of the exchange data in accordance with communication between portable terminals.

In the present example, though a case where, when at least one reception BOX or transmission BOX has been changed, that is, when processing for giving/receiving at least one piece of exchange data (communication processing) is performed with the communication partner, CPU 31 (device identification information registration processing unit 211) causes saving data memory 34 to save (register) the MAC address for identifying the communication partner in MAC address list saving area 88 is described, there is also a case that communication is cut off during the process and communication error occurs as described above. Therefore, the MAC address may be registered when communication error does not occur and the communication processing completely (appropriately) ends (for example, a case of transmission completion flag ON and reception completion flag ON, or the like).

Then, since the MAC address list is saved in MAC address list saving area 70 through the communication setting processing, communication with the same game device over and over again can be prevented by the MAC address filtering processing described above and efficient and effective data communication can be achieved.

In the present example, the MAC address list saved in MAC address list saving area 88 provided in saving data memory 34 on the main body side is the same as the MAC address list stored in MAC address list saving area 70 in wireless communication module 38, and the scheme described above may be implemented by using only MAC address list saving area 70.

Meanwhile, by providing MAC address list saving area 88 in saving data memory 34 on the main body side and saving the MAC address in MAC address list saving area 88, edition such as addition or deletion of data of the MAC address can be carried out more readily and faster than in a case where wireless communication module 38 is accessed to edit the data in MAC address list saving area 70.

In addition, in the present example, though a case where, when the exchange data is saved in the reception BOX in reception data saving area 82, that is, when the processing for giving/receiving the exchange data with the communication partner (communication processing) is performed, CPU 31 (device identification information registration processing unit 211) causes saving data memory 34 to save the MAC address for identifying the communication partner in MAC address list saving area 88 by way of example has been described, the order is not particularly limited as such. For example, after the sleep state is canceled in step S142 and before the data giving/receiving processing is started in FIG. 40, the MAC address identifying the communication partner can also be saved.

Namely, according to this configuration, when wireless communication module 38 gives a notification to the main body portion, for example, when the sleep state is canceled while the sleep state has been set, the MAC address in another game device in which the sleep state has been canceled is saved in MAC address list saving area 88 owing to device identification information registration processing unit 211. As a result of the processing described above, efficient data communication without establishing communication with the communication partner about which notification has been given to the main body portion, that is, of which sleep state has been canceled while it had been in the sleep state, can be carried out.

In the configuration, though a case where, on condition that a notification was given to the main body portion, that is, the sleep state was canceled while the sleep state had been set (registration condition), CPU 31 (device identification information registration processing unit 211) causes saving data memory 34 to save (register) the MAC address for identifying the communication partner in MAC address list saving area 88 has been described, the MAC address may be registered when the sleep state is canceled and then determination processing under other conditions is performed and the determination processing under those other conditions is satisfied, without limited only to a case where a notification to the main body portion, that is, canceling of the sleep state while the sleep state has been set, is adopted as the registration condition for registering the MAC address.

<Data Notification Processing>

Figure 71:
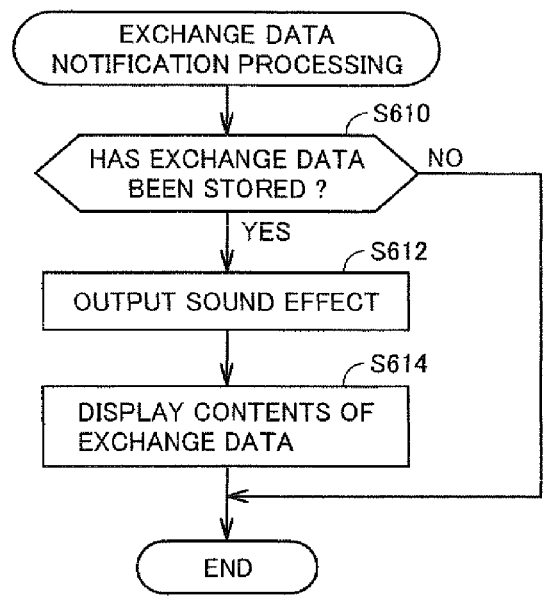
FIG. 71 is a flowchart illustrating data notification processing according to an embodiment of the present invention.

FIG. 71 is a flowchart illustrating data notification processing according to an embodiment of the present invention. The data notification processing is implemented by CPU 31 executing the main body function program stored in system program saving area 86 described above, by way of example.

Referring to FIG. 71, CPU 31 (data notification processing unit 212) determines whether or not the exchange data has been stored in the reception BOX in reception data saving area 82 (step S610).

Then, when it is determined that the exchange data has been stored in the reception. BOX in reception data saving area 82 (YES in step S610), CPU 31 (data notification processing unit 212) outputs sound effect (step S612). Specifically, CPU 31 (data notification processing unit 212) instructs output of sound effect prepared in advance from speaker 45 described with reference to FIG. 2. Then, CPU 31 (data notification processing unit 212) causes display of the contents of exchanged data (step S614). Specifically, CPU 31 (data notification processing unit 212) instructs LCD 12 to output an indication that the exchange data is present. Then, the process ends (END). It is noted that the indication that the exchange data is present may be provided for each reception BOX in which the exchange data is stored or indications may be displayed in a list at once in correspondence with all reception BOXes in which the exchange data is stored.

By the output of sound effect from speaker 45 and display on LCD 12, the user can recognize that the exchange data is stored.

In the present example, though a case where the user is notified of the fact that giving/receiving of exchange data has been carried out through the sense of hearing and the sense of sight based on the sound effect from speaker 45 and display on LCD 12 has been described by way of example, either one of these may be sufficient. Alternatively, for example, the user may be notified of the fact that giving/receiving of exchange data has been carried out through the sense of touch, based on vibration of the game device utilizing a vibration function.

It is assumed that, as the exchange data is stored, the user launches the application that can use the exchange data. Then, when the application is launched, the exchange data that has been stored in the exchange data saving area is erased.

<Exchange Data Adding and Erasing Processing>

Figure 72:
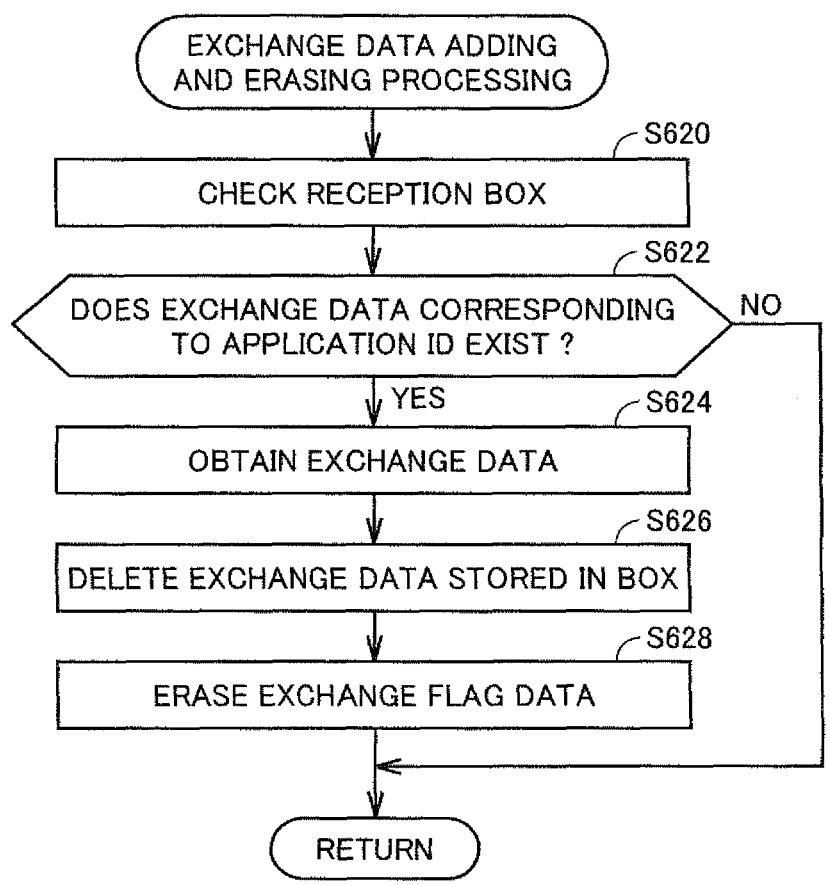
FIG. 72 is a flowchart representing exchange data adding and erasing processing according to an embodiment of the present invention.

FIG. 72 is a flowchart representing exchange data adding and erasing processing according to an embodiment of the present invention. Namely, the processing in step S22 in FIG. 9 will be described.

It is noted that, by way of example, the processing for adding and erasing the exchange data is realized by CPU 31 executing an application program stored in ROM 27 of memory card 26.

Referring to FIG. 72, initially, CPU 31 (exchange data adding and erasing processing unit 214) checks the reception BOX in reception data saving area 82 (step S620).

Then, CPU 31 (exchange data adding and erasing processing unit 214) determines whether or not the exchange data corresponding to the application ID of the application that is being executed and of which data has been loaded exists in the corresponding reception BOX in reception data saving area 82 (step S622).

Then, when it is determined that the exchange data corresponding to the application ID exists in the reception BOX in reception data saving area 82, CPU 31 (exchange data adding and erasing processing unit 214) obtains the exchange data (step S624).

Through the processing, it becomes possible to execute the application using the obtained exchange data.

Here, the obtained exchange data may be transferred and saved as save data in a save area (back-up RAM) of its own. Further, with this operation, the exchange data in the reception BOX in reception data saving area 82 can be deleted.

In the present example, an example in which whether or not the exchange data exists in the reception BOX in reception data saving area 82 is determined and when it exists in reception data saving area 82, the exchange data is obtained is described. At this time, however, the fact that the exchange data has been obtained (more preferably, contents in the obtained exchange data) may be presented to the user. Further, it is also possible to have the user select whether or not to use the exchange data.

Then, CPU 31 (exchange data adding and erasing processing unit 214) deletes the exchange data corresponding to the application ID stored in the transmission BOX in exchange data saving area 80 (step S626). Specifically, data located at the end in the transmission BOX, of which number of times of transmission is set to 0, should only be deleted.

Here, the exchange data stored as save data in the save area (back-up RAM) of its own can also be deleted.

Through this processing, the exchange data corresponding to the application ID stored in the transmission BOX in exchange data saving area 80 is deleted and thus the processing for exchanging the exchange data is completed.

Then, as the exchange data stored in exchange data saving area 80 is deleted, CPU 31 (exchange data adding and erasing processing unit 214) erases the exchange flag data stored in back-up RAM 28 (step S628).

Then, the process ends (RETURN).

Then, the process proceeds to step S5 as described with reference to FIG. 9.

In the present example, though such a scheme that, at the time when the application is launched, the reception BOX in reception data saving area 82 is checked based on presence/absence of the exchange flag data, when the exchange data exists, the exchange data stored in the reception BOX in reception data saving area 82 is obtained and the exchange data stored in the transmission BOX in exchange data saving area 80 is deleted has been described, it is also possible to delete the exchange data stored in the transmission BOX in exchange data saving area 80 even though the application is not launched. For example, in response to CPU 31 causing storage of exchange data from another game device in the reception BOX in reception data saving area 82, an instruction may be issued to delete the exchange data stored in the transmission BOX in exchange data saving area 80.

In addition, in the present example, though a case where the exchange data corresponding to the application ID stored in the transmission BOX in exchange data saving area 80 is erased has been described, the exchange data can also be maintained as it is, without being erased. In that case, replicated data is given/received instead of the exchange data exchange processing. For example, by way of example, when the transmission/reception condition data is included in the application ID as described above and only reception communication is included as a condition as the transmission/reception condition data, the processing may be such that the exchange data is not erased but maintained as it is. Alternatively, in another case, for example, in a case where the transmission/reception condition data as described above is included in the application ID by way of example, when the number of times of transmission is set to one or more as well, while bidirectional communication (communication being permitted in any communication) is included as a condition as the transmission/reception condition data, the processing may be such that the exchange data is not erased from the transmission BOX but maintained as it is.

Though deletion of data located at the end in the transmission BOX, of which number of times of transmission is set to 0, has been described, the number of pieces of data to be deleted is not limited to one and all pieces of data in the transmission BOX, of which number of times of transmission is set to 0, may be deleted.

When the number of times of transmission is set to 0, copying and storage from the transmission BOX to the transmission slot is unlikely and thus the transmission BOX can be cleaned up through this processing.

It is noted that, when the game device transfers the transfer data in accordance with the number of times of transfer set by communication condition setting processing unit 202, the transfer data of which number of times of transmission stored in the transmission BOX is set to 0 may not automatically be deleted. In the case of the transfer data, since the data is transferred regardless of intention of the user of the game device, by leaving the data in the transmission BOX, the user may grasp what was transferred. Alternatively, in the case of the transfer data, in copying the transfer data in the reception BOX and storing the copy in the transmission BOX, only data necessary for display of the transfer data may be stored. In this case, the transfer data of which number of times of transmission is set to 0 may be deleted and information on the transfer data may be displayed on a BOX display screen which will be described later, based on data necessary for displaying the stored transfer data.

<Communication Condition Setting Processing>

Figure 73:
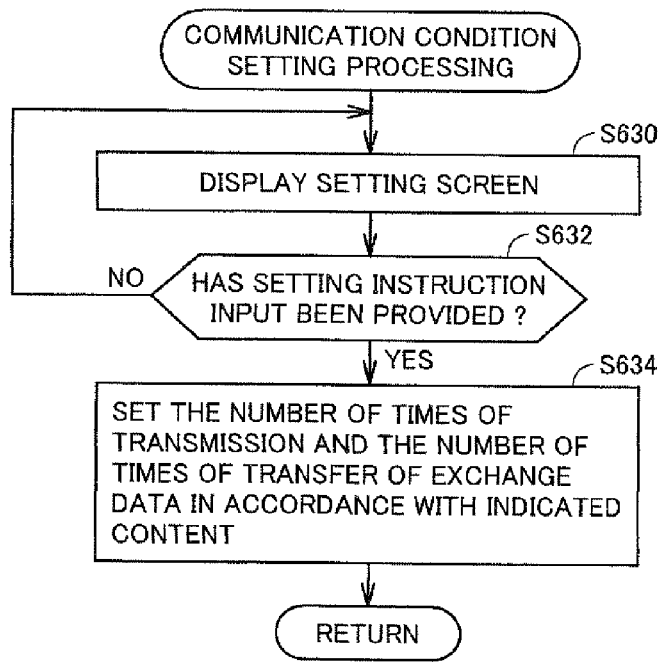
FIG. 73 is a flowchart of communication condition setting processing according to an embodiment of the present invention.

FIG. 73 is a flowchart of the communication condition setting processing according to an embodiment of the present invention. Namely, the processing in step S7 in FIG. 9 will be described.

It is noted that the communication condition setting processing is implemented by CPU 31 executing the application program stored in ROM 27 of memory card 26 by way of example.

Referring to FIG. 73, initially, CPU 31 (communication condition setting processing unit 202) causes a setting screen to be displayed (step S630).

Figure 74:
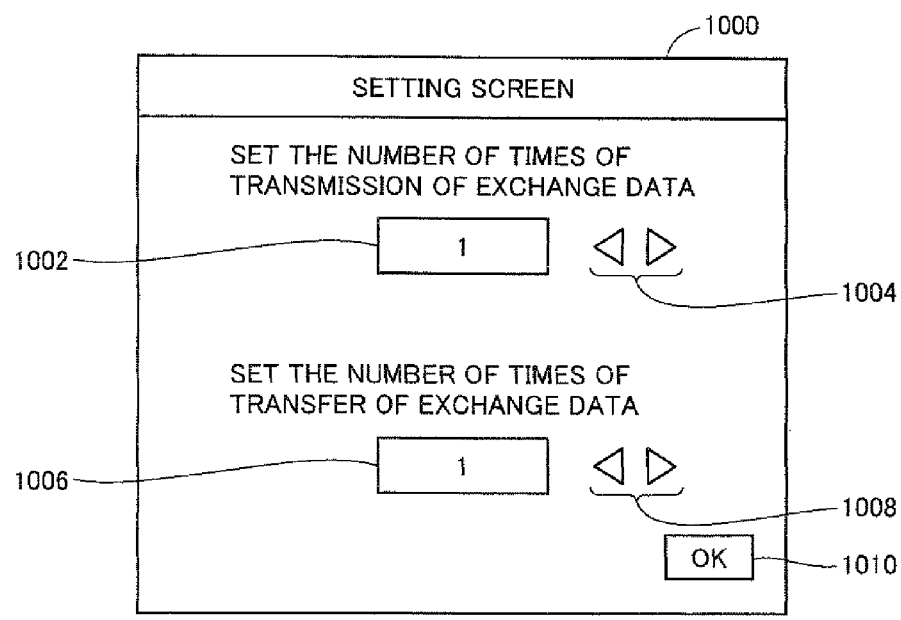
FIG. 74 is a diagram illustrating a communication condition setting screen according to an embodiment of the present invention.

FIG. 74 is a diagram illustrating a communication condition setting screen according to an embodiment of the present invention.

Referring to FIG. 74, a case where a display field 1002 for displaying the number of times of transmission and a the-number-of-times-of-transmission UP/DOWN button 1004 are provided together with an indication "set the number of times of transmission of exchange data" on a communication condition setting screen 1000 displayed on LCD 12 is shown. In addition, a case where a display field 1006 for displaying the number of times of transfer and a the-number-of-times-of-transfer UP/DOWN button 1008 are provided together with an indication "set the number of times of transfer of exchange data" is shown. Moreover, an "OK" button 1010 is provided. By operating the-number-of-times-of-transmission UP/DOWN button 1004, the number of times of transmission is incremented or decremented so as to be able to set the number of times. Meanwhile, by operating the-number-of-times-of-transfer UP/DOWN button 1008, the number of times of transfer is incremented or decremented so as to be able to set the number of times. Then, displayed contents can be set by pressing "OK" button 1010. In the present example, a case where the number of times of transmission is set to one and the number of times of transfer is set to one is shown by way of example. In the case of the exchange data of which number of times of transmission is set to one and number of times of transfer is set to one, the exchange data transmitted to the partner is stored in the reception BOX and also in the transmission BOX and it is further transmitted to another game device as described above.

It is noted that setting is made such that, when the number of times of transfer is greater than 1, the number of times of transmission cannot be set to a value greater than 1. This is because, if the number of times of transmission is set to 2 or more, the exchange data may extensively transfer to a range beyond the sender's intention, depending on combination with the number of times of transfer.

Referring again to FIG. 73, CPU 31 (communication condition setting processing unit 202) determines whether a setting instruction input has been provided to the setting screen or not (step S632). Specifically, whether the "OK" button has been pressed or not is determined.

Then, when CPU 31 (communication condition setting processing unit 202) determines in step S632 that a setting instruction input has been provided (YES in step S632), the number of times of transmission and the number of times of transfer of the exchange data are set in accordance with the indicated content (step S634). Then, the process ends (RETURN). Namely, the process proceeds to step S8 described with reference to FIG. 9.

In the present example, a case where the communication condition setting processing described with reference to FIG. 73 is performed when an exchange data designation input has been given in step S6 in FIG. 9 is described. Namely, though a case where the user can arbitrarily set the number of times of transfer and the number of times of transmission in communication condition setting screen 1000 is described, the number of times of transfer and the number of times of transmission may automatically be set through the application execution processing. Specifically, the user is allowed to arbitrarily set the number of times of transmission and the number of times of transfer in accordance with a type of exchange data when an exchange data registration event occurs, or the application may automatically set the number of times.

<BOX Access Processing>

Figure 75:
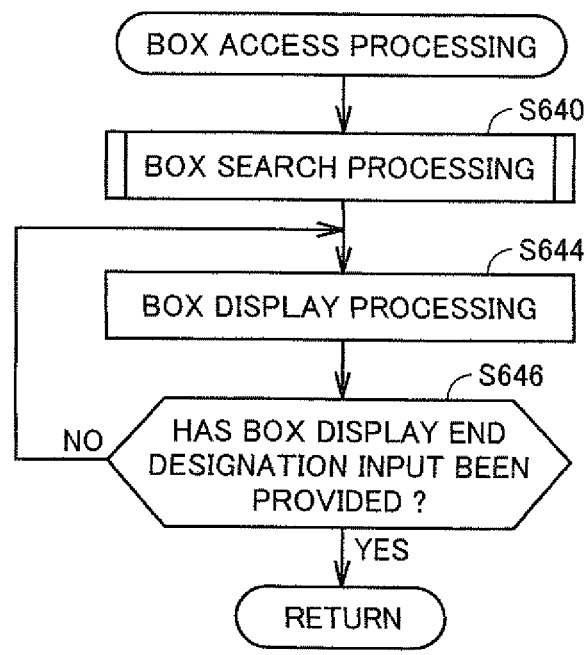
FIG. 75 is a flowchart of BOX access processing according to an embodiment of the present invention.

FIG. 75 is a flowchart of the BOX access processing according to an embodiment of the present invention. Namely, the processing in step S26 in FIG. 9 will be described.

It is noted that the BOX access processing is implemented by CPU 31 executing the application program stored in ROM 27 of memory card 26 by way of example.

Referring to FIG. 75, when an input to designate BOX check has been given, CPU 31 (BOX access processing unit 215) performs processing for searching for a transmission BOX and a reception BOX in exchange data saving area 80 and reception data saving area 82 (step S640).

Figure 76:
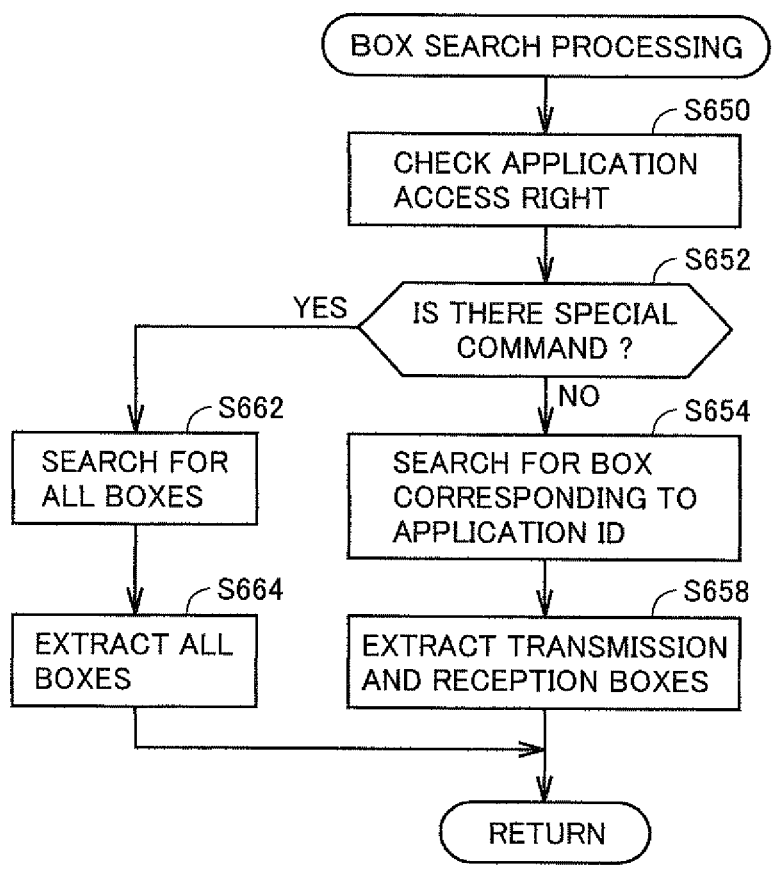
FIG. 76 is a flowchart illustrating BOX search processing according to an embodiment of the present invention.

FIG. 76 is a flowchart illustrating BOX search processing according to an embodiment of the present invention.

Referring to FIG. 76, CPU 31 (BOX access processing unit 215) initially checks an application access right (step S650). Specifically, whether or not a special command instead of data for identifying a specific application is included in an input (command) to designate checking of a BOX stored in saving data memory 34 indicated as a result of execution of the application is checked. For example, it is assumed that, in such a case that the application program is a management program managing information stored in system program saving area 86, a special command is included.

Then, CPU 31 (BOX access processing unit 215) determines whether there is a special command or not (step S652).

When CPU 31 (BOX access processing unit 215) determines in step S652 that there is a special command (YES in step S652), it searches for all boxes (step S662).

Then, CPU 31 (BOX access processing unit 215) extracts all retrieved boxes (step S664). Then, the process ends (RETURN).

On the other hand, when CPU 31 (BOX access processing unit 215) determines in step S652 that there is no special command (NO in step S652), it searches for a BOX corresponding to the application ID (step S654).

Then, CPU 31 (BOX access processing unit 215) extracts a transmission BOX and a reception BOX of the corresponding application ID (step S658). Then, the process ends (RETURN).

Referring again to FIG. 75, CPU 31 (BOX access processing unit 215) performs processing for displaying the extracted transmission BOX and reception BOX (step S644). Specifically, the extracted BOX is displayed on LCD 12. Then, in step S646, CPU 31 (BOX access processing unit 215) determines whether a BOX display end designation input has been provided or not (step S646). When CPU 31 (BOX access processing unit 215) determines in step S646 that a BOX display end designation input has been provided (YES in step S646), the process ends (RETURN). On the other hand, when CPU 31 (BOX access processing unit 215) determines in step S646 that a BOX display end designation input has not been provided (NO in step S646), the process returns to step S644.

Figure 77:
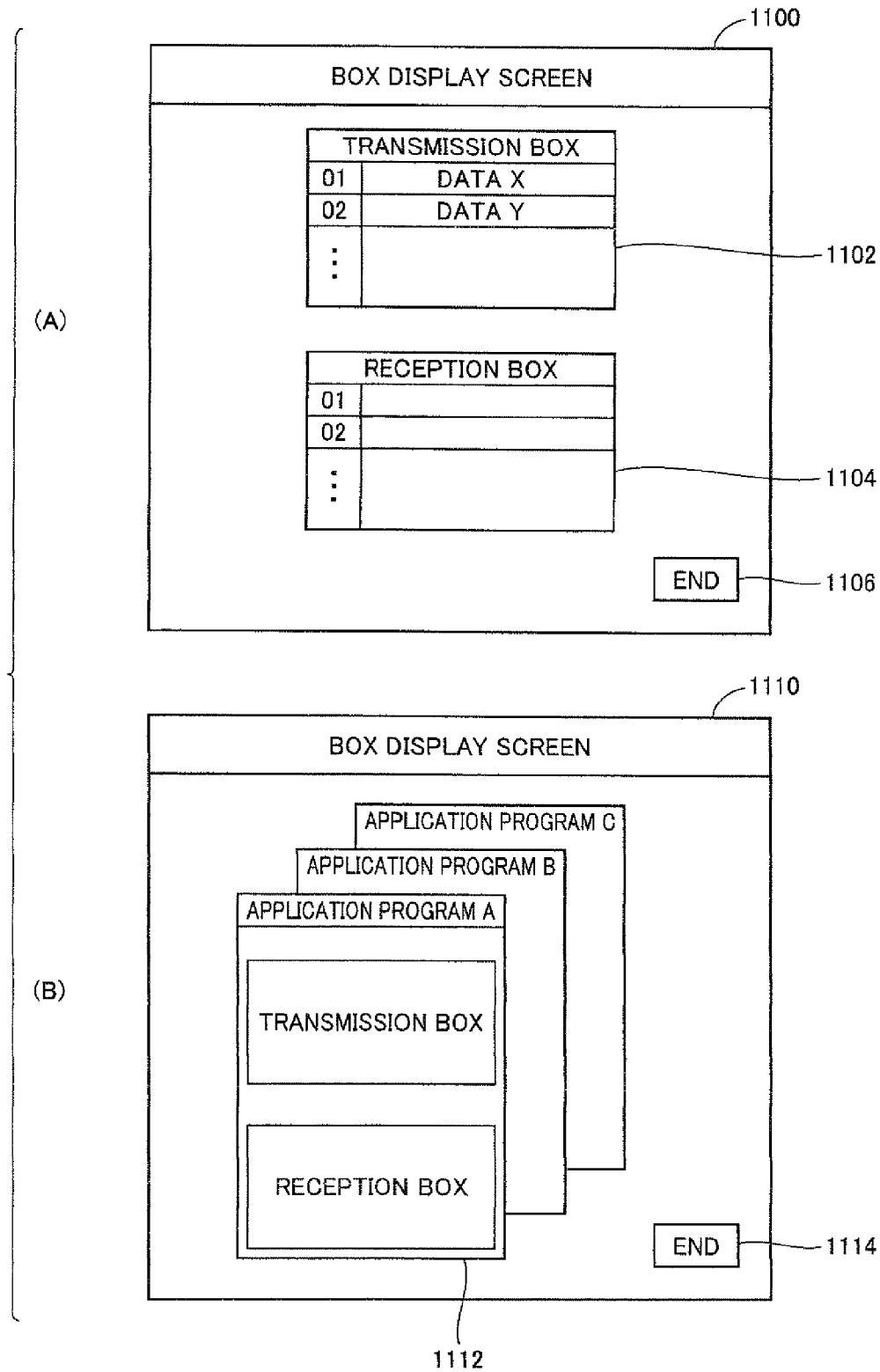
FIG. 77 is a diagram illustrating a BOX display screen according to an embodiment of the present invention.

FIG. 77 is a diagram illustrating a BOX display screen according to an embodiment of the present invention.

Referring to FIG. 77(A), in a BOX display screen 1100 according to the present example, a case where a transmission BOX 1102 and a reception BOX 1104 corresponding to the corresponding application ID are displayed is shown. In addition, an "end" button 1106 is provided and the processing for displaying the BOX can be terminated by pressing "end" button 1106.

Referring to FIG. 77(B), in a BOX display screen 1110 according to the present example, a case where all extracted boxes are displayed is shown. Here, a case where a display region 1112 is provided for each application and a transmission BOX and a reception BOX are displayed in the display region is shown. In addition, an "end" button 1114 is provided and the processing for displaying the BOX can be terminated by pressing "end" button 1114.

Therefore, through the processing, the user can check data stored in the transmission BOX and the reception BOX corresponding to the corresponding application ID.

It is noted that a special command is not limited to a case where an application program is a management program for managing information stored in system program saving area 86, and it can also be included in an input (command) to designate checking of a BOX when another application program is executed.

In general, processing for obtaining information by searching for only a transmission BOX and a reception BOX corresponding to a specific application, with data identifying the specific application being included in the command, is performed. By using the special command, however, processing for obtaining information by searching for all transmission BOXes and reception BOXes can be performed and therefore access to sophisticated game device 1 using the special command can be made. For example, by using the special command, the transmission BOX and the reception BOX stored in saving data memory 34 may directly be accessed from a fixed terminal device.

<Communication Partner Search Processing>

Referring to FIGS. 78 to 81, the communication partner search processing in step S52 (FIG. 18) described previously will be described.

In this processing, game device 1 as a base or a client performs exchange partner search processing for searching for a communicable partner among other game devices.

Game device 1 repeatedly transmits a connection request signal as the transmission wireless frame described above without designating a destination, in order to search for another game device existing in communication range 10 (though a scheme for periodically and repeatedly transmitting the connection request signal will be described in the present embodiment, what is called a probe request scheme may be adopted).

In the present example, it is assumed that the game device as a client transmits the connection request signal as the transmission wireless frame. The game device as the base waits until the connection request signal as the transmission wireless frame transmitted from the client side (that is, reception wireless frame) is received. When the signal is received, in response thereto, the game device as the base transmits a connection response signal as the transmission wireless frame from the base side to the game device on the client side.

By transmission/reception of the connection request signal and the connection response signal, data communication between the game devices as the base and the client becomes possible. Though an example in which the connection request signal is transmitted from the game device on the client side and the connection response signal is transmitted from the game device on the base side is described in the present example, relation between the base and the client may be interchanged.

In such communication partner search processing, each game device 1 alternately repeats the processing for operating as a base to be searched for by a client and the processing for operating as a client to search for a base.

FIG. 78 illustrates a period of one cycle of the communication partner search processing according to an embodiment of the present invention.

Specifically, defining a prescribed time period (Tcycle in FIG. 78) as one cycle, a part of each cycle is defined as a period for a client operation (Tsp in FIG. 78) and a remaining part is defined as a period for a base operation (Tsc). Here, connection can be established between a game device operating as a client and a game device operating as a base, while connection cannot be established between a game device operating as a client and a game device operating as a client and between a game device operating as a base and a game device operating as a base.

Therefore, in a case where the period for operating as a client and the period for operating as a base are fixed, data communication cannot be established between two game devices between which such periods incidentally match with each other.

In order to prevent such a problem, allotment or arrangement of the period for operating as a client and the period for operating as a base in one cycle is changed at random.

A scheme of changing allotment at random corresponds to "communication partner search processing (1)" as shown in FIG. 78(A), and a scheme of changing arrangement at random corresponds to "communication partner search processing (2)" as shown in FIG. 78(B).

Referring to FIG. 78(A), in communication partner search processing (1), allotment of Tsp and Tsc is determined at random as described above. The time period of this processing (1 cycle) is set to a fixed value Tcycle (for example, 4 seconds), a length of Tsc is determined to be a random value between 0 and Tcycle, and a length of Tsp is determined to a remaining period of Tcycle calculated as (Tcycle−Tsc). Further, Tsc and Tsp are set in this order in Tcycle. Since the length of Tsc is determined at random each time, the length of Tsp is also determined at random. Thus, such a state that data communication cannot be carried out with another game device existing in communication range 10 can be avoided. When Tsp becomes too short, however, another game device cannot accurately be searched for and data communication with another game device may not be carried out. Therefore, a minimum necessary period of Tsp may be determined, and when such a period cannot be ensured, Tsc may again be determined.

In this embodiment, though Tcycle is set in the order of Tsc and Tsp, it may be set with the order being reversed.

Referring to FIG. 78(B), in communication partner search processing (2), arrangement of Tsp and Tsc is determined at random as described above. In other words, the length of Tsp is set to a fixed value and the position of start of Tsp in Tcycle is set at random. Specifically, as shown in FIG. 78(B), in communication partner search processing (2), Tcycle (in this embodiment, a fixed value set to 4 seconds) includes Tsp determined to be a fixed value and Tsc1 and Tsc2 with Tsp lying therebetween. Namely, Tsc1, Tsp and Tsc2 are provided in Tcycle in this order. Further, the length of Tsc1 is determined at random between 0 and (Tcycle−Tsp), and the length of Tsc2 is determined by subtracting randomly determined Tsc1 and Tsp from Tcycle.

In the present embodiment, though the start position of Tsp is set at random because Tcycle is set in the order of Tsc and Tsp, the start timing of Tsc may be determined at random when Tcycle is set in the order of Tsp and Tsc.

In communication partner search processing (1) or (2), during time period Tsp, game device 1 repeats the processing for transmitting a connection request signal without specifying a destination and thereafter trying to receive a connection response signal transmitted from another game device 3. In addition, during time period Tsc, game device 1 repeats the processing for trying to receive a connection request signal transmitted from another game device, and when the signal is successfully received, transmitting a connection response signal.

Further, in order to prevent wasteful power consumption, game device 1 is adapted to transmit the connection request signal every prescribed period (in this embodiment, 64 ms) during a period in which it is operating as a client. In other words, data is intermittently transmitted.

In the following, communication partner search processing (1) and communication partner search processing (2) will specifically be described with reference to flowcharts, respectively.

Figure 79:
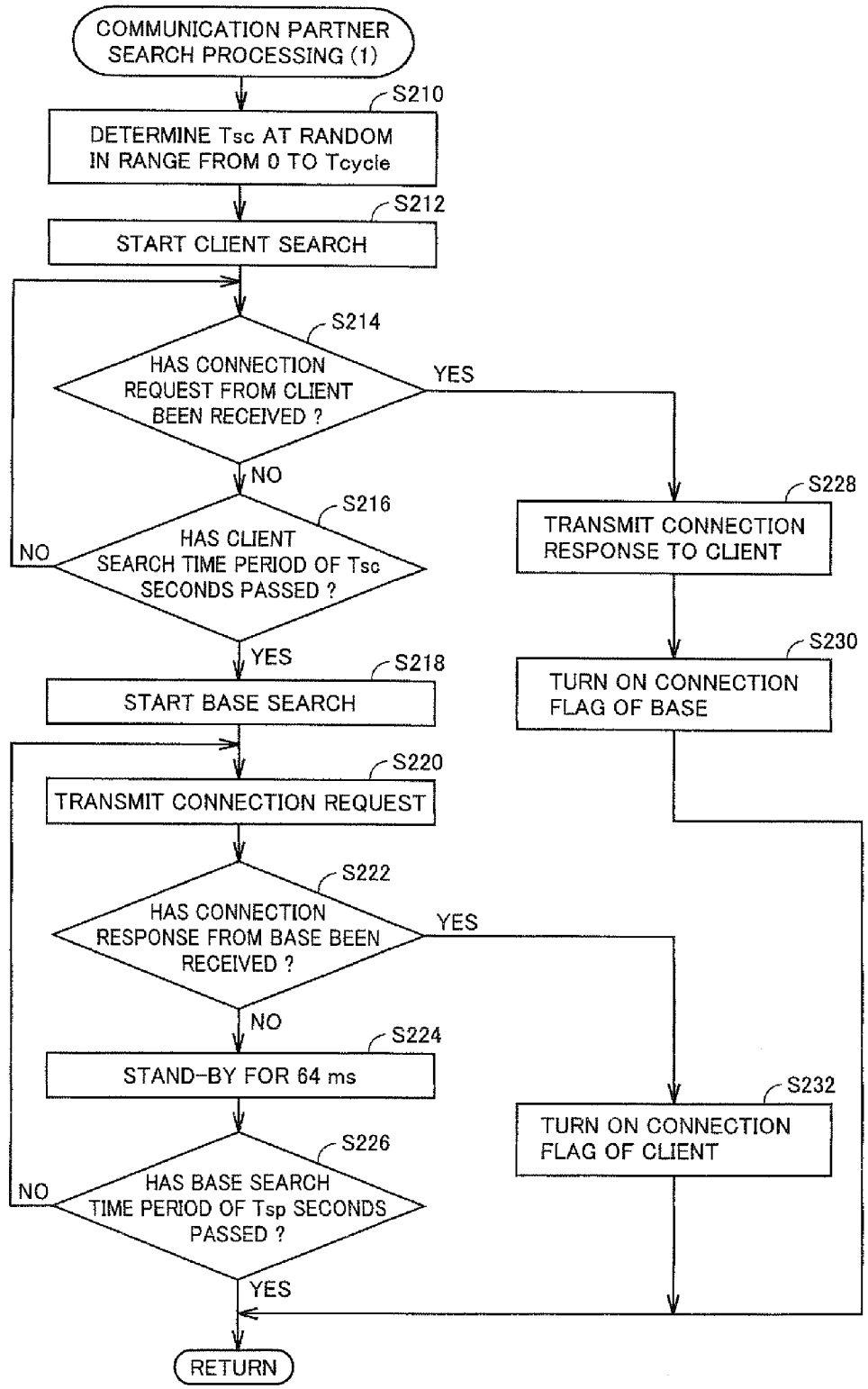
FIG. 79 is a flowchart representing communication partner search processing (1) according to an embodiment of the present invention.

FIG. 79 is a flowchart representing communication partner search processing (1) according to an embodiment of the present invention.

Referring to FIG. 79, when communication partner search processing (1) starts, in step S210, Tsc is determined at random between 0 and Tcycle. Though not shown, since Tcycle is a fixed value, when. Tsc is determined, Tsp is also determined.

Following steps S212 to S216, S228, and S230 are the processing performed in Tsc described above, in which processing for operating as the base and searching for a client is performed. Steps S218 to S226 and S232 are the processing performed in Tsp described above, in which processing for operating as the client and searching for a base is performed.

In step S212, search for a client starts. Though not shown, a timer circuit starts here. Then, in step S214, whether or not the connection request signal which is the transmission wireless frame transmitted from the client (that is, a reception wireless frame) has been received is determined.

When the connection request signal which is the transmission wireless frame transmitted from the client (that is, the reception wireless frame) is received (YES in step S214), in step S228, a connection response signal which is a transmission wireless frame is transmitted to the client. Thereafter, in step S230, a connection flag as a base is turned ON and communication partner search processing (1) ends. In other words, it is found that the game device is capable of communication connection as a base to another game device.

Though not shown in FIG. 79, when communication partner search processing (1) starts, the connection flag as a client is turned OFF (reset) (which is also applicable to the connection flag as a base which will be described later).

When a connection request signal is not received from a client (NO in step S214), in step S216, whether or not the time period of Tsc seconds as the client search time period during which connection from another game device to the base is tried has passed is determined.

When client search time period Tsc has not passed in step S216 (NO in step S216), the process directly returns to step S214.

On the other hand, when the client search time period of Tsc seconds has passed (YES in step S216), search for a base starts in step S218, that is, the timer circuit is reset and started, and in step S220, the connection request signal which is the transmission wireless frame is transmitted without specifying a destination.

Then, in successive step S222, whether or not the connection response signal which is the transmission wireless frame transmitted from the base (that is, the reception wireless frame) has been received is determined. When the connection response signal which is the transmission wireless frame transmitted from the base (that is, the reception wireless frame) is received (YES in step S222), in step S232, the connection flag as a client is turned ON and communication partner search processing (1) ends. In other words, it is found that the game device is capable of communication connection as a client to another game device.

On the other hand, when the connection response signal which is the transmission wireless frame transmitted from the base (that is, the reception wireless frame) has not been received (NO in step S222), in step S224, a stand-by period for 64 ms is provided, and in successive step S226, whether or not the time period of Tsp seconds as the base search time period during which connection with another game device as a client is tried has passed is determined.

When the base search time period of Tsp seconds has not yet passed (NO in step S226), the process directly returns to step S220.

On the other hand, when the base search time period of Tsp seconds has passed (YES in step S226), it is determined that time period Tcycle has passed and communication partner search processing (1) ends.

Since the stand-by period for 64 ms is provided in step S224, the processing for repeating transmission of the connection request signal which is the transmission wireless frame without specifying a destination in step S220 is intermittently performed and thus power consumption can be suppressed.

Figure 80:
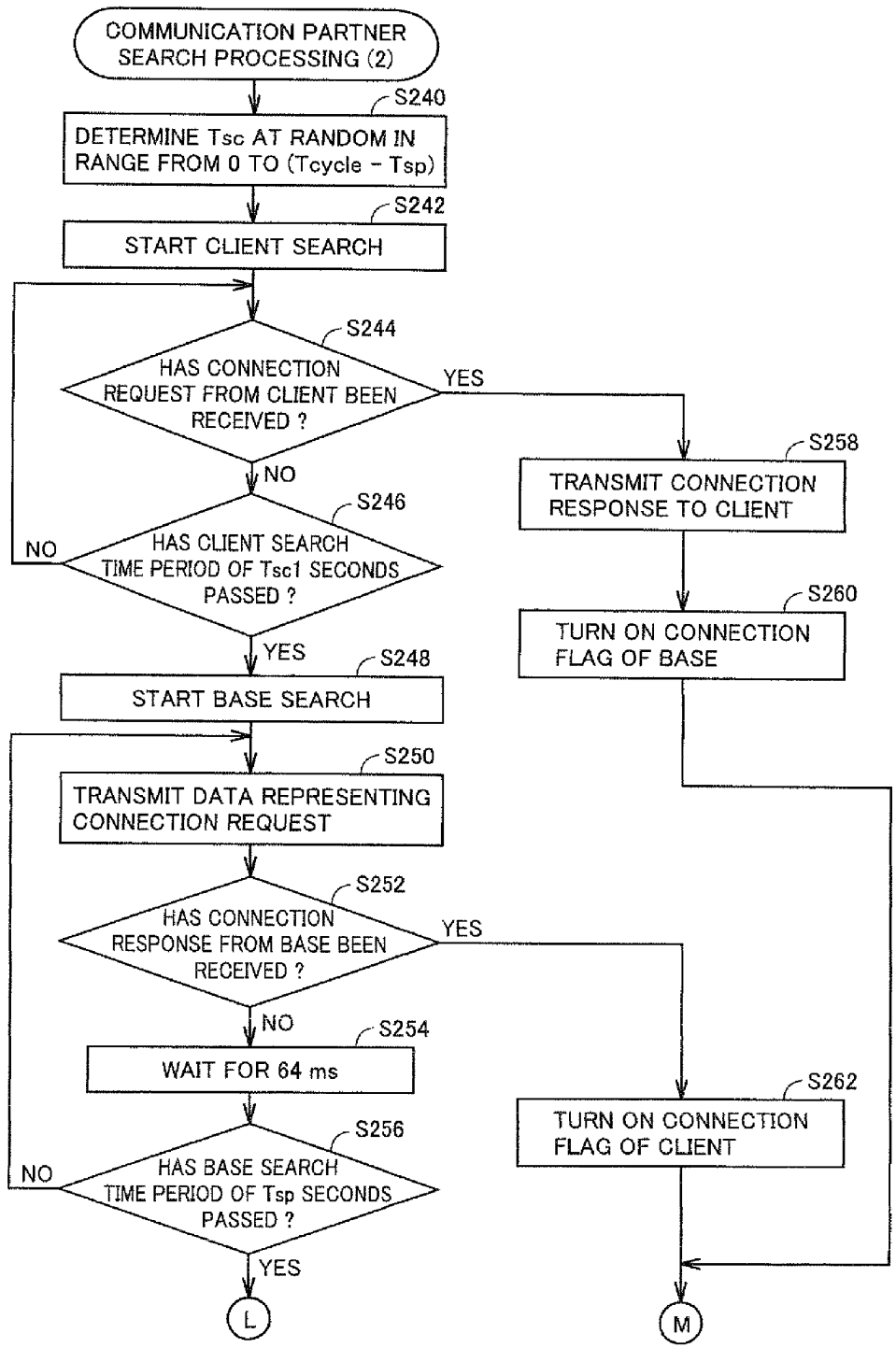
FIG. 80 is a (first) flowchart representing communication partner search processing (2) according to an embodiment of the present invention.
Figure 81:
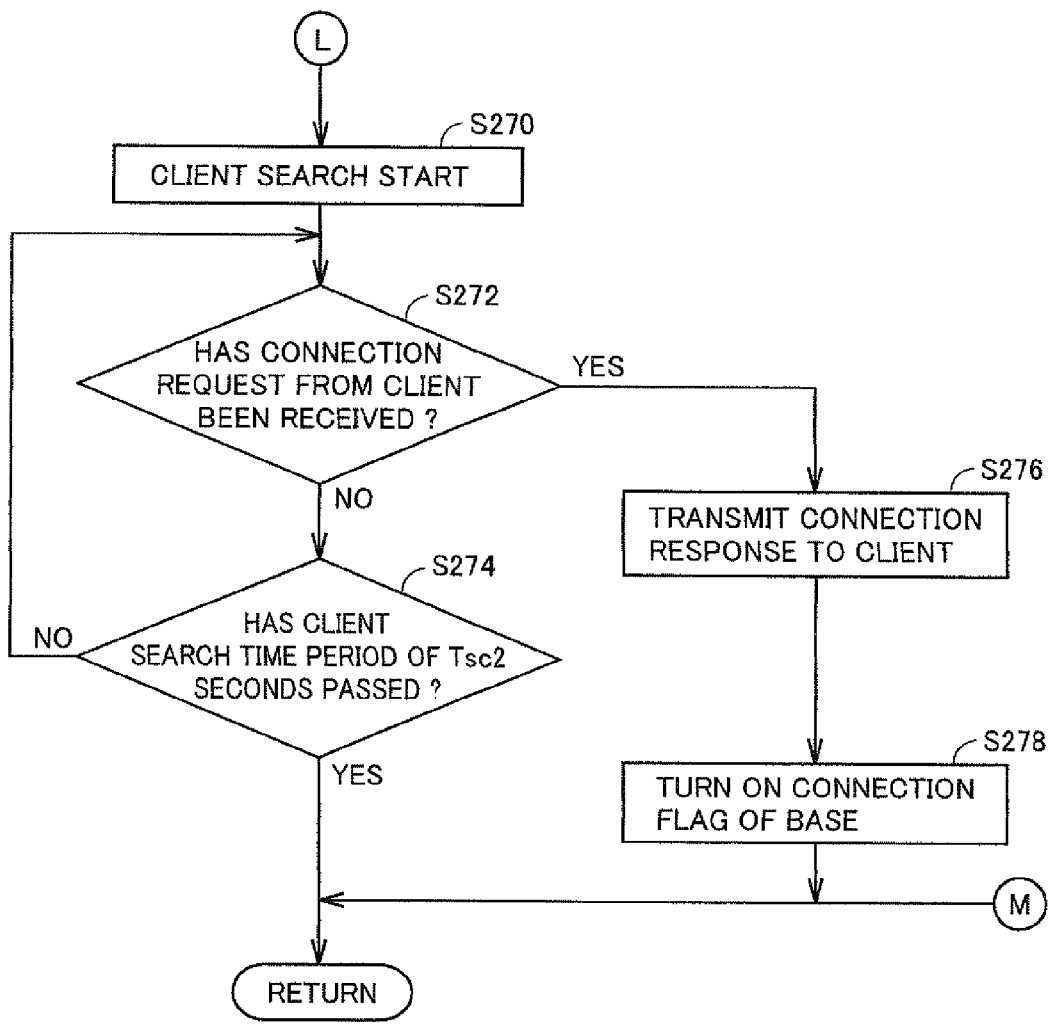
FIG. 81 is a (second) flowchart representing communication partner search processing (2) according to an embodiment of the present invention.

FIGS. 80 and 81 are flowcharts representing communication partner search processing (2) according to an embodiment of the present invention.

Referring to FIG. 80, when communication partner search processing (2) starts, in step S240, Tsc1 is determined at random in a range from 0 to (Tcycle−Tsp). As described above, in communication partner search processing (2), Tcycle and Tsp are fixed values. Therefore, when Tsc1 is determined, Tsc2 is also determined.

Following steps S242 to S246, S258, and S260 are processing performed in Tsc1 described above, during which processing for operating as a base and searching for a client is performed. Steps S248 to S256 and S262 are processing performed in Tsp described above, during which processing for operating as a client and searching for a base is performed. Further, steps S270 to S274, S276, and S278 are processing performed in Tsc2 described above, during which processing for operating as a base and searching for a client is performed.

In step S242, search for a client starts. Though not shown, a timer circuit starts here. Then, in step S244, whether or not the connection request signal which is the transmission wireless frame transmitted from the client (that is, the reception wireless frame) has been received is determined.

When the connection request signal which is the transmission wireless frame transmitted from the client (that is, the reception wireless frame) is received (YES in step S244), in step S258, a connection response signal which is the transmission wireless frame is transmitted from the base to the client. Thereafter, in step S260, the connection flag as a base is turned ON and the communication partner search processing (2) ends. In other words, it is found that the game device is capable of communication connection as a base to another game device.

Though not shown in FIG. 81, as in communication partner search processing (1), when communication partner search processing (2) starts, the connection flag as a client and the connection flag as a base are turned OFF.

On the other hand, when a connection request signal which is the transmission wireless frame transmitted from the client (that is, the reception wireless frame) has not been received (NO in step S244), in step S246, whether or not the time period of Tsc1 seconds which is the client search time period during which connection from another game device to a base is tried has passed is determined.

When the client search time period of Tsc1 seconds has not passed (NO in step S246), the process directly returns to step S244.

On the other hand, when the client search time period of Tsc1 seconds has passed (YES in step S246), search for a base starts in step S248, that is, the timer circuit is reset and started, and in step S250, the connection request signal which is the transmission wireless frame is transmitted without specifying a destination.

In successive step S252, whether the connection response signal which is the transmission wireless frame transmitted from the base (that is, the reception wireless frame) has been received or not is determined. When the connection response signal which is the transmission wireless frame transmitted from the base (that is, the reception wireless frame) has been received (YES in step S252), in step S262, the connection flag as a client is turned ON and communication partner search processing (2) ends. In other words, it is found that the game device is capable of communication connection as a client to another game device.

On the other hand, when the connection response signal which is the transmission wireless frame transmitted from the base (that is, the reception wireless frame) has not been received (NO in step S252), in step S254, a stand-by period for 64 ms is provided. In successive step S256, whether or not the time period of Tsp seconds as the base search time period during which connection to another game device as a client is tried has passed is determined.

When the base search time period of Tsp seconds has not yet passed (NO in step S256), the process directly returns to step S250.

On the other hand, when the base search time period of Tsp seconds has passed (YES in step S256), search for a client starts in step S270 shown in FIG. 81. At this time, the timer circuit is reset and started.

In next step S272, whether the connection request signal which is the transmission wireless frame transmitted from the client (that is, the reception wireless frame) has been received or not is determined.

When the connection request signal which is the transmission wireless frame transmitted from the client (that is, the reception wireless frame) has been received (YES in step S272), in step S276, a connection response signal is transmitted to the client. Thereafter, in step S278, a connection flag as a base is turned ON and communication partner search processing (2) ends.

On the other hand, when the connection request signal has not been received from a client (NO in step S272), in step S274, whether or not the time period of Tsc2 seconds as the client search time period has passed is determined.

When the client search time period of Tsc2 seconds has not yet passed (NO in step S274), the process directly returns to step S272.

On the other hand, when the client search time period of Tsc2 seconds has passed (YES in step S274), it is determined that the time period of Tcycle has passed and communication partner search processing (2) ends.

Figure 82:
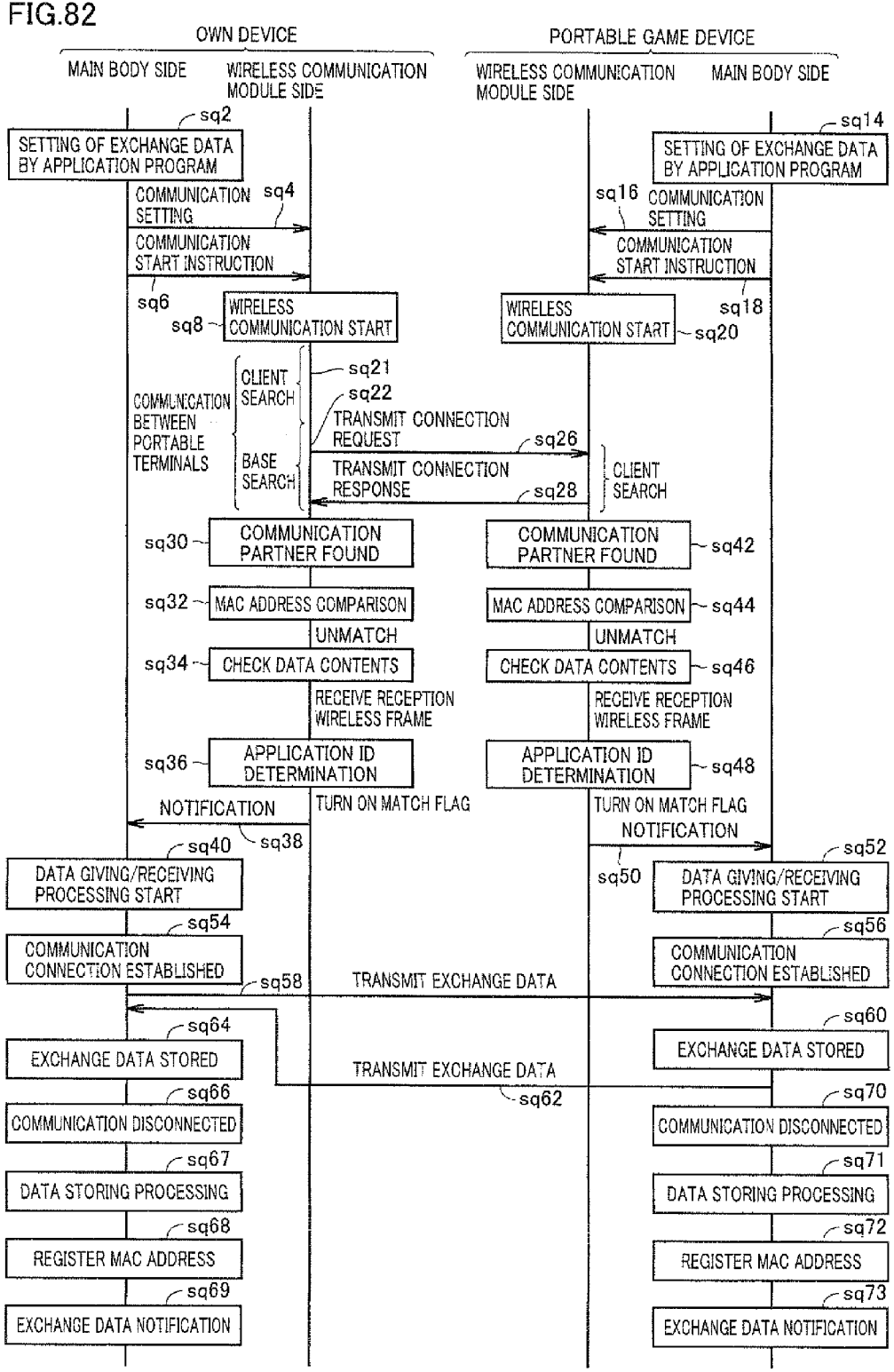
FIG. 82 shows data exchange in giving/receiving exchange data according to an embodiment of the present invention.

FIG. 82 shows data exchange in giving/receiving exchange data according to an embodiment of the present invention.

Referring to FIG. 82, in CPU 31 on the main body side, exchange data is set by execution of an application program (sequence sq2). Then, CPU 31 on the main body side outputs data for communication setting to wireless communication module 38 (sequence sq4). Specifically, data relating to an application ID of the exchange data and the MAC address list are output. The application ID of the exchange data is stored in filtering data saving area 68, and the MAC address list in MAC address list saving area 88 is stored in MAC address list saving area 70. In the present example, the application IDs are collectively saved in filtering data saving area 68 as a list corresponding to each determination scheme. As described above, the MAC address list in MAC address list saving area 88# is also saved in MAC address list saving area 70#.

Then, CPU 31 on the main body side outputs a communication start instruction to wireless communication module 38 (sequence sq6).

In response to the communication start instruction, wireless communication by wireless communication module 38 starts (sequence sq8). In the present embodiment, in wireless communication module 38, communication between portable terminals which is the exchange partner search processing for searching for a communication partner to exchange the exchange data starts.

On the other hand, in game device 3 as well, the exchange data is set by execution of an application program by the CPU on the main body side (sequence sq14). Then, the CPU on the main body side outputs data for communication setting to wireless communication module 38P (sequence sq16). Specifically, data relating to the application ID of exchange data and the MAC address list are output. The application ID of the exchange data is stored in filtering data saving area 68P, and the MAC address list is stored in MAC address list saving area 70P. In the present example, the application IDs are collectively saved in filtering data saving area 68 as a list corresponding to each determination scheme.

Then, CPU 31 on the main body side outputs a communication start instruction to wireless communication module 38P (sequence sq18).

In response to the communication start instruction, wireless communication by wireless communication module 38P starts (sequence sq20). Then, communication between portable terminals starts in the similar manner as described above.

Again in game device 1, a client search is then carried out in communication between portable terminals as described above (sequence sq21). Then, a base search is carried out (sequence sq22).

Then, in base search, when the connection request signal is transmitted from wireless communication module 38 of game device 1 to wireless communication module 38P of game device 3 (sequence sq26), wireless communication module 38P of game device 3 accepts the transmission wireless frame (that is, reception wireless frame) transmitted from game device 1 and transmits a connection response signal which is the transmission wireless frame of game device 3 to wireless communication module 38 of game device 1 (sequence sq28).

Then, wireless communication module 38 accepts the input of the connection response signal which is the transmission wireless frame transmitted from wireless communication module 38P (that is, the reception wireless frame).

Through this processing, in game device 1 which is the own device, the connection flag as a client is turned ON as described above. In game device 3, the connection flag as a base is turned ON.

Since the connection flag as a client is turned ON, game device 1 determines that communication connection with the base which is a communication partner is possible, that is, a communication partner has been found (sequence sq30). Since the connection flag as a base is turned ON, game device 3 also determines that communication connection with the client which is a communication partner is possible, that is, a communication partner has been found (sequence sq42).

After the communication partner is found, in game device 1, the MAC addresses are compared (sequence sq32). Namely, the MAC address included in the reception wireless frame received from game device 3 which is the communication partner is compared with the MAC address list saved in MAC address list saving area 70 and whether these addresses match or not is determined.

When it is determined that the addresses do not match, that is, when it is determined that communication has not been established so far with this partner, the data contents are then checked (sequence sq34). Namely, whether or not the reception wireless frame is a wireless frame that can be processed in the processing between portable terminals is determined.

Then, when it is determined that a reception wireless frame that can be processed in the processing between portable terminals has been received, the application ID determination processing is performed (sequence sq36).

Then, when the match flag is turned ON in the application ID determination processing, wireless communication module 38 notifies the CPU on the main body side that game device 3 with which exchange of the exchange data corresponding to the matching application ID can be carried out has been found (sequence sq38).

Consequently, the CPU on the main body side recognizes, based on the notification from wireless communication module 38, that an exchange partner with which communication connection can be established has been found, and the processing for giving/receiving data starts (sequence sq40).

On the other hand, through similar processing, on the side of game device 3 as well, after the communication partner has been found (sequence sq42), the MAC addresses are compared (sequence sq44), and when the addresses do not match, that is, when communication has not been established so far with this partner, data contents are checked (sequence sq46). When it is determined that a reception wireless frame that can be processed in the processing between portable terminals has been received, the application ID determination processing is performed (sequence sq48), and when the match flag is turned ON, a notification is sent to the CPU on the main body side that game device 1 with which exchange can be carried out has been found (sequence sq50).

Thus, in game device 3 as well, the processing for giving/receiving data starts (sequence sq52).

Then, after the start of the data giving/receiving processing, CPU 31 on the main body side of game device 1 establishes communication connection with game device 3 (sequence sq54).

Similarly, after the start of the data giving/receiving processing, the CPU on the main body side of game device 3 also establishes communication connection with game device 1 (sequence sq56).

Then, game device 1 transmits the exchange data (sequence sq58). The exchange data is copy data obtained by copying the exchange data stored in the slot.

Then, game device 3 receives the exchange data transmitted from game device 1 and stores the exchange data (sequence sq60).

Then, game device 3 transmits the exchange data (sequence sq62). The exchange data is copy data obtained by copying the exchange data stored in the slot.

Then, game device 1 receives the exchange data transmitted from game device 3 and stores the exchange data (sequence sq64).

Then, communication is disconnected (sequence sq66).

Then, the data storing processing is performed (sequence sq67).

Then, the MAC address is registered (sequence sq68).

Then, data notification processing is performed (sequence sq69).

Similarly, in game device 3 as well, after the exchange data is stored, communication is disconnected (sequence sq70). Then, the data storing processing is performed (sequence sq71). Then, the MAC address is registered (sequence sq72), and data notification processing is performed (sequence sq73).

Then, receiving the notification of exchange data as described above, when the user executes the application using the exchange data, the processing for erasing the exchange data stored in the slot described above is performed, and the processing for exchanging the exchange data is completed.

In the sequence above, sequences sq4, sq6, sq16, sq18, sq40, and sq52 to sq72 are functions on the main body side of each game device as described above by way of example, that are realized by a main body function program stored in system program saving area 86. Meanwhile, sequences sq8, sq20 to sq38, and sq42 to sq50 are realized by a program read from ROM 72 stored in memory control unit 64 in wireless communication module 38 in each game device, as described above by way of example.

As a result of this wireless communication, exchange data utilized in a prescribed application can automatically be exchanged with a game device with which communication connection is established even when the application is not being executed. Therefore, chances of negotiating exchange data with acquaintances are increased. Further, regardless of presence/absence of an application executed by CPU 31 on the main body side, wireless communication allows automatic exchange of the exchange data utilized in a prescribed application with a game device with which communication connection is established, even when the application is not being executed. Therefore, it is unnecessary to have memory card 26 storing the application attached. Thus, convenience is great and zest is enhanced because what will be exchanged is unknown. Further, since a partner with which exchange is carried out is not limited to acquaintances, it is highly likely that the exchange data can be exchanged if the user goes to a place where people gather. Thus, fun of exchange increases. Namely, zest of an application utilizing the exchange data can be enhanced. Further, initially, only after the communication processing is performed between wireless communication modules and exchange is determined as possible, a notification is given to the CPU on the main body side and the processing for giving/receiving exchange data is performed. Thus, processing load imposed on the CPU can be alleviated and power consumption can be reduced.

After the processing for giving/receiving the exchange data is performed, the exchange partner search processing again starts in wireless communication module 38.

Specifically, the processing for giving/receiving the exchange data changes the contents in exchange data saving area 80. Therefore, in accordance with the flow described with reference to FIG. 14, CPU 31 (communication setting processing unit 204) performs the communication setting processing (step S28). Since the details of the communication setting processing have been described with reference to FIG. 15, description will not be repeated. Then, CPU 31 (communication instruction processing unit 206) outputs a communication start instruction to wireless communication module 38 (step S29).

Thus, communication between portable terminals again starts in wireless communication module 38 as described in connection with step S44 in FIG. 17 (step S44). Details of communication between portable terminals are as described with reference to FIG. 18.

In communication between portable terminals, as described with reference to FIG. 23, MAC address filtering processing without performing the communication processing again with another game device having the matching MAC address (in the present example, game device 3) is performed.

Namely, substantial communication is not carried out with a game device (in the present example, game device 3) which is a communication partner registered in the MAC address list, with which communication has once been established.

Therefore, in the game device according to the embodiment of the present invention, a game device within the communication range is automatically and repeatedly searched for, and a found game device is set as a communication candidate. In this case, it is likely that the same game device is detected and found a number of times, however, the MAC address filtering processing as described above can prevent repeated communication with the same game device and thus efficient and effective data communication can be carried out.

<Modification>

A scheme in which, in communication between portable terminals above, in setting the transmission wireless frame, the vendor specifying IE data representing a communication determination condition is included in a transmission wireless frame together with the MAC address and transmitted has been described. For higher security, however, a scheme in which a transmission wireless frame including only the MAC address is transmitted first and thereafter another transmission wireless frame including the vendor specifying IE data is transmitted/received is also applicable.

Specifically, using the MAC address included in the preceding transmission wireless frame, the MAC address filtering processing described above can be performed.

In that case, exchange data communication determination unit 225 provided as a function of wireless communication module 38 described with reference to FIG. 7 may only have the configuration of device identification information comparison unit 226.

With such a configuration, when it is determined in the MAC address filtering processing in device identification information comparison unit 226 that the MAC addresses do not match, a notification may be sent to the main body side.

Then, after communication connection described above is established, another transmission wireless frame may be transmitted/received, and by way of example, by executing a main body function program, the processing by communication data determination unit 228 and application ID determination unit 230 representing other functions of exchange data communication determination unit 225 described above as the functions of the main body may be performed.

In addition, in the present example as well, it is also possible to save the MAC address for identifying the communication partner by means of device identification information registration processing unit 211 before starting the processing for giving/receiving data after the sleep state is canceled in step S142 as described above.

Namely, in the configuration, as exchange data communication determination unit 225 including device identification information comparison unit 226 is passed, the MAC address of another game device that passed the determination processing by exchange data communication determination unit 225 is saved in MAC address list saving area 88 by means of device identification information registration processing unit 211. Through the processing described above, efficient data communication can be achieved, without carrying out communication with a communication partner that once passed the determination processing.

In the configuration, a case where CPU 31 (device identification information registration processing unit 211) causes the MAC address for identifying the communication partner to be saved (registered) in MAC address list saving area 88 provided in saving data memory 34, on condition (registration condition) that the determination processing by exchange data communication determination unit 225 was passed, has been described. It is noted, however, that the registration condition for registering the MAC address is not limited only to the fact that the determination processing by exchange data communication determination unit 225 was passed, and the MAC address may be registered when the determination processing is passed and additionally determination processing under other conditions is performed and such determination processing under other conditions is satisfied.

In the configuration, a case where processing by communication data determination unit 228 and application ID determination unit 230 is performed as a function of the main body has been described. In that case, when it is determined by communication data determination unit 228 that a reception wireless frame has not been received, that is, when data has been received from a device with which communication connection is impossible or when data that is not the object of communication has been received, it is considered unnecessary to carry out data communication again.

Therefore, in that case as well, the MAC address of the device that transmitted the data may be saved in MAC address list saving area 88 by means of device identification information registration processing unit 211.

Thus, the MAC address of a device that is not an object of communication is saved in MAC address list saving area 88 so that efficient data communication can be achieved without carrying out communication with a communication partner with which communication has been established once.

In addition, similarly, in the determination processing by application ID determination unit 230, when the match flag of the application ID is not ON, that is, when another game device is determined not to be an exchange partner of exchange data, it is also considered unnecessary to carry out data communication again.

Therefore, in that case as well, the MAC address of another device may be saved in MAC address list saving area 88 by means of device identification information registration processing unit 211.

Thus, the MAC address of a device that is not an exchange partner of exchange data is saved in MAC address list saving area 88 so that efficient data communication can be achieved without carrying out communication with a communication partner with which communication has been established once.

<Communication Between Portable and Fixed Terminals>

Data communication in game device 1 for receiving distribution data from a fixed terminal device according to an embodiment of the present invention will now be described.

Figure 83:
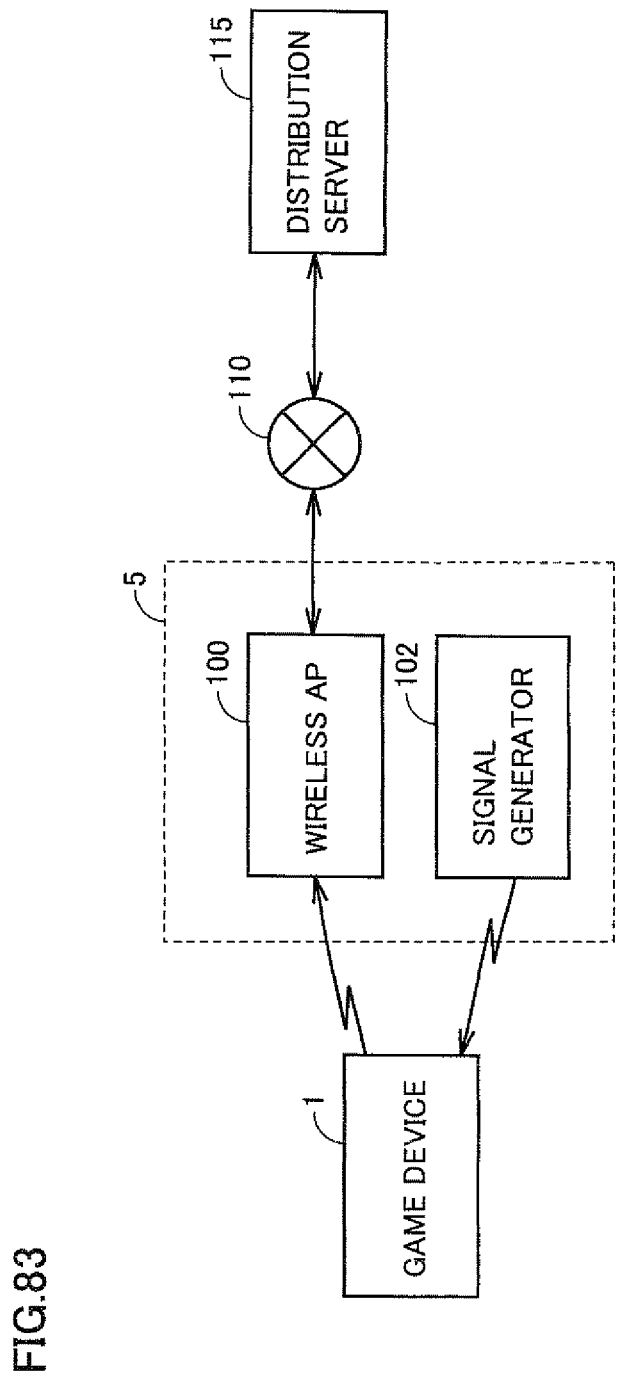
FIG. 83 is a diagram illustrating overview of communication processing between game device 1 and a fixed terminal device 5 according to an embodiment of the present invention.

FIG. 83 is a diagram illustrating overview of communication processing between game device 1 and fixed terminal device 5 according to an embodiment of the present invention.

Referring to FIG. 83, fixed terminal device 5 includes a wireless access point device 100 and a signal generator 102. Wireless access point device 100 is connected through a network 110 to a distribution server 115. Signal generator 102 transmits a distribution wireless frame which will be described later, including connection information required for connection with wireless access point device 100, without specifying a destination.

Wireless access point device 100 transmits to game device 1, distribution data obtained (downloaded) from distribution server 115 through network 110, in response to a request for the distribution data from game device 1.

<Description of Functional Block Carrying Out Reception of Distribution Data from Fixed Terminal Device 5>

Figure 84:
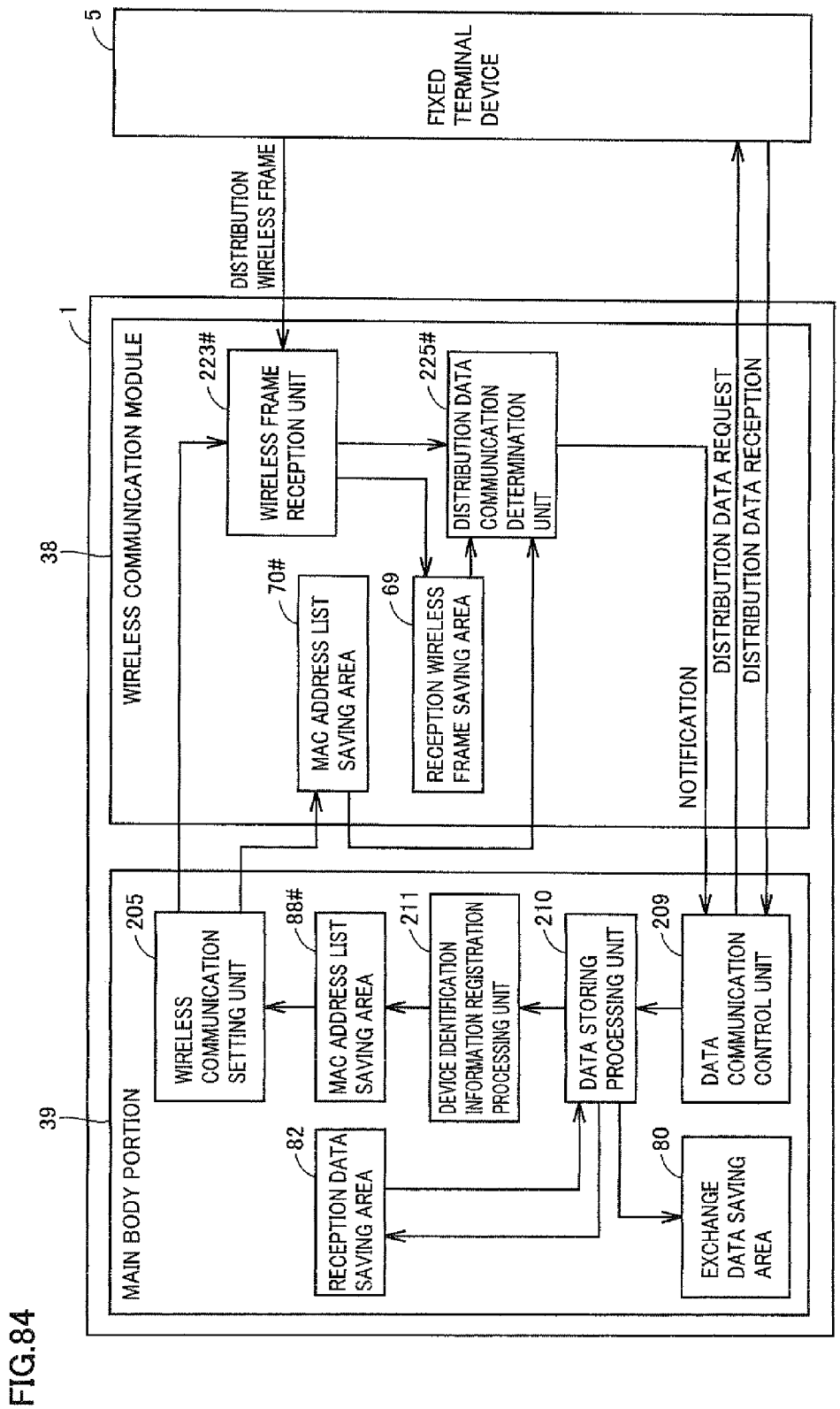
FIG. 84 shows functional blocks for receiving distribution data in game device 1 according to an embodiment of the present invention.

FIG. 84 shows functional blocks for receiving distribution data in game device 1 according to an embodiment of the present invention.

Referring to FIG. 84, game device 1 includes wireless communication module 38 and main body portion 39 other than wireless communication module 38.

Main body portion 39 includes wireless communication setting unit 205, device identification information registration processing unit 211, data communication control unit 209, reception data saving area 82, and MAC address list saving area 88#.

Wireless communication module 38 includes a wireless frame reception unit 223#, a distribution data communication determination unit 225#, MAC address list saving area 70#, and reception wireless frame saving area 69.

Wireless communication setting unit 205 causes the MAC address list stored in MAC address list saving area 88# to be stored in MAC address list saving area 70#. Further, wireless communication setting unit 205 outputs an instruction to carry out wireless communication in wireless communication module 38 to wireless frame reception unit 223#.

Wireless frame reception unit 223# of wireless communication module 38 receives the instruction to carry out wireless communication and performs distribution partner search processing for searching for a distribution partner. In the present example, it is assumed that wireless frame reception unit 223# receives as a reception wireless frame, a distribution wireless frame transmitted from fixed terminal device 5 by way of example of a distribution partner. Then, wireless frame reception unit 223# causes the received reception wireless frame to be stored in reception wireless frame saving area 69.

Distribution data communication determination unit 225# determines, based on the received distribution wireless frame (reception wireless frame), whether or not the communication partner is a distribution partner distributing the distribution data, and when it is determined that the communication partner is the distribution partner, a notification to that effect is issued to main body portion 39.

Specifically, whether or not the MAC address which is the device identification information included in the distribution wireless frame (reception wireless frame) is registered in the MAC address list saved in MAC address list saving area 70# is determined. Further, whether or not the distribution wireless frame (reception wireless frame) is a wireless frame that can be subjected to distribution data obtaining processing is determined.

Then, when it is determined that the MAC address included in the distribution wireless frame is not registered in the MAC address list and the distribution wireless frame is a wireless frame that can be subjected to distribution data obtaining processing, distribution data communication determination unit 225# outputs a notification to the effect that reception of distribution data is possible to data communication control unit 209 in main body portion 39. Though a case where the notification to the effect that reception of distribution data is possible is output to data communication control unit 209 in main body portion 39 when two conditions are satisfied is described here, the notification may be output when at least one condition is satisfied.

Receiving the notification output from distribution data communication determination unit 225# to the effect that reception of distribution data is possible, data communication control unit 209 performs distribution data obtaining processing for requesting fixed terminal device 5 to transmit distribution data and receiving the distribution data transmitted from fixed terminal device 5. The received distribution data is stored in reception data saving area 82.

When the distribution data received by data communication control unit 209 is stored in reception data saving area 82, device identification information registration processing unit 211 causes the MAC address which is the device identification information of fixed terminal device 5 which is the distribution partner to be stored in MAC address list saving area 88#.

Then, wireless communication setting unit 205 again causes the MAC address list stored in MAC address list saving area 88# to be stored in MAC address list saving area 70#, and outputs an instruction to carry out wireless communication in wireless communication module 38 to wireless frame reception unit 223#. Namely, the same processing as described above is repeated.

Receiving the instruction to carry out wireless communication again, wireless frame reception unit 223# in wireless communication module 38 performs the distribution partner search processing to search for a distribution partner. Then, for example, again in the present example, it is assumed that a distribution wireless frame transmitted from fixed terminal device 5, that is, a reception wireless frame, is received.

As described above, distribution data communication determination unit 225# determines whether or not the MAC address list which is the device identification information included in the distribution wireless frame is registered in the MAC address list saved in MAC address list saving area 70#.

Here, when the distribution data obtaining processing was performed previously as described above, the MAC address which is the device identification information of fixed terminal device 5 has been stored in the MAC address list, and therefore distribution data communication determination unit 2254 determines that the MAC address has been registered and the distribution data obtaining processing which is subsequent data communication is not performed. Namely, efficient data communication can be achieved without carrying out communication with a communication partner with which communication has once been established.

It is noted that main body portion 39 and wireless communication module 38 can operate independently of each other. Namely, even when main body portion 39 has made transition to a sleep state, it is possible for wireless communication module 38 to perform the distribution partner search processing for searching for a distribution partner. Then, only when a distribution partner from which distribution data can be received is found, a notification is sent to main body portion 39, connection with the communication partner is established, and the distribution data obtaining processing is performed. Therefore, when main body portion 39 has made transition to such a power save state as a sleep state and a communication partner is found through the distribution partner search processing in wireless communication module 38, a notification is not given to main body portion 39 and communication connection is not established unless exchange is possible. Therefore, power saving in game device 1 as a whole can be achieved.

Figure 85:
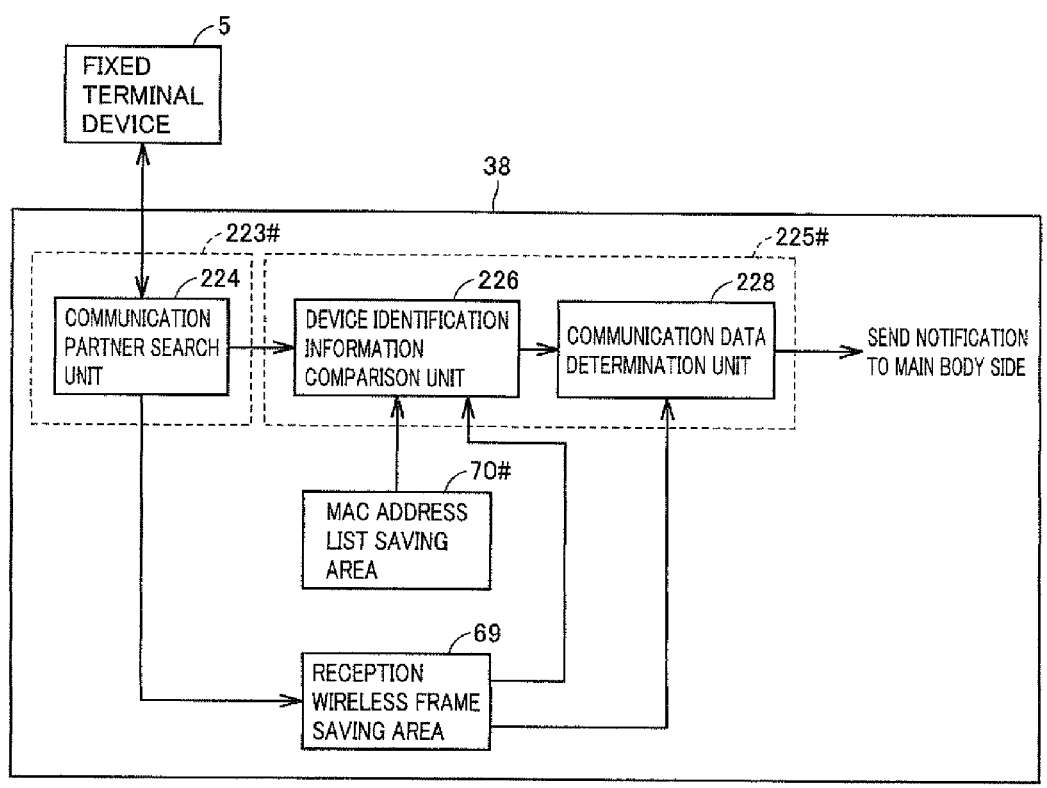
FIG. 85 shows details of the functional blocks of wireless communication module 38 performing the processing between a portable terminal and a fixed terminal according to an embodiment of the present invention.

FIG. 85 shows details of the functional blocks of wireless communication module 38 performing the processing between a portable terminal and a fixed terminal according to an embodiment of the present invention.

Referring to FIG. 85, in the present example, by way of example, a case where a prescribed function is realized by CPU 60 executing an application for performing the processing between portable and fixed terminals saved in ROM 72 will be described, however, the case is not necessarily limited to the case where the function is realized by CPU 60 and at least a partial function may be realized by using a dedicated IC (Integrated Circuit).

Wireless communication module 38 includes wireless frame reception unit 223# and distribution data communication determination unit 225#.

Wireless frame reception unit 223# includes communication partner search unit 224. Distribution data communication determination unit 225# includes device identification information comparison unit 226 and communication data determination unit 228. It is assumed that each function is realized by multi-task control as needed.

As compared with the functional block in FIG. 7, the configuration is such that wireless frame setting unit 222 is not provided because a transmission wireless frame is not transmitted.

Communication partner search unit 224 performs the distribution partner search processing for searching for a communication partner within communication range 10. In the present example, by way of example, a case in which communication takes place with fixed terminal device 5 as a communication partner will be described. Communication partner search unit 224 waits until the distribution wireless frame is received from fixed terminal device 5, and when it is received, the distribution wireless frame is stored as a reception wireless frame in reception wireless frame saving area 69.

When a communication partner has been found by communication partner search unit 224, that is, when a distribution wireless frame has been received from the communication partner, distribution data communication determination unit 225# determines whether or not the communication partner is a distribution partner from which distribution data can be obtained based on the distribution wireless frame, and when it is determined as a distribution partner, a notification to that effect is issued.

Specifically, when a communication partner has been found by communication partner search unit 224, device identification information comparison unit 226 compares the MAC address which is the device identification information included in the distribution wireless frame received from fixed terminal device 5 which is the communication partner with the MAC address list saved in MAC address list saving area 70# so as to determine whether there is any matching address or not.

When a communication partner has been found and when it is determined that the MAC address list included in the distribution wireless frame does not match with the MAC address list saved in MAC address list saving area 70# based on the result of comparison by device identification information comparison unit 226, communication data determination unit 228 checks the data contents in the distribution wireless frame and determines whether or not the distribution wireless frame is a wireless frame that can be processed in the processing between portable and fixed terminals.

Then, when it is determined that the distribution wireless frame is a wireless frame that can be processed in the processing between portable and fixed terminals, communication data determination unit 228 sends a notification to that effect to the main body side.

Subsequent processing is performed as a function of main body portion 39 of game device 1.

Since details of the functional blocks of main body portion 39 of game device 1 are basically the same as the configuration described above with reference to FIG. 6, description will be given with reference to FIG. 6.

Specifically, sleep setting/canceling processing unit 216 receives the notification from wireless communication module 38 (notification from communication data determination unit 228 shown in FIG. 85).

Then, when the notification is received from wireless communication module 38, sleep setting/canceling processing unit 216 outputs the notification to data communication carrying-out processing unit 208.

In accordance with the notification from wireless communication module 38, data communication carrying-out processing unit 208 performs the processing for obtaining distribution data from fixed terminal device 5. Specifically, a distribution data request is transmitted to fixed terminal device 5. Then, the distribution data transmitted from fixed terminal device 5 is received.

Then, the distribution data received from fixed terminal device 5 is saved in reception data saving area 82 of saving data memory 34.

When the distribution data received by data communication carrying-out processing unit 208 is stored in reception data saving area 82, device identification information registration processing unit 211 causes the MAC address which is the device identification information of fixed terminal device 5 which is the communication partner to be stored in MAC address list saving area 88#.

Data notification processing unit 212 notifies the user of the fact that the distribution data has been obtained.

<Communication Between Portable and Fixed Terminals by Wireless Communication Module 38>

Figure 86:
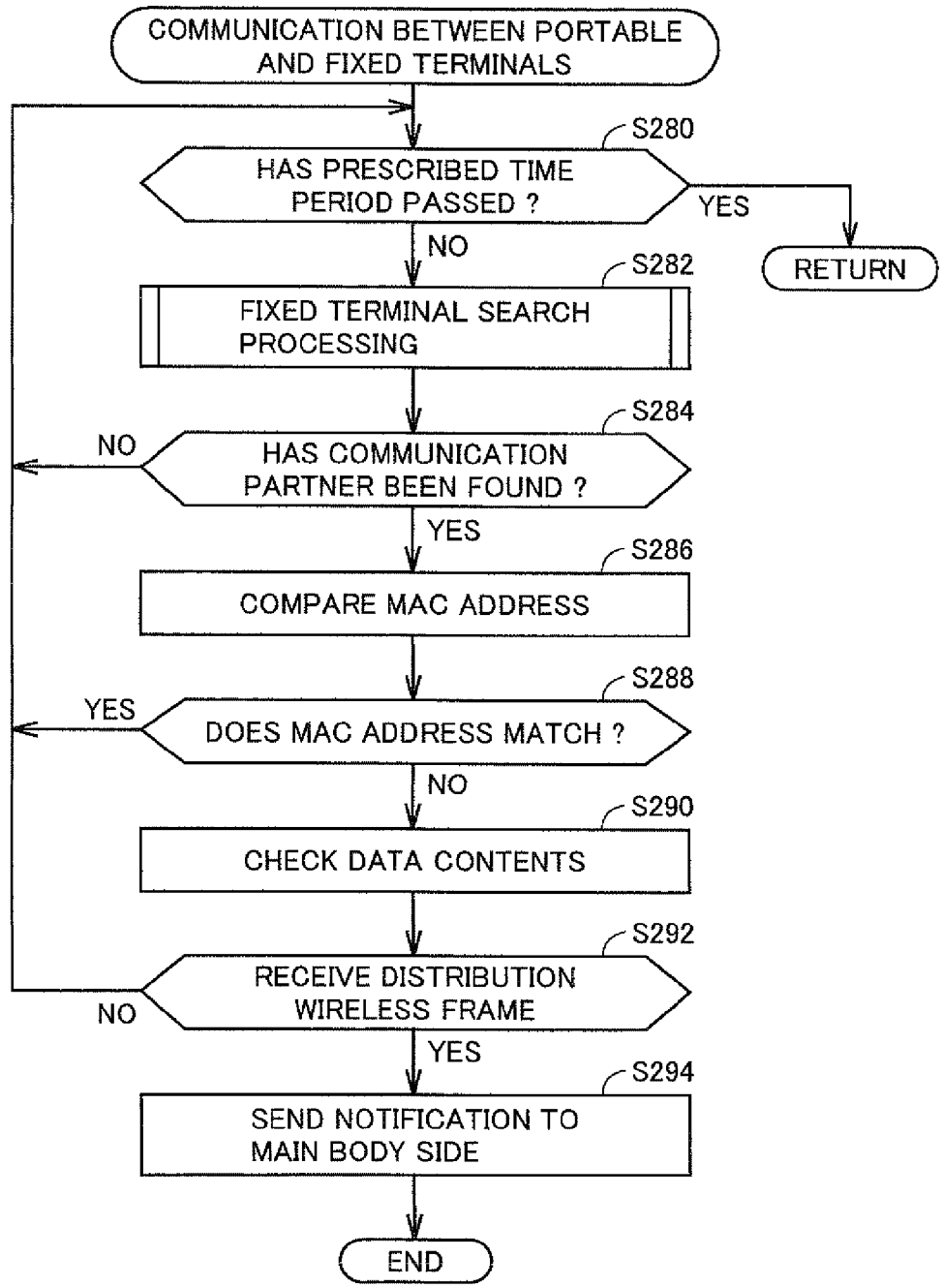
FIG. 86 is a diagram illustrating communication between portable and fixed terminals according to an embodiment of the present invention.

FIG. 86 is a diagram illustrating communication between portable and fixed terminals according to an embodiment of the present invention. The processing is the distribution partner search processing for searching for a communication partner providing the distribution data in wireless communication module 38, and by way of example, this processing is performed by CPU 60 executing an application for performing the processing between portable and fixed terminals stored in ROM 72.

Referring to FIG. 86, initially, CPU 60 (communication partner search unit 224) determines whether or not a prescribed time period has passed (step S280). Then, when it is determined in step S280 that the prescribed time period has not yet passed (NO in step S280), CPU 60 performs the communication partner search processing for searching for a communication partner (fixed terminal device) (step S282). The communication partner search processing will be described later.

Then, CPU 60 (communication partner search unit 224) determines whether or not a communication partner has been found by the communication partner search processing (step S284).

When a communication partner has not been found in step S284 (NO in step S284), the process returns to step S280.

When a communication partner has been found in step S284 (YES in step S284), CPU 60 (device identification information comparison unit 226) compares the MAC address (step S286). Specifically, the MAC address included in the distribution wireless frame is compared with a MAC address stored in MAC address list saving area 70# described above. The MAC address is a piece of identification information for identifying an object of communication as described above, and each fixed terminal device has its own specific MAC address allocated. In MAC address list saving area 70#, MAC addresses allocated to respective fixed terminal devices are saved.

Then, CPU 60 (device identification information comparison unit 226) determines whether or not the MAC address of the fixed terminal device included in the distribution wireless frame matches with a MAC address stored in the MAC address list (step S288).

Then, when it is determined in step S288 that the MAC address matches (YES in step S288), the process returns again to step S280. Namely, communication with fixed terminal device 5 corresponding to the MAC address is terminated without performing subsequent processing. Namely, the MAC address filtering processing described above is performed. Therefore, each time data as the communication object is received from another game device within communication range 10, determination as to whether the MAC address which is the identification information matches or not is repeated.

Since the conceptual diagram of MAC address comparison is the same as described with reference to FIGS. 22 and 23, details thereof will not be repeated.

When it is determined in step S288 that MAC address does not match (NO in step S288), CPU 60 (communication data determination unit 228) checks the contents in reception data (step S290).

Figure 87:
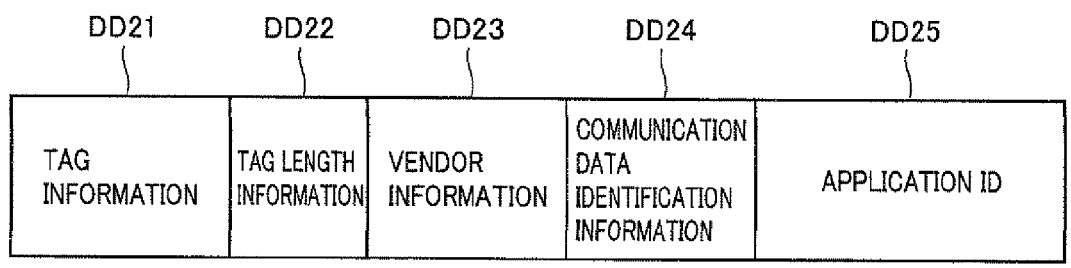
FIG. 87 shows a configuration of a distribution wireless frame received as a beacon in the game device in communication between portable and fixed terminals according to an embodiment of the present invention.

FIG. 87 shows a configuration of a distribution wireless frame received as a beacon in a game device in communication between portable and fixed terminals according to an embodiment of the present invention.

Referring to FIG. 87, overview of the configuration of a distribution wireless frame transmitted from signal generator 102 in fixed terminal device 5 is substantially the same as that of the transmission wireless frame described with reference to FIG. 19, except for the configuration of vendor specifying IE data described with reference to FIG. 20.

Specifically, the vendor specifying IE data included in the distribution wireless frame received as the beacon includes tag information DD21, tag length information DD22, vendor information DD23, communication data identification information DD24, and an application ID DD25.

Tag information DD21 is identification data identifying each of a plurality of pieces of IE data. Tag length information DD22 includes data indicating a data length of the vendor specifying IE data.

Vendor information DD23 is data for identifying a company or the like that provides the data.

Communication data identification information DD24 is data indicating a type of communication data. For communication between portable and fixed terminals, information indicating communication data of communication between portable and fixed terminals is stored.

Then, application ID DD25 follows.

The distribution wireless frame is transmitted from fixed terminal device 5 to an unspecified partner (game device) and received by an unspecified partner (game device) as will be described later. Fixed terminal device 5 on the base side repeatedly carries out transmission to a communication partner on the client side without specifying a destination.

Again referring to FIG. 86, then, CPU 60 determines whether or not the distribution wireless frame included in the reception data has been received (step S288).

Specifically, whether or not the vender information for identifying a company or the like providing the data described with reference to FIG. 87 matches with the vendor information held in advance in game device 1 is determined. The case where the pieces of vender information match means that transmission sources of transmitted data are devices allowing communication connection, and the case that the pieces of information do not match means that transmission sources of transmitted data are devices between which communication connection is impossible.

Further, whether the communication data identification information matches with the communication data identification information held in advance in game device 1 or not is determined. The case where the communication data identification information matches means that the communication data is for communication between portable and fixed terminals, that is, the wireless frame can be processed in the processing between portable and fixed terminals. It is assumed that the vendor information which is the object of comparison on the side of game device 1 is registered in advance in ROM 72. It is also assumed that the communication data identification information which is the object of comparison on the side of game device 1 is registered in advance in ROM 72.

On the other hand, the communication data identification information in communication between portable and fixed terminals is different from the communication data identification information in communication between portable terminals. Therefore, even when data output from game device 3 is received, the data is not received because the communication data identification information is different and hence communication only with fixed terminal device 5 is possible.

CPU 60 (communication data determination unit 228) switches the communication data identification information to be the object of comparison depending on whether communication is communication between portable terminals or communication between portable and fixed terminals, and determines whether or not the communication data identification information included in the reception data matches.

Namely, when it is determined in step S288 by CPU 60 (communication data determination unit 228) that the distribution wireless frame has not been received (NO in step S288), the process again returns to step S280.

Therefore, when data is received from a device with which communication connection is impossible or when data that is not an object of communication is received, communication is terminated without performing subsequent processing. Though a case in which whether the vendor information and the communication data identification information both match or not is determined has been described in the present example, only matching of the communication data identification information may be determined.

Then, when it is determined in step S292 that the distribution wireless frame has been received (YES in step S292), CPU 60 (communication data determination unit 228) notifies the main body side that fixed terminal device 5 having distribution data has been found (step S294). Then, the process ends (END).

Thereafter, the distribution data obtaining processing for establishing connection with fixed terminal device 5 which is a communication partner and obtaining the distribution data is performed as an application of CPU 31 on the main body side, using wireless communication module 38.

Therefore, by notifying the main body side that fixed terminal device 5 having the distribution data has been found, wireless data communication carried out independently by CPU 60 of wireless communication module 38, that is, the distribution partner search processing for searching for a communication partner to obtain the distribution data in wireless communication module 38 ends.

On the other hand, when it is determined by CPU 60 (communication data determination unit 228) in step S292 that the distribution wireless frame has not been received (NO in step S292), the process returns to step S280.

Through the processing, in the present example, only when a communication partner from which the distribution data can be obtained is found by the distribution partner search processing by wireless communication module 38, a notification is sent to CPU 31 on the main body side, connection with the communication partner is established, and the processing for obtaining the distribution data is performed. Therefore, even though CPU 31 on the main body side is in such a power save state as a sleep state and a communication partner has been found in the distribution partner search processing by wireless communication module 38, a notification to CPU 31 on the main body side is not sent and communication connection is not established when it is determined that the distribution data cannot be obtained. Therefore, power consumption in game device 1 as a whole can be reduced.

Figure 88:
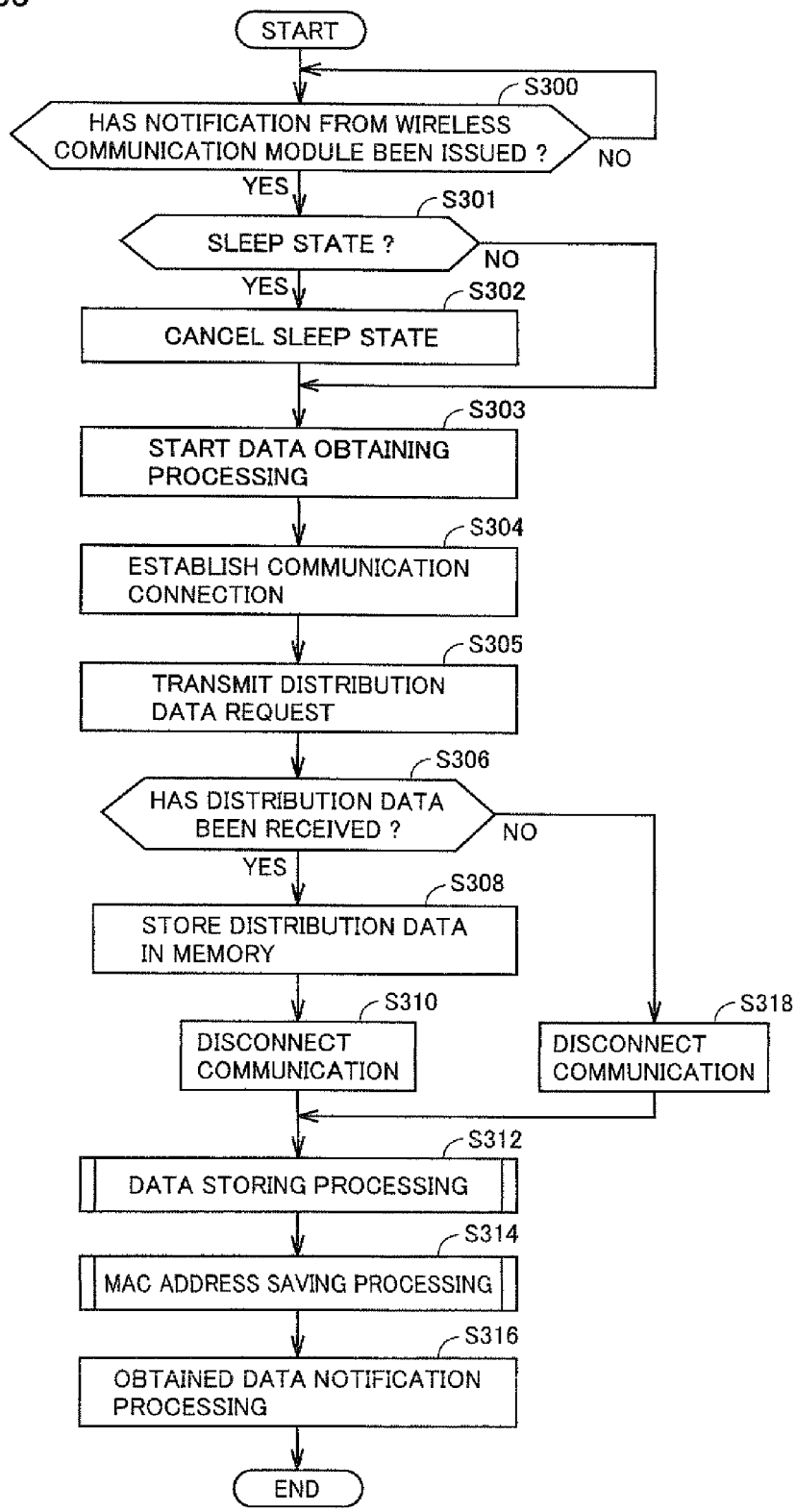
FIG. 88 is a flowchart of data obtaining processing far obtaining distribution data according to an embodiment of the present invention.

FIG. 88 is a flowchart of data obtaining processing for obtaining distribution data according to an embodiment of the present invention. The data obtaining processing is realized, by way of example, by CPU 31 executing a main body function program stored in system program saving area 86 described above. For example, the data obtaining processing is started at the time of launch of the main body and continuously performed in the background.

Referring to FIG. 88, first, CPU 31 (sleep setting/canceling processing unit 216) determines whether or not a notification has been issued from wireless communication module 38 (step S300).

When it is determined in step S300 that a notification has been issued from wireless communication module 38 (YES in step S300), CPU 31 (sleep setting/canceling processing unit 216) determines whether or not functions on the main body side are in the sleep state (step S301).

Then, when it is determined that the functions on the main body side are in the sleep state (YES in step S301), CPU 31 (sleep setting/canceling processing unit 216) cancels the sleep state (step S302).

Then, CPU 31 (data communication carrying-out processing unit 208) starts the data obtaining processing (step S303). On the other hand, when it is determined that functions on the main body side are not in the sleep state (NO in step S301), the process proceeds to step S303.

Then, based on the connection information such as the MAC address of the communication partner included in the notification from wireless communication module 38 to the effect that a fixed terminal device having distribution data has been found, CPU 31 (data communication carrying-out processing unit 208) establishes communication connection with the communication partner (step S304). In the present example, communication connection is established with wireless access point device 100 of fixed terminal device 5. In the present example, though a case in which connection with the communication partner is established after the notification that the fixed terminal device has been found is issued, that is, a case in which CPU 31 (data communication carrying-out processing unit 208) performs processing for communication, is described, the processing for establishing connection with the communication partner may be performed before the notification to the effect that a game device has been found is issued, for example, between step S292 and step S294 in FIG. 86 in wireless communication module 38.

Then, CPU 31 (data communication carrying-out processing unit 208) transmits a request for the distribution data (step S305).

Then, CPU 31 (data communication carrying-out unit 208) determines whether or not the distribution data has been received (step S306).

Then, when it is determined in step S306 that the distribution data has been received (YES in step S306), CPU 31 (data communication carrying-out processing unit 208) causes main memory 32 to store the distribution data (step S308).

Then, CPU 31 (data communication carrying-out processing unit 208) disconnects communication with the communication partner (fixed terminal device 5) (step S310). Namely, through the processing above, the data obtaining processing for obtaining the distribution data from the fixed terminal device which is the communication partner ends.

Then, CPU 31 (data storing processing unit 210) performs the data storing processing.

Figure 89:
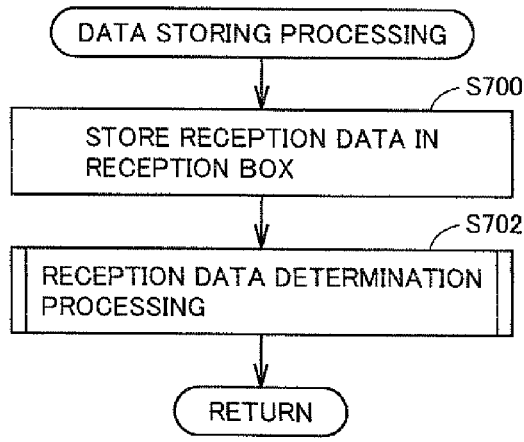
FIG. 89 is a flowchart illustrating data storing processing of distribution data according to an embodiment of the present invention.

FIG. 89 is a flowchart illustrating the data storing processing of distribution data according to an embodiment of the present invention.

Referring to FIG. 89, CPU 31 (data storing processing unit 210) causes the reception BOX provided in correspondence with the application ID in reception data saving area 82 to store the distribution data received by data communication carrying-out processing unit 208 (step S700).

Then, CPU 31 (data storing processing unit) performs the reception data determination processing (step S702). The reception data determination processing is as described with reference to FIG. 66. Namely, the number of times of transfer set in correspondence with the distribution data stored in the reception BOX in reception data saving area 82 is checked and whether the condition is satisfied or not is determined. When the condition is satisfied, in order to transfer the distribution data to another game device, the distribution data is copied and stored as the exchange data (transfer data) in the transmission BOX provided in correspondence with the application ID of exchange data saving area 80.

Then, the process ends (RETURN).

Referring again to FIG. 88, CPU 31 (device identification information registration processing unit 211) then performs the MAC address saving processing (step S314). The MAC address saving processing is substantially the same as described with reference to FIG. 70, however, when the reception BOX has been changed, the MAC address identifying the communication partner is saved in MAC address list saving area 88# provided in saving data memory 34. The MAC address saved in MAC address list saving area 88# is included as a part of the MAC address list and used in the communication setting processing described above.

Through the communication setting processing, the MAC address list is saved in MAC address list saving area 70#. Therefore, the MAC address filtering processing described above can prevent a number of times of communication with the same fixed terminal device. Thus, efficient and effective data communication can be achieved.

In the present example, the MAC address list saved in MAC address list saving area 88# provided in saving data memory 34 on the main body side is the same as the MAC address list stored in MAC address list saving area 70# of wireless communication module 38. Therefore, the scheme described above may be realized using only MAC address list saving area 70#.

On the other hand, by providing MAC address list saving area 88# in saving data memory 34 on the main body side and saving the MAC addresses in MAC address list saving area 88#, it becomes possible to carry out edition such as addition or deletion of MAC address data more easily and at higher speed than in edition of data in MAC address list saving area 70 by accessing wireless communication module 38.

Then, CPU 31 (data notification processing unit 212) performs obtained data notification processing (step S316). Then, the process ends (END). The obtained data notification processing is similar to that described with reference to FIG. 71 and when the distribution data is obtained, a notification is given to the user by outputting sound effect or by displaying the contents.

On the other hand, when it is determined by CPU 31 (data communication carrying-out processing unit 208) in step S306 that the distribution data has not been received from the fixed terminal device which is the distribution partner within a prescribed time period (NO in step S306), the process proceeds to step S318. In step S318, CPU 31 (data communication carrying-out processing unit 208) disconnects communication with the fixed terminal device which is the distribution partner. Then, the process proceeds to step S312. Therefore, in this case, since the distribution data could not appropriately be obtained, communication is disconnected without saving the MAC address in MAC address list saving area 70#. Therefore, it is possible to perform the processing described above in accordance with communication between portable and fixed terminals to thereby resume the data obtaining processing of the distribution data.

Figure 90:
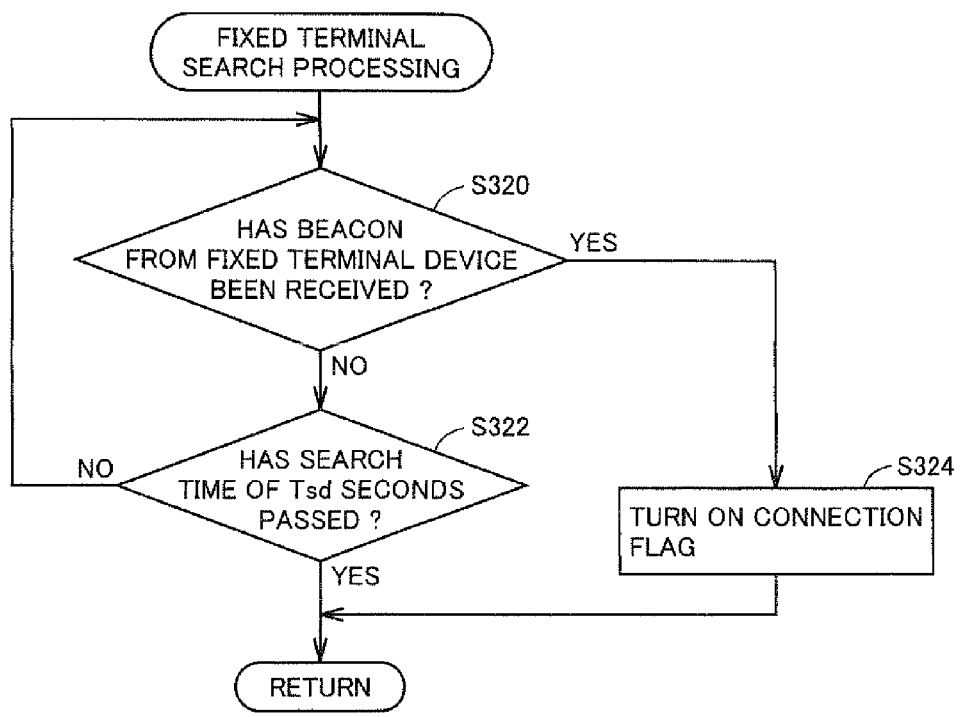
FIG. 90 is a flowchart representing fixed terminal search processing according to an embodiment of the present invention.

FIG. 90 is a flowchart representing fixed terminal search processing according to an embodiment of the present invention.

In this processing, game device 1 as a client carries out data communication with fixed terminal device 5 as a base, and game device 1 waits until a beacon is received from fixed terminal device 5 as a base. In the communication partner search processing, game device 1 always operates as a client and performs processing for searching for a base. In the present example, a scheme in which the beacon is transmitted only from fixed terminal device 5 and game device 1 waits for reception of the signal is described. This is because, since fixed terminal device 5 is a stationary device, data communication can be more efficient in a case where a beacon is transmitted only from fixed terminal device 5 than in a case where a signal is output from a portable and mobile game device.

Referring to FIG. 90, though not shown, when the fixed terminal search processing starts, a timer circuit is started.

In step S320, whether or not the beacon has been received from fixed terminal device 5 as a base is determined.

When the beacon has been received from fixed terminal device 5 (YES in step S320), a connection flag is turned ON in step S324 and the fixed terminal search processing ends. In other words, it is found that a client is capable of communication connection with fixed terminal device 5 which is the base.

Though not shown in FIG. 90, when the fixed terminal search processing starts, the connection flag is turned OFF (reset).

On the other hand, when the connection request signal from the base has not at all been received (NO in step S320), whether or not a time period of Tsd seconds in which the client tries connection to fixed terminal device 5 has passed is determined in step S322.

When the base search time period of Tsd seconds has not yet passed in step S322 (NO in step S322), the process directly returns to step S320.

On the other hand, when the base search time period of Tsd seconds has passed (YES in step S322), the fixed terminal search processing ends.

Figure 91:
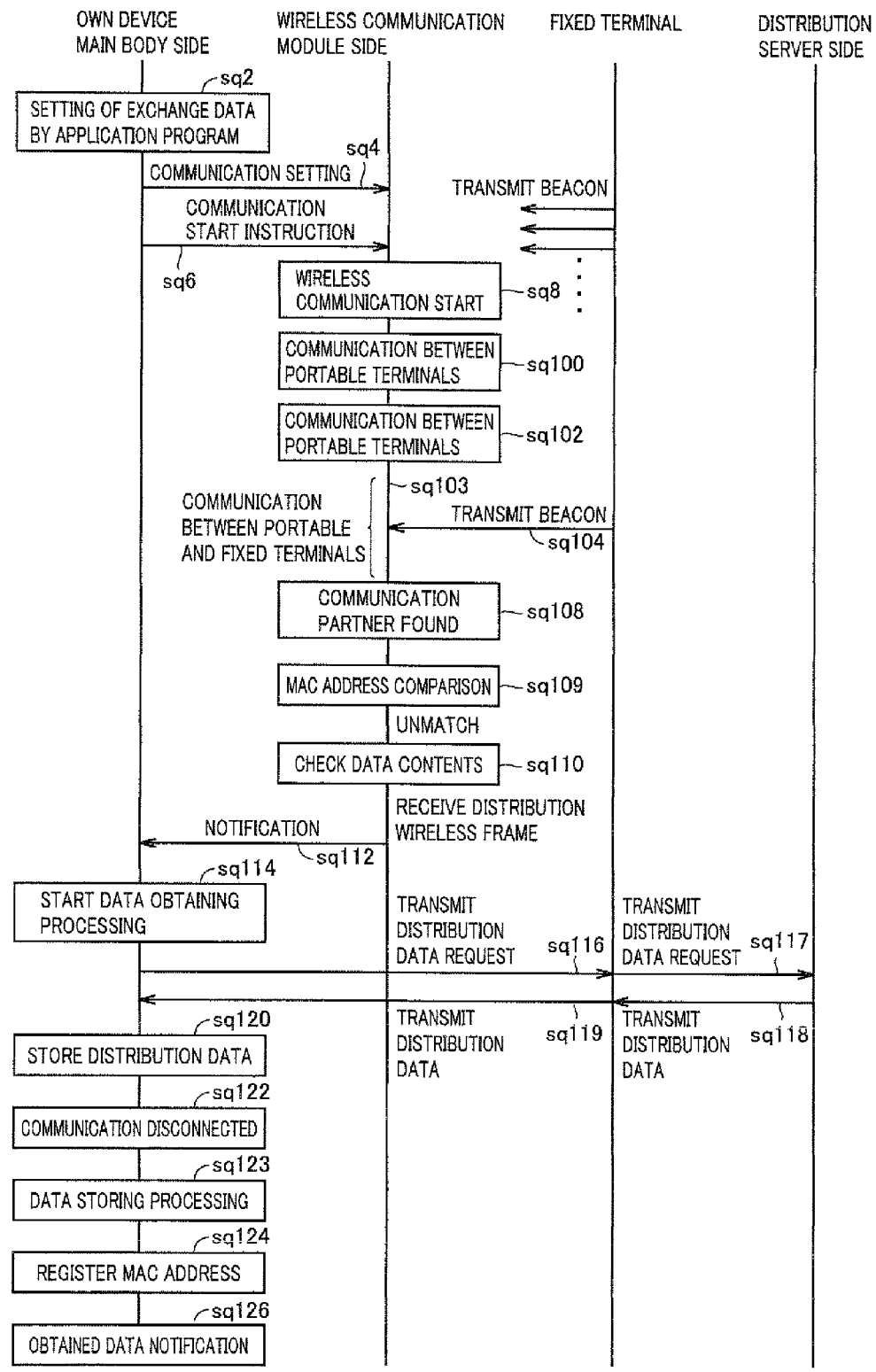
FIG. 91 illustrates exchange of data for obtaining distribution data according to an embodiment of the present invention.

FIG. 91 illustrates exchange of data for obtaining the distribution data according to an embodiment of the present invention.

Referring to FIG. 91, sequences sq2 to sq8 are the same as described with reference to FIG. 82, and CPU 31 on the main body side sets exchange data by executing an application program (sequence sq2). Then, CPU 31 on the main body side outputs data for communication initialization setting to wireless communication module 38 (sequence sq4). Then, CPU 31 on the main body side outputs a communication start instruction to wireless communication module 38 (sequence sq6).

In response to the communication start instruction, wireless communication by wireless communication module 38 starts (sequence sq8).

It is assumed that, first, communication between portable terminals searching for a communication partner to exchange data is started in wireless communication module 38 (sequence sq100) and a communication partner could not be found within a prescribed time period.

Then, in addition, it is assumed that a communication partner could not be found within the prescribed time period either in this case where communication between portable terminals starts (sequence sq102).

Then, communication between portable and fixed terminals starts (sequence sq103).

As described above, fixed terminal device 5 repeatedly emits (transmits) the beacon from signal generator 102.

Then, wireless communication module 38 of game device 1 accepts an input of the beacon transmitted from fixed terminal device 5 (sequence sq104).

Thus, the connection flag of game device 1 which is the own device is turned ON as described above.

As the connection flag is turned ON, wireless communication module 38 of game device 1 determines that communication connection with the fixed terminal device which is a communication partner becomes possible, that is, a communication partner has been found (sequence sq108).

Then, wireless communication module 38 of game device 1 checks the data contents (sequence sq110).

Then, when it is determined that the distribution wireless frame has been received, wireless communication module 38 notifies the CPU on the main body side that fixed terminal device 5 from which the distribution data can be provided has been found (sequence sq112).

Thus, based on the notification from wireless communication module 38, the CPU on the main body side recognizes that communication connection with fixed terminal device 5 that distributes distribution data is possible and starts the data obtaining processing (sequence sq114).

Then, after the data obtaining processing is started, CPU 31 on the main body side of game device 1 transmits a distribution data request (sequence sq116).

Wireless access point device 100 of fixed terminal device 5 accepts the distribution data request from game device 1 and transmits the distribution data request to distribution server 115 through network 110 (sequence sq117).

Then, in accordance with the distribution data request from wireless access point device 100, distribution server 115 transmits the distribution data (sequence sq118).

After the distribution data is accepted from distribution server 115 through network 110, wireless access point device 100 transmits the distribution data to game device 1 (sequence sq119).

Then, game device 1 accepts the distribution data transmitted from wireless access point device 100 of fixed terminal device 5 and stores the received distribution data in the memory (sequence sq120).

Then, communication is disconnected (sequence sq122).

Then, the data storing processing is performed (sequence sq123).

Then, the MAC address is registered (sequence sq124).

Then, the obtained data is notified (sequence sq126).

In the sequence above, by way of example, sequences sq4, sq6, and sq114 to 126 are the functions on the main body side and realized by the main body function program stored in system program saving area 86 as described above. Meanwhile, by way of example, sequences sq8 and sq100 to sq110 are realized by a program read from ROM 72 stored in memory control unit 64 of wireless communication module 38 as described above.

According to this embodiment, it is possible to automatically obtain the distribution data from fixed terminal device 5 with which communication connection is established, through wireless communication.

For example, in a case where the distribution data is such data as displaying a coupon that can be used at a store, one can obtain the distribution data displaying the coupon simply by carrying game device 1 accompanying wireless communication with fixed terminal device 5, and thus fun of obtaining the distribution data can be increased.

Further, for example, the obtained distribution data displaying a coupon may be stored as exchange data in the slot in exchange data saving area 80 described above. For example, the distribution data should only include an application causing storage in the exchange data saving area as exchange data described above. As a result of this processing, it becomes possible to provide the distribution data to others as the exchange data through communication between portable terminals.

Namely, even the distribution data that can be obtained only from fixed terminal device 5 can be provided to other users through communication between portable terminals, and zest of the distribution data can further be increased.

After the processing for obtaining distribution data is performed, the distribution partner search processing by wireless communication module 38 is started again.

For example, it is also possible to automatically start the communication setting processing every prescribed time period as described above. Since details of the communication setting processing have been described with reference to FIG. 15, description will not be repeated. Then, CPU 31 (communication instruction processing unit 206) outputs a communication start instruction to wireless communication module 38 (step S29).

Thus, communication between portable terminals is carried out again in wireless communication module 38 as described with reference to step S44 in FIG. 17 (step S44). Then, communication between portable terminals is again carried out (step S46).

When a communication partner could not be found within a prescribed time period in communication between portable terminals, communication between portable and fixed terminals is again carried out.

Details of communication between portable and fixed terminals are as described with reference to FIG. 86.

As described with reference to FIG. 86, in communication between portable and fixed terminals as well, the MAC address filtering processing that the communication processing with other fixed terminal devices having a matching MAC address is not performed again is performed.

Namely, substantial communication is not carried out with a fixed terminal device (in the present example, fixed terminal device 5) which is a communication partner with which communication has once been carried out and whose address is registered in the MAC address list.

Therefore, in the game device according to the embodiment of the present invention, a fixed terminal device in the communication range is automatically and repeatedly detected and the found fixed terminal device is set as a communication candidate. Here, it is possible that the same fixed terminal device is detected and found over and over again, however, the MAC address filtering processing as described above can prevent a number of times of communication with the same fixed terminal. Thus, efficient and effective data communication can be carried out.

Though the configuration in FIG. 85 not including application ID determination unit 230 as described with reference to FIG. 7 has been described, an application ID determination unit for determining whether or not the application ID stored in the received distribution wireless frame satisfies prescribed conditions relating to reception of the distribution data also in communication between portable and fixed terminals can also be provided. Specifically, similarly to the scheme described with reference to communication between portable terminals, the determination processing of an application ID saved in transmission wireless frame saving area 67 may be performed. For example, as described above, in a case where the application ID saved in transmission wireless frame saving area 67 includes the transmission/reception condition data (send flag data and receive flag data) described above, when such setting that only reception of data is desired is made, the determination processing for comparing the application ID with the application ID included in the distribution wireless frame to find out matching may be performed.

It is noted that a case where wireless access point device 100 and signal generator 102 are provided as separate components in fixed terminal device 5 shown in FIG. 83 has been described, however, these two components may be provided as one integrated device. Namely, wireless access point device 100 may have the function of signal generator 102 and output a connection request signal.

Alternatively, by providing signal generator 102 as a dedicated device for transmitting only a connection request signal as in the configuration shown in FIG. 83, processing load imposed on wireless access point device 100 can be alleviated so that, for example, data communication of distribution data with a plurality of game devices is efficiently carried out.

Further, as signal generator 102, a game device communicating with fixed terminal device 5 may be used as a dedicated signal generator that transmits only a connection request signal. Since information such as the vendor information the same as in the game device which is a communication partner is held, a signal generator can be realized in a simplified manner.

Figure 92:
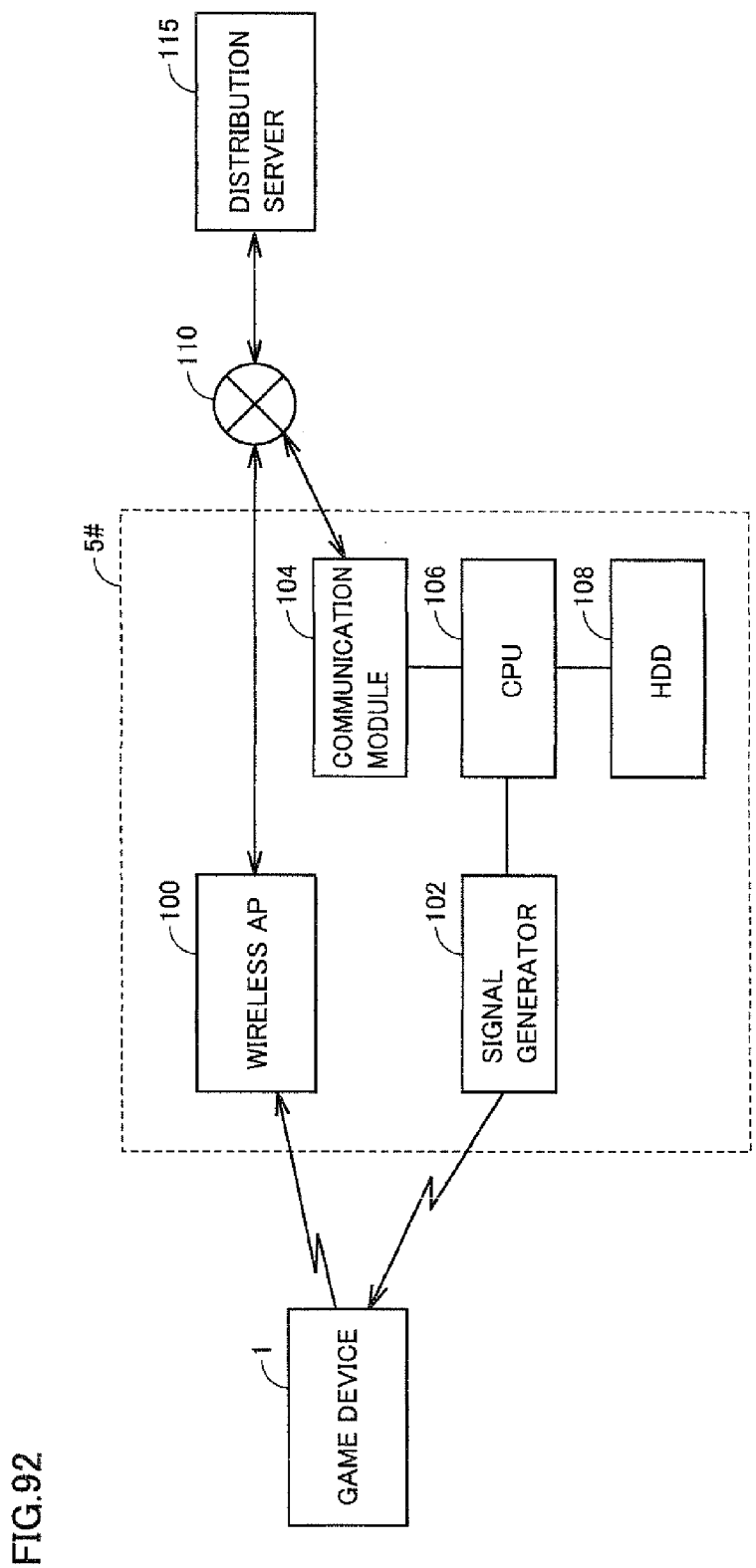
FIG. 92 is a diagram illustrating overview of communication processing between game device 1 and a fixed terminal device 5# according to an embodiment of the present invention.

FIG. 92 is a diagram illustrating overview of communication processing between game device 1 and a fixed terminal device 5# according to an embodiment of the present invention.

Referring to FIG. 92, fixed terminal device 5# is different from fixed terminal device 5 described with reference to FIG. 83 in additionally including a communication module 104, a CPU 106 and an HDD 108. Since configurations are otherwise the same as described with reference to FIG. 83, detailed description thereof will not be repeated.

It is assumed that communication module 104 is connected to network 110. Further, it is assumed that CPU 106 is connected to communication module 104, HDD (Hard Disk Drive) 108 and signal generator 102 and it controls these components. In the present example, by way of example, it is assumed that CPU 106 can output the distribution data stored in HDD 108 to other devices through network 110 connected to communication module 104.

According to such a configuration, it is possible for wireless access point device 100 to obtain the distribution data from distribution server 115 through the same processing as described above. Further, it is also possible to connect to communication module 104 connected through network 110, for example, to obtain the distribution data stored in HDD 108 and to transmit the data from wireless access point device 100 to a game device.

For example, when fixed terminal device 5# is installed in each of a plurality of stores and the like, by customizing the distribution data stored in HDD 108 for each store, it becomes possible to transmit the customized distribution data to a game device and hence fun of obtaining distribution data in a game device can be increased.

<MAC Address Update>

Figure 93:
FIG. 93 is a diagram illustrating update of a MAC address according to an embodiment of the present invention.

FIG. 93 is a diagram illustrating update of a MAC address according to an embodiment of the present invention.

As shown in FIG. 93, a prescribed data capacity is provided in the MAC address list saving area. When the prescribed data capacity is full and there is no longer an area for saving, the saved old MAC address is erased so that a new MAC address is saved. In the present example, though a case where the date of registration of a MAC address is registered as a time stamp is shown, the example is not particularly limited to that scheme, and an old one can be erased and a new one can be registered by sequencing addresses in the order of registration even in the absence of a time stamp.

A scheme for improving security in connection with setting of a transmission wireless frame in communication between portable terminals will now be described.

As described above, though the MAC address is used as the information for identifying a device, it is also possible that a third party fraudulently uses the MAC address to disguise itself as that device.

Therefore, in the present example, in order to improve security, the MAC address is updated.

Specifically, CPU 31 (communication setting processing unit 204) updates the contents in a local address set in the vendor code described with reference to FIG. 19.

Figure 94:
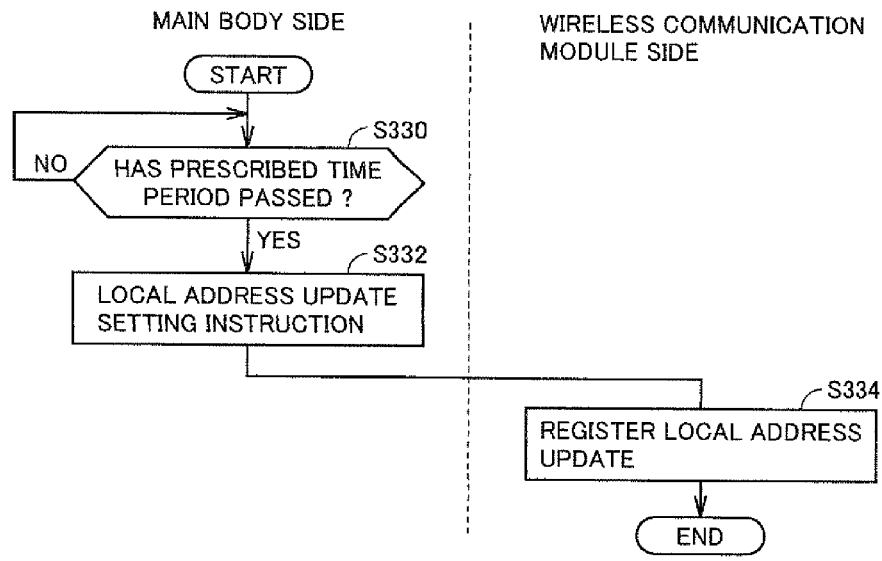
FIG. 94 is a flowchart representing update of a local address according to an embodiment of the present invention.

FIG. 94 is a flowchart representing update of a local address according to an embodiment of the present invention.

Referring to FIG. 94, first, CPU 31 (communication setting processing unit 204) on the main body side determines whether or not a prescribed time period has passed (step S330). By way of example, the prescribed time period is set to approximately 6 hours.

Then, when it is determined in step S330 that the prescribed time period has passed (YES in step S330), CPU 31 (communication setting processing unit 204) provides a local address update setting instruction (step S332).

Then, CPU 60 on the side of the wireless communication module updates and registers the local address in accordance with the local address update setting instruction (step S334), Namely, a local address value to be set in the transmission wireless frame is updated and registered in RAM 66.

Then, the process ends (END).

Through this processing, the local address of each device is updated after a prescribed time period passed.

Therefore, since the contents in a MAC address are updated after a prescribed time period passed, the MAC address is not uniquely defined. Therefore, by introducing such a scheme as preventing the device from being uniquely specified based on a MAC address, security can be improved.

<Erasure of MAC Address List>

In the foregoing description, such processing and the like that the data in MAC address list saving area 88 is erased in response to an instruction from CPU 31 (device identification information erasing processing unit 218) in accordance with a prescribed operation instruction from the user, or when a prescribed data capacity becomes full and a saving area is no longer available, a saved old MAC address is erased and a new MAC address is saved to ensure a saving area has been described, however, the MAC address list may be erased in coordination with MAC address updating described above.

As described above, in a case where the local address of each device is updated after a prescribed time period passed, it is possible that update of MAC addresses of other game devices results in the processing again performed with a partner with which the exchange data giving/receiving processing described above was performed previously.

Figure 95:
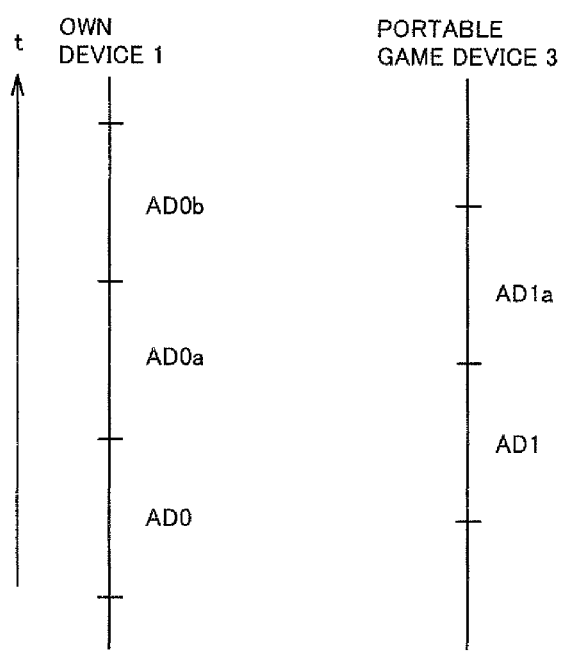
FIG. 95 illustrates MAC address update processing according to an embodiment of the present invention.

FIG. 95 illustrates MAC address update processing according to an embodiment of the present invention.

Referring to FIG. 95, here, own device 1 and game device 3 will be described.

A case in which the MAC address of own device 1 is updated over time from AD0 to AD0*a* and AD0*b* every prescribed time period is shown.

Further, a case where the MAC address of game device 3 is updated from AD1 to AD1*a* is shown.

Therefore, it is possible that data communication takes place with the same device (game device 3) each time the MAC address is updated, and the data capacity to be ensured in the MAC address list saving area may become large.

On the other hand, as shown in FIG. 95, the timing of MAC address update differs for each device.

It is assumed that the processing for giving/receiving exchange data described above to/from game device 3 is performed while the MAC address of own device 1 is AD0. Then, MAC address AD1 of game device 3 is registered.

When the MAC address of own device 1 is updated from AD0 to AD0*a* (update for the first time), it is not always the case that the MAC address of game device 3 has been updated. Therefore, MAC address AD1 of game device 3 registered while the MAC address was AD0 is not erased but maintained as it is, so that wasteful data communication can be avoided.

Then, a case where the MAC address of own device 1 is updated from AD0*a* to AD0*b* (update for the second time) after a prescribed time period passed is considered. In this case, since the prescribed time period has passed, the MAC address of game device 3 has been updated from AD1 to AD1*a*.

Therefore, it is unnecessary to maintain MAC address AD1 of game device 3 that was maintained last time.

Therefore, in the present example, the MAC address list corresponding to the currently used MAC address is held and the MAC address list corresponding to the immediately preceding MAC address is held, whereas the MAC address list corresponding to the further preceding MAC address, that is, the second last MAC address, is erased.

Figure 96:
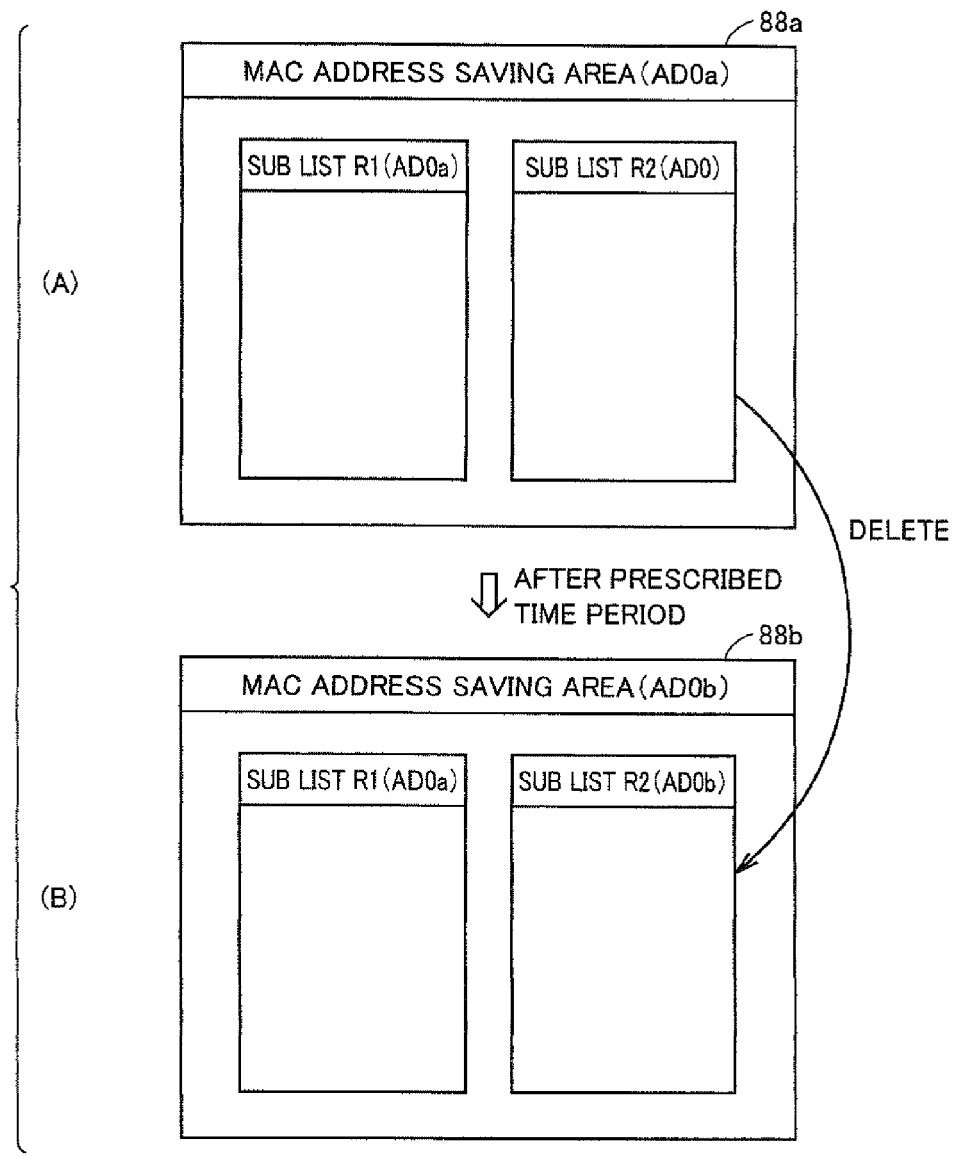
FIG. 96 shows a configuration of a MAC address list saving area 88 according to an embodiment of the present invention.

FIG. 96 shows a configuration of MAC address list saving area 88 according to an embodiment of the present invention.

In the present example, it is assumed that two areas are provided as MAC address list saving areas. Here, a case where a MAC address list saving area 88*a* is defined for the current time and a MAC address list saving area 88*b* is defined for a time after a prescribed time period passed will be described.

Referring to FIG. 96(A), MAC address list saving area 88*a* includes two sub lists R1 and R2. In this case, it is assumed that data communication is being carried out using MAC address AD0*a*.

Specifically, an area (sub list R1) for saving the MAC address of another game device by performing the processing for giving/receiving the exchange data using the currently used MAC address (AD0*a*) and an area (sub list R2) for saving the MAC address of another game device by performing the processing for giving/receiving the exchange data using the MAC address (AD0) used before the currently used MAC address are provided.

Figure 97:
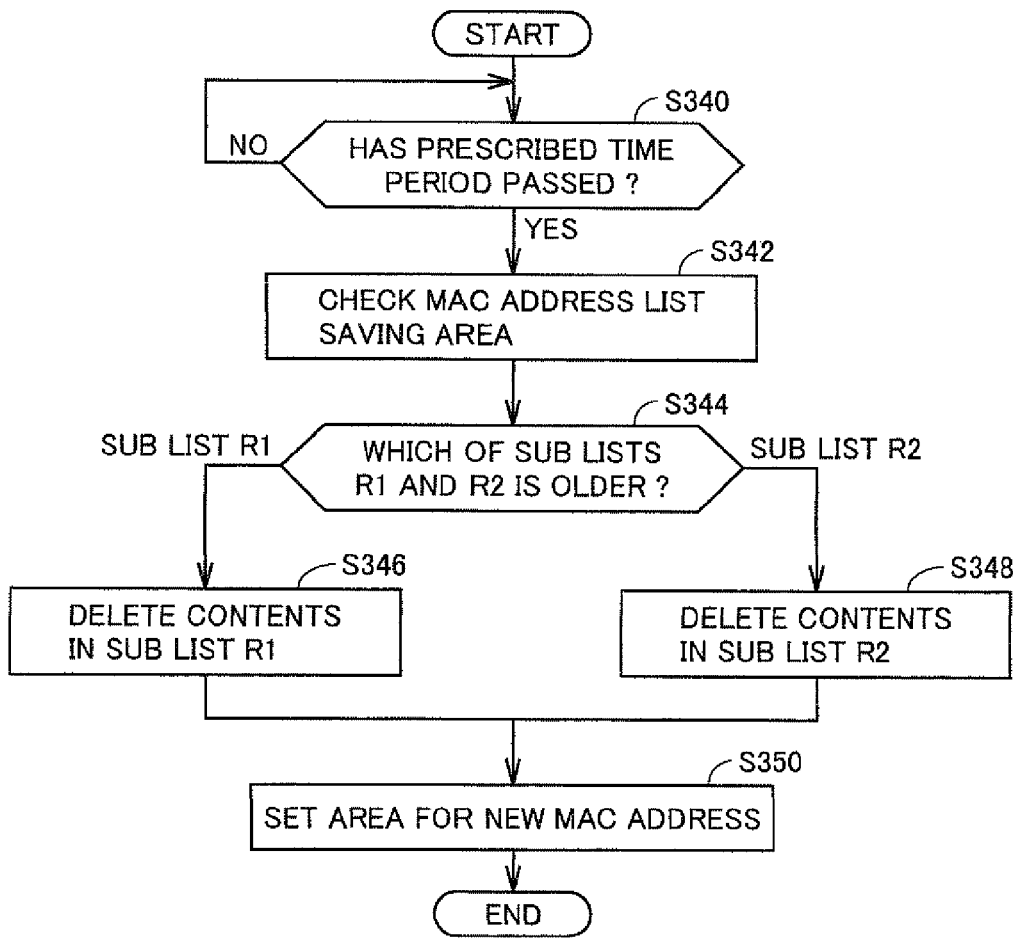
FIG. 97 is a flowchart representing erasure of a MAC address list according to an embodiment of the present invention.

FIG. 97 is a flowchart representing erasure of a MAC address list according to an embodiment of the present invention.

Referring to FIG. 97, first, CPU 31 (device identification information erasing processing unit 218) on the main body side determines whether or not the prescribed time period has passed (step S340). By way of example, the prescribed time period is set to about 6 hours.

Then, when it is determined in step S340 that the prescribed time period has passed (YES in step S340), CPU 31 (device identification information erasing processing unit 218) checks MAC address list saving area 88 (step S342).

Then, which of sub lists R1 and R2 provided in MAC address list saving area 88*a* is older is determined (step S344).

Then, when sub list R1 is determined to be older, the contents in sub list R1 are deleted (step S346).

On the other hand, when sub list R2 is determined to be older, the contents in sub list R2 are deleted (step S348).

Then, the area from which contents have been deleted is set as the area for a new MAC address (step S350).

Then, the process ends (END).

Referring to FIG. 96(B), here, an example in which MAC address AD0*a* has been updated to MAC address AD0*b* after the prescribed time period passed is shown.

In this case, a case where MAC address list saving area 88*b* has an area for a new MAC address (MAC address AD0*b*) set, with contents in older sub list R2 (MAC address AD0) of two sub lists R1 and R2 having been deleted, is shown.

As a result of this processing, each time the MAC address is updated, data contents in one of the two areas are deleted so that a data amount of the MAC address list saving area as a whole can be suppressed.

Further, when the MAC address is updated, the sub list corresponding to the currently used MAC address can be held and therefore MAC address filtering can be carried out based on the held MAC address. Therefore, even when the MAC address is updated, efficient data communication can be continued.

In this case as well, CPU 31 (device identification information erasing processing unit 218) can also delete the data contents in MAC address list saving area 88# in which the MAC addresses for communication between portable and fixed terminals are saved, in addition to MAC address list saving area 88 in which the MAC addresses for communication between portable terminals are saved, however, the MAC address of a fixed terminal device is not updated and therefore it is unnecessary to erase the data contents at the same timing as in communication between portable and fixed terminals.

Therefore, CPU 31 (device identification information erasing processing unit 218) may erase the data contents in MAC address list saving area 88# in which the MAC addresses for communication between portable and fixed terminals are saved at timing different from the timing of erasing the data contents in MAC address list saving area 88 in which the MAC addresses for communication between portable terminals are saved.

Though MAC address list saving areas 88 and 88# in the main body portion have been described here, MAC address list saving areas 70 and 70# on the side of wireless communication module 38 are also similarly applicable.

<Other Embodiments>

Though game device 1 has been exemplified as a representative example of the information processing apparatus according to the present invention, the information processing apparatus is not limited as such. Namely, an application executable by a personal computer may be provided as a program according to the present invention. Here, the program according to the present invention may be incorporated as a partial function of various applications executed by a personal computer.

Though only an information processing system including a portable game device has been described in this embodiment, a portable terminal such as a portable telephone and a PDA in place of the portable game device is also similarly applicable.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing system, comprising:
 a plurality of information processing apparatuses, each of the respective information processing apparatuses including memory, communication circuitry, and processing circuitry for controlling the respective information processing apparatus to perform operations comprising:
  storing, in the memory, first assignment data for transmission to unspecified other information processing apparatuses configured with an application program capable of using the first assignment data,
  transmitting, via the communication circuitry, first transmission data to a receiving information processing apparatus determined to be configured with an application program capable of using the first assignment data, the first transmission data including the first assignment data and first transfer data specifying a number of times for further transfer of the first assignment data to unspecified other information processing apparatuses configured with an application program capable of using the first assignment data,
  receiving, as reception data, via the communication circuitry, second transmission data transmitted from a transmitting information processing apparatus, the reception data including second assignment data usable by an application program stored in the memory and second transfer data specifying a number of times for further transfer of the second assignment data,
  determining, based on the second transfer data, whether the second assignment data is to be further transferred to unspecified other information processing apparatuses configured with an application program capable of using the second assignment data, and
  transmitting, via the communication circuitry, third transmission data to a receiving information processing apparatus determined to be configured with an application program capable of using the second assignment data, if the determining determines that the second assignment data is to be further transferred, the third transmission data including the second assignment data and third transfer data for specifying a number of times for still further transfer of the second assignment data to unspecified other information processing apparatuses configured with an application program capable of using the second assignment data.

2. The information processing system according to claim 1, wherein the processing circuitry of each respective information processing apparatus controls the respective information processing apparatus to perform further operations comprising:
 updating the second transfer data to generate the third transfer data when the determining determines that the second assignment data is to be further transferred.

3. The information processing system according to claim 2, wherein the reception data, and the third transfer data are stored in the memory.

4. The information processing system according to claim 3, wherein the processing circuitry of each respective information processing apparatus controls the respective information processing apparatus to perform further operations comprising:
 causing a display to display the second assignment data.

5. The information processing system according to claim 1, wherein the processing circuitry of each respective information processing apparatus controls the respective information processing apparatus to perform further operations comprising:
 setting a transmission number defining the number of times for transmitting the first assignment data,
 determining whether to transmit the first assignment data based on the transmission number, and
 transmitting the first transmission data including the first assignment data to a receiving information processing apparatus if the determining based on the transmission number determines that the first assignment data is to be transmitted.

6. The information processing system according to claim 5, wherein the processing circuitry of each respective information processing apparatus controls the respective information processing apparatus to perform further operations comprising:
- determining whether transmission of the first transmission data has been successful,
- updating the transmission number when the determining determines that the transmission has been successful, and
- determining whether to transmit the first assignment data again based on the updated transmission number.

7. The information processing system according to claim 5, wherein
- the first transfer data and the transmission number define the number of times of transfer of the first assignment data and the number of times of transmission of the first assignment data, respectively, and
- the number of times of transmission is initially one when the number of times of transfer is initially one or more.

8. The information processing system according to claim 1, wherein
- the second assignment data is transmitted to a receiving information processing apparatus when the determining determines that the second assignment data is to be transferred, regardless of whether the application program with which the second assignment data is usable is currently being executed.

9. The information processing system according to claim 1, wherein the processing circuitry of each respective information processing apparatus controls the respective information processing apparatus to perform further operations comprising:
- causing the second assignment data to be stored in a reception storage area in the memory, and causing the second assignment data to be replicated and the replicated assignment data to be stored in a transmission storage area in the memory, when the result of the determining determines that the second assignment data is to be transferred.

10. The information processing system according to claim 9, wherein
- at least part of the communication circuitry of each information processing apparatus is provided in a wireless module configured to search for other information processing apparatuses capable of communication through near field communication, and
- a main body portion of each information processing apparatus, other than the wireless module, transitions to a sleep state after replicated second assignment data is stored in the transmission storage area thereof.

11. The information processing system according to claim 10, wherein
- the wireless module repeatedly searches for another information processing apparatus with which it can communicate through near field communication, and when the wireless module can communicate with another information processing apparatus, communication is carried out with the another information processing apparatus.

12. An information processing apparatus, comprising memory, communication circuitry, and processing circuitry for controlling the information processing apparatus to perform operations comprising:
- storing, in the memory, first assignment data for transmission to unspecified other information processing apparatuses configured with an application program capable of using the first assignment data;
- transmitting, via the communication circuitry, first transmission data to a receiving information processing apparatus determined to be configured with an application program capable of using the first assignment data, the first transmission data including the first assignment data and first transfer data specifying a number of times for further transfer of the first assignment data to unspecified other information processing apparatuses configured with an application program capable of using the first assignment data;
- receiving, as reception data, via the communication circuitry, second transmission data transmitted from a transmitting information processing apparatus, the reception data including second assignment data usable by an application program stored in the memory and second transfer data specifying a number of times for further transfer of the second assignment data to unspecified other information processing apparatuses configured with an application program capable of using the second assignment data,
- determining, based on the second transfer data, whether the second assignment data is to be further transferred to unspecified other information processing apparatuses configured with an application program capable of using the second assignment data, and
- transmitting, via the communication circuitry, third transmission data to a receiving information processing apparatus determined to be configured with an application program capable of using the second assignment data, if the determining determines that the second assignment data is to be further transferred, the third transmission data including the second assignment data and third transfer data for specifying a number of times for still further transfer of the second assignment data to unspecified other information processing apparatuses configured with an application program capable of using the second assignment data.

13. A method of controlling an information processing apparatus comprising memory, communication circuitry and processing circuitry, the method comprising:
- storing, in the memory, first assignment data for transmission to unspecified other information processing apparatuses configured with an application program capable of using the first assignment data;
- transmitting, via the communication circuitry, first transmission data to a receiving information processing apparatus determined to be configured with an application program capable of using the first assignment data, the first transmission data including the first assignment data and first transfer data specifying a number of times for further transfer of the first assignment data to unspecified other information processing apparatuses configured with an application program capable of using the first assignment data;
- receiving, as reception data, via the communication circuitry, second transmission data transmitted from a transmitting information processing apparatus, the reception data including second assignment data usable by an application program stored in the memory and second transfer data specifying a number of times for further transfer of the second assignment data to unspecified other information processing apparatuses configured with an application program capable of using the second assignment data;
- determining, based on the second transfer data, whether the second assignment data is to be further transferred to unspecified other information processing apparatuses configured with an application program capable of using the second assignment data, and transmitting, via the communication circuitry, third transmission data to a receiving information processing apparatus determined to be configured with an application program capable of using the second assignment data, if the determining determines that the second assignment data is to be further transferred, the third transmission data including the second assignment data and third transfer data for specifying a number of times for still further transfer of the second assignment data to unspecified other information processing apparatuses configured with an application program capable of using the first assignment data.

14. A non-transitory recording medium storing instructions for an information processing apparatus comprising communication circuitry and processing circuitry, the instructions for the information processing apparatus causing a computer to control the information processing apparatus to perform operations comprising:

storing first assignment data for transmission to unspecified other information processing apparatuses configured with an application program capable of using the first assignment data;

transmitting, via the communication circuitry, first transmission data to a receiving information processing apparatus determined to be configured with an application program capable of using the first assignment data, the first transmission data including the first assignment data and first transfer data specifying a number of times for further transfer of the first assignment data to unspecified other information processing apparatuses configured with an application program capable of using the first assignment data;

receiving, as reception data, via the communication circuitry, second transmission data transmitted from a transmitting information processing apparatus, the reception data including second assignment data usable by an application program stored in the memory and second transfer data specifying a number of times for further transfer of the second assignment data to unspecified other information processing apparatuses configured with an application program capable of using the second assignment data;

determining, based on the second transfer data, whether the second assignment data is to be further transferred to unspecified other information processing apparatuses configured with an application program capable of using the second assignment data, and transmitting, via the communication circuitry, third transmission data to a receiving information processing apparatus determined to be configured with an application program capable of using the second assignment data, if the determining determines that the second assignment data is to be further transferred, the third transmission data including the second assignment data and third transfer data for specifying a number of times for still further transfer of the second assignment data to unspecified other information processing apparatuses configured with an application program capable of using the second assignment data.

15. An information processing apparatus, comprising:

a wireless communication module for wirelessly communicating with other information processing apparatuses; and one or more processors for controlling the information processing apparatus to perform operations comprising:

data communicating operations comprising:

storing, in memory, first assignment data for transmission to unspecified other information processing apparatuses configured with an application program capable of using the first assignment data;

determining whether an unspecified other information processing apparatus in communication range is configured with an application capable of using the first assignment data;

transmitting, via the wireless communication module, first transmission data to a receiving information processing apparatus determined to be configured with an application program capable of using the first assignment data, the first transmission data including the first assignment data and first transfer data specifying a number of times for further transfer of the first assignment data to unspecified other information processing apparatuses configured with an application program capable of using the first assignment data;

receiving, as reception data, via the wireless communication module, second transmission data transmitted by a transmitting information processing apparatus, the reception data including second assignment data usable by an application program stored in the memory and second transfer data specifying a number of times for further transfer of the second assignment data to unspecified other information processing apparatuses configured with an application program capable of using the second assignment data;

determining, based on the second transfer data, whether the second assignment data is to be further transferred to unspecified other information processing apparatuses configured with an application program capable of using the second assignment data;

determining whether an unspecified other information processing apparatus in communication range is configured with an application capable of using the second assignment data;

transmitting, via the wireless communication module, third transmission data to a receiving information processing apparatus determined to be configured to execute an application program capable of using the second assignment data, if the determining determines that the second assignment data is to be further transmitted, the third transmission data including the second assignment data and third transfer data for specifying a number of times for still further transfer of the second assignment data to unspecified other information processing apparatuses configured with an application program capable of using the second assignment data.

16. The information processing apparatus according to claim 15, further comprising:

a built-in, touchscreen display.

17. The information processing apparatus according to claim 15, embodied as a telephone device.

* * * * *